(12) United States Patent
Kurashina

(10) Patent No.: US 7,038,794 B2
(45) Date of Patent: May 2, 2006

(54) IMAGE FORMING DEVICE WHICH DETERMINES IF THE NUMBER OF LINES TO BE FORMED AFTER CONVERTING IMAGE DATA EXCEEDS A PREDETERMINED LINE COUNT

(75) Inventor: Hiroyasu Kurashina, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 217 days.

(21) Appl. No.: 10/758,704

(22) Filed: Jan. 14, 2004

(65) Prior Publication Data

US 2004/0145762 A1 Jul. 29, 2004

Related U.S. Application Data

(62) Division of application No. 09/382,499, filed on Aug. 25, 1999, now Pat. No. 6,707,571.

(30) Foreign Application Priority Data

| Aug. 28, 1998 | (JP) | ............................................. | 10-244134 |
| Aug. 28, 1998 | (JP) | ............................................. | 10-244136 |
| Aug. 28, 1998 | (JP) | ............................................. | 10-244143 |
| Aug. 28, 1998 | (JP) | ............................................. | 10-244144 |

(51) Int. Cl.
*G06F 15/00* (2006.01)

(52) U.S. Cl. ..................................... 358/1.11; 358/1.18
(58) Field of Classification Search ................. 358/1.1, 358/1.2, 1.6, 1.8, 1.9, 1.12, 1.13, 1.14, 1.18, 358/874, 1.11, 1.17
See application file for complete search history.

(56) References Cited

U.S. PATENT DOCUMENTS

| 5,448,685 | A |   | 9/1995  | Ogura et al. | ................ 358/1.18 |
| 5,559,934 | A | * | 9/1996  | Ogura et al. | ................ 358/1.18 |
| 5,677,999 | A | * | 10/1997 | Hidaka et al. | ................ 358/1.2 |
| 5,933,589 | A |   | 8/1999  | Hidaka et al. | ............. 358/1.18 |
| 6,375,306 | B1 | * | 4/2002 | Tsukagoshi | .................. 347/40 |

FOREIGN PATENT DOCUMENTS

| JP | 62-44865 | 8/1985 |
| JP | 3-15751 | 8/1986 |
| JP | 5-92649 | 2/1991 |
| JP | 9-136463 | 11/1995 |
| JP | 9-326185 | 6/1996 |
| JP | 11-185442 | 7/1999 |

* cited by examiner

*Primary Examiner*—Gabriel Garcia
(74) *Attorney, Agent, or Firm*—Hogan & Hartson, LLP

(57) ABSTRACT

An image forming device defines a reference line count, determines whether or not the number of lines of basic character strings to be formed which is arranged in an edit image forming memory area exceeds in number any of one or more n-th predetermined line counts, and calculates an n-th post-omission line count for notifying omission of lines from each n-th predetermined line count which the number of characters strings is determined to exceed by inserting an n-th predetermined line overflow notifying character string indicative of an excess in line count over each n-th predetermined line count between an end of a line of the basic character strings immediately before the count of lines of the basic character strings exceeds the n-th post omission line count and a head of the following line.

17 Claims, 76 Drawing Sheets

F I G. 2 0 A
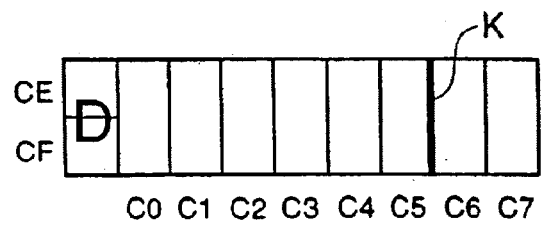
F I G. 2 0 B
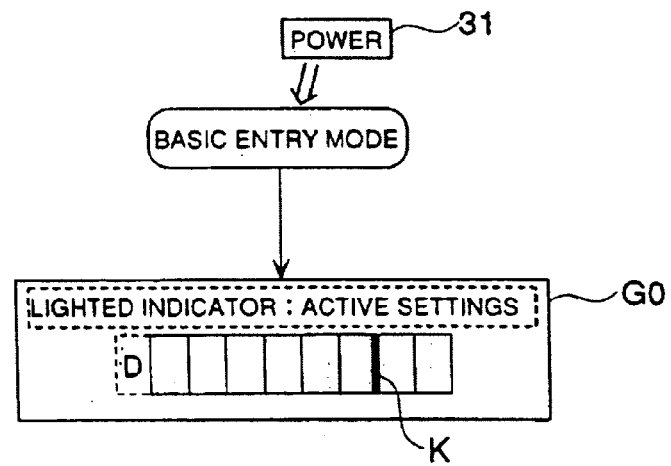
F I G. 2 0 C
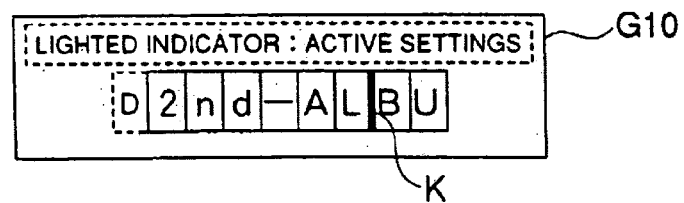

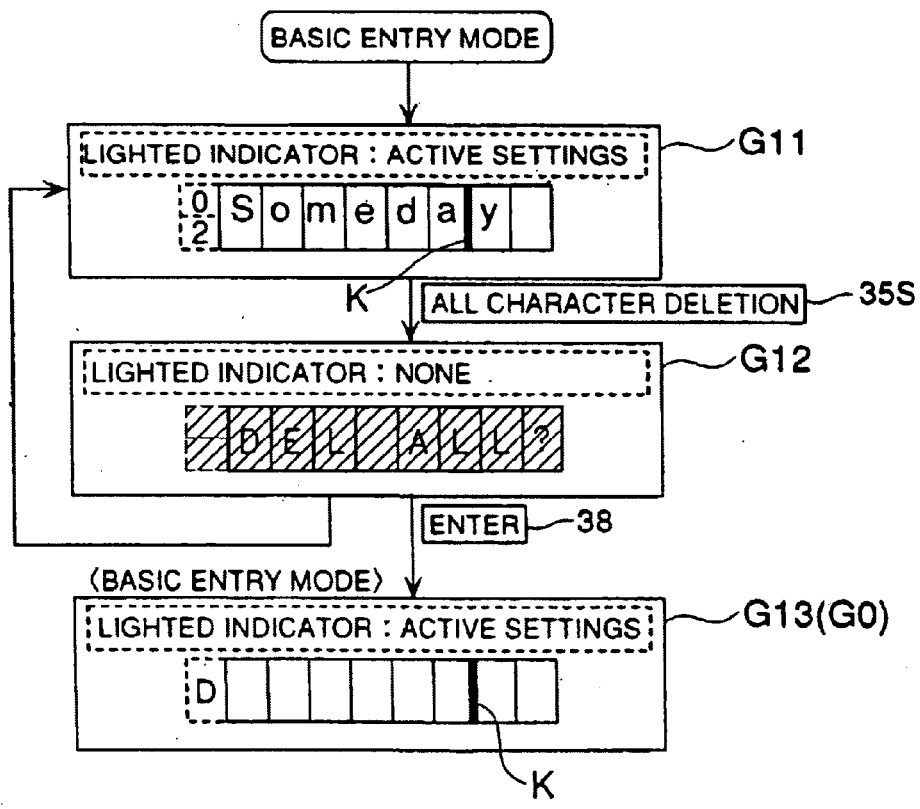
F I G. 2 1

| LINE NUMBER | MUSIC NUMBER (INFORMATION NUMBER) / TITLE | MUSIC NUMBER (INFORMATION NUMBER) / TITLE |
|---|---|---|
| 1 | ☆TITLE | ☆TITLE |
| 2 | 1. A1B1C1D1E1F | 1. A1B1C1D1E1F |
| 3 | 1G1 | 1G1 |
| 4 | 2. A2B2C2 | 2. A2B2C2 |
| 5 | 3. A3B3C3D3E3F | 3. A3B3C3D3E3F |
| 6 | 3G | 3G |
| 7 | 4. A4B4C4D4E4F | 4. A4B4C4D4E4F |
| 8 | 5. A5B5C5D5E5F | 5. A5B5C5D5E5F |
| 9 | 5G5H5I5J5K5 | 5G5H5I5J5K5 |
| 10 | L5M5N5 | L5M5N5 |
| 11 | 6. A6B6C6D6 | 6. A6B6C6D6 |
| 12 | 7. A7B7C7E | 7. A7B7C7E |
| 13 | 8. A8B8C8D8E8F | 8. A8B8C8D8E8F |
| 14 | 8G8H8I8J8K8 | 8G8H8I8J8K8 |
| 15 | L8 | L8 |
| 16 | 9. A9B9 | 9. A9B9 |
| 17 | 10. A10B10C10D1 | 10. A10B10C10D1 |
| 18 | 0E10F1 | 0E10F1 |
| 19 | 11. A11B11C11D1 | 11. A11B11C11D1 |
| 20 | 12. A12B12C12D1 | ~A TOTAL OF 45 TITLES~ |
| 21 | 2E12F12 | |
| 22 | 13. A13B13C13D1 | |
| 23 | 3E13 | |
| 24 | 14. A14B14C14 | |
| ⋮ | | |

FIG. 27A     FIG. 27B

| LINE NUMBER | MUSIC NUMBER (INFORMATION NUMBER) / TITLE | MUSIC NUMBER (INFORMATION NUMBER) / TITLE |
|---|---|---|
| 1 | ☆TITLE | ☆TITLE |
| 2 | 1. A1B1C1D1E1··· | 1. A1B1C1D1E1··· |
| 3 | 2. A2B2C2 | 2. A2B2C2 |
| 4 | 3. A3B3C3D3E3··· | 3. A3B3C3D3E3··· |
| 5 | 4. A4B4C4D4E4F | 4. A4B4C4D4E4F |
| 6 | 5. A5B5C5D5E5··· | 5. A5B5C5D5E5··· |
| 7 | 6. A6B6C6D6 | 6. A6B6C6D6 |
| 8 | 7. A7B7C7E | 7. A7B7C7E |
| 9 | 8. A8B8C8D8E8··· | 8. A8B8C8D8E8··· |
| 10 | 9. A9B9 | 9. A9B9 |
| 11 | 10. A10B10C10D··· | 10. A10B10C10D··· |
| 12 | 11. A11B11C11D1 | 11. A11B11C11D1 |
| 13 | 12. A12B12C12D··· | 12. A12B12C12D··· |
| 14 | 13. A13B13C13D··· | 13. A13B13C13D··· |
| 15 | 14. A14B14C14 | 14. A14B14C14 |
| 16 | 15. A15B15 | 15. A15B15 |
| 17 | 16. A16B16C16D··· | 10. A16B16C16D··· |
| 18 | 17. A17B | 17. A17B |
| 19 | 18. A18B18C18D··· | 18. A18B18C18D··· |
| 20 | ∼A TOTAL OF 45 TITLES∼ | 19. A19B19C19D··· |
| 21 |  | 20. A20B2 |
| 22 |  | 21. A21B21C21 |
| 39 |  | 38. A38B38C3 |
| 40 |  | ∼A TOTAL OF 45 TITLES∼ |

| CHARACTER | TITLE | MEANING |
|---|---|---|
| L1 | LINE OVERFLOW MARK 1 ("MARK L1") | WHEN PRINTING IS CARRIED OUT IN THE STATE OF DISC LABEL (SINGLE SHEET) BEING DESIGNATED, LINES FOLLOWING A LINE MARKED WITH THIS MARK ARE NOT PRINTED ONLY TO PRINT A MESSAGE "A TOTAL OF XX TITLES " INSTEAD. |
| L2 | LINE OVERFLOW MARK 2 ("MARK L2") | WHEN PRINTING IS CARRIED OUT IN THE STATE OF CASE LABEL (DOUBLE SHEET) BEING DESIGNATED, LINES FOLLOWING A LINE MARKED WITH THIS MARK ARE NOT PRINTED ONLY TO PRINT A MESSAGE "A TOTAL OF XX TITLES " INSTEAD. |
| C | CHARACTER OVERFLOW MARK ("MARK C") | WHEN PRINTING IS CARRIED OUT IN THE STATE OF NL-ON BEING DESIGNATED, A NEW LINE STARTS AT A CHARACTER LOCATED IMMEDIATELY AFTER THIS MARK, WHEREAS WHEN PRINTING IS CARRIED OUT IN THE STATE OF NL-OFF BEING DESIGNATED, ONLY ONE MARK C EXITS IN LINE OF TEXT DATA. WHEN THE TEXT DATA IS PRINTED, A LETTER IMMEDIATLY AFTER MARK C REPLACED BY A SYMBOL "..." TO SET THE SAME AS LAST LETTER TO BE PRINTED FOR THE LINE. |

FIG. 31A

| A | 1 | 0 | B | 1 | 0 | C | 1 | 0 | D | 1 | C | 0 | E | 1 | 0 | F | 1 |
|---|---|---|---|---|---|---|---|---|---|---|---|---|---|---|---|---|---|
| A | 1 | 1 | B | 1 | 1 | C | 1 | 1 | D | 1 | | | | | | | |

L1

| A | 1 | 2 | B | 1 | 2 | C | 1 | 2 | D | 1 | C | 2 | E | 1 | 2 | F | 1 | 2 |
| A | 1 | 3 | B | 1 | 3 | C | 1 | 3 | D | 1 | C | 3 | E | 1 | 3 | | | |

FIG. 31B

| A | 1 | 0 | B | 1 | 0 | C | 1 | 0 | D | C | 1 | 0 | E | 1 | 0 | F | 1 |
| A | 1 | 1 | B | 1 | 1 | C | 1 | 1 | D | 1 | | | | | | | |
| A | 1 | 2 | B | 1 | 2 | C | 1 | 2 | D | C | 1 | 2 | E | 1 | 2 | F | 1 | 2 |
| A | 1 | 3 | B | 1 | 3 | C | 1 | 3 | D | C | 1 | 3 | E | 1 | 3 | | | |

FIG. 31C

| A | 1 | 8 | B | 1 | 8 | C | 1 | 8 | D | C | 1 | 8 | E |
|---|---|---|---|---|---|---|---|---|---|---|---|---|---|

L1

| A | 1 | 9 | B | 1 | 9 | C | 1 | 9 | D | C | 1 | 9 | E | 1 | 9 |
| A | 2 | 0 | B | 2 | | | | | | | | | | | |

FIG. 31D

| | | | A | 3 | 8 | B | 3 | 8 | C | 3 |

L2

| A | 3 | 9 | B | 3 | 9 |
| A | 4 | 0 | B | 4 | 0 | C | 4 | 0 | D | C | 4 | 0 | E | 4 |
| A | 4 | 1 | B | 4 |

FIG. 34A

19. ガラスのジェネレーシ…
20. someday
21. 彼女はデリケート

FIG. 34B

19. ガラスのジェネレーシ…
20. someday
21. 彼女はデリケート

⟨PRINTING POSITION : REFERENCE POSITION⟩ 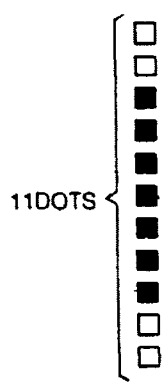
⟨PRINTING POSITION : SHIFTED UPWARD BY ONE DOT⟩ 
⟨PRINTING POSITION : SHIFTED DOWNWARD BY ONE DOT⟩ 
11DOTS
F I G. 3 7 A    F I G. 3 7 B    F I G. 3 7 C

FIG. 38A  FIG. 38B  FIG. 38C  FIG. 38D  FIG. 38E

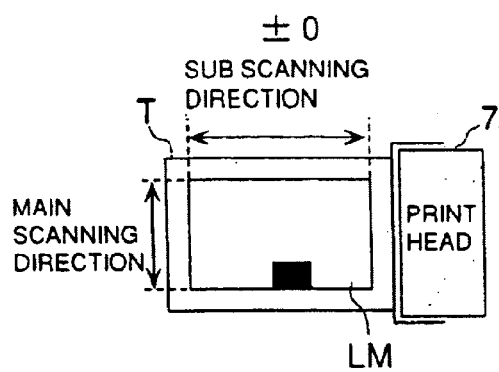
F I G. 40 A
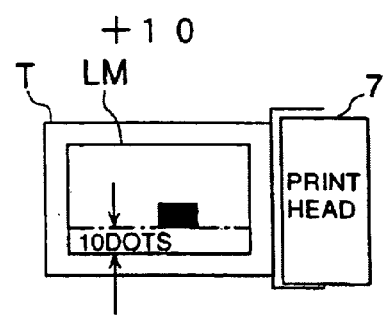
F I G. 40 B
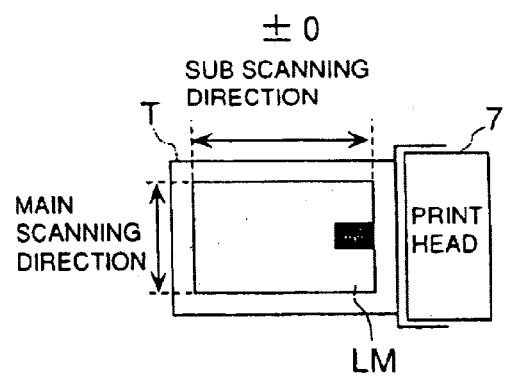
F I G. 41 A
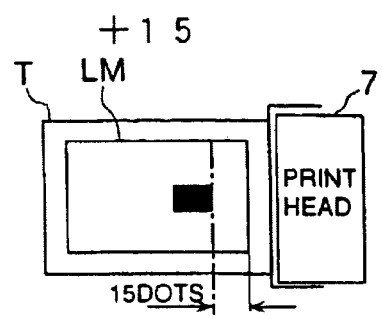
F I G. 41 B F I G. 4 4
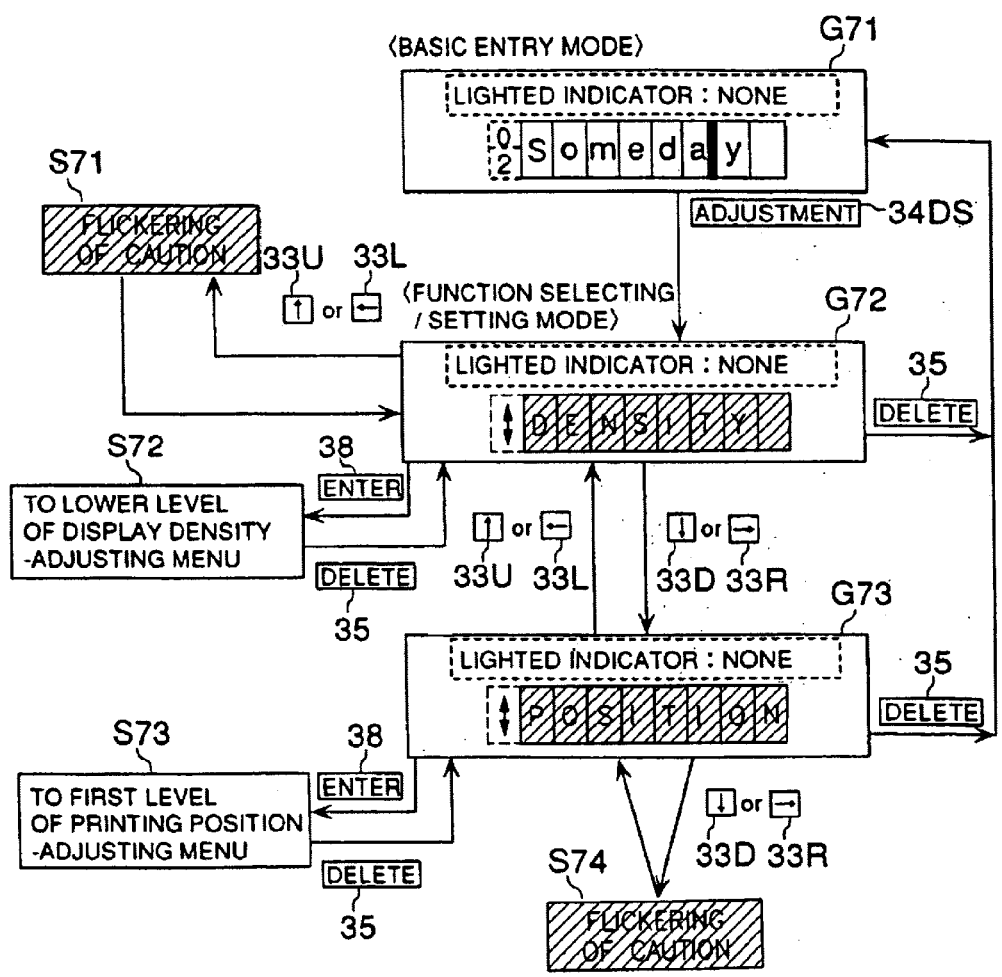

FIG. 50

| BITS | DETAILS |
|---|---|
| b31 | CARTRIDGE INFORMATION |
| b30 | NEW LINE-STARTING INFROMATION |
| b29 | (EFFECTIVE FOR MAIN LABEL ONLY) |
| b28 | PRINT SHEET NUMBER INFROMATION |
| b27 | (EFFECTIVE FOR MAIN LABEL ONLY) |
| b26 | RESERVE |
| b25 | |
| b24 | |
| b23 | FRAME INFORMATION |
| b22 | |
| b21 | |
| b20 | |
| b19 | |
| b18 | |
| b17 | (EFFECTIVE FOR MAIN LABEL ONLY) |
| b16 | RESERVE |
| b15 | |
| b14 | |
| b13 | |
| b12 | TITLE LINE : CHRARACTER DECORATION INFORMATION "TYPEFACE" |
| b11 | TITLE LINE : CHRARACTER DECORATION INFORMATION "EXTEND" |
| b10 | TITLE LINE : CHRARACTER DECORATION INFORMATION "SHORTEN" |
| b09 | TITLE LINE : CHRARACTER DECORATION INFORMATION "OUTLINE" |
| b08 | TITLE LINE : CHRARACTER DECORATION INFORMATION "ITALIC" |
| b07 | RESERVE |
| b06 | |
| b05 | |
| b04 | MUSIC TITLE LINE : CHRARACTER DECORATION INFORMATION "TYPEFACE" |
| b04 | MUSIC TITLE LINE : CHRARACTER DECORATION INFORMATION "EXTEND" |
| b04 | MUSIC TITLE LINE : CHRARACTER DECORATION INFORMATION "SHORTEN" |
| b04 | MUSIC TITLE LINE : CHRARACTER DECORATION INFORMATION "OUTLINE" |
| b04 | MUSIC TITLE LINE : CHRARACTER DECORATION INFORMATION "ITALIC" |

FIG. 51A

| b31 | b30 | CARTRIDGE INFORMATION |
|---|---|---|
| 0 | 0 | NO CARTRIDGE |
| 0 | 1 | MAIN LABEL CARTRIDGE |
| 1 | 0 | SIDE LABEL CARTRIDGE |
| 1 | 1 | UNUSABLE CARTRIDGE |

FIG. 51B

| b29/b28 | NEW LINE-STARTING SETTINGS |
|---|---|
| 0 | NL-OFF |
| 1 | NL-ON |

FIG. 51C

| b27 | b26 | PRINT SHEET NUMBER INFORMATION |
|---|---|---|
| 0 | – | PRINTING ON FIRST SHEET IS SET |
| 1 | 0 | PRINTING ON BOTH SHEETS IS SET, AND FIRST SHEET IS TO BE PRINTED NOW |
| 1 | 1 | PRINTING ON BOTH SHEETS IS SET, AND SECOND SHEET IS TO BE PRINTED NOW |

F I G. 5 2
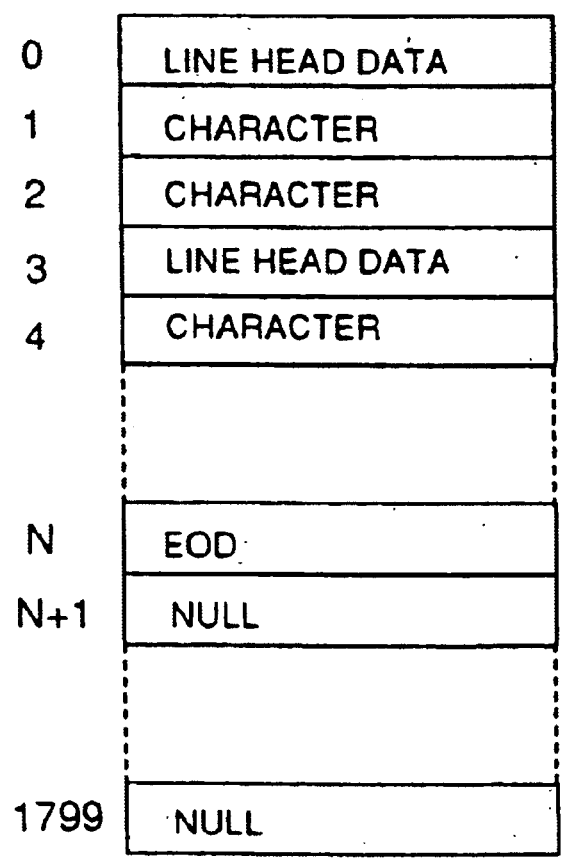

FIG. 53A

| b15 | b14 | b13 | b12 | KINDS OF DATA |
|---|---|---|---|---|
| 0 | 1 | 1 | 1 | EDIT INFORMATION |
| OTHER THAN THE ABOVE | | | | CHARACTER CODE |

FIG. 53B

| BIT | | DETAILS |
|---|---|---|
| b15 | 0 | INFORMATION OF TYPE OF DATA |
| b14 | 1 | "EDIT INFORMATION" |
| b13 | 1 | |
| b12 | 1 | |
| b11 | 1 | CLASSIFICATION OF EDIT INFORMATION |
| b10 | 0 | "LINE HEAD DATA" |
| b09 | 0 | |
| b08 | 0 | |
| b07 | — | MUSIC NUMBER |
| b06 | — | |
| b05 | — | |
| b04 | — | |
| b03 | — | |
| b02 | — | |
| b01 | — | |
| b00 | — | |

FIG. 53C

| BIT | | DETAILS |
|---|---|---|
| b15 | 0 | INFORMATION OF TYPE OF DATA |
| b14 | 1 | "EDIT INFORMATION" |
| b13 | 1 | |
| b12 | 1 | |
| b11 | 1 | CLASSIFICATION OF EDIT INFORMATION |
| b10 | 1 | "END MARK" |
| b09 | 1 | |
| b08 | 1 | |
| b07 | 1 | FIXED VALUE |
| b06 | 1 | |
| b05 | 1 | |
| b04 | 1 | |
| b03 | 1 | FIXED VALUE |
| b02 | 1 | |
| b01 | 1 | |
| b00 | 1 | |

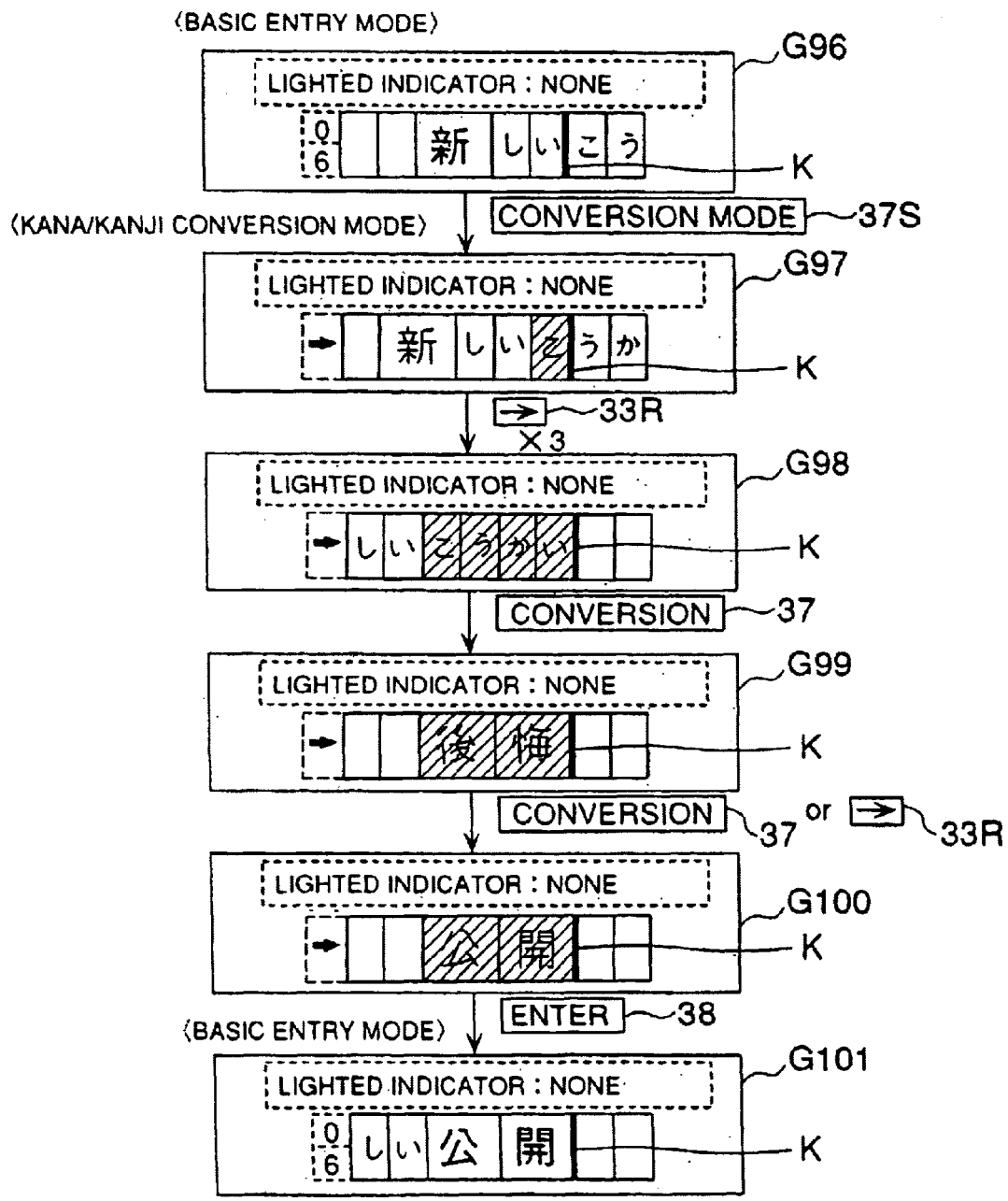

F I G. 5 8
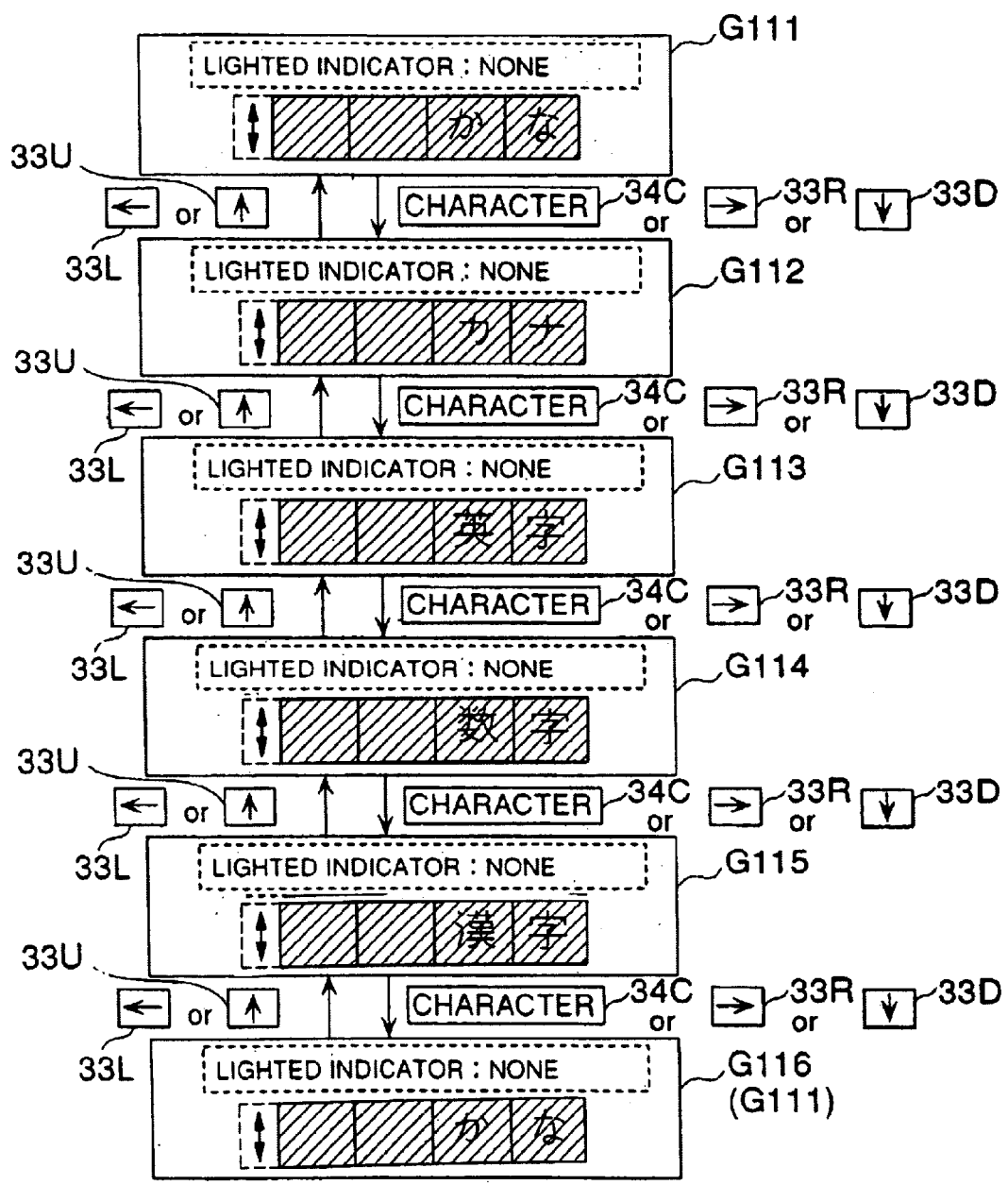

FIG. 60A
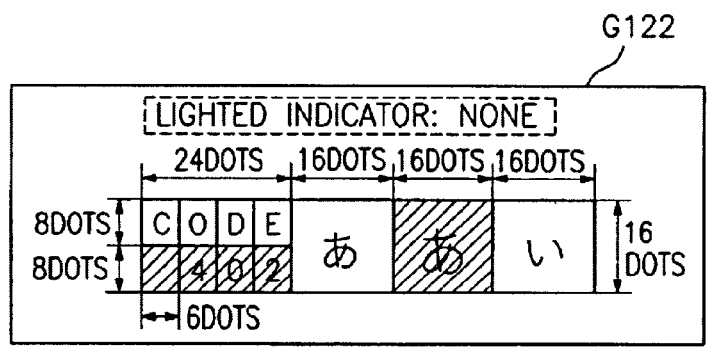
FIG. 60B
FIG. 60C  10  11  12

FIG. 61

| j\i | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | あ 0401 | あ 0402 | い 0403 | い 0404 | う 0405 | う 0406 | え 0407 | え 0408 | お 0409 | お 0410 | — | — | — | — | — |
| 2 | か 0411 | が 0412 | き 0413 | ぎ 0414 | く 0415 | ぐ 0416 | け 0417 | げ 0418 | こ 0419 | ご 0420 | — | — | — | — | — |
| 3 | さ 0421 | ざ 0422 | し 0423 | じ 0424 | す 0425 | ず 0426 | せ 0427 | ぜ 0428 | そ 0429 | ぞ 0430 | — | — | — | — | — |
| 4 | た 0431 | だ 0432 | ち 0433 | ぢ 0434 | っ 0435 | つ 0436 | づ 0437 | て 0438 | で 0439 | と 0440 | ど 0441 | — | — | — | — |
| 5 | な 0442 | に 0443 | ぬ 0444 | ね 0445 | の 0446 | — | — | — | — | — | — | — | — | — | — |
| 6 | は 0447 | ば 0448 | ぱ 0449 | ひ 0450 | び 0451 | ぴ 0452 | ふ 0453 | ぶ 0454 | ぷ 0455 | へ 0456 | べ 0457 | ぺ 0458 | ほ 0459 | ぼ 0460 | ぽ 0461 |
| 7 | ま 0462 | み 0463 | む 0464 | め 0465 | も 0466 | — | — | — | — | — | — | — | — | — | — |
| 8 | や 0467 | ゃ 0468 | ゆ 0469 | ゅ 0470 | よ 0471 | ょ 0472 | — | — | — | — | — | — | — | — | — |
| 9 | ら 0473 | り 0474 | る 0475 | れ 0476 | ろ 0477 | — | — | — | — | — | — | — | — | — | — |
| 10 | わ 0478 | ゎ 0479 | ゐ 0480 | ゑ 0481 | を 0482 | ん 0483 | — | — | — | — | — | — | — | — | — |

FIG. 62

| あ | あ | い | い | う | う | え | え | お | お | | | |
|---|---|---|---|---|---|---|---|---|---|---|---|---|
| か | が | き | ぎ | く | ぐ | け | げ | こ | ご | | | |
| さ | ざ | し | じ | す | ず | せ | ぜ | そ | ぞ | | | |
| た | だ | ち | ぢ | っ | つ | づ | て | で | と | ど | | |
| な | に | ぬ | ね | の | | | | | | | | |
| は | ば | ぱ | ひ | び | ぴ | ふ | ぶ | ぷ | へ | べ | ぺ | ほ | ぼ | ぽ |
| ま | み | む | め | も | | | | | | | | |
| や | や | ゆ | ゆ | よ | よ | | | | | | | |
| ら | り | る | れ | ろ | | | | | | | | |
| わ | わ | ゐ | ゑ | を | ん | | | | | | | |

FIG. 63

| あ | あ | い | い | う | う | え | え | お | お | | | |
|---|---|---|---|---|---|---|---|---|---|---|---|---|
| か | が | き | ぎ | く | ぐ | け | げ | こ | ご | | | |
| さ | ざ | し | じ | す | ず | せ | ぜ | そ | ぞ | | | |
| た | だ | ち | ぢ | っ | つ | づ | て | で | と | ど | | |
| な | に | ぬ | ね | の | | | | | | | | |
| は | ば | ぱ | ひ | び | ぴ | ふ | ぶ | ぷ | へ | べ | ぺ | ほ | ぼ | ぽ |
| ま | み | む | め | も | | | | | | | | |
| や | や | ゆ | ゆ | よ | よ | | | | | | | |
| ら | り | る | れ | ろ | | | | | | | | |
| わ | わ | ゐ | ゑ | を | ん | | | | | | | |

| | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | ア 0501 | ア 0502 | イ 0503 | イ 0504 | ウ 0505 | ウ 0506 | エ 0507 | エ 0508 | オ 0509 | オ 0510 | — | — | — | — | — |
| 2 | カ 0511 | ガ 0512 | キ 0513 | ギ 0514 | ク 0515 | グ 0516 | ケ 0517 | ゲ 0518 | コ 0519 | ゴ 0520 | — | — | — | — | — |
| 3 | サ 0521 | ザ 0522 | シ 0523 | ジ 0524 | ス 0525 | ズ 0526 | セ 0527 | ゼ 0528 | ソ 0529 | ゾ 0530 | — | — | — | — | — |
| 4 | タ 0531 | ダ 0532 | チ 0533 | ヂ 0534 | ッ 0535 | ツ 0536 | ヅ 0537 | テ 0538 | デ 0539 | ト 0540 | ド 0541 | — | — | — | — |
| 5 | ナ 0542 | ニ 0543 | ヌ 0544 | ネ 0545 | ノ 0546 | — | — | — | — | — | — | — | — | — | — |
| 6 | ハ 0547 | バ 0548 | パ 0549 | ヒ 0550 | ビ 0551 | ピ 0552 | フ 0553 | ブ 0554 | プ 0555 | ヘ 0556 | ベ 0557 | ペ 0558 | ホ 0559 | ボ 0560 | ポ 0561 |
| 7 | マ 0562 | ミ 0563 | ム 0564 | メ 0565 | モ 0566 | — | — | — | — | — | — | — | — | — | — |
| 8 | ャ 0567 | ヤ 0568 | ュ 0569 | ユ 0570 | ョ 0571 | ヨ 0572 | — | — | — | — | — | — | — | — | — |
| 9 | ラ 0573 | リ 0574 | ル 0575 | レ 0576 | ロ 0577 | — | — | — | — | — | — | — | — | — | — |
| 10 | ヮ 0578 | ワ 0579 | ヰ 0580 | ヱ 0581 | ヲ 0582 | ン 0583 | ヴ 0584 | ヵ 0585 | ヶ 0586 | — | — | — | — | — | — |

FIG. 69

| i \ j | 1 | 2 | 3 | 4 | 5 | 6 | 7 | 8 | 9 | 10 | 11 | 12 | 13 |
|---|---|---|---|---|---|---|---|---|---|---|---|---|---|
| 1 | A | B | C | D | E | F | G | H | I | J | K | L | M |
|   | 0333 | 0334 | 0335 | 0336 | 0337 | 0338 | 0339 | 0340 | 0341 | 0342 | 0343 | 0344 | 0345 |
| 2 | N | O | P | Q | R | S | T | U | V | W | X | Y | Z |
|   | 0346 | 0347 | 0348 | 0349 | 0350 | 0351 | 0352 | 0353 | 0354 | 0355 | 0356 | 0357 | 0358 |
| 3 | a | b | c | d | e | f | g | h | i | j | k | l | m |
|   | 0365 | 0366 | 0367 | 0368 | 0369 | 0370 | 0371 | 0372 | 0373 | 0374 | 0375 | 0376 | 0377 |
| 4 | n | o | p | q | r | s | t | u | v | w | x | y | z |
|   | 0378 | 0379 | 0380 | 0381 | 0382 | 0383 | 0384 | 0385 | 0386 | 0387 | 0388 | 0389 | 0390 |

F I G. 7 0

| i\j | 1 | 2 | 3 | 4 | 5 | 6 | 7 | 8 | 9 | 10 |
|---|---|---|---|---|---|---|---|---|---|---|
| 1 | 1 | 2 | 3 | 4 | 5 | 6 | 7 | 8 | 9 | 0 |
|   | 0317 | 0318 | 0319 | 0320 | 0321 | 0322 | 0323 | 0324 | 0325 | 0316 |
| 2 | I | II | III | IV | V | VI | VII | VIII | IX | X |
|   | 10833 | 10834 | 10835 | 10836 | 10837 | 10838 | 10839 | 10840 | 10841 | 10842 |
| 3 | ① | ② | ③ | ④ | ⑤ | ⑥ | ⑦ | ⑧ | ⑨ | ⑩ |
|   | 10843 | 10844 | 10845 | 10846 | 10847 | 10848 | 10849 | 10850 | 10851 | 10852 |
| 4 | ⑪ | ⑫ | ⑬ | ⑭ | ⑮ | ⑯ | ⑰ | ⑱ | ⑲ | ⑳ |
|   | 10853 | 10854 | 10855 | 10856 | 10857 | 10858 | 10859 | 10860 | 10861 | 10862 |

FIG. 71

| | 1 | 2 | 3 | 4 | 5 | 6 | 7 | 15 | 94 |
|---|---|---|---|---|---|---|---|---|---|
| 1 | 亜 | 唖 | 娃 | 阿 | 哀 | 愛 | 挨 | 渥 | 薩 |
| | 1601 | 1602 | 1603 | 1604 | 1605 | 1606 | 1607 | 1615 | 1694 |
| 2 | 阮 | 隆 | 隠 | 韻 | 吋 | 右 | 宇 | 丑 | 応 |
| | 1701 | 1702 | 1703 | 1704 | 1705 | 1706 | 1707 | 1715 | 1794 |

| | 1 | 2 | 3 | 4 | 5 | 6 | 7 | 15 | 94 |
|---|---|---|---|---|---|---|---|---|---|
| 68 | 8301 | 8302 | 8303 | 8304 | 8305 | 8306 | 8307 | 8315 | 8394 |
| 69 | 尭 | 槙 | 遙 | 瑤 | 凛 | 熙 | — | — | — |
| | 8401 | 8402 | 8403 | 8404 | 8405 | 8406 | | | |

FIG. 72

| i \ j | 1 | 2 | 3 | 4 | 5 | 6 | 7 | 8 | 9 | 10 |
|---|---|---|---|---|---|---|---|---|---|---|
| 1 |  | ` | . | , | . | · | : | ; | ? | ! |
|  | 0101 | 0102 | 0103 | 0104 | 0105 | 0106 | 0107 | 0108 | 0109 | 0110 |
| 2 | ˙ | ˘ | ¯ | ˋ | ¨ | · | ― | — | ＼ | ～ |
|  | 0111 | 0112 | 0113 | 0114 | 0115 | 0116 | 0117 | 0118 | 0119 | 0120 |
| 3 | ゝ | ゞ | 〃 | 仝 | 々 | 〆 | 〇 | ー | — | - |
|  | 0121 | 0122 | 0123 | 0124 | 0125 | 0126 | 0127 | 0128 | 0129 | 0130 |
| 4 | ／ | ＼ | ～ | ‖ | \| | … | ‥ | ' | ' | " |
|  | 0131 | 0132 | 0133 | 0134 | 0135 | 0136 | 0137 | 0138 | 0139 | 0140 |
| 5 | " | ( | ) | 〔 | 〕 | [ | ] | { | } | 〈 |
|  | 0141 | 0142 | 0143 | 0144 | 0145 | 0146 | 0147 | 0148 | 0149 | 0150 |
| 6 | 〉 | 《 | 》 | 「 | 」 | 『 | 』 | 【 | 】 | ＋ |
|  | 0151 | 0152 | 0153 | 0154 | 0155 | 0156 | 0157 | 0158 | 0159 | 0160 |
| 7 | − | ± | × | ÷ | = | ≠ | < | > | ≦ | ≧ |
|  | 0161 | 0162 | 0163 | 0164 | 0165 | 0166 | 0167 | 0168 | 0169 | 0170 |
| 8 | ∞ | ∴ | ♂ | ♀ | ° | ′ | ″ | ℃ | ¥ | $ |
|  | 0171 | 0172 | 0173 | 0174 | 0175 | 0176 | 0177 | 0178 | 0179 | 0180 |
| 9 | ¢ | £ | % | # | & | * | @ | § | ☆ | ★ |
|  | 0181 | 0182 | 0183 | 0184 | 0185 | 0186 | 0187 | 0188 | 0189 | 0190 |
| 10 | ○ | ● | ◎ | ◇ | — | — | — | — | — | — |
|  | 0191 | 0192 | 0193 | 0194 |  |  |  |  |  |  |
| 11 | ◆ | □ | ■ | △ | ▲ | ▽ | ▼ | ※ | 〒 | → |
|  | 0201 | 0202 | 0203 | 0204 | 0205 | 0206 | 0207 | 0208 | 0209 | 0210 |
| 12 | ← | ↑ | ↓ | = | — | — | — | — | — | — |
|  | 0211 | 0212 | 0213 | 0214 |  |  |  |  |  |  |

FIG. 73

| i \ j | 1 | 2 | 3 | 4 | 5 | 6 | 7 | 8 | 9 | 10 |
|---|---|---|---|---|---|---|---|---|---|---|
| 1 |  | 、 | 。 | ， | ． | ・ | ： | ； | ？ | ！ |
|  | 0101 | 0102 | 0103 | 0104 | 0105 | 0106 | 0107 | 0108 | 0109 | 0110 |
| 2 | ゛ | ゜ | ´ | ` | ¨ | ＾ | ￣ | ＿ | ヽ | ヾ |
|  | 0111 | 0112 | 0113 | 0114 | 0115 | 0116 | 0117 | 0118 | 0119 | 0120 |
| 3 | ゝ | ゞ | 〃 | 仝 | 々 | 〆 | 〇 | ― | ‐ | ／ |
|  | 0121 | 0122 | 0123 | 0124 | 0125 | 0126 | 0127 | 0128 | 0129 | 0130 |
| 4 | ＼ | 〜 | ‖ | ｜ | … | ‥ | ‘ | ’ | “ | ” |
|  | 0131 | 0132 | 0133 | 0134 | 0135 | 0136 | 0137 | 0138 | 0139 | 0140 |
| 5 | ” | （ | ） | 〔 | 〕 | ［ | ］ | ｛ | ｝ | 〈 |
|  | 0141 | 0142 | 0143 | 0144 | 0145 | 0146 | 0147 | 0148 | 0149 | 0150 |
| 6 | 〉 | 《 | 》 | 「 | 」 | 『 | 』 | 【 | 】 | ＋ |
|  | 0151 | 0152 | 0153 | 0154 | 0155 | 0156 | 0157 | 0158 | 0159 | 0160 |
| 7 | － | ± | × | ÷ | ＝ | ≠ | ＜ | ＞ | ≦ | ≧ |
|  | 0161 | 0162 | 0163 | 0164 | 0165 | 0166 | 0167 | 0168 | 0169 | 0170 |
| 8 | ∞ | ∴ | ♂ | ♀ | ° | ′ | ″ | ℃ | ￥ | ＄ |
|  | 0171 | 0172 | 0173 | 0174 | 0175 | 0176 | 0177 | 0178 | 0179 | 0180 |
| 9 | ¢ | £ | ％ | ＃ | ＆ | ＊ | ＠ | § | － | － |
|  | 0181 | 0182 | 0183 | 0184 | 0185 | 0186 | 0187 | 0188 |  |  |
| 10 | ☆ | ★ | ○ | ● | ◎ | － | － | － | － | － |
|  | 0189 | 0190 | 0191 | 0192 | 0193 |  |  |  |  |  |
| 11 | ◇ | ◆ | □ | ■ | △ | ▲ | ▽ | ▼ | － | － |
|  | 0194 | 0201 | 0202 | 0203 | 0204 | 0205 | 0206 | 0207 |  |  |
| 12 | ※ | 〒 | → | ← | ↑ | ↓ | 〓 | － | － | － |
|  | 0208 | 0209 | 0210 | 0211 | 0212 | 0213 | 0214 |  |  |  |

FIG. 74

| i\j | 1 | 2 | 3 | 4 | 5 | 6 | 7 | 8 | 9 | 10 | 11 |
|---|---|---|---|---|---|---|---|---|---|---|---|
| 1 |  | ､ | ｡ | ， | ． | ・ | ： | ； | ？ | ！ | — |
|  | 0101 | 0102 | 0103 | 0104 | 0105 | 0106 | 0107 | 0108 | 0109 | 0110 |  |
| 2 | ゛ | ゜ | ´ | ｀ | ¨ | ＾ | ￣ | ＿ | ヽ | ヾ | — |
|  | 0111 | 0112 | 0113 | 0114 | 0115 | 0116 | 0117 | 0118 | 0119 | 0120 |  |
| 3 | ゝ | ゞ | 〃 | 仝 | 々 | 〆 | 〇 | ー | ― | - | — |
|  | 0121 | 0122 | 0123 | 0124 | 0125 | 0126 | 0127 | 0128 | 0129 | 0130 |  |
| 4 | ／ | ＼ | 〜 | ‖ | ｜ | … | ‥ | ' | ' | " | " |
|  | 0131 | 0132 | 0133 | 0134 | 0135 | 0136 | 0137 | 0138 | 0139 | 0140 | 0141 |
| 5 | （ | ） | 〔 | 〕 | ［ | ］ | ｛ | ｝ | — | — |  |
|  | 0142 | 0143 | 0144 | 0145 | 0146 | 0147 | 0148 | 0149 |  |  |  |
| 6 | 〈 | 〉 | 《 | 》 | 「 | 」 | 『 | 』 | 【 | 】 | — |
|  | 0150 | 0151 | 0152 | 0153 | 0154 | 0155 | 0156 | 0157 | 0158 | 0159 |  |
| 7 | ＋ | － | ± | × | ÷ | ＝ | ≠ | ＜ | ＞ | ≦ | ≧ |
|  | 0160 | 0161 | 0162 | 0163 | 0164 | 0165 | 0166 | 0167 | 0168 | 0169 | 0170 |
| 8 | ∞ | ∴ | ♂ | ♀ | ° | ′ | ″ | ℃ | ￥ | ＄ | — |
|  | 0171 | 0172 | 0173 | 0174 | 0175 | 0176 | 0177 | 0178 | 0179 | 0180 |  |
| 9 | ¢ | £ | ％ | ＃ | ＆ | ＊ | ＠ | § | — | — | — |
|  | 0181 | 0182 | 0183 | 0184 | 0185 | 0186 | 0187 | 0188 |  |  |  |
| 10 | ☆ | ★ | ○ | ● | ◎ | — | — | — | — | — | — |
|  | 0189 | 0190 | 0191 | 0192 | 0193 |  |  |  |  |  |  |
| 11 | ◇ | ◆ | □ | ■ | △ | ▲ | ▽ | ▼ | — | — | — |
|  | 0194 | 0201 | 0202 | 0203 | 0204 | 0205 | 0206 | 0207 |  |  |  |
| 12 | ※ | 〒 | → | ← | ↑ | ↓ | 〓 | — | — | — | — |
|  | 0208 | 0209 | 0210 | 0211 | 0212 | 0213 | 0214 |  |  |  |  |

F I G. 7 5

| DISPLAY ORDER | TITLE OF SYMBOL GROUP | | | DISPLAY ORDER | TITLE OF SYMBOL GROUP | | |
|---|---|---|---|---|---|---|---|
| 1 | 01 | 音 | 楽 | 14 | 14 | 星 | 座 |
| 2 | 02 | ビ | デ | オ | 15 | 15 | 自 | 然 |
| 3 | 03 | あ | そ | び | 16 | 16 | 乗 | り | 物 |
| 4 | 04 | 記 | 述 | 17 | 17 | 食 | べ | 物 |
| 5 | 05 | 省 | 略 | 18 | 18 | 暮 | ら | し |
| 6 | 06 | カ | ッ | コ | 19 | 19 | 家 | 族 |
| 7 | 07 | 数 | 字 | 20 | 20 | 仕 | 事 |
| 8 | 08 | 矢 | 印 | 21 | 21 | ギ | リ | シャ |
| 9 | 09 | 図 | 形 | 22 | 22 | 欧 | 州 | 大 |
| 10 | 10 | 学 | 術 | 23 | 23 | 欧 | 州 | 小 |
| 11 | 11 | 丸 | 付 | き | 24 | 24 | 発 | 音 |
| 12 | 12 | 単 | 位 | 25 | 25 | 罫 | 線 |
| 13 | 13 | 生 | き | 物 | | | | |

FIG. 76

| TITLE OF SYMBOL GROUP | JAPANESE GRAPHIC CHARACTER CODE FOR MD | SHIFT JIS | NAME | |
|---|---|---|---|---|
| 01 音楽 (MUSIC) | 00286 | 81F4 | SINGLE NOTE | ♪ |
| | 10922 | F755 | DOUBLE NOTE | ♫ |
| | 10923 | F756 | G CLEF | 𝄞 |
| | 10924 | F757 | F CLEF | 𝄢 |
| | 00284 | 81F2 | SHARP | # |
| | 00285 | 81F3 | FLAT | ♭ |
| | 10925 | F758 | REST | 𝄽 |
| | 10926 | F759 | NATURAL | ♮ |
| | 10927 | F75A | MINOR CODE | m |
| | 10928 | F75B | MAJOR CODE | maj |
| | 10929 | F75C | SUS CODE | sus |
| | 10930 | F75D | AUGMENT | aug |
| | 10931 | F75E | DIMINISH | dim |
| | 10932 | F75F | ADD CODE | add |
| | 12121 | FAB3 | DOUBLE NOTE · SLANTED | |
| | 12122 | FAB4 | SINGER | |
| | 12123 | FAB5 | STAND BEFORE MICROPHONE | |
| | 11041 | F7C7 | EMOTION · SING(MICROPHONE) | 𝅘 |
| | 12124 | FAB6 | TRUMPET | |
| | 12125 | FAB6 | GUITAR | |
| | 12126 | FAB8 | KEYBOARD | |

F I G. 7 7

| TITLE OF SYMBOL GROUP | JAPANESE GRAPHIC CHARACTER CODE FOR MD | SHIFT JIS | NAME | |
|---|---|---|---|---|
| 04. 記述 (DESCRIPTION) | 0 0 1 0 2 | 8 1 4 1 | PUNTUATION | 、 |
| | 0 0 1 0 3 | 8 1 4 2 | FULLSTOP | 。 |
| | 0 0 1 0 4 | 8 1 4 3 | COMMA | , |
| | 0 0 1 0 5 | 8 1 4 4 | PERIOD | . |
| | 0 0 1 0 6 | 8 1 4 5 | MIDPOINT | ・ |
| | 0 0 1 0 7 | 8 1 4 6 | COLON | : |
| | 0 0 1 0 8 | 8 1 4 7 | SEMICOLON | ; |
| | 0 0 1 0 9 | 8 1 4 8 | QUESTION MARK | ? |
| | 0 0 1 1 0 | 8 1 4 9 | EXCLAMATION MARK | ! |
| | 0 0 1 1 1 | 8 1 4 A | VOICED SOUND MARK | ゛ |
| | 0 0 1 1 2 | 8 1 4 B | SEMIVOICED SOUND MARK | ゜ |
| | 0 0 1 1 3 | 8 1 4 C | ACUTE ACCENT | ´ |
| | 0 0 1 1 4 | 8 1 4 D | GRAVE ACCENT | ` |
| | 0 0 1 1 5 | 8 1 4 E | DIAERESIS | ¨ |
| | 0 0 1 1 6 | 8 1 4 F | CIRCUMFLEX ACCENT | ^ |
| | 0 0 1 1 7 | 8 1 5 0 | OVER LINE | ￣ |
| | 0 0 1 1 8 | 8 1 5 1 | UNDER LINE | _ |
| | 0 0 1 1 9 | 8 1 5 2 | KATAKANA REPEAT | ヽ |
| | 0 0 1 2 0 | 8 1 5 3 | KATAKANA VOICED SOUND REPEAT | ヾ |
| | 0 0 1 2 1 | 8 1 5 4 | HIRAGANA REPEAT | ゝ |
| | 0 0 1 2 2 | 8 1 5 5 | HIRAGANA VOICED SOUND REPEAT | ゞ |
| | 0 0 1 2 3 | 8 1 5 6 | DITTO MARK | 〃 |
| | 0 0 1 2 4 | 8 1 5 7 | SAME-AS-ABOVE MARK | 仝 |
| | 0 0 1 2 5 | 8 1 5 8 | REPEAT | 々 |
| | 0 0 1 2 6 | 8 1 5 9 | CLOSE SIGN | 〆 |
| | 0 0 1 2 8 | 8 1 5 B | EN DASH | – |
| | 0 0 1 2 9 | 8 1 5 C | EM DASH | — |
| | 0 0 1 3 0 | 8 1 5 D | HYPHEN | - |
| | 0 0 1 3 1 | 8 1 5 E | SLASH | / |
| | 0 0 1 3 2 | 8 1 5 F | BACK SLASH | \ |
| | 0 0 1 3 3 | 8 1 6 0 | SWUNG DASH | ~ |
| | 0 0 1 3 6 | 8 1 6 3 | 3 POINT LEADER | ... |
| | 0 0 1 3 7 | 8 1 6 4 | 2 POINT LEADER | .. |
| | 0 0 1 8 8 | 8 1 9 8 | SECTION MARK | § |
| | 0 0 2 8 7 | 8 1 F 5 | DAGGER | † |
| | 0 0 2 8 8 | 8 1 F 6 | DOUBLE DAGGER | ‡ |
| | 0 0 2 8 9 | 8 1 F 7 | PARAGRAPH SIGN | ¶ |
| | 1 0 7 0 2 | F 6 4 1 | INVERTED EXCLAMATION MARK | ¡ |
| | 1 0 7 3 2 | F 6 5 F | INVERTED QUESTION MARK | ¿ |

F I G. 7 8

| TITLE OF SYMBOL GROUP | JAPANESE GRAPHIC CHARACTER CODE FOR MD | SHIFT JIS | NAME | |
|---|---|---|---|---|
| 05 省略 (OMISSION) | 0 0 1 1 9 | 8 1 5 2 | KATAKANA REPEAT | 、 |
| | 0 0 1 2 0 | 8 1 5 3 | KATAKANA VOICED SOUND REPEAT | ヾ |
| | 0 0 1 2 1 | 8 1 5 4 | HIRAGANA REPEAT | ゝ |
| | 0 0 1 2 2 | 8 1 5 5 | HIRAGANA VOICED SOUND REPEAT | ゞ |
| | 0 0 1 2 3 | 8 1 5 6 | DITTO MARK | 〃 |
| | 0 0 1 2 4 | 8 1 5 7 | SAME-AS-ABOVE MARK | 仝 |
| | 0 0 1 2 5 | 8 1 5 8 | REPEAT | 々 |
| | 0 0 1 2 6 | 8 1 5 9 | CLOSE SIGN | 〆 |
| | 0 0 1 2 8 | 8 1 5 B | EN DASH | — |
| | 0 0 1 3 6 | 8 1 6 3 | 3 POINT LEADER | … |
| | 0 0 1 3 7 | 8 1 6 4 | 2 POINT LEADER | ‥ |
| | 0 0 1 8 4 | 8 1 9 4 | NUMBER | # |
| | 0 0 1 8 5 | 8 1 9 5 | AMPERSAND | & |
| | 1 0 9 1 0 | F 7 4 9 | SUPERSCRIPT TRADE MARK | TM |
| | 1 0 9 1 1 | F 7 4 A | SUPERSCRIPT SHARP | # |
| | 1 0 9 1 2 | F 7 4 B | SUPERSCRIPT FLAT | ♭ |
| | 1 0 9 3 3 | F 7 6 0 | HOT SPRING MARK | ♨ |
| | 1 0 9 3 4 | F 7 6 1 | SHRINE MARK | 卍 |
| | 1 0 9 3 5 | F 7 6 2 | TEMPLE MARK | 卍 |
| | 1 0 9 3 6 | F 7 6 3 | POSTAL MARK | 〒 |
| | 1 0 9 3 7 | F 7 6 4 | TELEPHONE MARK | ☎ |
| | 1 0 9 3 8 | F 7 6 5 | FACSIMILE | Fax |
| | 1 1 0 1 0 | F 7 A 8 | COPY | COPY |
| | 1 1 0 1 1 | F 7 A 9 | KEEP | KEEP |
| | 1 1 0 1 2 | F 7 A A | MASTER | MST |

IMAGE FORMING DEVICE WHICH DETERMINES IF THE NUMBER OF LINES TO BE FORMED AFTER CONVERTING IMAGE DATA EXCEEDS A PREDETERMINED LINE COUNT

This is a divisional of application Ser. No. 09/382,499 filed Aug. 25, 1999, and issued on Mar. 16, 2004 as U.S. Pat. No. 6,707,571 B1, which application is hereby incorporated by reference in its entirety.

BACKGROUND OF THE INVENTION

1. Field of the Invention

This invention relates to a character printing method and device for printing groups of characters, such as letters, numerals, symbols, and simple figures (hereinafter generically referred to as "characters") as well as an image forming method and device for converting text data of character strings each having at least one character to image data thereof based on a predetermined font, and properly arranging the image data within a predetermined memory area to thereby form data representative of an image of the character strings.

2. Prior Art

In general, in a character printing device for printing character groups each including one or more characters, it is checked before printing by using a display device thereof or the like, how many printing areas of a predetermined size are required (for instance, how many pages are required, assuming that one printing area of the predetermined size is equivalent to one page) for printing the character groups (groups of character images corresponding to respective character codes) desired to be printed. Thereafter, printing operation is carried out. Otherwise, if there is not sufficient time before printing, for instance, the check is carried out after printing.

However, there has not been proposed a character printing device, which, when the size of a printable area is fixed due to a predetermined limit set to the number of characters, the number of lines or the number of pages, for printing, directly designates such a limit and extracts part of character groups for printing such that the extracted part is adapted to the printable area of the limited size. Still less proposed is a character printing device which notifies the user of the existence of an unprinted portion of the character groups.

For instance, in a word processor or the like, the number of pages is eventually designated by designating a print starting page and a print ending page. However, the limit of the number of pages is not directly designated, and hence there is no means to tell whether or not the user intended to print all the desired character groups in pages up to the print ending page. Therefore, if all the character groups cannot be printed within the limited number of pages, it is impossible to print a message notifying the user of the fact. To print such a message, the user himself is required to carry out the check via the display screen and enter characters notifying the fact. The same applies to a tape printing apparatus or the like, which does not print on a predetermined size of a printing area, but requires the user to set a size thereof e.g. by setting a fixed length.

Further, in general, in order to display or print an image of a character string including one or more characters, font data corresponding to text (code) data of each character of the character string is read out from the ROM or the like storing known font data, or dot matrix data registered by nonstandard character registration or image registration is read out from the RAM or the like (hereinafter the known font or the registered dot matrix is simply referred to as "the predetermined font"), and based on the predetermined font data, a character image is formed and arranged in a predetermined image-forming area, whereby display image data or print image data representative of the image of the character string is produced.

In a word processor or the like, an edit screen adjusted to a set or determined size of one page is displayed, and registered text data is read into the range of the edit screen, or new characters are input thereto via the keyboard to permit editing of the text data or the characters input thereto. That is, an image of characters (character image) corresponding to the text data of character strings is formed as dot matrix data and arranged in a display image-forming area of a predetermined size, to display a display image thus formed. Further, after the edit process is terminated, by carrying out a key entry to instruct printing operation, a print image which is the same image as displayed on the screen is printed. That is, a character image corresponding to the text data of the character strings is formed as dot matrix data arranged in a print image area of the predetermined size, and the thus formed print image is printed.

In the above cases, for instance, when arbitrary new line-starting codes, which can be inserted into the text (code) data of character strings as desired, are contained, lines of the character strings are determined or defined by these arbitrary new line-starting codes. However, when the length (number of characters or the like) of a character string on a line up to the arbitrary new line-starting code, is larger than the length (horizontal size in horizontal writing, for instance) of each line set as a horizontal size of the image-forming area for the character strings, automatic start of a new line is carried out at the position of a character corresponding to the end of the predetermined horizontal size of the image-forming area. Of course, if there is not included an arbitrary new line-starting code in the text data, the automatic start of a new line is carried out on each line at a character position corresponding to the end of the set horizontal size of the image-forming area.

The same applies to lines. For instance, when arbitrary page break codes, which can be inserted into the text (code) data of character strings as desired, are contained, the number of lines (line count) in each page is determined or defined according to the arbitrary page break codes. However, when the number of lines up to the arbitrary page break code is larger than the number of lines set as the size of the image-forming area for the character strings, automatic page break is carried out at the position of a line count corresponding to the end of the predetermined vertical size of the image-forming area. Needless to say, if there is not included an arbitrary page break code in the text data, the automatic page break is carried out for all of the text data at the position of each line count corresponding to the lower end of the set vertical size of the image-forming area.

However, there has not been proposed a device for forming an image which can meet needs for displaying or printing the summary of contents representative of all the character strings, within one predetermined line, a predetermined number of lines, or a predetermined number of pages, even by omitting part of the contents. In other words, there has not been proposed a device, for instance, which is capable of arranging within each line not only a line number or an information number but also at least an essential portion (e.g. a predetermined number of characters from the head) of a character string or character strings corresponding to the line number or the information number, and arranging such lines for display or printing. Furthermore, there has not been proposed a device which is capable of arranging at least an essential portion (e.g. a plurality of lines from the head of character strings) within a predetermined number of lines or pages, and displaying or printing an image representative of all the contents of the character strings within the predetermined number of lines or pages.

Further, assuming that once data of an image of partially omitted character strings (elided image) described above is formed, and the data is used for display or printing, it is difficult to check the source character strings when they are required to be partially changed. More specifically, if characters or lines as part of the whole character strings are omitted, the range of characters to be received within a line having a predetermined length or the range of lines to be received within a predetermined number of lines or a predetermined number of pages is changed, and hence a position from which the following characters or lines are omitted is required to be also changed. From the display or print of only the elided image, it is impossible to grasp omitted characters which should be restored, and hence correction of the data of the display image or the print image is difficult to carry out.

On the other hand, when not the data of the elided image but data of an image of the whole character strings (whole image) is formed, the automatic start of a new line and the automatic page break is carried out according to the horizontal size of one page (e.g. predetermined number or count of characters on a line) or the vertical size of the same (e.g. predetermined number or count of lines) as described above, it is difficult to think of the original image of the source character strings. Further, it is difficult to imagine each line or page of an elided image to be formed subsequently.

SUMMARY OF THE INVENTION

It is a first object of the invention to provide a character printing method and device which permits direct designation of a print size corresponding to an integral multiple of a reference size and is capable of extracting groups of characters adapted to a print memory area corresponding to the designated print size, and further, when all of the groups of characters cannot be printed within the designated print size, capable of carrying out printing by adding a notification character string notifying the fact.

It is a second object of the invention to provide an image forming method and device which is capable of omitting an excess of character strings over a predetermined number of characters or an excess of lines of characters over a predetermined number of lines of a plurality of character strings, and forming an elided image by adding an image notifying the omission if the omission is carried out.

It is a third object of the invention to provide an image forming method and device which is capable of forming an edit information image which makes it possible to imagine an original image representative of each line of character strings and view or grasp line overflow positions designating omission positions for use in setting the number of lines of the edit image to a predetermined number or count equal to an integral multiple of a predetermined reference count of lines, before forming an edit image, such as an elided image produced by omitting some of a plurality of lines of character strings and adding instead an image for notifying the user of the omission to the character strings, and forming the dot matrix pattern data of character strings such that the image is comprised of images of the predetermined number of lines equal in number to the integral multiple of the predetermined reference count, or alternatively, separately or independently of forming the edit image.

It is a fourth object of the invention to provide an image forming method and device which is capable of forming an edit information image which makes it possible to imagine an original image representative of each line of character strings and view or grasp character overflow positions in an edit image at which characters overflow from each line, such as omission positions, new line start positions or the like, before forming the edit image, such as an elided image produced by omitting part of each character string and forming dot matrix pattern data such that the elided image becomes an image of character strings each formed of one line, or a whole image formed without omitting any part of each character string, or alternatively, separately or independently of forming the edit image.

To attain the first object, according to a first aspect of the invention, there is provided a method of printing characters, comprising the steps of:

defining a reference size, and at least one predetermined enlarged size each corresponding to an integral multiple of the reference size, as alternatives to be selectively set to a print size of a printing area of a printing object on which is to be printed part or all of character groups including at least one character;

setting one of the reference size and the at least one predetermined enlarged size to the print size;

allocating at least one predetermined portion different from one another of the character groups respectively to at least one divisional printing area formed by dividing the printing area by the reference size;

forming at least one print image corresponding to the at least one predetermined portion of the character groups allocated respectively to the at least one divisional printing area; and printing the at least one print image respectively on the at least one divisional printing area of the printing object.

To attain the first object, according to a second aspect of the invention, there is provided a character printing device, comprising:

print size storage means for storing a reference size, and at least one predetermined enlarged size each corresponding to an integral multiple of the reference size, defined, as alternatives to be selectively set to a print size of a printing area of a printing object on which is to be printed part or all of character groups including at least one character;

print size-setting means for setting one of the reference size and the at least one predetermined enlarged size to the print size;

allocation means for allocating at least one predetermined portion different from one another of the character groups respectively to at least one divisional printing area formed by dividing the printing area by the reference size;

print image-forming means for forming at least one print image corresponding to the at least one predetermined portion of the character groups allocated respectively to the at least one divisional printing area; and printing means for printing the at least one print image respectively on the at least one divisional printing area of the printing object.

According to the method of printing characters and device therefor, by setting one of a reference size and at least one predetermined enlarged size to a print size, it is possible to directly designate a print size which is an integral multiple of the reference size, whereby it is possible to allocate at least one predetermined portion different from one another of character groups respectively to at least one divisional printing area formed by dividing a printing area by the reference size, form at least one print image corresponding to the at least one predetermined portion of the character groups allocated respectively to the at least one divisional printing area, and print the at least one print image respectively on the at least one divisional printing area of the printing object. In short, it is possible to directly designate a print size which is an integral multiple of a reference size and extract character groups adapted to a print area for the print size to print the same.

Preferably, the step of allocating the at least one predetermined portion includes the steps of determining whether or not the all of the character groups can be printed within the printing area having the print size, and adding information characters implying the incapability of printing the all of the character groups, to the part of the character groups.

Preferably, the allocation means includes determining means for determining whether or not the all of the character groups can be printed within the printing area having the print size, and information character-adding means for adding information characters implying the incapability of printing the all of the character groups, to the part of the character groups.

According to these preferred embodiments, character groups are laid out in a print area having the selected print size, and when all of the character groups cannot be printed, an information character notifying the incapability is added to the character groups. More specifically, since it is possible to directly designate a print size equal to an integral multiple of a predetermined print size, and hence it is possible to determine whether or not all of the character groups (images of characters corresponding respectively to character codes) within the designated print size. If it is determined that it is impossible to print all of the character groups, printing of the character groups can be carried out by adding information characters notifying the incapability to the character groups. It should be noted that the addition of the information characters can be carried out after adding character codes therefor to the character groups, or by separately converting character codes for the character groups and the character codes for the information characters separately to respective images of the character groups and the information characters, followed by combining the two images. Further, it can be configured as desired whether or not information characters are added to the character groups when it is determined that it is possible to print all of the character groups.

Preferably, data of the character groups is stored in a disc, the method further including the step of reading the data of the character groups from the disc.

Preferably, data of the character groups is stored in a disc, the character printing device further including reading means for reading the data of the character groups from the disc.

According to these preferred embodiments, the print size equal to the integral multiple of the reference size is directly designated and at the same time, the character groups are read from the disc. Therefore, it is possible to extract a portion adapted to the print area having the directly designated print size from the character groups read from the disc and print the portion.

Preferably, the disc is a mini disc.

According to this preferred embodiment of each of the first and second aspects of the invention, it is possible to print character groups read from the mini disc.

Preferably, the reference size and the at least one predetermined enlarged size include sizes of a plurality of kinds of labels.

According to this preferred embodiment of each of the first and second aspects of the invention, the alternatives to be selected for the print size include print sizes of a plurality of kinds of labels, and hence by selecting any of them as a print size, it is possible to extract and print character groups adapted to a label having the selected print size.

More preferably, the sizes of the plurality of kinds of labels include a size of a disc label to be attached to a surface of a disc cartridge, as the reference size, and a size of a case label to be attached to a surface of a case of the disc cartridge, as one of the at least one predetermined enlarged size.

According to this preferred embodiment of each of the first and second aspects of the invention, it is possible to extract and print character groups adapted to any of label sizes of various kinds of labels including a disc label and a case label.

More preferably, the step of setting one of the reference size and the at least one predetermined enlarged size to the print size includes selecting, from the alternatives, one corresponding to a size of a half-die-cut label, when the printing object is formed with the half-die-cut label.

More preferably, the print size-setting means selects, from the alternatives, one corresponding to a size of a half-die-cut label, when the printing object is formed with the half-die-cut label.

According to these preferred embodiments, when a half-die-cut label is formed in a printing object, by selecting a print size adapted to the size of the half-die-cut label, it is possible to extract and print character groups adapted to the label size of the half-die-cut label.

Preferably, the reading means includes disc playback means for reading the data of the character groups from the disc.

According to this preferred embodiment, the character printing device has disc playback means for reading the character groups from the disc. That is, the device is provided with the disc playback means which is not only capable of playing back (reading) main information of music, voices, movies, etc., but also capable of reading character groups, such as information of attributes. This makes it possible to easily read out the character groups stored in the disc as well as divert the construction of a disc playback device of a general type to the reading of the character groups.

More preferably, the disc playback means is constructed such that the disc playback means receives a request signal generated in response to a key operation of a remote controller from the remote controller, and transmits a portion of character groups to be displayed on a display of the remote controller to the remote controller, the portion corresponding to the request signal, and the reading means further includes remote-controlled communication means for sending the request signal and receiving the portion of the character groups in place of the remote controller.

According to this preferred embodiment, the above-mentioned disc playback device of the general type is constructed such that it receives a request signal generated by a key operation from the remote controller, and transmits character groups in response to the request signal. Therefore, by generating the same request signal as generated by the remote controller for the same processing, the character printing device can also obtain the same character groups as obtained by the remote controller. That is, in this character printing device, the reading means has the disc playback means and the remote-controlled communication means for transmitting the same request signal as generated by the remote controller and receives the character groups, which makes it possible to obtain the character groups stored in the disc. It should be noted that by configuring the remote-controlled communication means such that it causes the remote controller to generate a plurality of request signals by a single operation and transmit a combination of a plurality of successive request signals to the disc playback device, it is possible to obtain a plurality of character groups corresponding to the respective request signals by the single operation.

Preferably, the method includes the step of removably mounting one of a plurality of kinds of printing objects in a printing device, as the printing object.

Preferably, the character printing device further includes mounting means for removably mounting one of a plurality of kinds of printing objects, as the printing object.

According to these preferred embodiments, it is possible to mount any of a plurality of kinds of printing objects, as a printing object.

More preferably, the step of setting one of the reference size and the at least one predetermined enlarged size to the print size includes selecting, from the alternatives, one corresponding to a kind of the printing object, when the print size varies with the kind of the printing object.

More preferably, the print size-setting means selects, from the alternatives, one corresponding to a kind of the printing object, when the print size varies with the kind of the printing object.

According to these preferred embodiments, it is possible to select a print size suitable for a kind of the printing object. More specifically, this embodiment is applied to cases where the print size varies with the kind of printing object, and in this case, the selection of the printing object means the selection of the print size.

Further preferably, the method includes the step of detecting a kind of printing object mounted in the printing device, and the step of setting one of the reference size and the at least one predetermined enlarged size to the print size includes selecting, from the alternatives, one corresponding to the detected kind of the printing object.

Further preferably, the character printing device includes detecting means for detecting a kind of printing object mounted in the printing device, and the print size-setting means selects, from the alternatives, one corresponding to the detected kind of the printing object.

According to these preferred embodiments, the kind of a printing object mounted is detected, and the print size is selected according to the kind of the printing object, whereby it is possible to select the print size adapted to the kind of printing object mounted.

Preferably, the step of setting one of the reference size and the at least one predetermined enlarged size to the print size includes selection of one of the alternatives by the user.

Preferably, the print size-setting means selects the one of the alternatives in response to an operation carried out by the user.

According to these preferred embodiments, since the print size is selected in response to the selection by the user, and hence it is possible to select the print size complying with the user's intention.

Preferably, the printing object is a tape.

According to this preferred embodiment of each of the first and second aspects of the invention, since the printing object is a tape, it is possible to apply the method and device to a tape printing apparatus.

To attain the second object, according to a third aspect of the invention, there is provided a method of forming an image, comprising the steps of:

storing text data of at least one basic character string forming at least one line each including at least one character;

determining whether or not any of the at least one basic character string has characters in excess of a predetermined number of characters;

forming, with reference to a post-omission character count calculated by subtracting from the predetermined number the number of characters of a character omission-notifying character string for notifying omission of at least one character from each basic character string determined to have characters in excess of the predetermined number of characters, at least one elided character string corresponding respectively to the at least one basic character string by omitting an excess of characters over the post-omission character count from the each basic character string;

forming at least one elided basic character string corresponding respectively to the at least one basic character string, by adding the character omission-notifying character string to each corresponding one of the at least one elided character string which corresponds to the each basic character string; and forming data of an elided image by converting text data of the at least one elided basic character string to image data thereof, based on a predetermined font, and arranging the image data of the each of the at least one elided basic character string in a predetermined image-forming memory area within which image data of the predetermined number of characters can be arranged.

To attain the second object, according to a third aspect of the invention, there is provided an image forming device comprising:

storage means for storing text data of at least one basic character string forming at least one line each including at least one character;

determining means for determining whether or not any of the at least one basic character string has characters in excess of a predetermined number of characters;

elided character string-forming means for forming, with reference to a post-omission character count calculated by subtracting from the predetermined number the number of characters of a character omission-notifying character string for notifying omission of at least one character from each basic character string determined to have characters in excess of the predetermined number of characters, at least one elided character string corresponding respectively to the at least one basic character string by omitting an excess of characters over the post-omission character count from the each basic character string;

elided basic character string-forming means for forming at least one elided basic character string corresponding respectively to the at least one basic character string, by adding the character omission-notifying character string to each corresponding one of the at least one elided character string which corresponds to the each basic character string; and elided image data-forming means for forming data of an elided image by converting text data of each of the at least one elided basic character string to image data thereof, based on a predetermined font, and arranging the image data of the each of the at least one elided basic character string in a predetermined image-forming memory area within which image data of the predetermined number of characters can be arranged.

According to the method of forming an image and the device therefor, there is stored text data of at least one basic character string forming at least one line each including at least one character, and determines whether or not any of the at least one basic character string has characters in excess of a predetermined number of characters. With reference to a post-omission character count calculated by subtracting from the predetermined number the number of characters of a character omission-notifying character string for notifying omission of at least one character from each basic character string determined to have characters in excess of the predetermined number of characters, at least one elided character string is formed by omitting an excess of characters over the post-omission character count from the each basic character string, and at least one elided basic character string is formed by adding the character omission-notifying character string to the at least one elided character string. Data of an elided image is formed by converting text data of the at least one elided basic character string to image data thereof, based on a predetermined font, and arranging the image data of the each of the at least one elided basic character string in a predetermined image-forming memory area within which image data of the predetermined number of characters can be arranged. In this process, the number of elided character strings, i.e. the predetermined post-omission character count is equal to a difference calculated by subtracting from the predetermined number the number of characters of the character omission-notifying character string, and therefore, the number of characters of any of elided basic character strings formed by adding the character omission-notifying character string to each relevant elided character string does not become larger than the predetermined number of characters.

Therefore, according to the image forming method and device, when any of the at least one basic character string including at least one character has characters in excess of a predetermined number of characters, data of an elided image can be formed by converting text data of the at least one elided basic character string formed by omitting an excess of characters over the post-omission character count from the each basic character string, and adding the character omission-notifying character string to the at least one elided character string to image data thereof, based on a predetermined font, and arranging the image data of the each of the at least one elided basic character string in a predetermined image-forming memory area within which image data of the predetermined number of characters can be arranged. In short, an elided image can be formed by omitting an excess of characters over the predetermined number of characters, and adding an image notifying the omission to the image, when the excess of characters is omitted.

It should be noted that the size of an image-forming memory area or the like is calculated in units of dots (by dot size), and hence the predetermined number is assumed to be the number of characters each having a character size (dot size) defined by the current setting or configuration, and more specifically, equal to the number of characters each having a character size defined by the current setting or configuration and arranged such that a total number of dots of the characters agrees with a horizontal dot size of the image-forming memory area. Therefore, if the dot size of one character is changed by expansion/contraction, various character modifications (e.g. hollow characters, italic, etc.), or the like, the predetermined number of characters is also changed. However, in such a case, whether the dot size (size measured in units of dots) of character omission-notifying character string should be also changed or not may be arbitrarily determined.

Further, as to a character string including characters different in dot size from each other due to proportional spacing or kerning (e.g. characters to be converted to image data based on proportional font or the like), the dot number of the character string (total number of dots of characters and blank or spacing between adjacent pairs of characters) exceeds the number of dots of a predetermined number of characters having a character size of the present setting and arranged in a line, it is determined that the character string has characters in excess of the predetermined number of characters. In short, in this case, the number of characters of each line indicates the number of characters of calculated in terms of number of dots based on the character size of the present setting.

To attain the second object, according to a fifth aspect of the invention, there is provided a method of forming an image, comprising the steps of:

storing text data of at least one basic character string forming at least one line each including at least one character;

determining whether or not any of the at least one basic character string has characters in excess of a predetermined number of characters;

forming, with reference to a post-omission character count calculated by subtracting from the predetermined number the number of characters of a character omission-notifying character string for notifying omission of at least one character from each basic character string determined to have characters in excess of the predetermined number of characters, image data of at least one elided character string by converting text data of each of characters of the at least one elided character string formed by omitting an excess of characters over the post-omission character count from the each basic character string to image data of the each of the characters, and arranging the image data of the each of the characters in a predetermined image-forming memory area within which image data of the predetermined number of characters can be arranged; and forming data of an elided image by converting text data of the character omission-notifying character string to image data thereof based on the predetermined font, and arranging the image data of the character omission-notifying character string in the predetermined image-forming memory area, such that the image data of the character omission-notifying character string is added to the image data of the at least one elided character string.

To attain the second object, according to a sixth aspect of the invention, there is provided an image forming device comprising:

storage means for storing text data of at least one basic character string forming at least one line each including at least one character;

determining means for determining whether or not any of the at least one basic character string has characters in excess of a predetermined number of characters;

elided character string image data-forming means for forming, with reference to a post-omission character count calculated by subtracting from the predetermined number the number of characters of a character omission-notifying character string for notifying omission of at least one character from each basic character string determined to have characters in excess of the predetermined number of characters, image data of at least one elided character string by converting text data of each of characters of the at least one elided character string formed by omitting an excess of characters over the post-omission character count from the each basic character string to image data of the each of the characters, and arranging the image data of the each of the characters in a predetermined image-forming memory area within which image data of the predetermined number of characters can be arranged; and elided image data forming means for forming data of an elided image by converting text data of the character omission-notifying character string to image data thereof based on the predetermined font, and arranging the image data of the character omission-notifying character string in the predetermined image-forming memory area, such that the image data of the character omission-notifying character string is added to the image data of the at least one elided character string.

According to the method of forming an image and the device therefor, text data of at least one basic character string forming at least one line each including at least one character is stored, and it is determined whether or not any of the at least one basic character string has characters in excess of a predetermined number of characters, With reference to a post-omission character count calculated by subtracting from the predetermined number the number of characters of a character omission-notifying character string for notifying omission of at least one character from each basic character string determined to have characters in excess of the predetermined number of characters, image data of at least one elided character string is formed by converting text data of each of characters of the at least one elided character string-formed by omitting an excess of characters over the post-omission character count from the each basic character string to image data of the each of the characters, and arranging the image data of the each of the characters in a predetermined image-forming memory area within which image data of the predetermined number of characters can be arranged. Data of an elided image is formed by converting text data of the character omission-notifying character string to image data thereof based on the predetermined font, and arranging the image data of the character omission-notifying character string in the predetermined image-forming memory area, such that the image data of the character omission-notifying character string is added to the image data of the at least one elided character string. That is, similarly to the third and second aspects of the invention, the number of characters of which image data is formed by conversion from text data thereof and arranged in a predetermined image-forming memory area does not exceed in number the predetermined number of characters.

Therefore, according to this image forming method and device, as well, when any of the at least one basic character string including at least one character has characters in excess of a predetermined number of characters, data of an elided image can be formed by converting text data of the at least one elided basic character string formed by omitting an excess of characters over the post-omission character count from the each basic character string, and adding the character omission-notifying character string to the at least one elided character string to image data thereof, based on a predetermined font, and arranging the image data of the each of the at least one elided basic character string in a predetermined image-forming memory area within which image data of the predetermined number of characters can be arranged. In short, it is possible to form an elided image by omitting an excess of characters over the predetermined number of characters, and adding an image notifying the omission to the image, when the excess of characters is omitted.

Preferably, the character omission-notifying character string includes at least one of characters "•••", "••", "•", and "~".

According to the preferred embodiment of each of the third to six aspects of the invention, since the character omission-notifying character string includes at least one of characters "•••", "••", "•", and "~", it is possible to properly represent the omission of characters.

Preferably, the text data of the at least one basic character string is stored in a disc, the method further includes the step of reading the text data of the at least one basic character string from the disc.

Preferably, the text data of the at least one basic character string is stored in a disc, the image forming device includes reading means for reading the text data of the at least one basic character string from the disc.

According to these preferred embodiments, it is possible to read text data of at least basic character string from a disc storing the same, and forms an image data thereof.

More preferably, the disc is a mini disc.

According to the preferred embodiment of each of the third to six aspects of the invention, it is possible to form an image of basic character strings by reading text data thereof from a mini disc.

More preferably, the reading means includes disc playback means for reading the text data of the at least one basic character string from the disc.

According to this preferred embodiment, the reading means of the image forming device has disc playback means for reading the text data of the at least one basic character string from the disc. The provision of the disc playback means makes it possible to read data of character strings stored in the disc, and further, the construction of a disc playback device of a general type can be diverted to this use.

To attain the second object, according to a seventh aspect of the invention, there is provided a method of forming an image, comprising the steps of:

determining whether or not any of at least one basic character string each including at least one character has characters in excess of a predetermined number of characters; and forming, based on a predetermined font, data of an elided image by converting text data of new at least one basic character string formed by omitting a portion from each basic character string determined to have characters in excess of the predetermined number of the characters and at the same time adding a character omission-notifying character string for notifying omission of the portion thereto, to image data thereof, and arranging the image data of the new at least one basic character string in a predetermined image-forming memory area within which image data of the predetermined number of characters can be arranged.

To attain the second object, according to an eighth aspect of the invention, there is provided an image forming device comprising:

determining means for determining whether or not any of at least one basic character string each including at least one character has characters in excess of a predetermined number of characters; and elided image data-forming means for forming, based on a predetermined font, data of an elided image by converting text data of new at least one basic character string formed by omitting a portion from each basic character string determined to have characters in excess of the predetermined character number and at the same time adding a character omission-notifying character string for notifying omission of the portion thereof, to image data thereof, and arranging the image data of the new at least one basic character string in a predetermined image-forming memory area within which image data of the predetermined number of characters can be arranged.

According to this image forming method and device, it is possible to form, based on a predetermined font, data of an elided image by converting text data of new at least one basic character string formed by omitting a portion from each basic character string determined to have characters in excess of a predetermined number of the characters and at the same time adding a character omission-notifying character string for notifying omission of the portion thereto, to image data thereof, and arranging the image data of the new at least one basic character string in a predetermined image-forming memory area within which image data of the predetermined number of characters can be arranged. In short, it is possible to form an elided image by omitting an excess of characters over the predetermined number of characters, and adding an image notifying the omission to the image, when the excess of characters is omitted.

Preferably, the method further includes the steps of carrying out any of edit operations including character insertion, character deletion, character conversion, character size setting, and character decoration setting, on any of the at least one basic character string; and as a result of the any of the edit operations, if the predetermined number of characters which can be arranged within the predetermined image-forming memory area has changed in number, forming the data of the elided image with reference to the resulting number of characters which can be arranged within the predetermined image-forming memory area.

Preferably, the image forming device further includes edit means for carrying out any of edit operations including character insertion, character deletion, character conversion, character size setting, and character decoration setting, on any of the at least one basic character string; and character number-updating means for, as a result of the any of the edit operations, if the predetermined number of characters which can be arranged within the predetermined image-forming memory area has changed in number, updating the predetermined number of characters which can be arranged within the predetermined image-forming memory area to a number resulting from the change.

According to these preferred embodiments, it is possible to carry out any of edit operations including character insertion, character deletion, character conversion, character size setting, and character decoration setting. And as a result of the any of the edit operations, if the predetermined number of characters which can be arranged within the predetermined image-forming memory area has changed in number, the elided image is formed with reference to the predetermined number of characters updated to a number resulting from the change, and hence an image adapted to the edited basic character strings.

To attain the above object, according to a ninth aspect of the invention, there is provided a method of forming an image, comprising the steps of:

storing text data of basic character strings forming a plurality of lines each including at least one character;

determining whether or not the plurality of lines of the basic character strings exceed in number a predetermined number of lines of characters;

forming, when it is determined that the plurality of lines of the basic character strings exceed in number the predetermined number of lines of characters, with reference to a post-omission line count calculated by subtracting from the predetermined number the number of lines of a line omission-notifying character string implying omission of at least one line from the plurality of lines, elided basic character strings as new basic character strings, by omitting an excess of lines over the post-omission line count from the basic character strings, and adding the line omission-notifying character string to remaining lines of the basic character strings; and forming data of an elided image by converting text data of the elided basic character strings to image data thereof based on a predetermined font and arranging the image data of the elided basic character strings in a predetermined image-forming memory area within which image data of the predetermined number of lines of characters can be arranged.

To attain the second object, according to a tenth aspect of the invention, there is provided an image forming device comprising:

storage means for storing text data of basic character strings forming a plurality of lines each including at least one character;

determining means for determining whether or not the plurality of lines of the basic character strings exceed in number a predetermined number of lines of characters;

elided character string-forming means for forming, with reference to a post-omission line count calculated by subtracting from the predetermined number the number of lines of a line omission-notifying character string implying omission of at least one line from the plurality of lines, when it is determined that the plurality of lines of the basic character strings exceed in number the predetermined number of lines of characters, elided basic character strings as new basic character strings, by omitting an excess of lines over the post-omission line count from the basic character strings, and adding the line omission-notifying character string to remaining lines of the basic character strings; and elided image data-forming means for forming data of an elided image by converting text data of the elided basic character strings to image data thereof based on a predetermined font and arranging the image data of the elided basic character strings in a predetermined image-forming memory area within which image data of the predetermined number of lines of characters can be arranged.

According to this image forming method and apparatus, text data of basic character strings forming a plurality of lines each including at least one character is stored, and it is determined whether or not the plurality of lines of the basic character strings exceed in number a predetermined number of lines of characters. When it is determined that the plurality of lines of the basic character strings exceed in number the predetermined number of lines of characters, with reference to a post-omission line count calculated by subtracting from the predetermined number the number of lines of a line omission-notifying character string implying omission of at least one line from the plurality of lines, elided basic character strings as new basic character strings, are formed by omitting an excess of lines over the post-omission line count from the basic character strings, and adding the line omission-notifying character string to remaining lines of the basic character strings. Then, data of an elided image is formed by converting text data of the elided basic character strings to image data thereof based on a predetermined font and arranging the image data of the elided basic character strings in a predetermined image-forming memory area within which image data of the predetermined number of lines of characters can be arranged. The post-omission line count is a value calculated by subtracting from the predetermined number the number of lines of a line omission-notifying character string, and hence even after addition of the line omission-notifying character string, the number of lines of basic character strings does not exceed in number the predetermined number of lines.

Therefore, according to this method and device, when the plurality of lines of the basic character strings exceed in number the predetermined number of lines of characters, it is possible to convert text data of elided basic character strings formed by omitting an excess of lines over the post-omission line count from the basic character strings, and adding the line omission-notifying character string to remaining lines of the basic character strings, to image data thereof and arranging the image data in a predetermined image-forming memory area within which image data of the predetermined number of lines of characters can be arranged. In short, it is possible to form an elided image by omitting an excess of lines over the predetermined number of lines of character strings, and adding an image notifying the omission to the image, when the excess of characters is omitted.

To attain the second object, according to an eleventh aspect of the invention, there is provided a method of forming an image, comprising the steps of:

storing text data of basic character strings forming a plurality of lines each including at least one character;

determining whether or not the plurality of lines of the basic character strings exceed in number a predetermined number of lines of characters;

forming, with reference to a post-omission line count calculated by subtracting from the predetermined number the number of lines of a line omission-notifying character string implying omission of at least one line from the plurality of lines, when it is determined that the plurality of lines of the basic character strings exceed in number the predetermined number of lines of characters, image data of elided character strings formed by omitting an excess of lines over the post-omission line count from the basic character strings, by converting text data of each of the elided character strings to image data thereof, and arranging the image data of the each of the elided character strings in a predetermined image-forming memory area within which image data of the predetermined number of lines of characters can be arranged; and forming data of an elided image by converting text data of the line omission-notifying character string to image data thereof based on the predetermined font, and arranging the image data of the line omission-notifying character string in the predetermined image-forming memory area, such that the image data of the line omission-notifying character string is added to the image data of the elided character strings.

To attain the second object, according to a twelfth aspect of the invention, there is provided an image forming device comprising:

storage means for storing text data of basic character strings forming a plurality of lines each including at least one character;

determining means for determining whether or not the plurality of lines of the basic character strings exceed in number a predetermined number of lines of characters;

elided character string image data-forming means for forming, with reference to a post-omission line count calculated by subtracting from the predetermined number the number of lines of a line omission-notifying character string implying omission of at least one line from the plurality of lines, when it is determined that the plurality of lines of the basic character strings exceed in number the predetermined number of lines of characters, image data of elided character strings formed by omitting an excess of lines over the post-omission line count from the basic character strings, by converting text data of each of the elided character strings to image data thereof, and arranging the image data of the each of the elided character strings in a predetermined image-forming memory area within which image data of the predetermined number of lines of characters can be arranged; and elided image data-forming means for forming data of an elided image by converting text data of the line omission-notifying character string to image data thereof based on the predetermined font, and arranging the image data of the line omission-notifying character string in the predetermined image-forming memory area, such that the image data of the line omission-notifying character string is added to the image data of the elided character strings.

According to this image forming method and device, text data of basic character strings forming a plurality of lines each including at least one character is stored, and similarly to the ninth and tenth aspects of the invention, with reference to a post-omission line count calculated by subtracting from the predetermined number the number of lines of a line omission-notifying character string implying omission of at least one line from the plurality of lines, image data of elided character strings formed by omitting an excess of lines over the post-omission line count from the basic character strings is formed by converting text data of each of the elided character strings to image data thereof, and arranging the image data of the each of the elided character strings in a predetermined image-forming memory area within which image data of the predetermined number of lines of characters can be arranged. And further, data of an elided image is formed by converting text data of the line omission-notifying character string to image data thereof based on the predetermined font, and arranging the image data of the line omission-notifying character string in the predetermined image-forming memory area, such that the image data of the line omission-notifying character string is added to the image data of the elided character strings. That is, in these aspects of the invention as well, similarly to the ninth and second aspects of the same, the number of lines of character strings of which image data is converted from text data thereof and arranged in the predetermined image-forming memory area does not exceed the predetermined number, either.

Therefore, according to this method and device, as well, when the plurality of lines of the basic character strings exceed in number the predetermined number of lines of characters, it is possible to convert text data of elided basic character strings formed by omitting an excess of lines over the post-omission line count from the basic character strings, and adding the line omission-notifying character string to remaining lines of the basic character strings, to image data thereof and arranging the image data in a predetermined image-forming memory area within which image data of the predetermined number of lines of characters can be arranged. In short, it is possible to form an elided image by omitting an excess of lines over the predetermined number of lines of character strings, and adding an image notifying the omission to the image, when the excess of lines is omitted.

Preferably, the text data of the at least one basic character string is stored in a disc, and the method further includes the step of reading the text data of the at least one basic character string from the disc.

Preferably, the text data of the at least one basic character string is stored in a disc, and the image forming device includes reading means for reading the text data of the at least one basic character string from the disc.

According to these preferred embodiments, it is possible to read text data of at least basic character string from a disc storing the same, and forms an image data thereof.

More preferably, the disc is a mini disc.

According to the preferred embodiment of each of the eleventh and twelfth aspects of the invention, it is possible to form an image of basic character strings by reading text data thereof from a mini disc.

More preferably, the basic character strings include a plurality of titles of music pieces, and the method includes the step of causing at least one character indicative of the number of music pieces stored in the disc or the number of titles omitted from the titles of the music pieces to be included in the line omission-notifying character string, when lines omitted from the plurality of lines of the basic character strings include at least one of the plurality of titles of the music pieces.

More preferably, the basic character strings include a plurality of titles of music pieces, and the image forming device includes means for causing at least one character indicative of the number of music pieces stored in the disc or the number of titles omitted from the titles of the music pieces to be included in the line omission-notifying character string, when lines omitted from the plurality of lines of the basic character strings include at least one of the plurality of titles of the music pieces.

According to these preferred embodiments, when lines omitted from the plurality of lines of the basic character strings include at least one of the plurality of titles of the music pieces, at least one character indicative of the number of music pieces stored in the disc or the number of titles omitted from the titles of the music pieces is caused to be included in the line omission-notifying character string. This enables the user to be informed of the omission of music titles as well as the total number of music titles and the number of omitted music titles from the number of music pieces stored in the disc or the number of titles omitted from the titles of the music pieces included in the line omission-notifying character string.

To attain the second object, according to a thirteenth aspect of the invention, there is a method of forming an image, comprising the steps of:

storing text data of basic character strings forming a plurality of lines each including at least one character;

determining whether or not the plurality of lines of the basic character strings exceed in number a predetermined number of lines of characters; and forming, based on a predetermined font, data of an elided image by converting text data of new basic character strings formed by omitting ones of the basic character strings and at the same time adding a line omission-notifying character string implying the omission of the ones of the basic character strings to the resulting basic character strings, to image data thereof, and arranging the image data of the new basic character strings in a predetermined image-forming memory area within which image data of the predetermined number of lines of characters can be arranged.

To attain the second object, according to a fourteenth aspect of the invention, there is provided an image forming device comprising:

storage means for storing text data of basic character strings forming a plurality of lines each including at least one character;

determining means for determining whether or not the plurality of lines of the basic character strings exceed in number a predetermined number of lines of characters; and elided image data-forming means for forming, based on a predetermined font, data of an elided image by converting text data of new basic character strings formed by omitting ones of the basic character strings and at the same time adding a line omission-notifying character string implying the omission of the ones of the basic character strings to the resulting basic character strings, to image data thereof, and arranging the image data of the new basic character strings in a predetermined image-forming memory area within which image data of the predetermined number of lines of characters can be arranged.

According to this image forming method and device, when the plurality of lines of the basic character strings exceed in number the predetermined number of lines of characters, it is possible to convert text data of elided basic character strings formed by omitting an excess of lines over the post-omission line count from the basic character strings, and adding the line omission-notifying character string to remaining lines of the basic character strings, to image data thereof and arranging the image data in a predetermined image-forming memory area within which image data of the predetermined number of lines of characters can be arranged. In short, it is possible to form an elided image by omitting an excess of lines over the predetermined number of lines of character strings, and adding an image notifying the omission to the image when the excess of lines is omitted.

Preferably, the elided image is a print image for printing on a printing object.

According to this preferred embodiment of each of the fifth to fourteenth aspects of the invention, since the elided image is a print image for printing on a printing object, and hence, the method and device can applied to printing devices and the like as an image forming method and device for forming a print image.

Preferably, the printing object is a tape.

According to this preferred embodiment of each of the fifth to fourteenth aspects of the invention, since the elided image formed as the print image is printed on a tape, it is possible to apply the method and device to tape printers and the like.

More preferably, the elided image is a display image for displaying on a display screen.

According to this preferred embodiment of each of the fifth to fourteenth aspects of the invention, since the elided image is a display image for displaying on a display screen, and hence, the method and device can applied to display devices and the like as an image forming method and device for forming a display image.

To attain the third object, according to a fifteenth aspect of the invention, there is provided a method of forming an image, comprising the steps of:

defining a reference line count and one or more n-th predetermined line counts each corresponding to a number which is n times as large as the reference line count (n represents a natural number), with reference to which text data of part or all of basic character strings forming a plurality of lines each including at least one character is converted based on a predetermined font to image data of the part or all of the basic character strings and the image data is arranged in an edit image-forming memory area;

storing text data of the basic character strings;

determining whether or not the number of lines of the basic character strings to be formed when the text data of the basic character strings is converted to image data thereof and the image data of the basic character strings is arranged in the edit image-forming memory area exceeds in number any of the one or more n-th predetermined line counts;

forming edit information character strings, with reference to an n-th post-omission line count calculated by subtracting the number of lines of an n-th predetermined line omission-notifying character string for notifying omission of lines from each n-th predetermined line count which the number of lines of the basic character strings is determined to exceed, by inserting an n-th predetermined line overflow-notifying character string indicative of an excess in line count over the each n-th predetermined line count between an end of a line of the basic character strings immediately before the count of lines of the basic character strings exceeds the n-th post-omission line count and ahead of the following line; and forming data of an edit information image by converting text data of the edit information character strings to image data thereof and arranging the image data of the edit information character strings in an edit information image-forming memory area.

To attain the third object, according to a sixteenth aspect of the invention, there is provided an image forming device comprising:

predetermined line count-defining means for defining a reference line count and one or more n-th predetermined line counts each corresponding to a number which is n times as large as the reference line count (n represents a natural number), with reference to which text data of part or all of basic character strings forming a plurality of lines each including at least one character is converted based on a predetermined font to image data of the part or all of the basic character strings and the image data is arranged in an edit image-forming memory area;

storage means for storing text data of the basic character strings;

determining means for determining whether or not the number of lines of the basic character strings to be formed when the text data of the basic character strings is converted to image data thereof and the image data of the basic character strings is arranged in the edit image-forming memory area exceeds in number any of the one or more n-th predetermined line counts;

edit information character string-forming means for forming edit information character strings, with reference to an n-th post-omission-line count calculated by subtracting the number of lines of an n-th predetermined line omission-notifying character, string for notifying omission of lines from each n-th predetermined line count which the number of lines of the basic character strings is determined to exceed, by inserting an n-th predetermined line overflow-notifying character string indicative of an excess in line count over the each n-th predetermined line count between an end of a line of the basic character strings immediately before the count of lines of the basic character strings exceeds the n-th post-omission line count and a head of the following line; and edit information image data-forming means for forming data of an edit information image by converting text data of the edit information character strings to image data thereof and arranging the image data of the edit information character strings in an edit information image-forming memory area.

According to this image forming method and device, there are defined a reference line count and one or more n-th predetermined line counts each corresponding to a number which is n times as large as the reference line count (n represents a natural number), with reference to which text data of part or all of basic character strings forming a plurality of lines each including at least one character is converted based on a predetermined font to image data of the part or all of the basic character strings and the image data is arranged in an edit image-forming memory area. When the number of lines of the basic character strings to be formed when the text data of the basic character strings is converted to image data thereof and the image data of the basic character strings is arranged in the edit image-forming memory area exceeds in number any of the one or more n-th predetermined line counts, edit information character strings, are formed with reference to an n-th post-omission line count calculated by subtracting the number of lines of an n-th predetermined line omission-notifying character string for notifying omission of lines from each n-th predetermined line count which the number of lines of the basic character strings is determined to exceed, by inserting an n-th predetermined line overflow-notifying character string indicative of an excess in line count over the each n-th predetermined line count between an end of a line of the basic character strings immediately before the count of lines of the basic character strings exceeds the n-th post-omission line count and a head of the following line. Data of an edit information image is formed by converting text data of the edit information character strings to image data thereof and arranging the image data of the edit information character strings in an edit information image-forming memory area.

The sum of each n-th post-omission line count and the number of lines of a corresponding n-th predetermined overflow-notifying character string is equal to the n-th predetermined line count. That is, the position at which the n-th predetermined overflow-notifying character string is a position after which lines are omitted from the basic character strings and the n-th predetermined line omission character string indicative of the omission is added to remaining lines to form characters strings having a total line count equal to the n-th predetermined line count. Therefore, by printing or displaying the edit information image thus formed, it is possible to grasp each omitting position (line overflow position) when the elided image (edit image) is formed such that it has the n-th predetermined line count (each predetermined line count a natural number times as large as the reference line count).

Preferably, the one or more n-th predetermined line counts comprise a plurality of line counts defined by different values of the n, and the number of lines of the n-th predetermined line omission-notifying character string is identical for all of the plurality of line counts of the one or more n-th predetermined line counts.

According to this preferred embodiment of each of the fifteenth and sixteenth aspects of the invention, an identical value can be used as the number of lines of the n-th predetermined line omission-notifying character string for all of the plurality of line counts of the one or more n-th predetermined line counts, and the process of inserting each n-th predetermined line overflow-notifying character string, i.e. forming of the edit information character strings can be simplified.

Preferably, the method includes the steps of:

setting one of the one or more n-th predetermined line counts to a predetermined line count with reference to which text data of the basic character strings is converted to image data thereof for arrangement in the edit image-forming memory area;

forming elided character strings by omitting lines of the edit information character strings after the n-th predetermined line overflow-notifying character string for the set one of the one or more n-th predetermined line counts;

forming elided basic character strings in which the n-th predetermined line overflow-notifying character string for the set one of the one or more n-th predetermined line counts is added to the elided character strings; and forming data of an elided image by converting text data of the elided basic character strings to image data thereof and arranging the image data of the elided basic character strings in the edit image-forming memory area.

Preferably, the image forming device includes:

predetermined line count-setting means for setting one of the one or more n-th predetermined line counts to a predetermined line count with reference to which text data of the basic character strings is converted to image data thereof for arrangement in the edit image-forming memory area;

elided character string-forming means for forming elided character strings by omitting lines of the edit information character strings after the n-th predetermined line overflow-notifying character string for the set one of the one or more n-th predetermined line counts;

elided basic character string-forming means for forming elided basic character strings in which the n-th predetermined line overflow-notifying character string for the set one of the one or more n-th predetermined line counts is added to the elided character strings; and elided image data-forming means for forming data of an elided image by converting text data of the elided basic character strings to image data thereof and arranging the image data of the elided basic character strings in the edit image-forming memory area.

According to these preferred embodiments, elided character strings is formed by omitting lines of the edit information character strings after the n-th predetermined line overflow-notifying character string for the set one of the one or more n-th predetermined line counts, and there are formed elided basic character strings in which the n-th predetermined line overflow-notifying character string for the set one of the one or more n-th predetermined line counts is added to the elided character strings. Then, data of an elided image is formed by converting text data of the elided basic character strings to image data thereof and arranging the image data of the elided basic character strings in the edit image-forming memory area. In short, in addition to the edit information image, it is possible to form an elided image by omitting part of the basic character strings and adding a character string notifying the omission to form elided basic character strings, followed by converting text data of the elided basic character string to image data such that the number of a total of lines of the resulting character strings is a natural number times as large as the reference line count.

Preferably, the elided image is a print image for printing on a printing object.

According to this preferred embodiment of the fifteenth and sixteenth aspects of the invention, the elided image is a print image for printing on a printing object, and hence the method and device can be applied to printing devices and the like as an image forming method and device for forming a print image.

More preferably, the printing object is a tape.

According to this preferred embodiment of each of the fifteenth and sixteenth aspects of the invention, since the elided image formed as the print image is printed on a tape, it is possible to apply the method and device to tape printers and the like.

Preferably, the n-th predetermined line omission-notifying character string is formed by an identical character string for all of the one or more n-th predetermined line counts.

According to this preferred embodiment of each of the fifteenth and sixteenth aspects of the invention, since the n-th predetermined line omission-notifying character string is formed by an identical character string for all of the one or more n-th predetermined line counts, it is only required to provide one kind of character string for the n-th predetermined line omission-notifying character string.

More preferably, a predetermined serial number is defined to indicate information of each of the basic character strings, and the n-th predetermined line omission-notifying character string indicates the number of all pieces of information of the basic character strings.

According to this preferred embodiment of each of the fifteenth and sixteenth aspects of the invention, a predetermined serial number is defined to indicate information of each of the basic character strings. This serial number is only required to correspond to each character string but not to each line formed when an image of the basic character strings is formed by converting text data of character strings to image data thereof and arranging in the edit image-forming memory area. That is, irrespective of whether text data of each character string is converted to image data of one line of the character string or to a plurality of lines of the same by automatically starting a new line, a character string included in the n-th predetermined line omission-notifying character string indicates the number of all pieces of information of the basic character strings. This enables the user to be informed of the omission of the number of pieces of information as well as the total number of pieces of information and the number of omitted pieces of information from the number of pieces of information not omitted and the total number of pieces information.

Preferably, the n-th predetermined line omission-notifying character string for the one or more n-th predetermined line counts is formed by a different character string for a different value of the n.

According to this preferred embodiment of each of the fifteenth and sixteenth aspects of the invention, since the n-th predetermined line omission-notifying character string for the one or more n-th predetermined line counts is formed by a different character string for a different value of the n, a character strings suitable for each of n-th predetermined line omission-notifying character string can be used.

Preferably, a predetermined serial number is defined to indicate information of each of the basic character strings, and the n-th predetermined line omission-notifying character string indicates the number of omitted pieces of information of the basic character strings.

According to this preferred embodiment of each of the fifteenth and sixteenth aspects of the invention, a predetermined serial number is defined to indicate information of each of the basic character strings. Therefore, by forming the n-th predetermined line omission-notifying character string as a character indicative of the number of omitted pieces of information, it is possible for the user to be informed of the omission of the number of pieces of information as well as the total number of pieces of information from the number of pieces of information not omitted and the number of omitted pieces information.

For instance, the edit information image is a display image for displaying on a display screen.

According to this preferred embodiment of each of the fifteenth and sixteenth aspects of the invention, since the elided image is a display image for displaying on a display screen, and hence, the method and device can applied to display devices and the like as the image forming method and device for forming a display image. Of course, the elided image can be formed as a print image for printing. However, particularly when the edit information image of an elided image is used for a print image, it is possible to check the omitting positions (line overflow positions) of the print image (edit image) by displaying the display image (edit information image). As a result of the check, if it is determined that editing, such as correction (e.g. restoring omitted characters) is necessary, the edit can be easily carried out since the whole basic character strings including the lines and characters can be checked.

Preferably, the edit information character strings correspond respectively to the basic character strings, and the step of forming the data of the edit information image includes converting text data of each of the edit information character strings to image data thereof and arranging the image data of the each of the edit information character strings in the edit information image-forming memory area such that an image of the each of the edit information character strings forms an image of one line of a character string.

Preferably, the edit information character strings correspond respectively to the basic character strings, and edit information image-forming means converts text data of each of the edit information character strings to image data thereof and arranges the image data of the each of the edit information character strings in the edit information image-forming memory area such that an image of the each of the edit information character strings forms an image of one line of a character string.

According to these preferred embodiments, the edit information character strings correspond respectively to the basic character strings, and an image of the edit information character strings is formed such that an image of the each of the edit information character strings forms an image of one line of a character string. Therefore, it is possible to an edit information image which suitably represents original lines of the basic character strings.

Preferably, the n-th predetermined line overflow-notifying character string includes a symbol easily discriminated from other characters.

According to this preferred embodiment of each of the fifteenth and sixteenth aspects of the invention, since the n-th predetermined line overflow-notifying character string includes a symbol which can be easily discriminated from other characters, it is possible to easily discriminate the n-th predetermined line overflow-notifying character string from other characters and hence easily grasp the position thereof. As the symbol it is preferred to use a symbol shaped after the letter "L" for association of overflow of lines, and a symbol shaped after the letter "P" for association of overflow of pages.

Preferably, the n-th predetermined line overflow-notifying character string includes at least one character indicative of a number represented by the n.

According to this preferred embodiment of each of the fifteenth and sixteenth aspects of the invention, the n-th predetermined line overflow-notifying character string includes at least one character indicative of a number represented by the n. That is, the n-th predetermined line overflow-notifying character string corresponds to n times as large as the reference count. Therefore, by viewing only the n-th predetermined line overflow-notifying character string including the character indicative of the n, it is possible to grasp how many times as large as the reference count the omitting position corresponds to.

Preferably, the data of the edit information image is formed by converting text data of only a required range of the edit information character strings to image data thereof and arranging the image data of the required range of the edit information character strings in the edit information image-forming memory area.

According to this preferred embodiment of each of the fifteenth and sixteenth aspects of the invention, the data of the edit information image is formed by converting-text data of only a required range of the edit information character strings to image data thereof and arranging the image data of the required range of the edit information character strings in the edit information image-forming memory area. More specifically, by forming an image of only a display range on the display screen, and adding an image of characters newly required to be displayed when the display range is moved, it is possible to reduce time from the start of forming edit information image and the checking thereof, and save memory since it is only required to allocate an area sufficient for forming image data corresponding to the display range. When the edit information image is used as a print image, the same advantageous effects can be obtained, since the printing can be carried out sequentially forming each range of image data necessary for printing operation.

Preferably, the text data of the basic image character strings is stored in a disc, the method including the step of reading the text data of the basic character strings from the disc.

Preferably, the text data of the basic image character strings is stored in a disc, the image forming device includes reading means for reading the text data of the basic character strings from the disc.

According to these preferred embodiments, it is possible to read text data of at least basic character string from a disc storing the same, and forms an image data thereof.

More preferably, the disc is a mini disc.

According to the preferred embodiment of each of the fifteenth and sixteenth aspects of the invention, it is possible to form an image of basic character strings by reading text data thereof from a mini disc.

More preferably, the reading means includes disc playback means for reading the text data of the at least one basic character string from the disc.

According to this preferred embodiment of the sixteenth aspect of the invention, the reading means of the image forming device has disc playback means for reading the text data of the at least one basic character string from the disc. The provision of the disc playback means makes it possible to read data of character strings stored in the disc, and further, the construction of a disc playback device of a general type can be diverted to this use.

To attain the fourth object, according to a seventeenth aspect of the invention, there is provided a method of forming an image, comprising the steps of:

storing text data of at least one basic character string forming at least one line each including at least one character;

determining whether or not any of the at least one basic character string has characters in excess of a predetermined number of characters;

forming at least one edit information character string corresponding respectively to the at least one basic character string, by inserting a character overflow-notifying character string indicative of an excess in character count over the predetermined number and including at least one predetermined character, between a character immediately before a point at which the count of characters exceeds the predetermined number and a character immediately after the point, in each basic character string determined to have characters in excess of the predetermined number of characters; and forming data of an edit information image by converting text data of the at least one edit information character string to image data thereof based on a predetermined font and arranging the image data of the at least one edit information character string in an edit information image data-forming memory area.

To attain the fourth object, according to an eighteenth aspect of the invention, there is provided an image forming device comprising:

storage means for storing text data of at least one basic character string forming at least one line each including at least one character;

determining means for determining whether or not any of the at least one basic character string has characters in excess of a predetermined number of characters;

edit information character string-forming means for forming at least one edit information character string corresponding respectively to the at least one-basic character string, by inserting a character overflow-notifying character string indicative of an excess in character count over the predetermined number and including at least one predetermined character, between a character immediately before a point at which the count of characters exceeds the predetermined number and a character immediately after the point, in each basic character string determined to have characters in excess of the predetermined number of characters; and edit information image data-forming means for forming data of an edit information image by converting text data of the at least one edit information character string to image data thereof based on a predetermined font and arranging the image data of the at least one edit information character string in an edit information image data-forming memory area.

According to this image forming method and device, text data of at least one basic character string forming at least one line each including at least one character is stored, and it is determined whether or not any of the at least one basic character string has characters in excess of a predetermined number of characters. At least one edit information character string corresponding respectively to the at least one basic character string is formed by inserting a character overflow-notifying character string indicative of an excess in character count over the predetermined number of characters and including at least one predetermined character, between a character immediately before a point at which the count of characters exceeds the predetermined number and a character immediately after the point, in each basic character string determined to have characters in excess of the predetermined number of characters, and data of an edit information image is formed by converting text data of the at least one edit information character string to image data thereof based on a predetermined font and arranging the image data of the at least one edit information character string in an edit information image data-forming memory area.

Assuming that the number of characters corresponding to the horizontal size (length of each line of horizontal writing, for instance) of an edit information image data-forming memory area for forming an edit image of an elided image or the whole image is the edit information character strings, the edit character overflow-notifying character string is inserted between a character immediately before a point at which the count of characters exceeds the predetermined number and a character immediately after the point, i.e. at a position from which a new line is automatically started to continue the character string, and hence the resulting image formed by conversion from text data of the edit information character strings includes an image of the edit character overflow-notifying character string formed at the automatic new line-starting position. Therefore, when the image thus formed is displayed or printed, it is possible to grasp each new line-starting position (character overflow position). It should be noted that if the character overflow-notifying character string can be inserted not only automatically when it is determined that any of the at least one basic character string has characters in excess of a predetermined number of characters, but also arbitrarily, similarly to the arbitrary new line start, when desired by the user, the operability of the device is enhanced with increased freedom of editing.

It should be noted that the size of an image-forming memory area or the like is calculated in units of dots (by dot size), and hence the predetermined number is assumed to be the number of characters each having a character size (dot size) defined by the current setting or configuration, and more specifically, equal to the number of characters each having a character size defined by the current setting or configuration and arranged such that a total number of dots of the characters agrees with a horizontal dot size of the image-forming memory area. Therefore, if the dot size of one character is changed by expansion/contraction, various character modifications (e.g. hollow characters, italic, etc.), or the like, the predetermined number of characters is also changed. However, in such a case, whether the dot size (size measured in units of dots) of character omission-notifying character string should be also changed or not may be arbitrarily determined.

Further, as to a character string including characters different in dot size from each other due to proportional spacing or kerning (e.g. characters to be converted to image data based on proportional font or the like), the dot number of the character string (total number of dots of characters and blank or spacing between adjacent pairs of characters) exceeds the number of dots of a predetermined number of characters having a character size of the present setting and arranged in a line, it is determined that the character string has characters in excess of the predetermined number of characters. In short, in this case, the number of characters of each line indicates the number of characters of calculated in terms of number of dots based on the character size of the present setting.

Preferably, the method includes the steps of setting one of a new line-on format for forming an image of an excess of characters over the predetermined number of characters of the each basic character string determined to have characters in excess of the predetermined number of characters as an image of the following line, and a new line-off format for omitting the image of the excess of characters of the each basic character string determined to have characters in excess of the predetermined number of characters, and the step of forming the at least one edit information character string includes inserting the character overflow-notifying character string, with reference to a post-omission character count calculated by subtracting from the predetermined number the number of characters of a character omission-notifying character string for notifying omission of at least one character, instead of referring to the predetermined number, in the each basic character string determined to have characters in excess of the predetermined number of characters, if the new line-off format has been set.

Preferably, the image forming device includes new line-on/off-setting means for setting one of a new line-on format for forming an image of an excess of characters over the predetermined number of characters of the each basic character string determined to have characters in excess of the predetermined number of characters as an image of the following line, and a new line-off format for omitting the image of the excess of characters of the each basic character string determined to have characters in excess of the predetermined number of characters. The edit information character string-forming means inserts the character overflow-notifying character string, with reference to a predetermined post-omission character count calculated by subtracting the number of characters of a character omission-notifying character string for notifying omission of at least one character, from the predetermined number, instead of referring to the predetermined number, in the each basic character string determined to have characters in excess of the predetermined number of characters, if the new line-off format has been set.

According to these preferred embodiments, there is set one of a new line-on format for forming an image of an excess of characters over the predetermined number of characters of the each basic character string determined to have characters in excess of the predetermined number of characters as an image of the following line, and a new line-off format for omitting the image of the excess of characters of the each basic character string determined to have characters in excess of the predetermined number of characters. If the new line-off format has been set, instead of referring to the predetermined number, reference is made to a post-omission character count calculated by subtracting from the predetermined number the number of characters of a character omission-notifying character string for notifying omission of at least one character, for insertion of the character overflow-notifying character string at a position corresponding to the post-omission character count. That is, the character overflow-notifying character string is inserted at a position prior to a position set in the case of the new line-on format being set, by the number of characters of the character omission-notifying character string.

The sum of the post-omission character count and the number of characters of the character omission-notifying character string is equal to the predetermined number (of characters). That is, the position at which character overflow-notifying character string is inserted is a position after which characters are omitted from the basic character string and the character omission-notifying character string is added to remaining characters of the same character string, assuming that the number of characters adapted to the horizontal size of the edit information image data-forming area is set to the predetermined number. Therefore, by printing or displaying the edit information image thus formed, it is possible to grasp each new line-starting position (character overflow position) in the case of the new line-on format is being set, and each line omitting position (character overflow position) in the case of the new line-off format is being set.

More preferably, the method includes the steps of forming at least one elided character string formed by omitting the character overflow-notifying character string and the following portion of each edit information character string corresponding to the each basic character string determined to have characters in excess of the predetermined number of characters, if the new line-off format has been set; forming at least one elided basic character string corresponding respectively to the at least one elided character string by adding the character omission-notifying character string to a portion of the each edit information character string from which the character overflow-notifying character string and the following portion are omitted; and forming data of an elided image by converting text data of the at least one elided character string to image data thereof based on a predetermined font and arranging the image data of the at least one elided basic character string in a predetermined edit image data-forming memory area within which image data of the predetermined number of characters can be arranged.

More preferably, the image forming device includes elided character string-forming means for forming at least one elided character string formed by omitting the character overflow-notifying character string and the following portion of each edit information character string corresponding to the each basic character string determined to have characters in excess of the predetermined number of characters, if the new line-off format has been set; elided basic character string-forming means for forming at least one elided basic character string corresponding respectively to the at least one elided character string by adding the character omission-notifying character string to a portion of the each edit information character string from which the character overflow-notifying character string and the following portion are omitted; and elided image data-forming means for forming data of an elided image by converting text data of the at least one elided basic character string to image data thereof based on a predetermined font and arranging the image data of the at least one elided basic character string in a predetermined edit image data-forming memory area within which image data of the predetermined number of characters can be arranged.

According to these preferred embodiments, at least one elided character string is formed by omitting the character overflow-notifying character string and the following portion of each edit information character string, and at least one elided basic character string is formed by adding the character omission-notifying character string to a portion of the each edit information character string from which the character overflow-notifying character string and the following portion are omitted. Data of an elided image is formed by converting text data of the at least one elided character string to image data thereof based on a predetermined font and arranging the image data of the at least one elided basic character string in a predetermined edit image data-forming memory area within which image data of the predetermined number of characters can be arranged.

That is, the character overflow-notifying character string of the edit information character strings indicates the omitting position (character overflow position) when the new line-on format is employed, and therefore, by omitting characters after the character overflow-notifying character string and adding the character omission-notifying character string to the resulting string, it is possible to prepare the elided basic character strings for forming an elided image from the displayed character strings. Therefore, the image forming method and device is not only capable of easily forming, based on the edit information character strings, an edit information image but also an elided image in which part of each basic character string is omitted and a character omission-notifying character string is added to the resulting string.

For instance, the elided image is a print image for printing on a printing object.

According to this preferred embodiment of the seventeenth and eighteenth aspects of the invention, the elided image is a print image for printing on a printing object, and hence the method and device can be applied to printing devices and the like as an image forming method and device for forming a print image.

For instance, the printing object is a tape.

According to this preferred embodiment of each of the seventeenth and eighteenth aspects of the invention, since the elided image formed as the print image is printed on a tape, it is possible to apply the method and device to tape printers and the like.

Further preferably, the further includes the steps of carrying out any of edit operations including character insertion, character deletion, character conversion, character size setting, and character decoration setting, on any of the at least one basic character string; and as a result of the any of the edit operations, if the predetermined number of characters which can be arranged within the predetermined image-forming memory area has changed in number, forming the data of the elided image with reference to the resulting number of characters which can be arranged within the predetermined edit image data-forming memory area.

Further preferably, the image forming device further includes edit means for carrying out any of edit operations including character insertion, character deletion, character conversion, character size setting, and character decoration setting, on any of the at least one basic character string; and as a result of the any of the edit operations, if the predetermined number of characters which can be arranged within the predetermined image-forming memory area has changed in number, the image forming device forms the elided image with reference to the resulting number of characters which can be arranged within the predetermined edit image data-forming memory area.

According to these preferred embodiments, it is possible to carry out any of edit operations including character insertion, character deletion, character conversion, character size setting, and character decoration setting. And as a result of the any of the edit operations, if the width of an image of each character is changed, causing a change in the predetermined number of characters which can be arranged within the predetermined image-forming memory area, the elided image is formed with reference to the predetermined number of characters updated to a number resulting from the change, and hence an image adapted to the edited basic character strings can be formed.

Further preferably, the character omission-notifying character string includes at least one of characters "•••", "••", "•", and "~".

According to this preferred embodiment of each of the seventeenth and eighteenth aspects of the invention, since the character omission-notifying character string includes at least one of characters "•••", "••", "•", and "~", it is possible to properly represent the omission of characters.

Preferably, the edit information image is a display image for displaying on a display screen.

According to this preferred embodiment of each of the seventeenth and eighteenth aspects of the invention, since the elided image is a display image for displaying on a display screen, and hence, the method and device can be applied to display devices and the like as the image forming method and device for forming a display image. Of course, the elided image can be formed as a print image for printing. However, particularly when the edit information image of an elided image is used for a print image, it is possible to check the omitting positions (character overflow positions) of the print image (edit image) by displaying the display image (edit information image). As a result of the check, if it is determined that editing, such as correction (e.g. restoring omitted characters) is necessary, the edit can be easily carried out since the whole basic character strings including the lines and characters can be checked or viewed.

Preferably, the step of forming the data of the edit information image includes converting text data of the each of the at least one edit information character string to image data thereof and arranging the image data of the each of the at least one edit information character string in the edit information image data-forming memory area such that an image of the each of the at least one edit information character string forms an image of one line of a character string.

Preferably, the edit information image data-forming means forms the data of the edit information image includes converting text data of the each of the at least one edit information character string to image data thereof and arranging the image data of the each of the at least one edit information character string in the edit information image data-forming memory area such that an image of the each of the at least one edit information character string forms an image of one line of a character string.

According to these preferred embodiments, the edit information character strings correspond respectively to the basic character strings, and an image of the edit information character strings is formed such that an image of the each of the edit information character strings forms an image of one line of a character string. Therefore, it is possible to an edit information image which suitably represents original lines of the basic character strings.

Preferably, the character overflow-notifying character string includes a symbol easily discriminated from other characters.

According to this preferred embodiment of each of the seventeenth and eighteenth aspects of the invention, since the character overflow-notifying character string includes a symbol which can be easily discriminated from other characters, such as a special symbol specially registered by non-standard character registration, when the edit character strings are displayed or printed for checking thereof, it is possible to easily discriminate the character overflow-notifying character string from other characters and hence easily grasp the position thereof. As the symbol, it is preferred to use a symbol shaped after the letter "C" for association of overflow of character.

Preferably, the step of forming the data of the edit information image includes converting text data of only a required range of the at least one edit information character string to image data thereof and arranging the image data of the required range of the at least one edit information character string in the edit information image data-forming memory area.

Preferably, the edit information image data-forming means converts text data of only a required range of the at least one edit information character string to image data thereof and arranges the image data of the required range of the at least one edit information character string in the edit information image data-forming memory area.

According to this preferred embodiment of each of the seventeenth and eighteenth aspects of the invention, the data of the edit information image is formed by converting text data of only a required range of the edit information character strings to image data thereof and arranging the image data of the required range of the edit information character strings in the edit information image-forming memory area. More specifically, by forming an image of only a display range on the display screen, and adding an image of characters newly required to be displayed when the display range is moved, it is possible to reduce time from the start of forming edit information image and the checking thereof, and save memory since it is only required to allocate an area sufficient for forming image data corresponding to the display range. When the edit information image is used as a print image, the same advantageous effects can be obtained, since the printing can be carried out by sequentially forming a range of image data necessary for printing operation.

Preferably, the text data of the basic image character strings is stored in a disc, the method including the step of reading the text data of the basic character strings from the disc.

Preferably, the text data of the basic image character strings is stored in a disc, the image forming device includes reading means for reading the text data of the basic character strings from the disc.

According to these preferred embodiments, it is possible to read text data of at least basic character string from a disc storing the same, and forms an image data thereof.

More preferably, the disc is a mini disc.

According to the preferred embodiment of each of the seventeenth and eighteenth aspects of the invention, it is possible to form an image of basic character strings by reading text data thereof from a mini disc.

More preferably, the reading means includes disc playback means for reading the text data of the at least one basic character string from the disc.

According to this preferred embodiment of the sixteenth aspect of the invention, the reading means of the image forming device has disc playback means for reading the text data of the at least one basic character string from the disc. The provision of the disc playback means makes it possible to read data of character strings stored in the disc, and further, the construction of a disc playback device of a general type can be diverted to this use.

The above and other objects, features, and advantages of the invention will become more apparent from the following detailed description taken in conjunction with the accompanying drawings.

Figure 1:
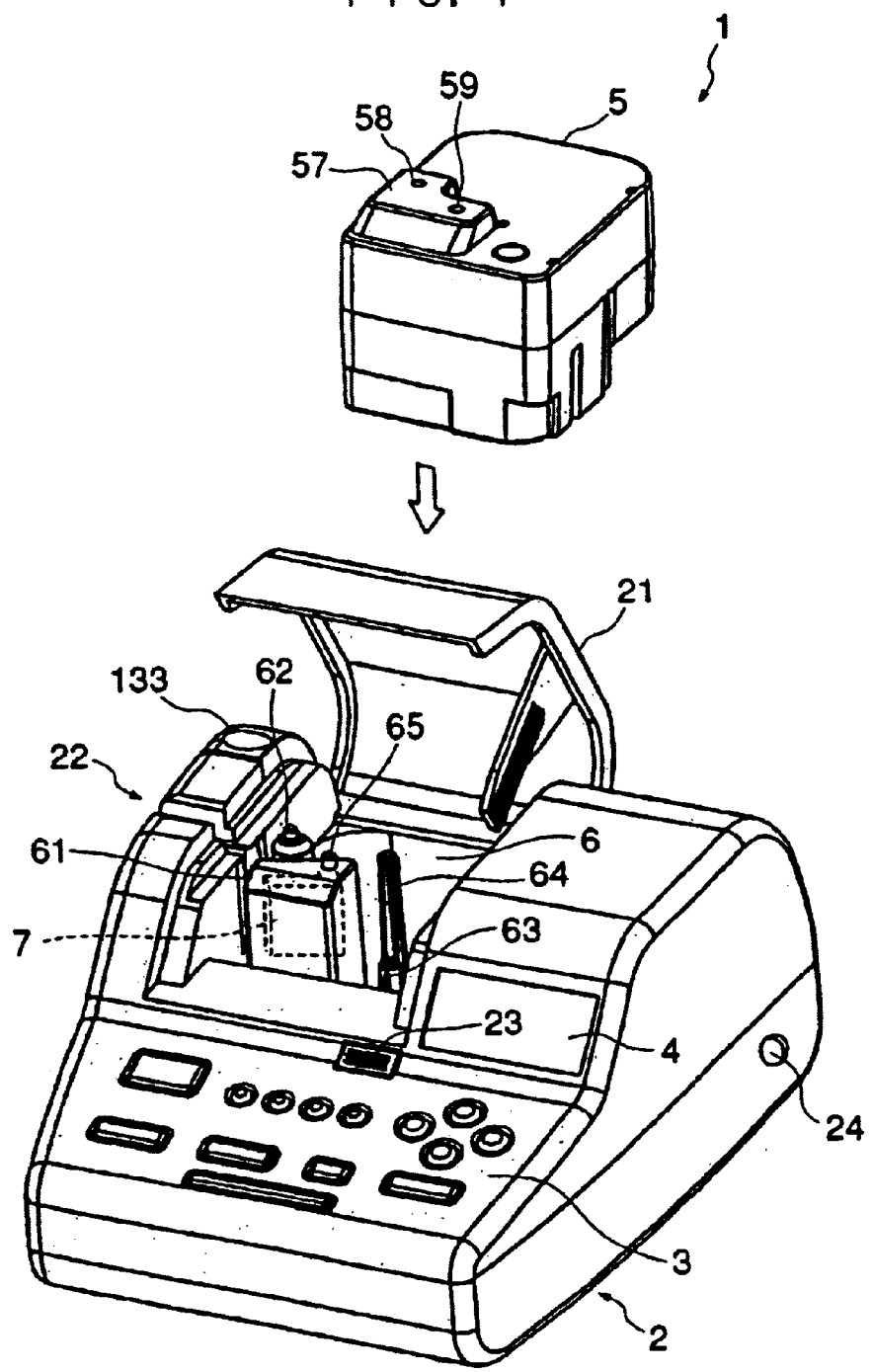
FIG. 1 is a perspective view of an appearance of a tape printing apparatus to which are applied a character printing method and device and an image forming method and device according to an embodiment of the invention, in a state in which a lid of the tape-printing apparatus is opened and a tape cartridge is removed therefrom.
Figure 2:
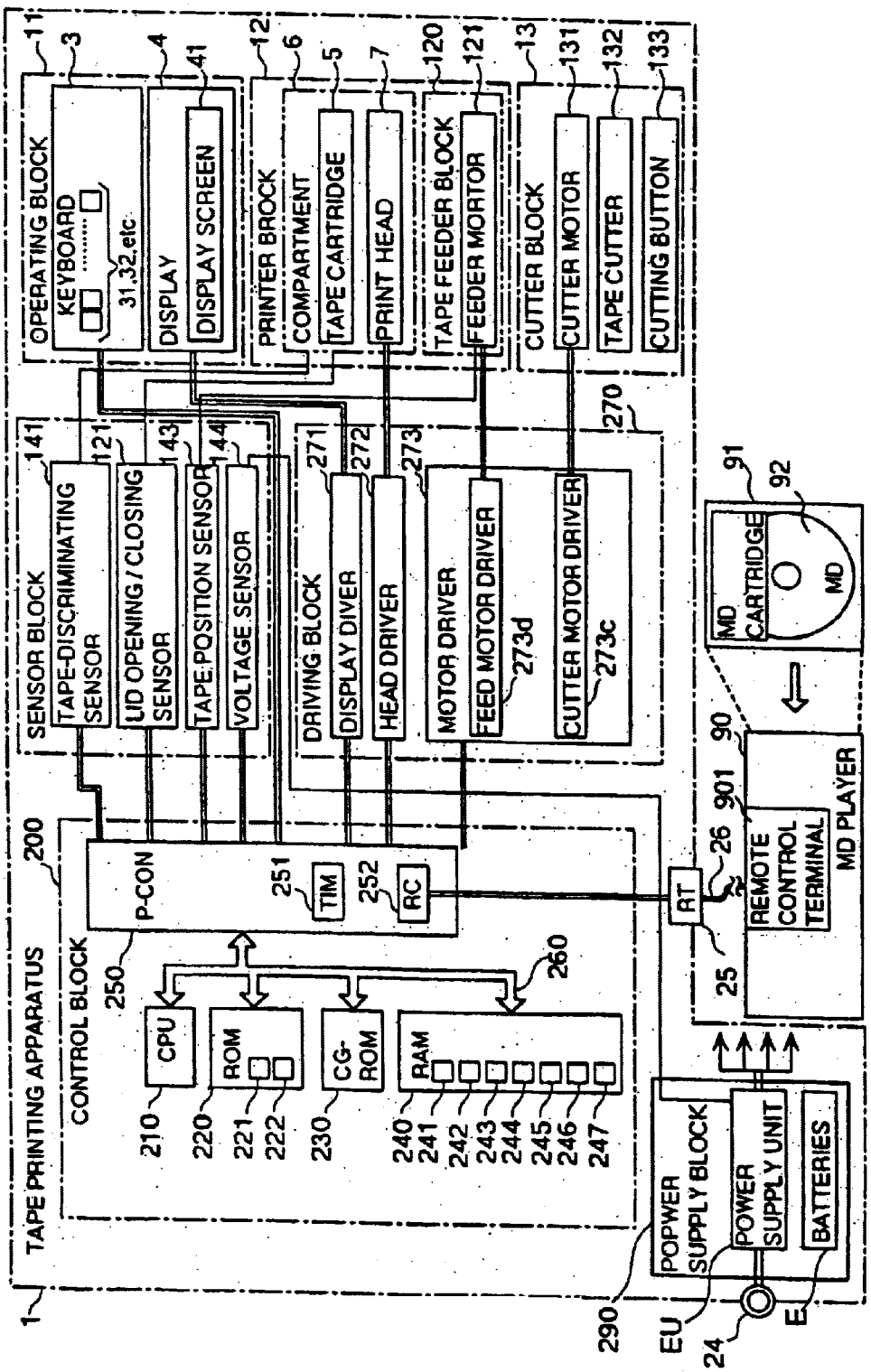
Figure 3:
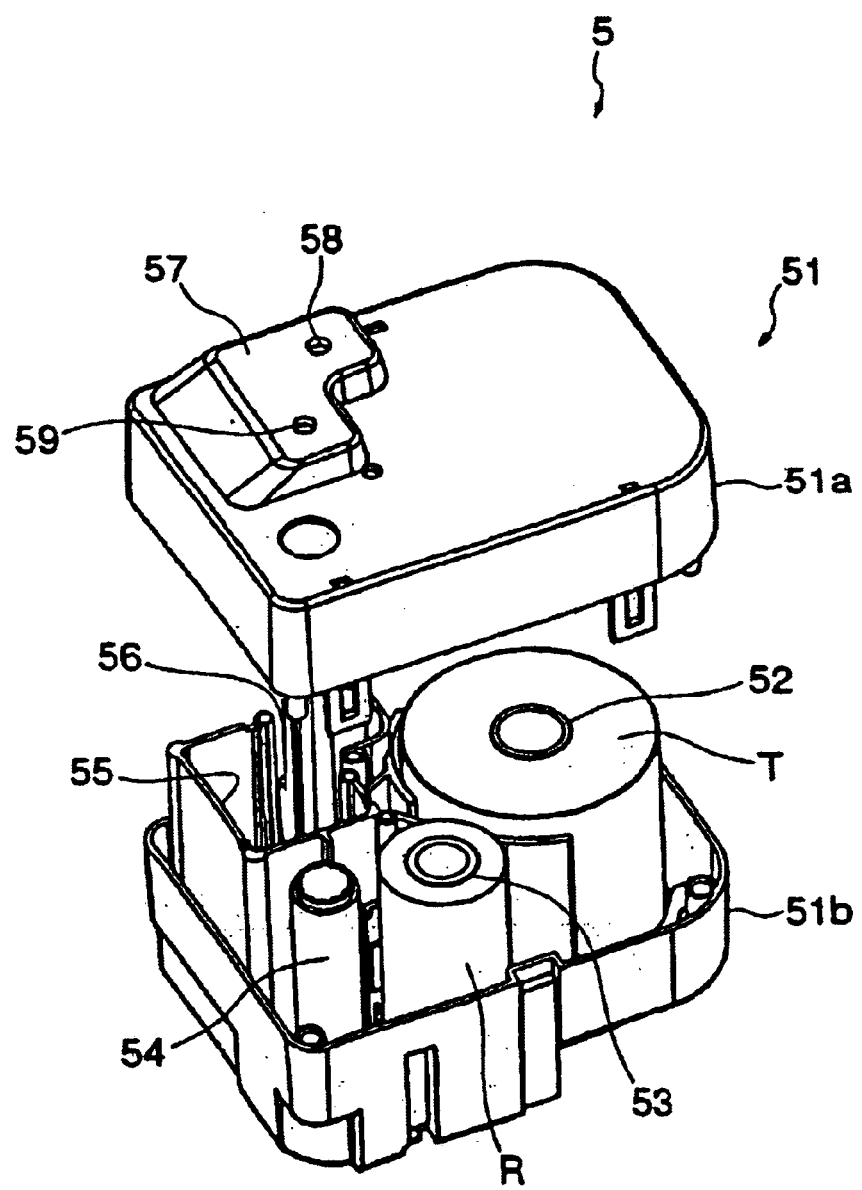
Figure 4A:
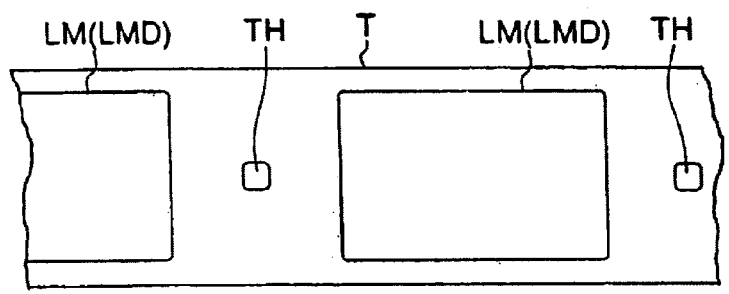
Figure 4B:
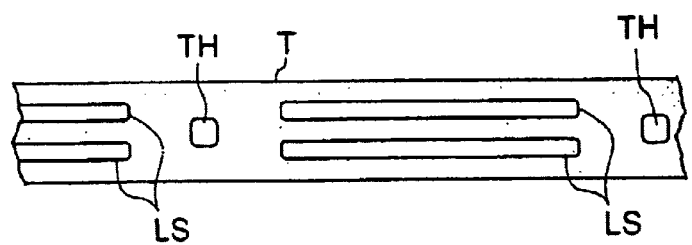
Figure 5A:
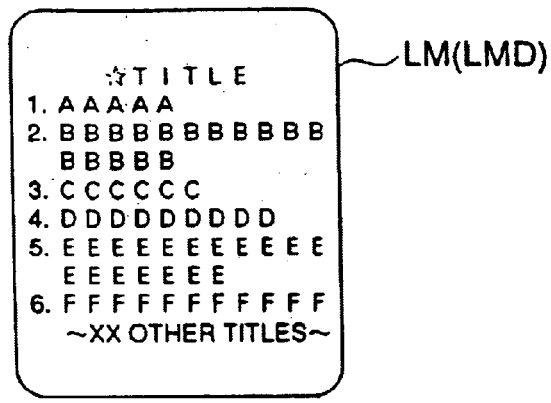
Figure 5B:
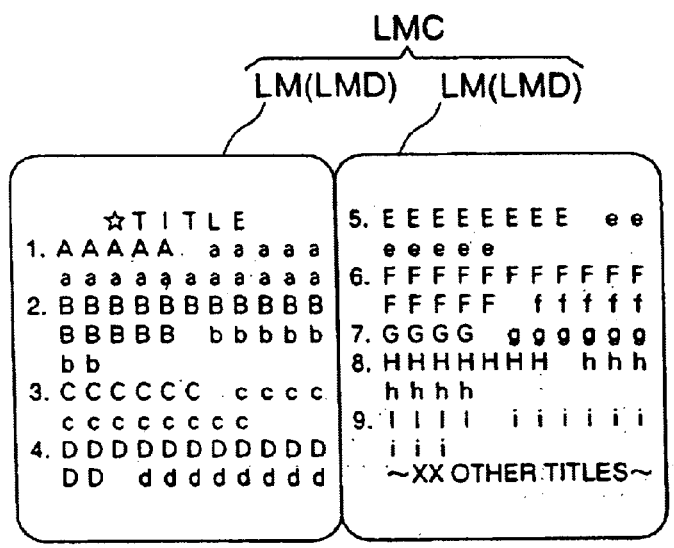
Figure 5C:
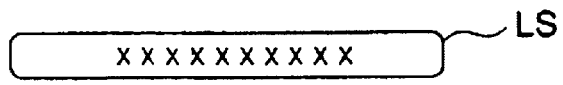
Figure 6:
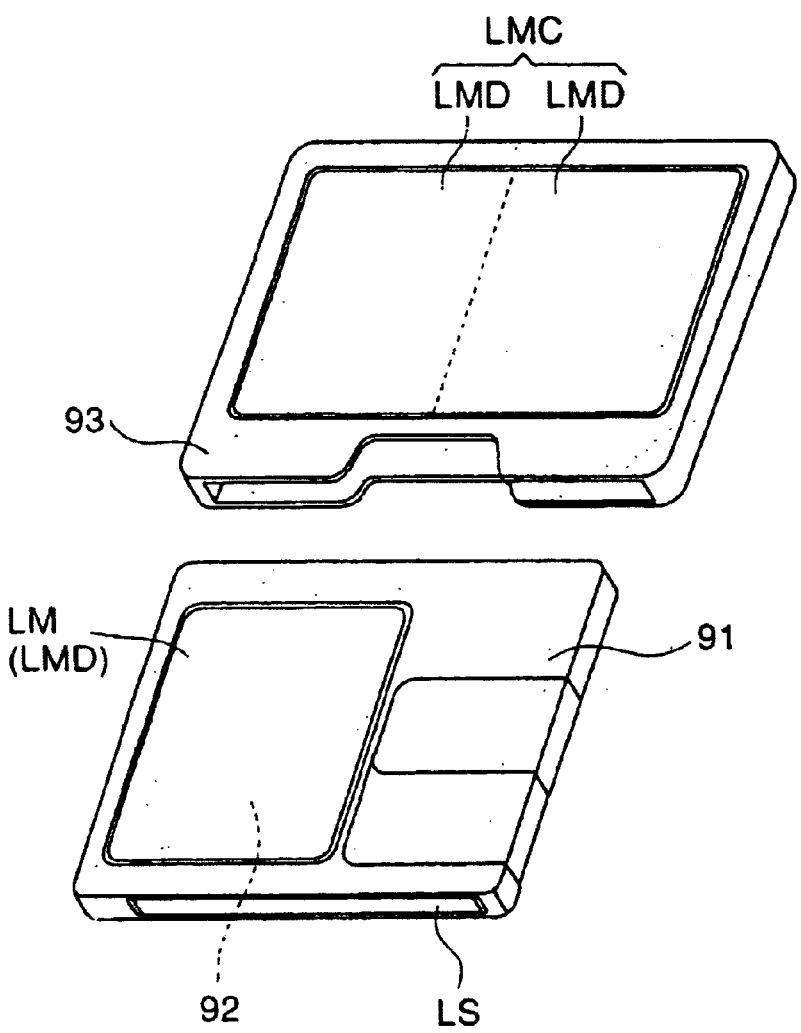
Figure 7:
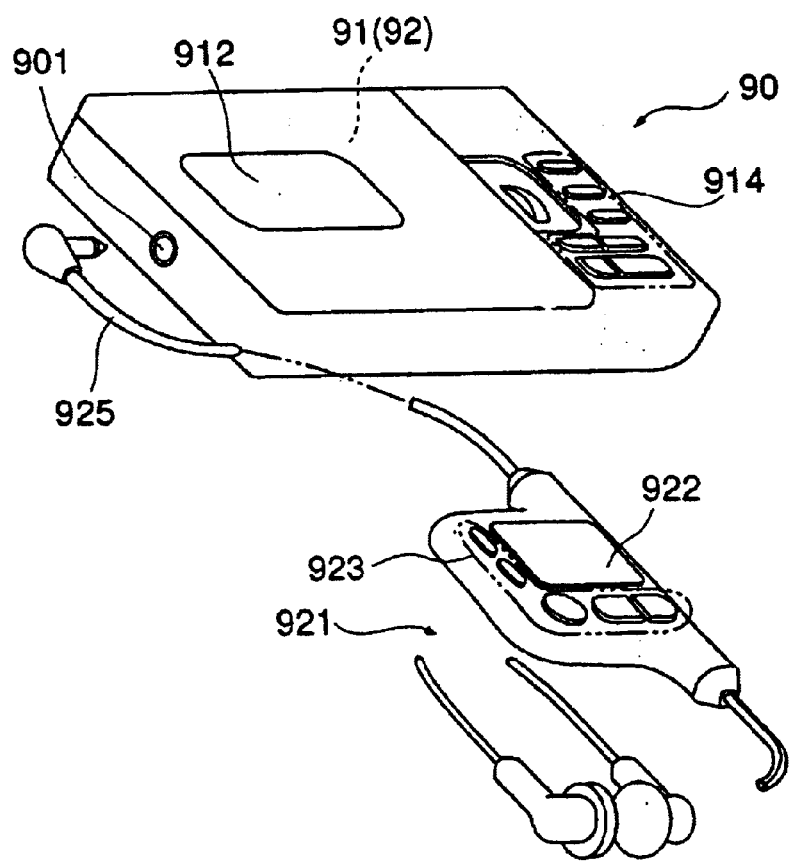
Figure 8:
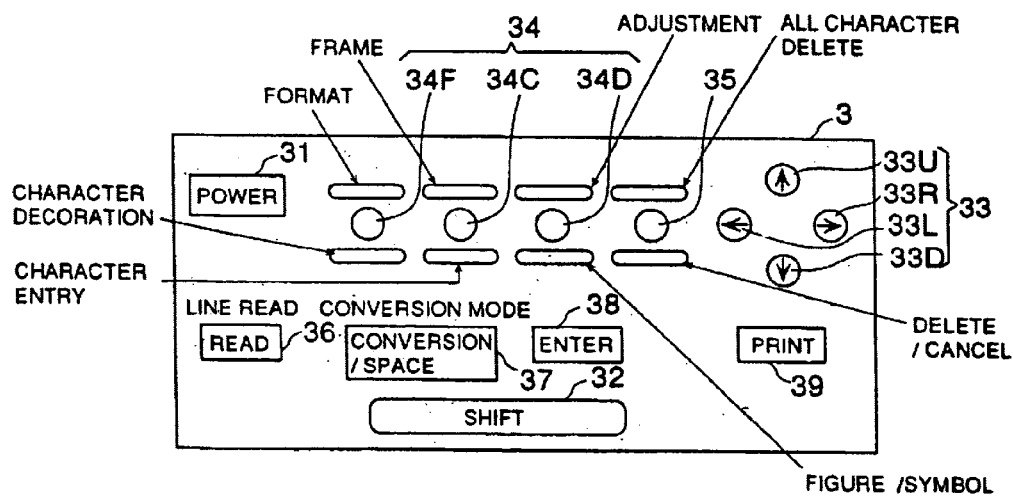
Figure 9:
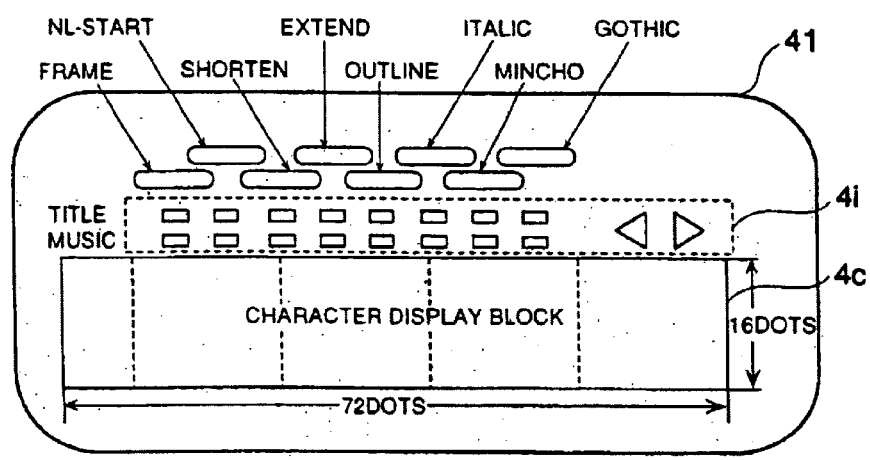
Figure 10:
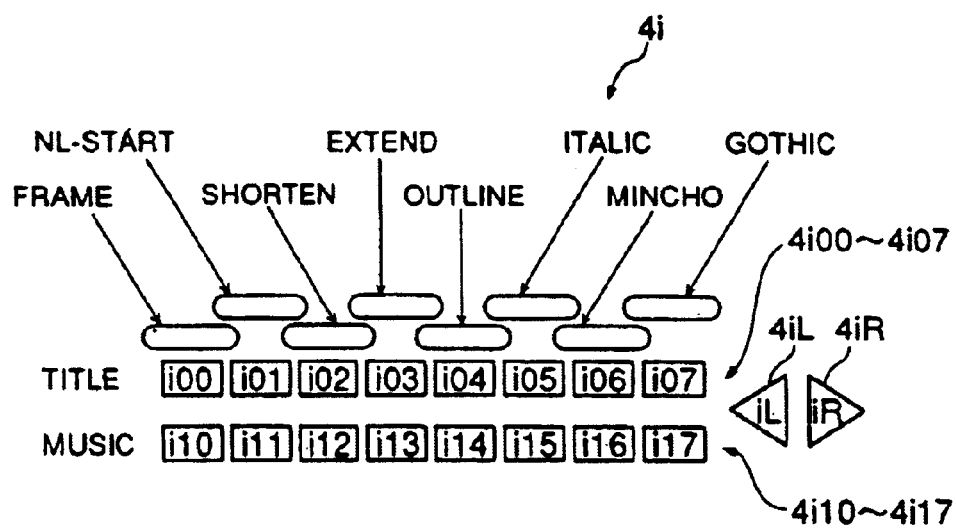
Figure 11A:
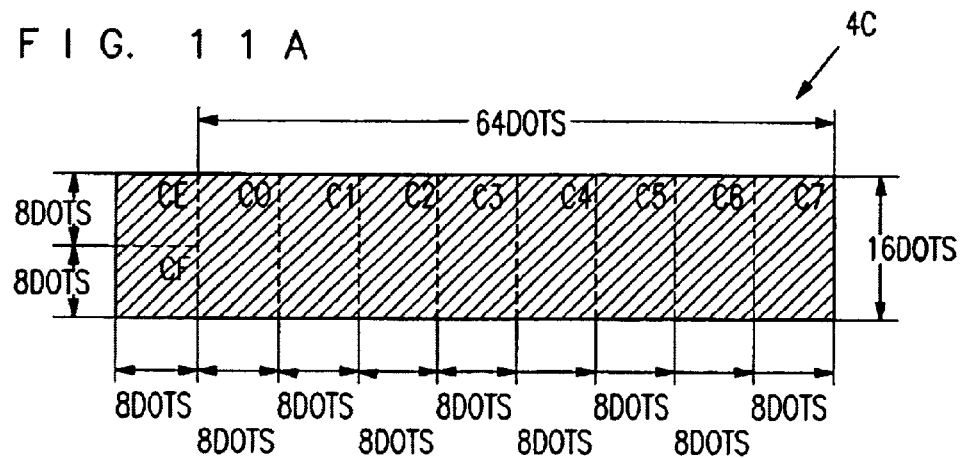
Figure 11B:
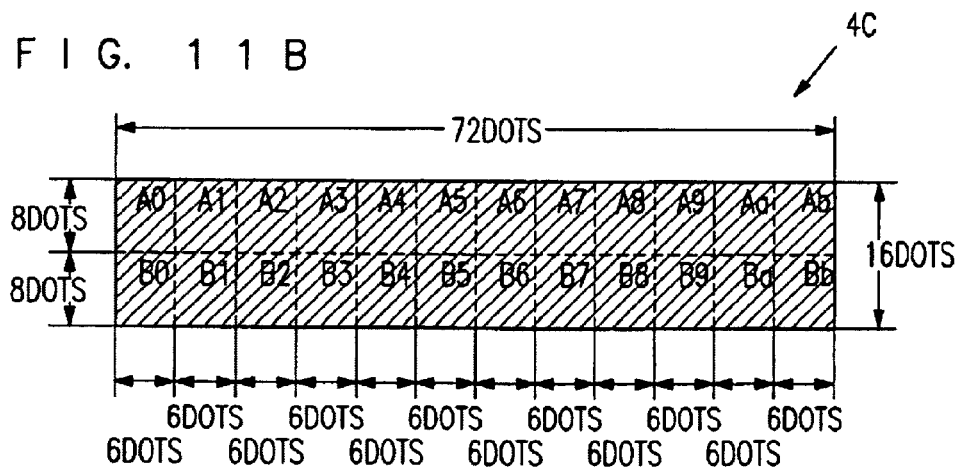

to which are applied an image printing method and device according to an embodiment of the invention, in a state in which a lid of the tape-printing apparatus is open and a tape cartridge is removed therefrom;

FIG. 2 is a block diagram schematically showing a control system of the FIG. 1 tape printing apparatus;

FIG. 3 is a perspective view of an appearance of the tape cartridge with an upper casing removed therefrom;

FIGS. 4A and 4B are diagrams showing appearances of tapes formed with half-die-cut labels different in type from each other;

FIGS. 5A and 5B are diagrams each of which is useful in explaining a print image printed on a main label (a disc label and a case label);

FIG. 5C is a diagram which is useful in explaining a print image printed on a side label;

FIG. 6 is a diagram showing an appearance of an mini disc (MD) cartridge and a case thereof, which is useful in explaining the relationship among the cartridge, the case, the disc label, the case label and the side label;

FIG. 7 is a diagram showing an appearance of a conventional portable MD player and a remote controller connected thereto;

FIG. 8 is a schematic diagram which is useful in explaining the arrangement of a keyboard;

FIG. 9 is a schematic diagram which is useful in explaining the arrangement of a display;

FIG. 10 is a schematic diagram which is useful in explaining the arrangement of an indicator display block of the FIG. 9 display;

FIGS. 11A and 11B are diagrams each of which is useful in explaining the arrangement and control coordinates of a character display block of the FIG. 9 display;

FIGS. 12A to 12E are diagrams showing examples of images displayed on a character display block, together with a cursor position, which are useful in explaining a screen display process in the FIG. 1 tape printing apparatus.

Figure 13:
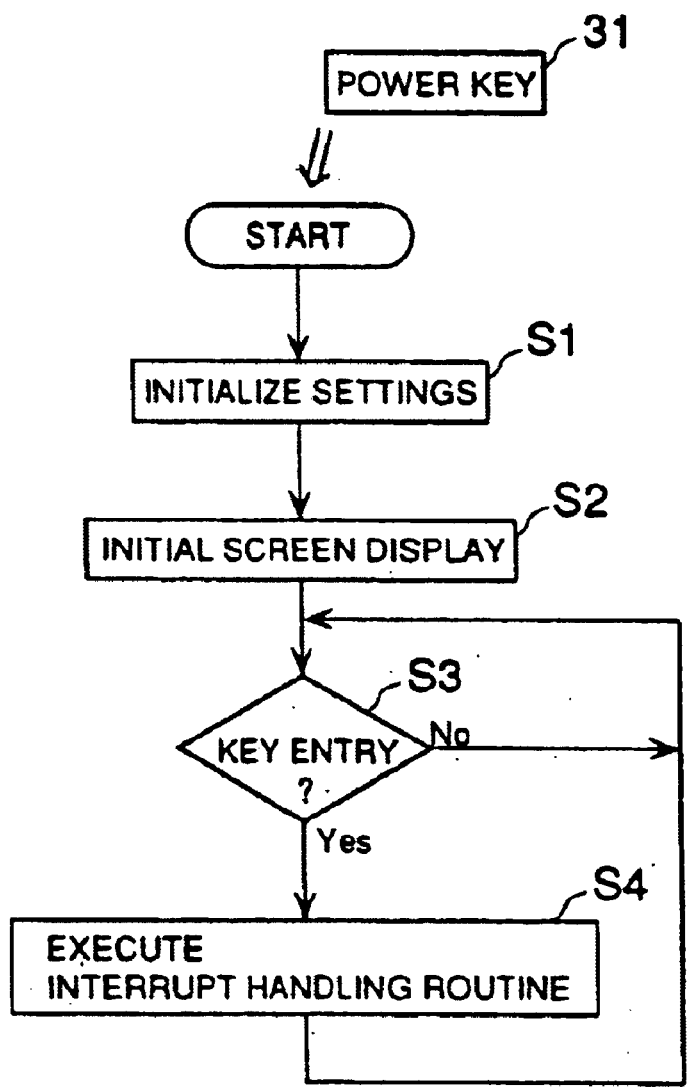
Figure 14:
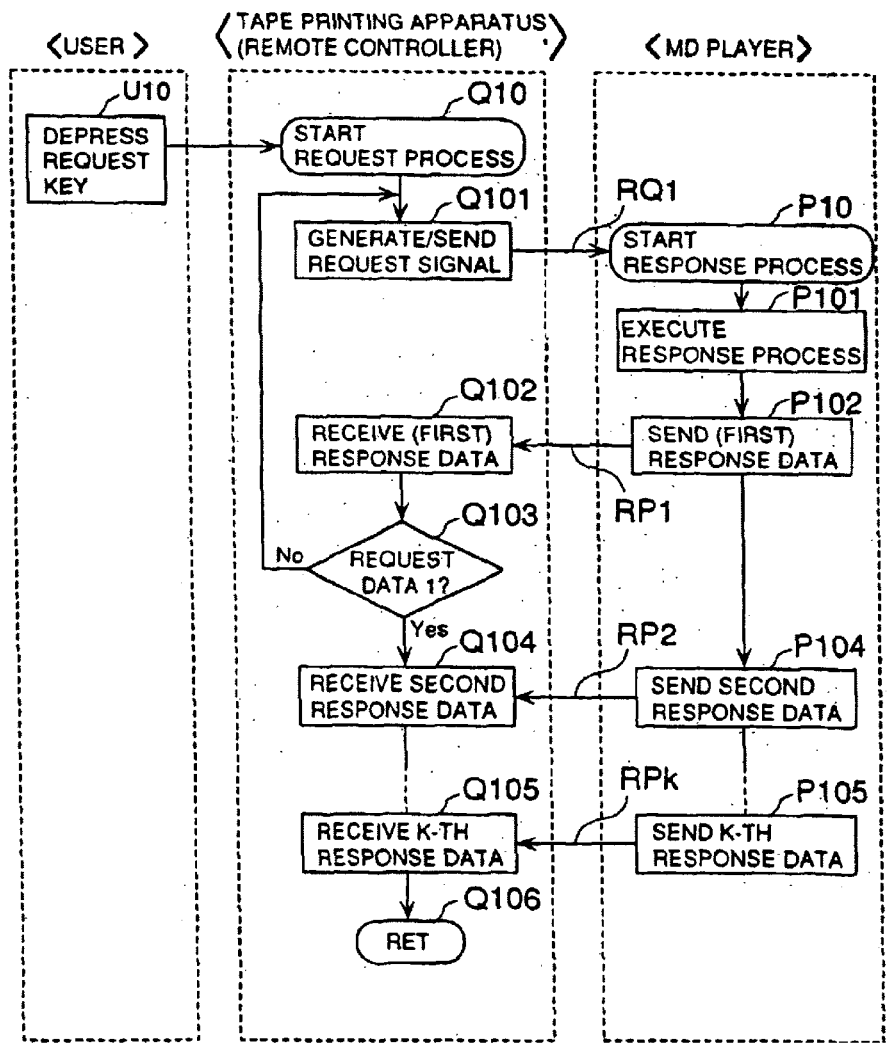
Figure 15:
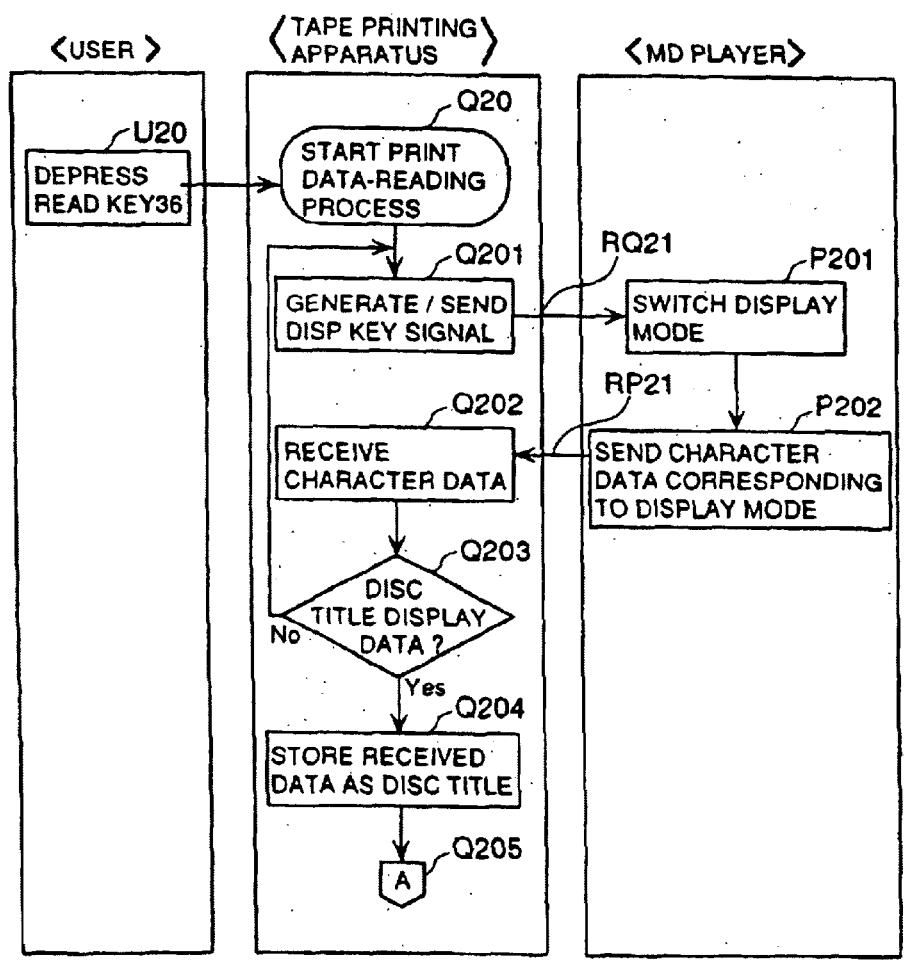
Figure 16:
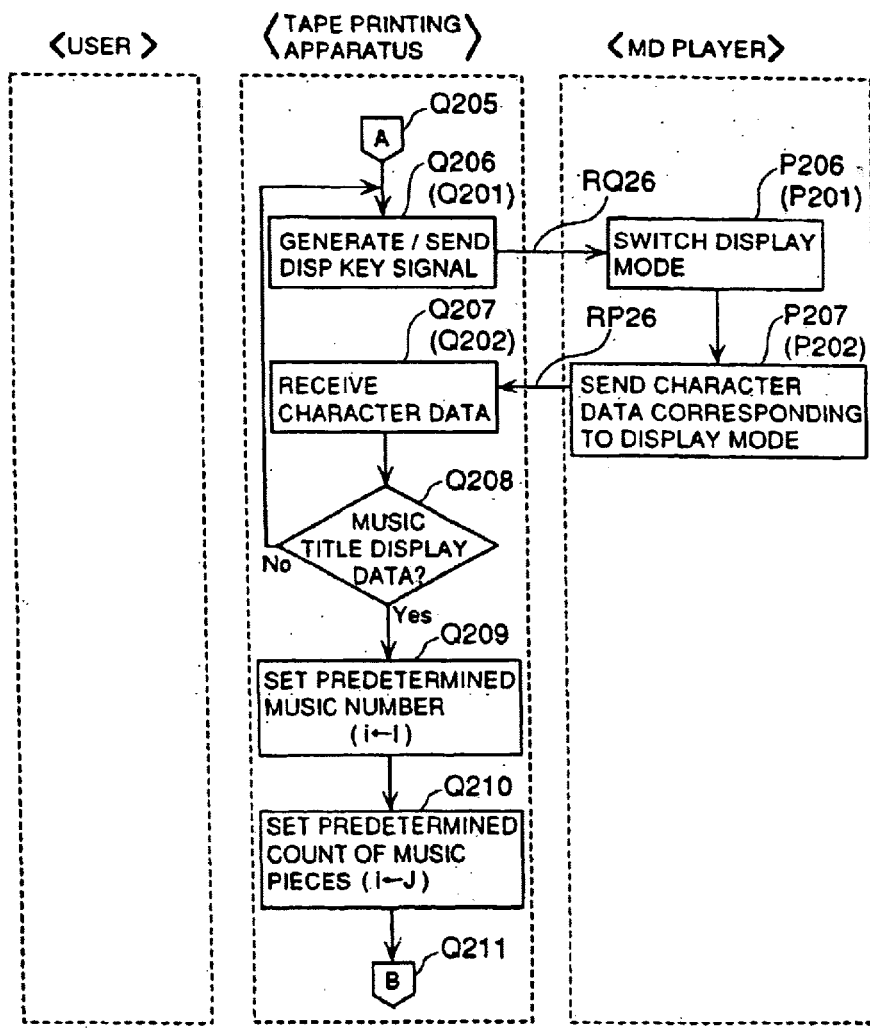
Figure 17:
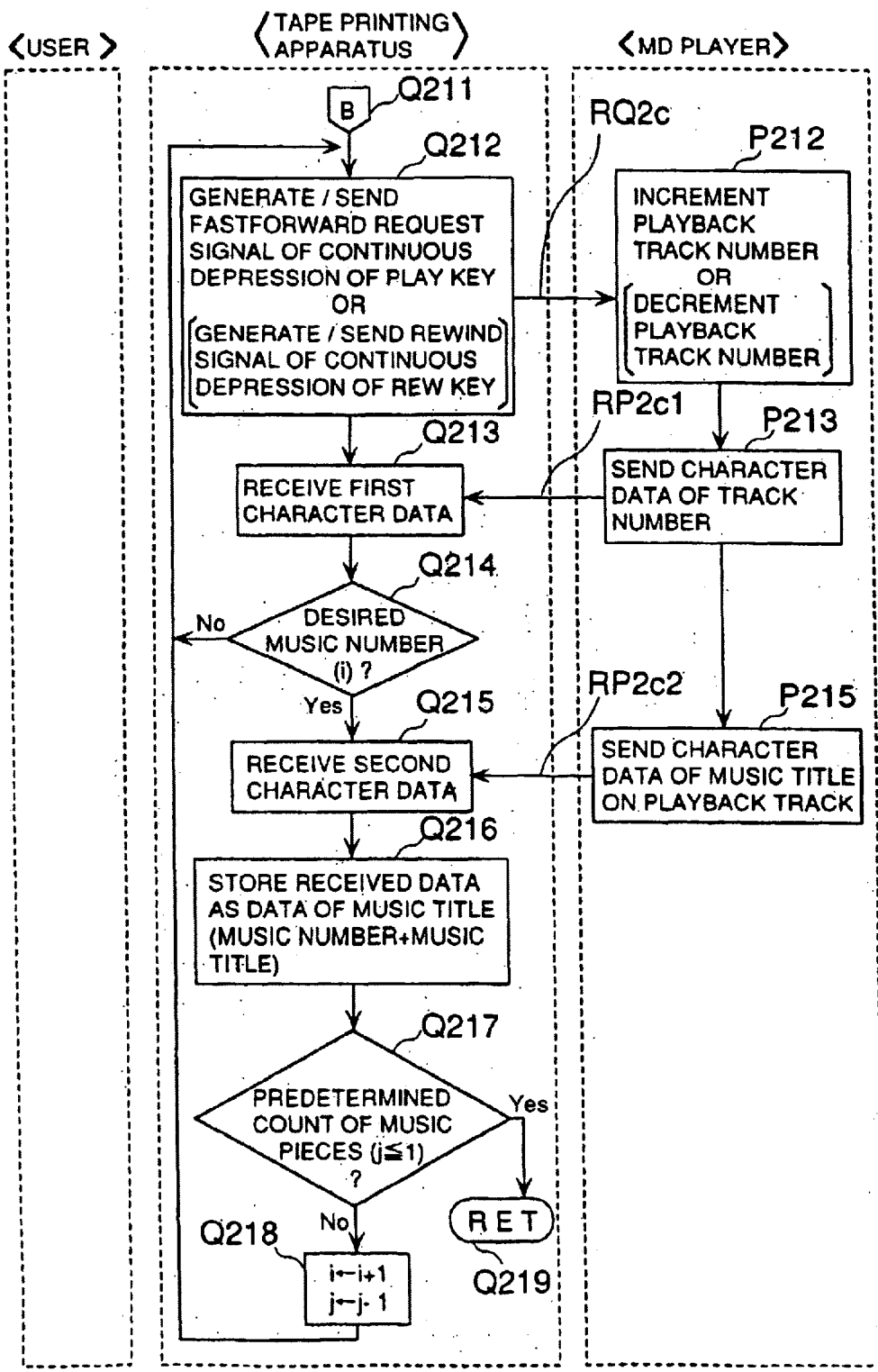
Figure 18:
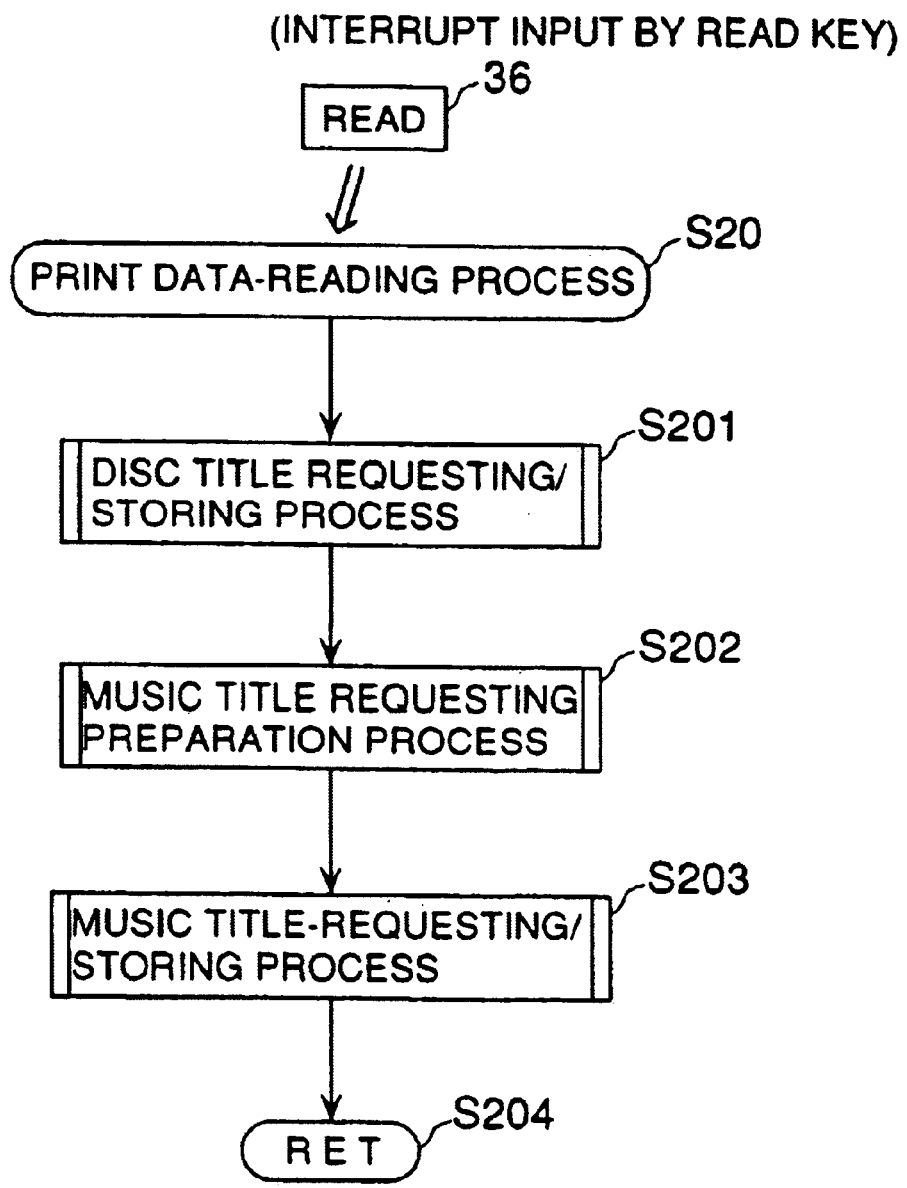
Figure 19:
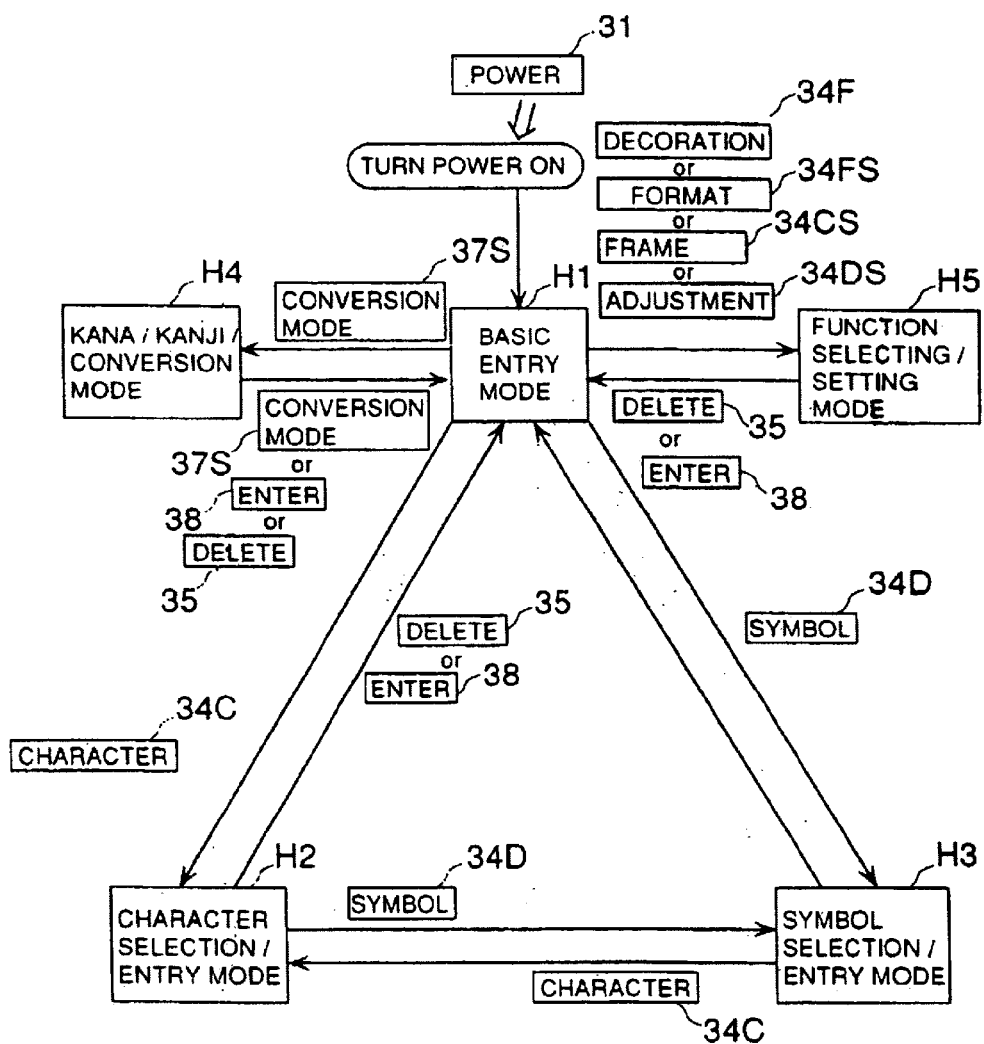
Figure 22:
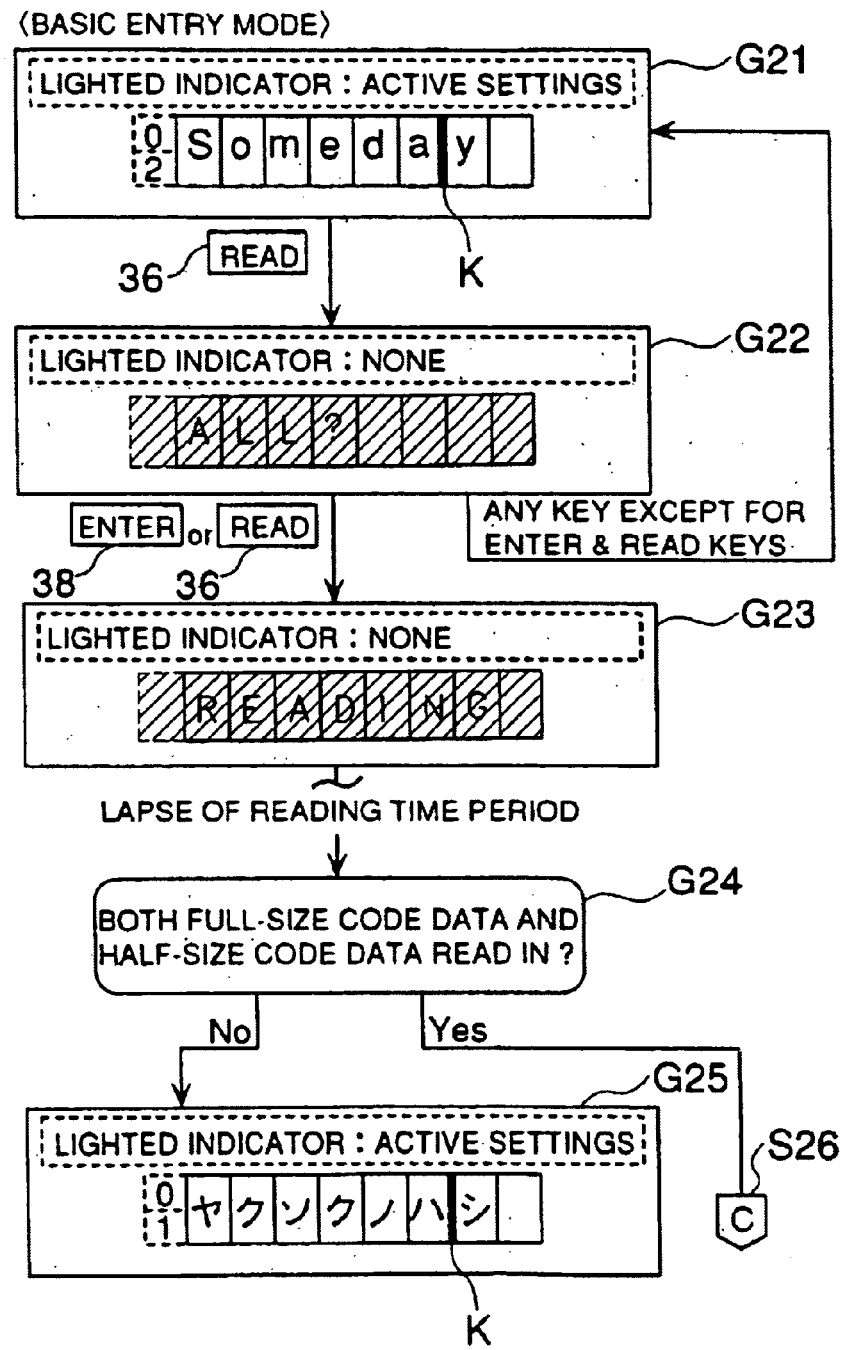
Figure 23:
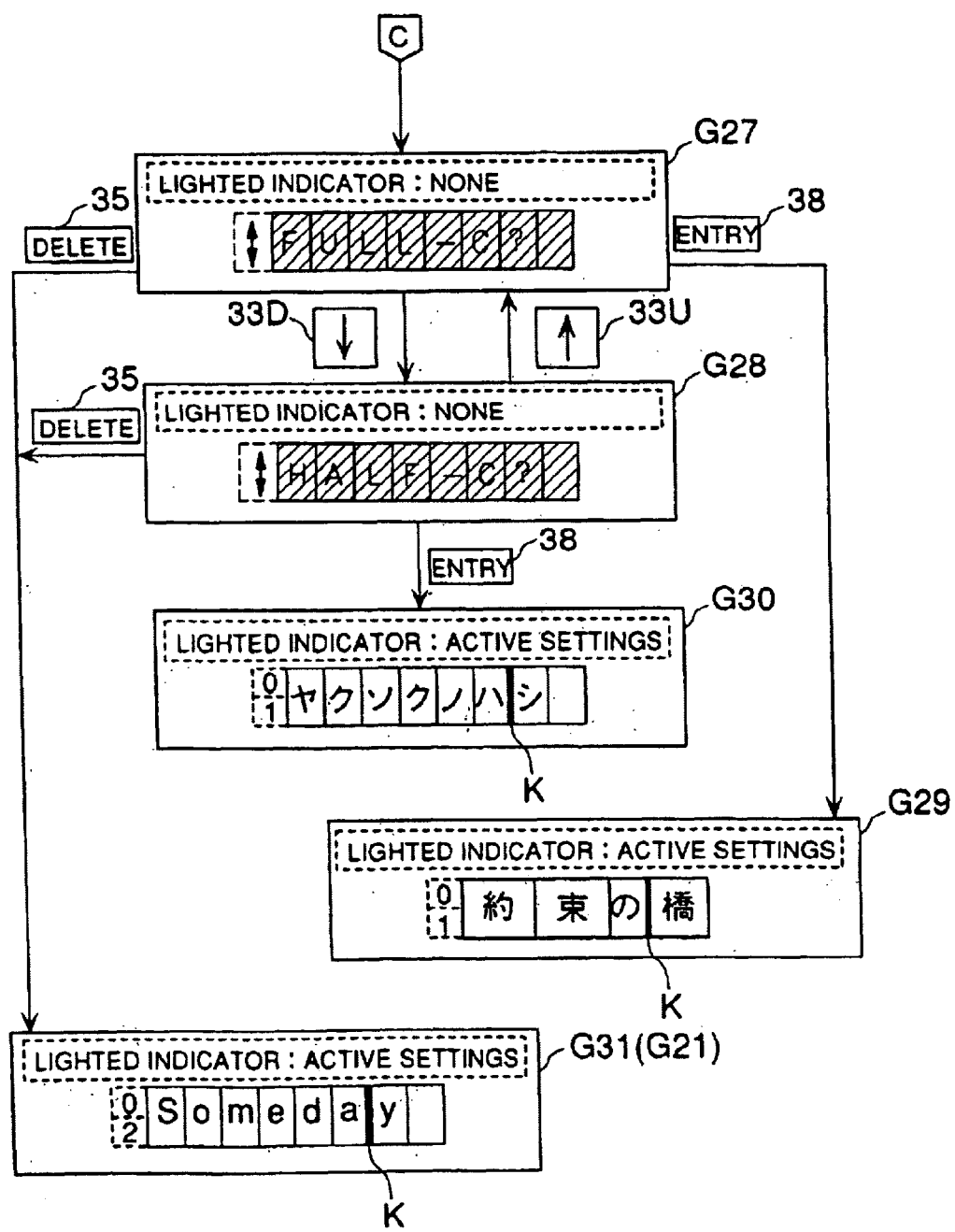
Figure 24:
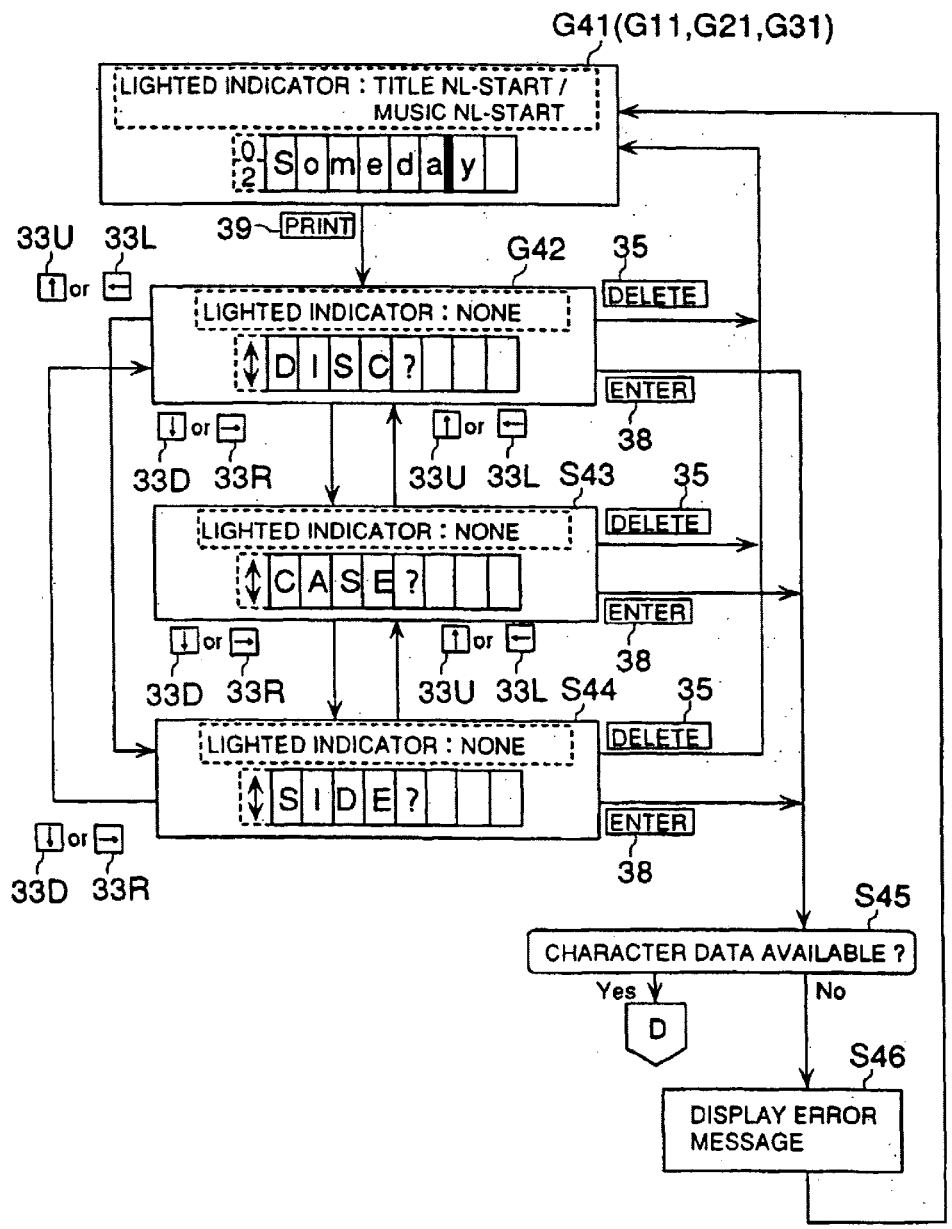
Figure 25:
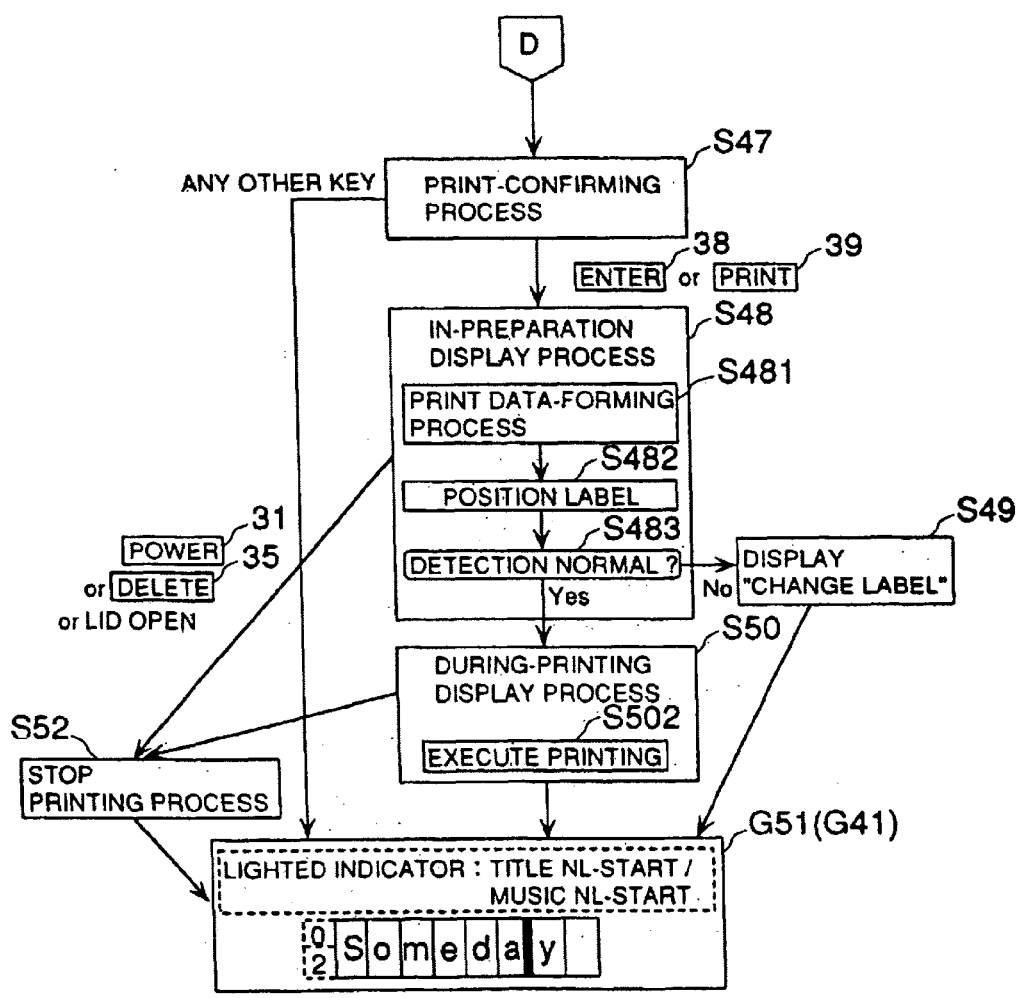
Figure 26:
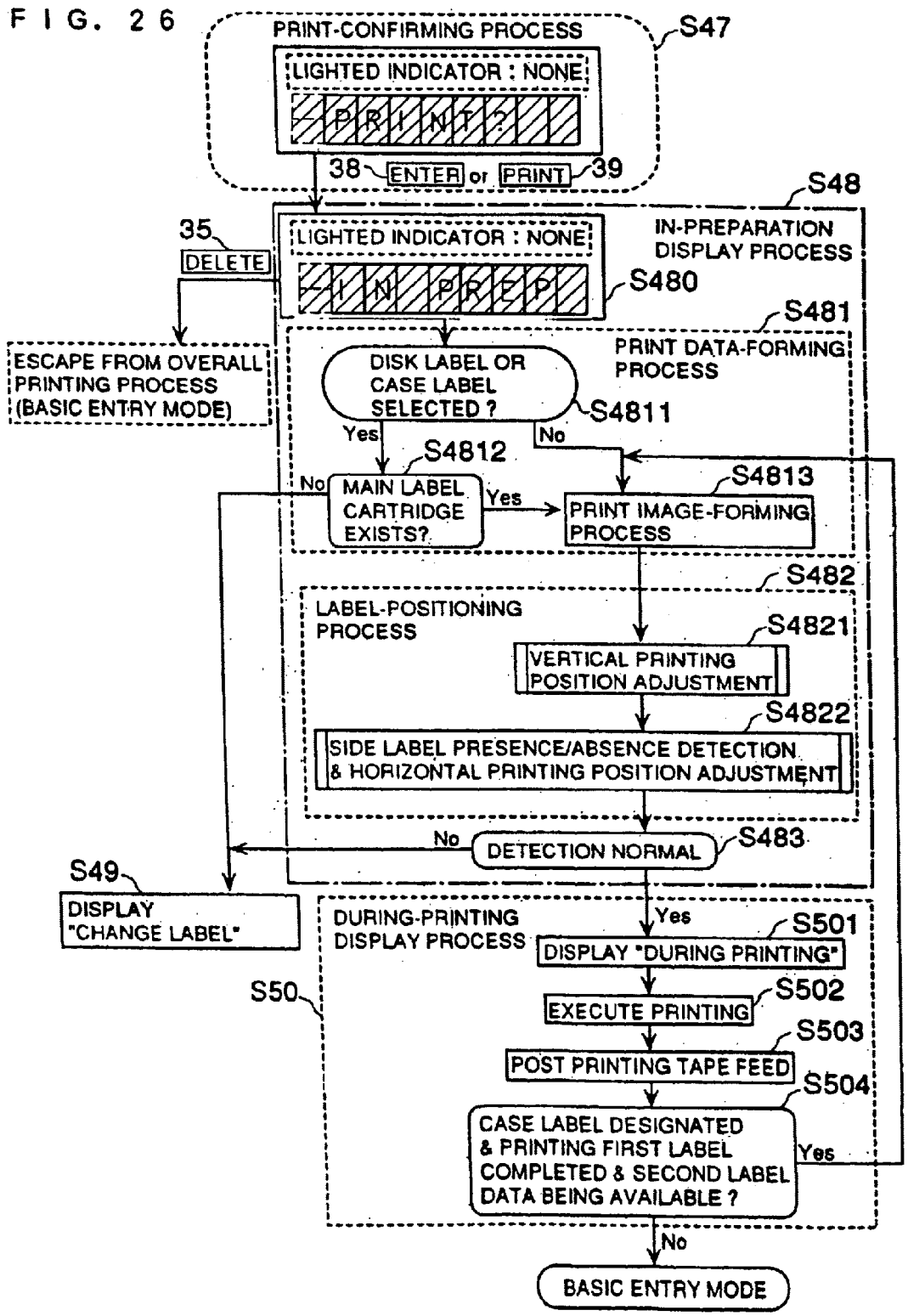
Figure 29:
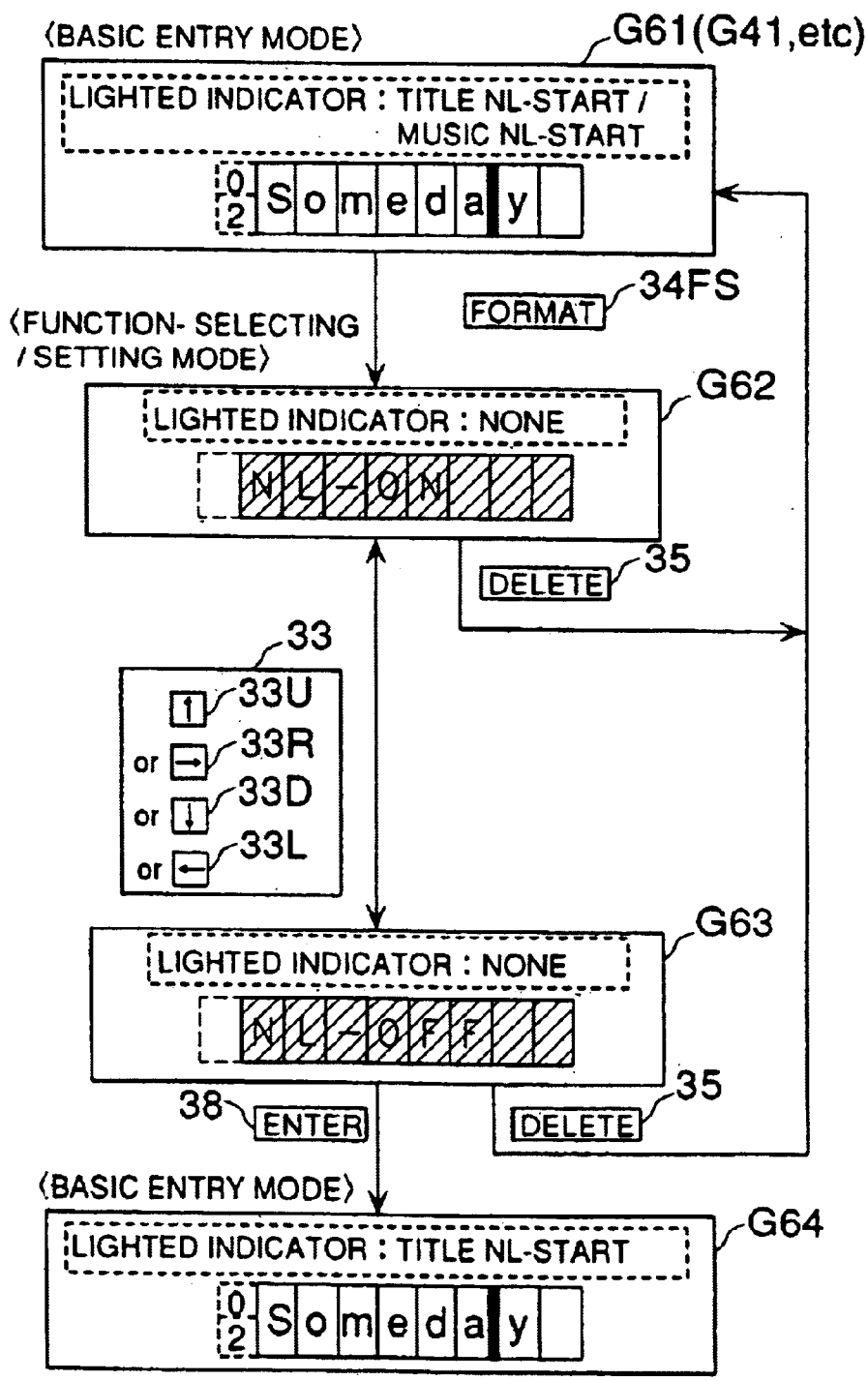
Figure 32A:
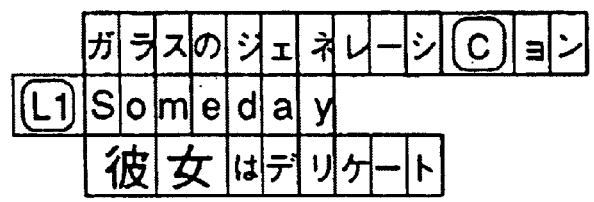
Figure 32B:
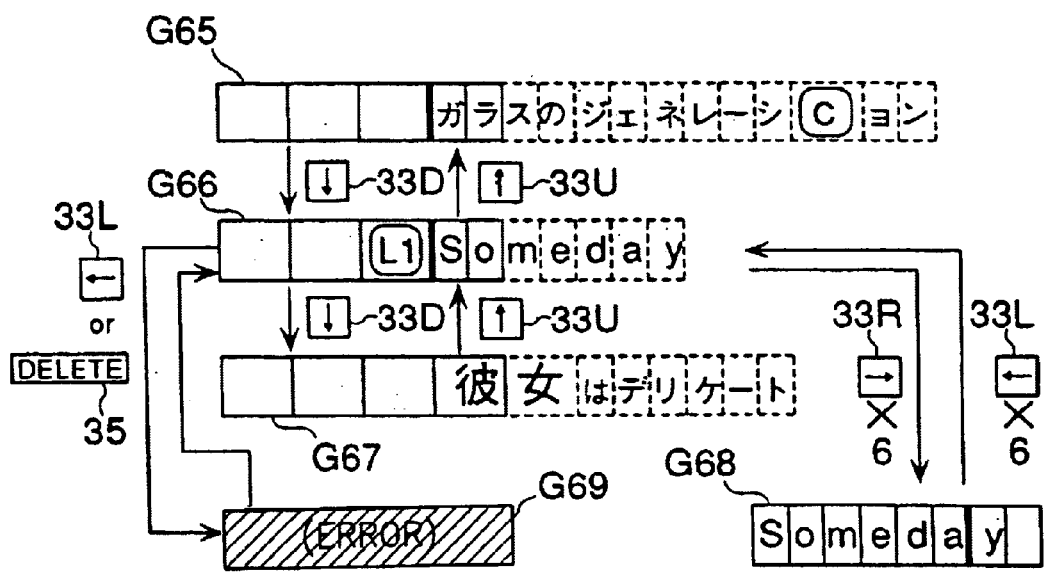
Figure 33:
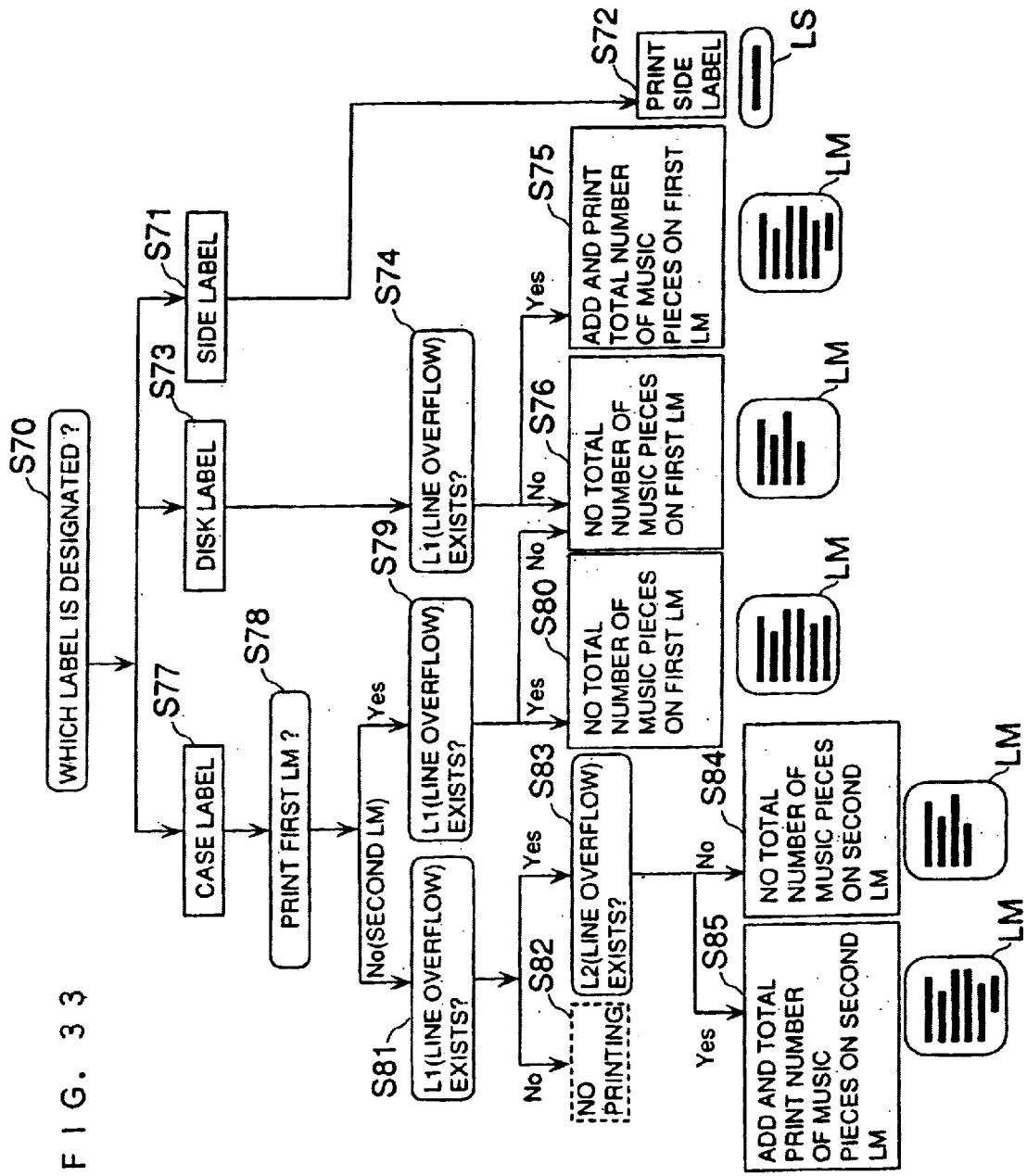
Figure 36A:
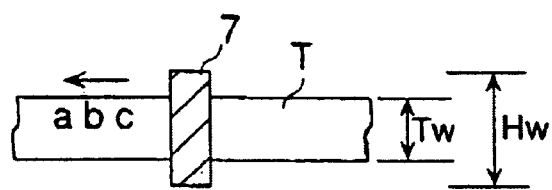
Figure 36B:
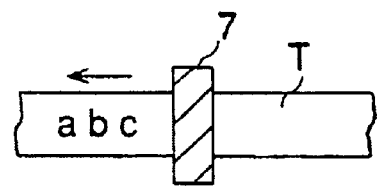
Figure 36C:
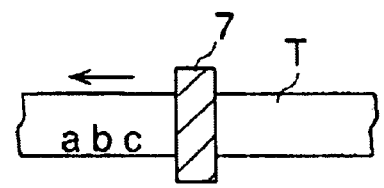
Figure 39A:
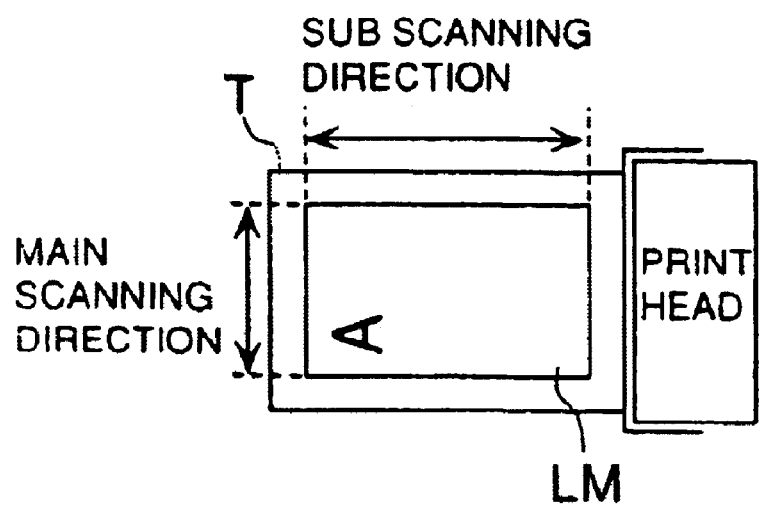
Figure 39B:
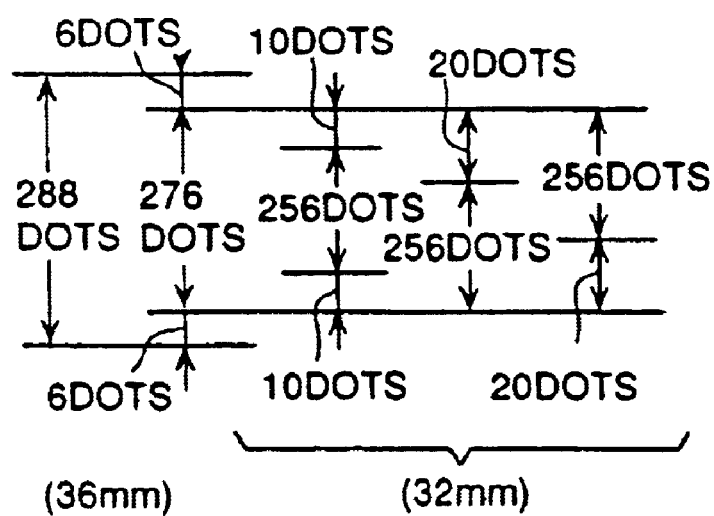
Figure 42A:
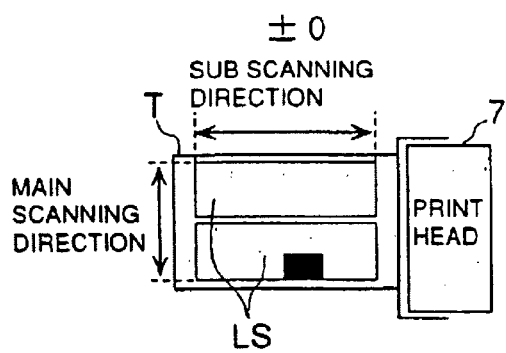
Figure 42B:
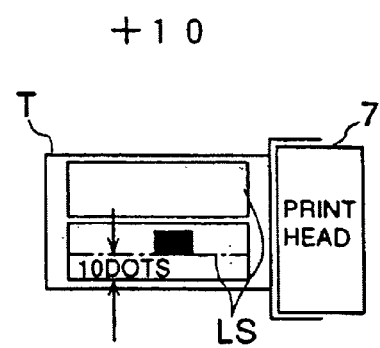
Figure 43A:
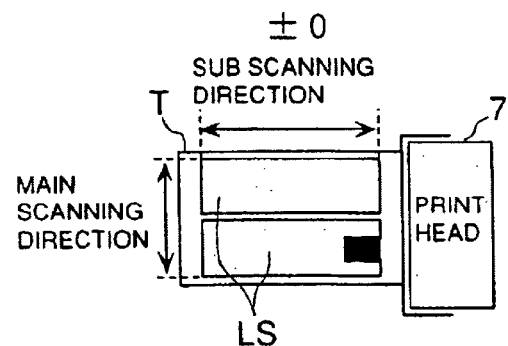
Figure 43B:
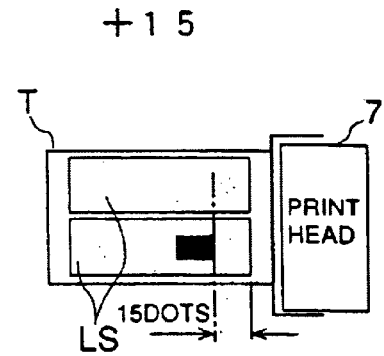
Figure 45:
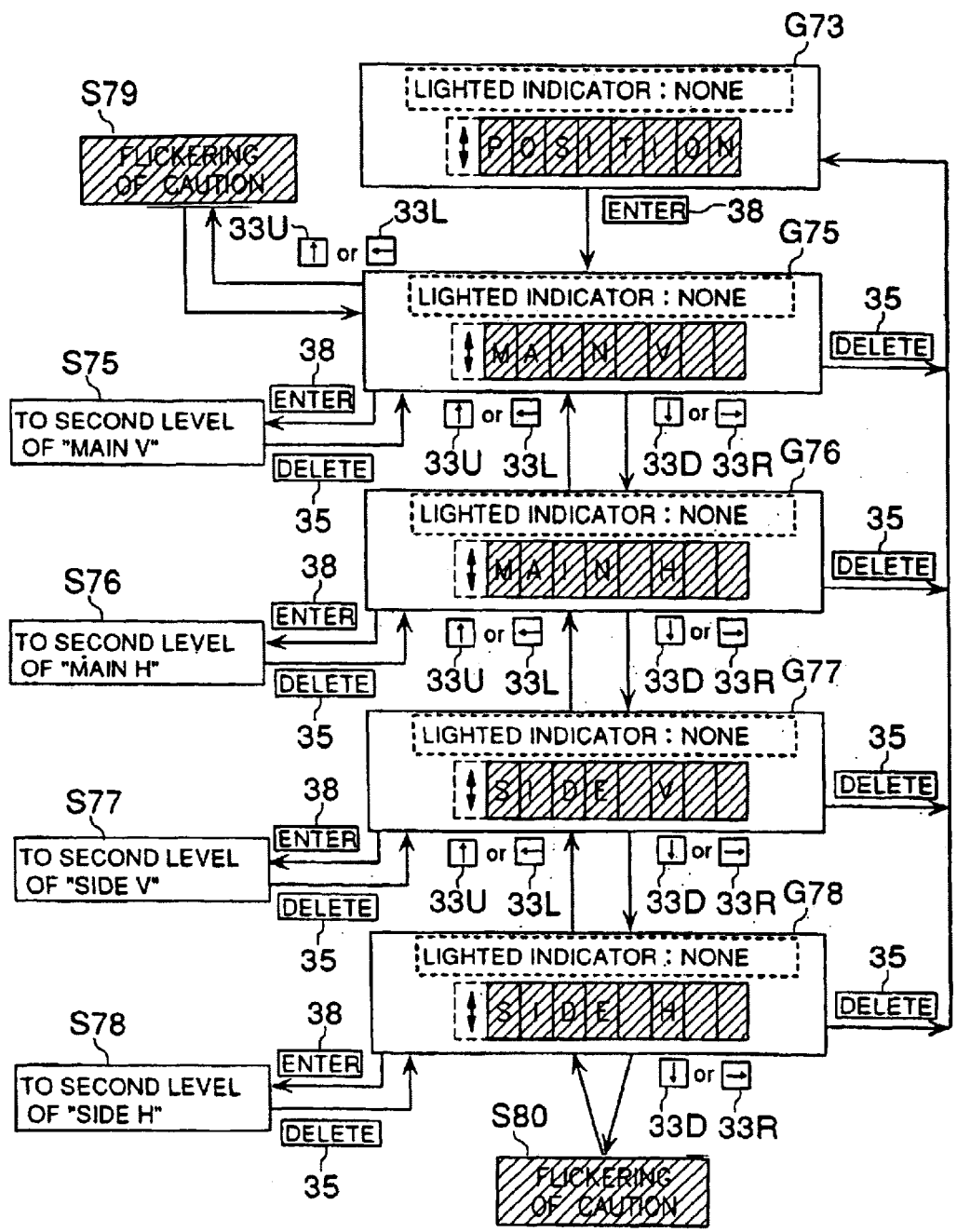
Figure 46:
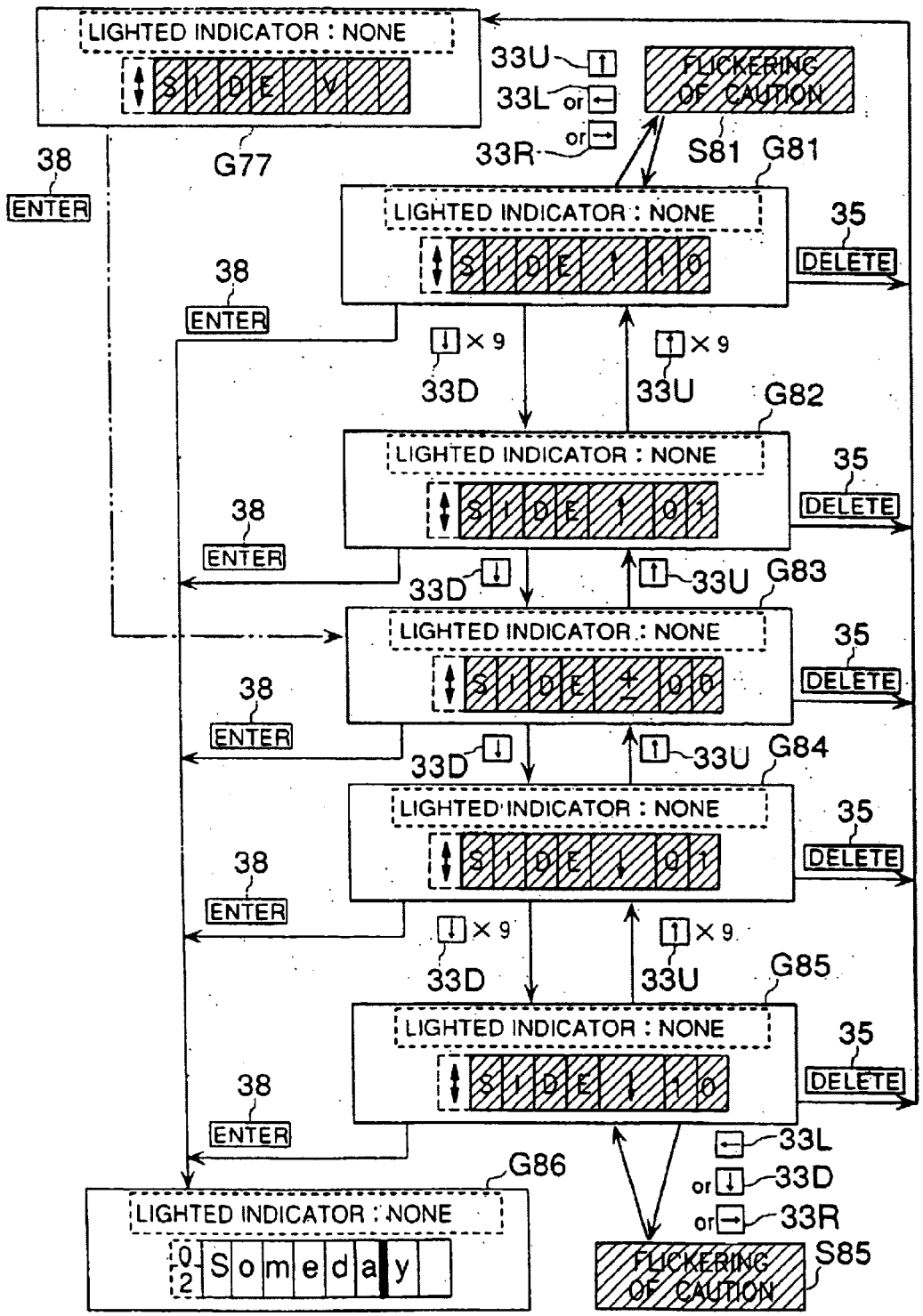
Figure 47:
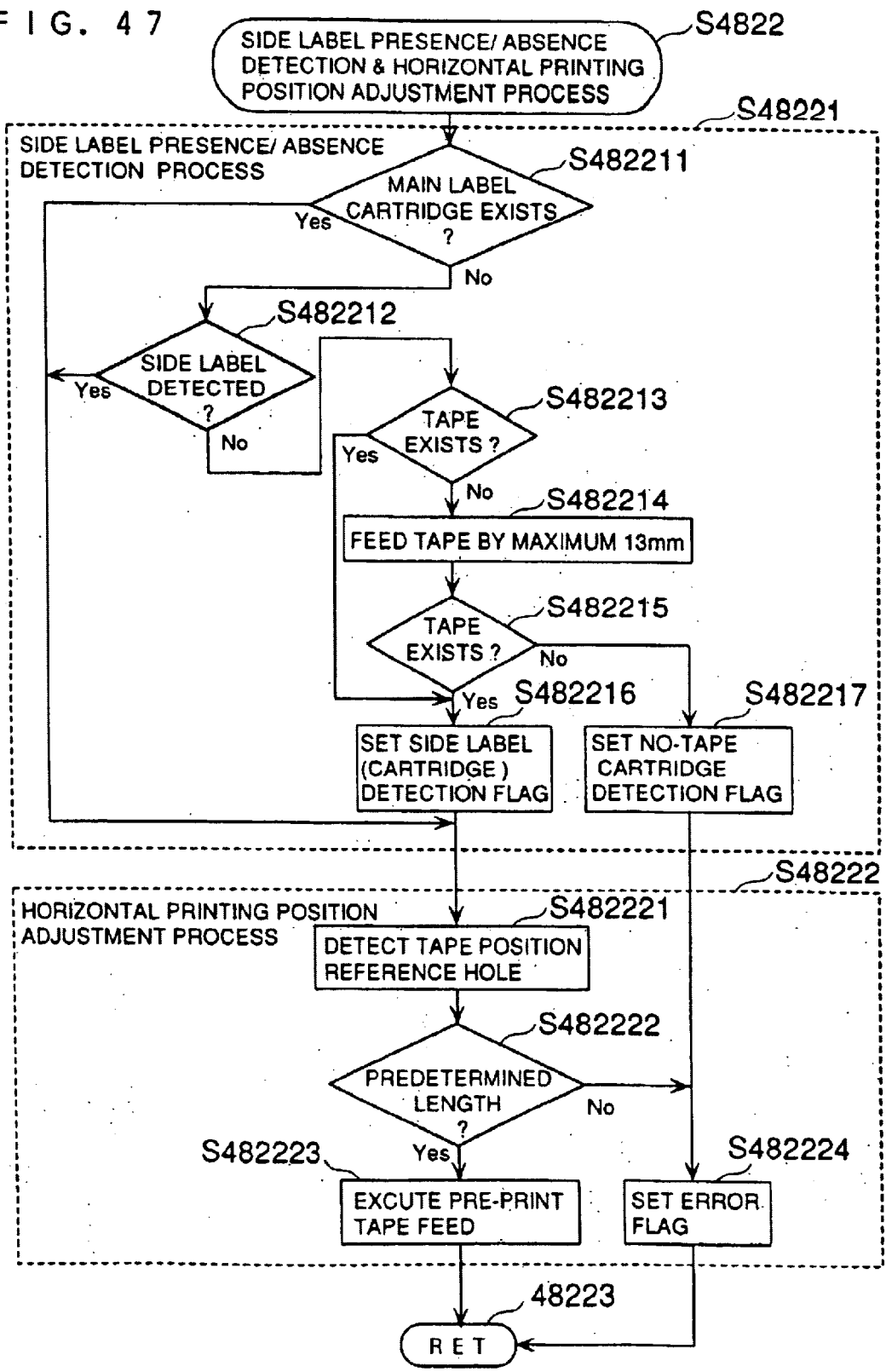
Figure 48A:
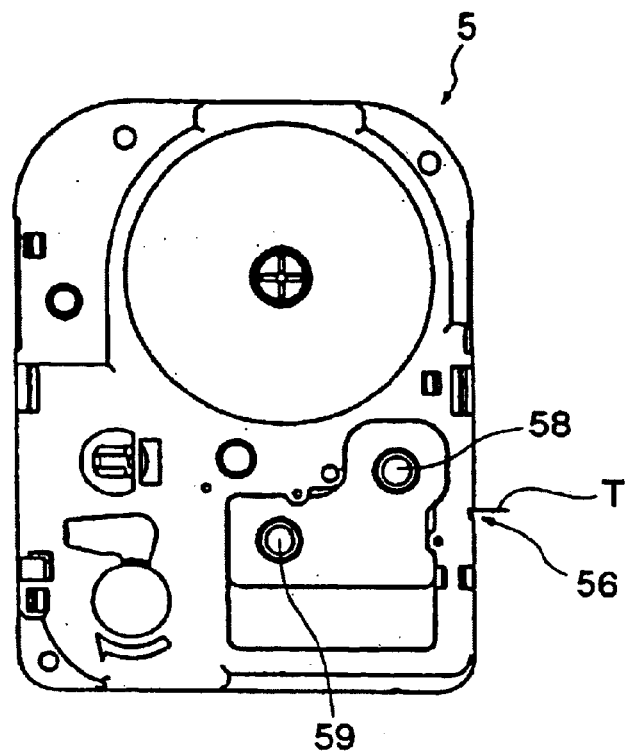
Figure 48B:
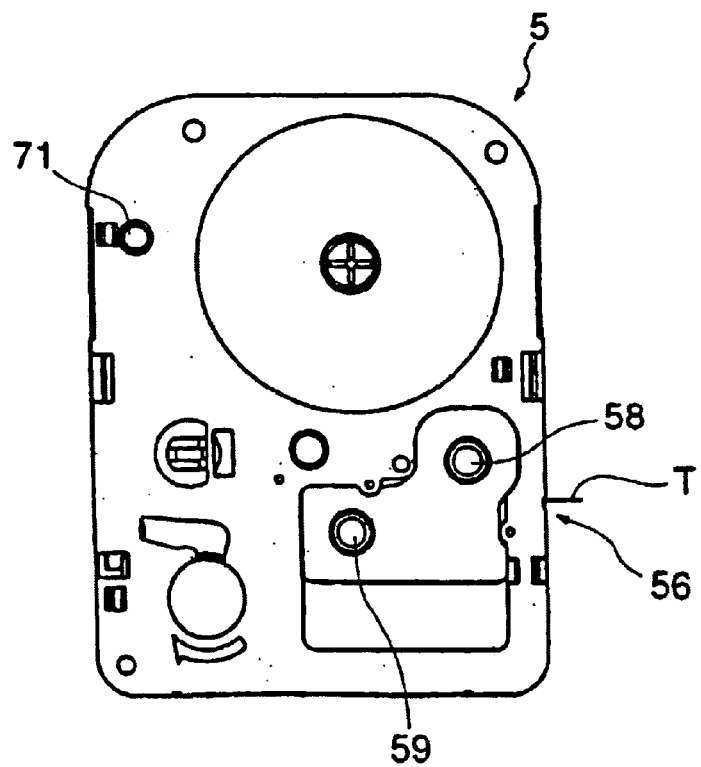
Figure 49A:
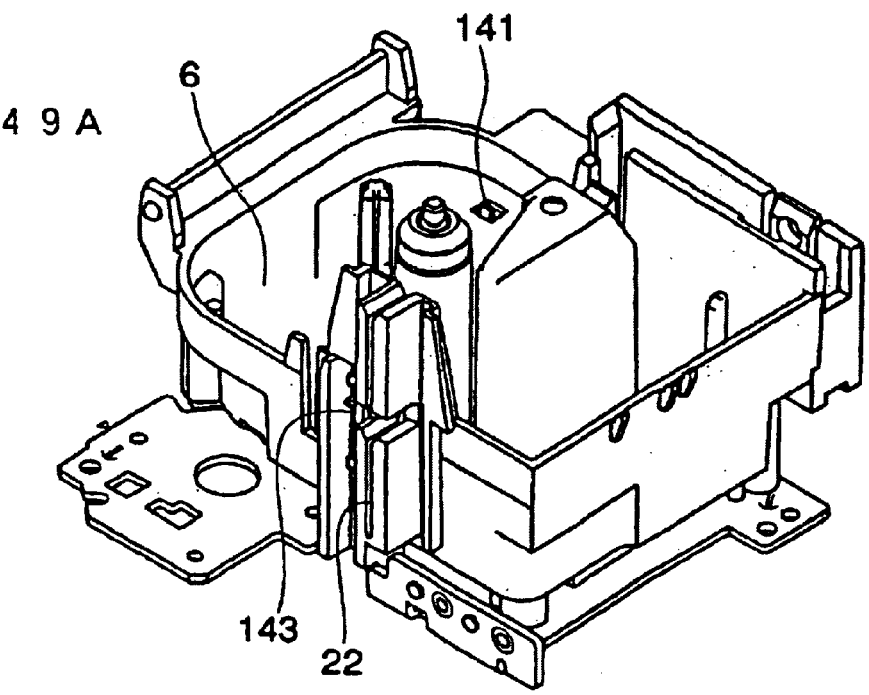
Figure 49B:
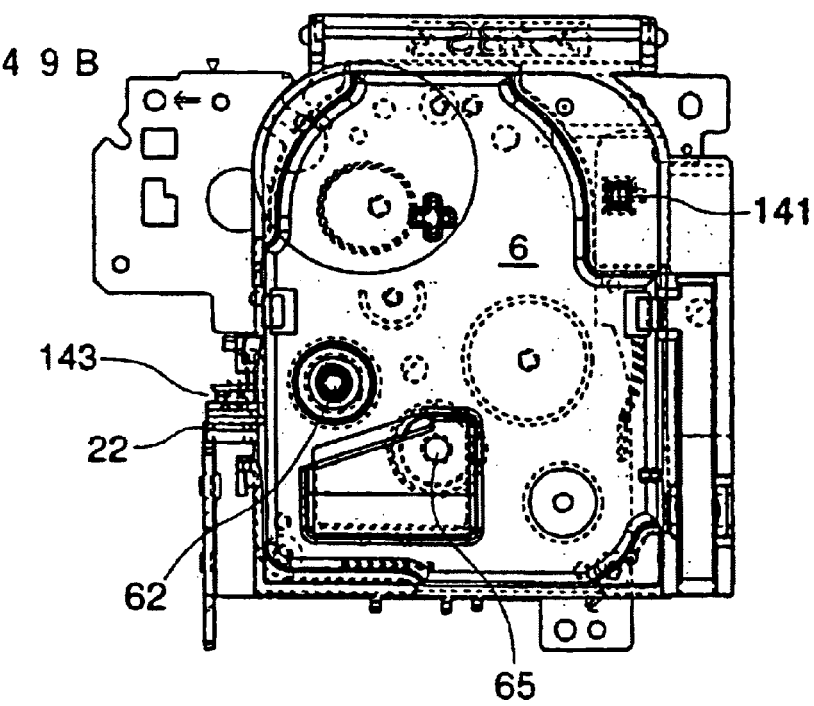
Figure 55:
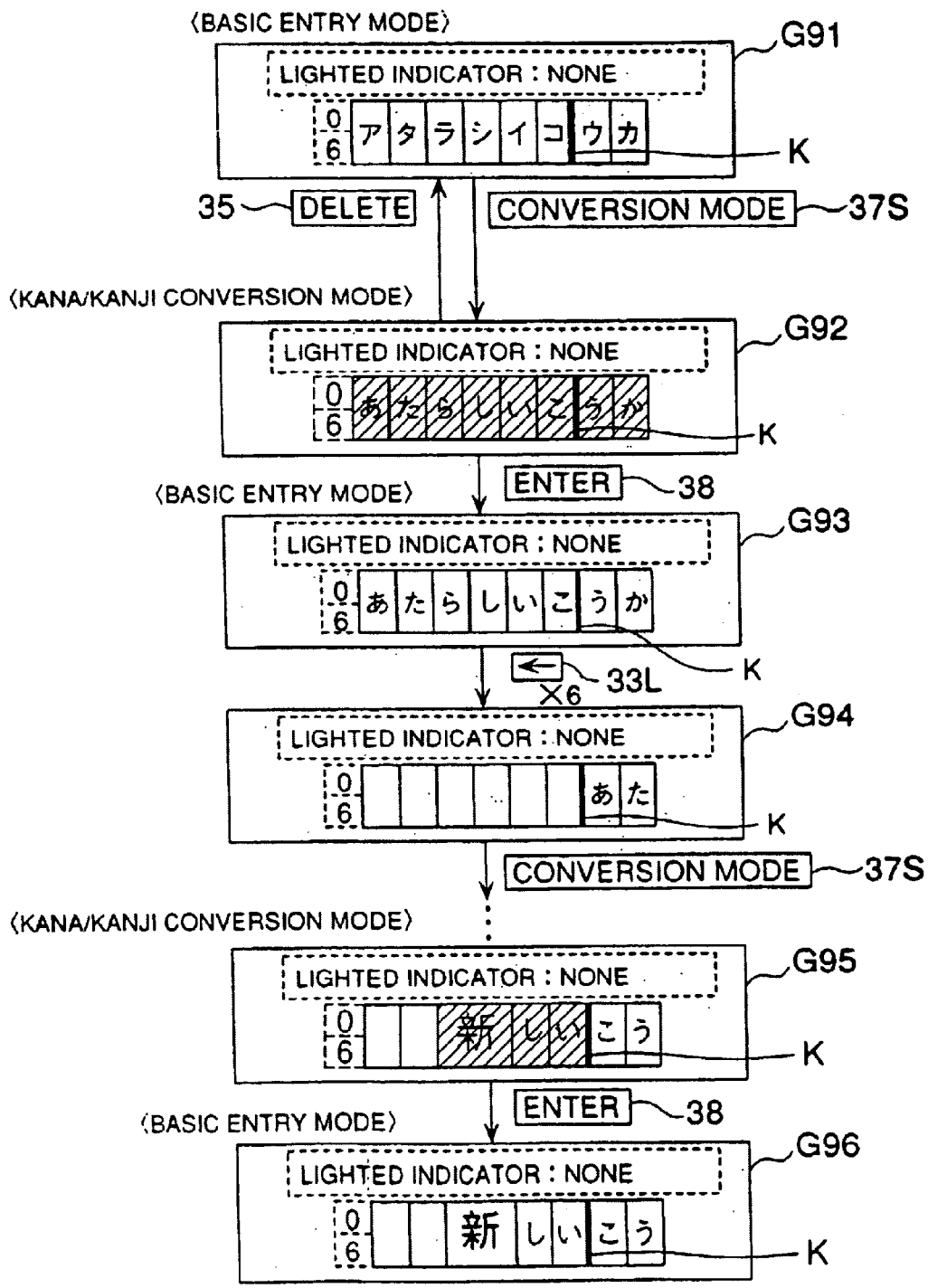
Figure 56:
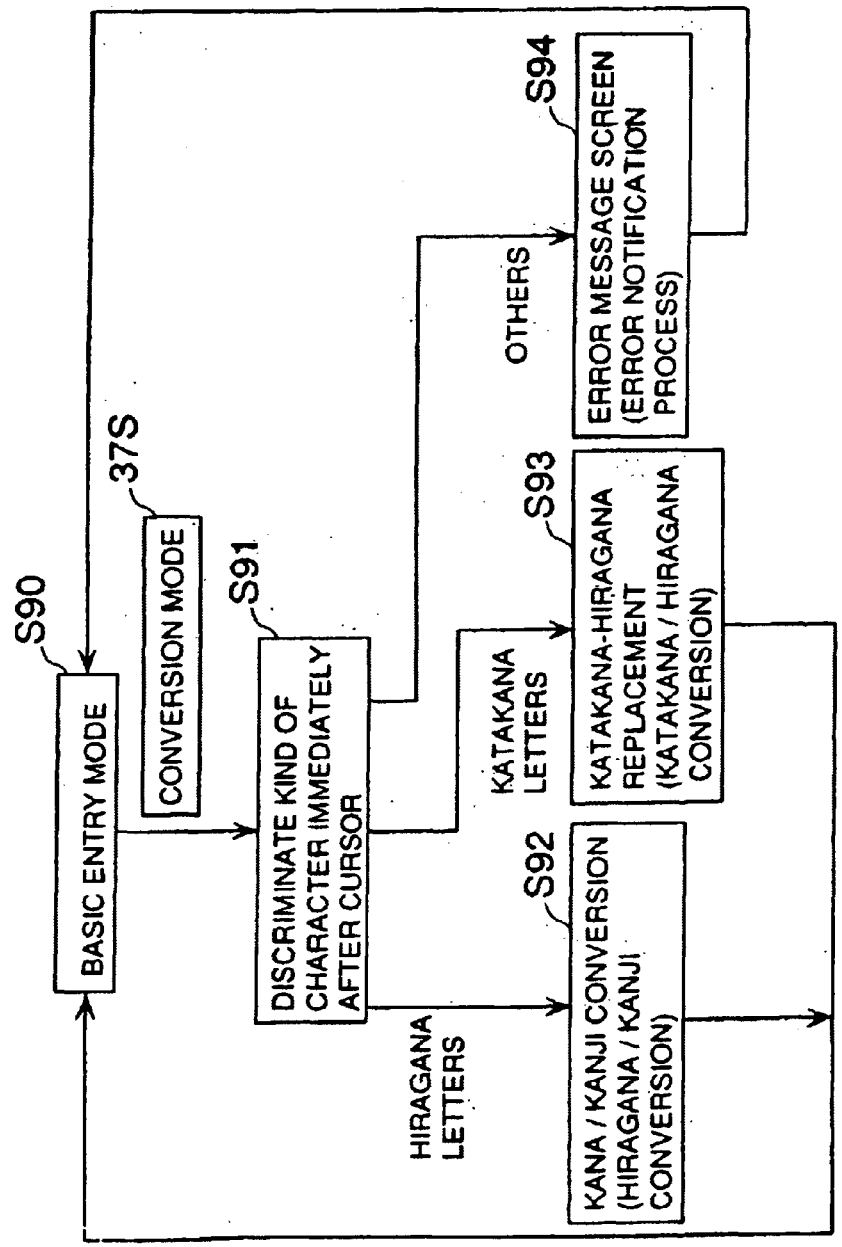
Figure 57:
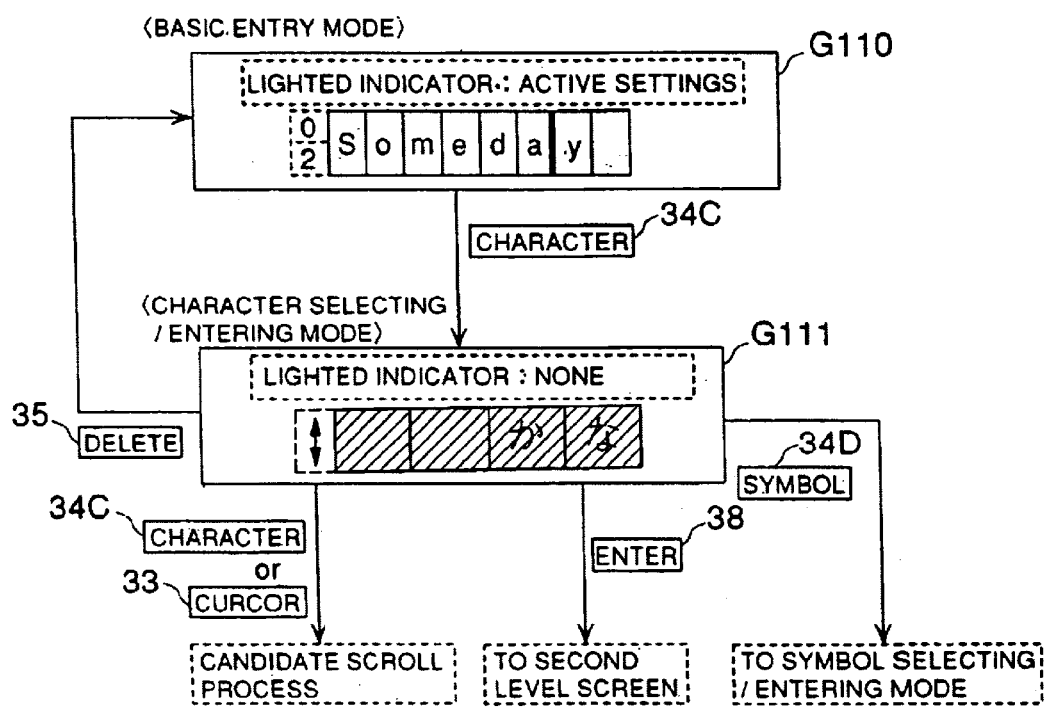
Figure 59:
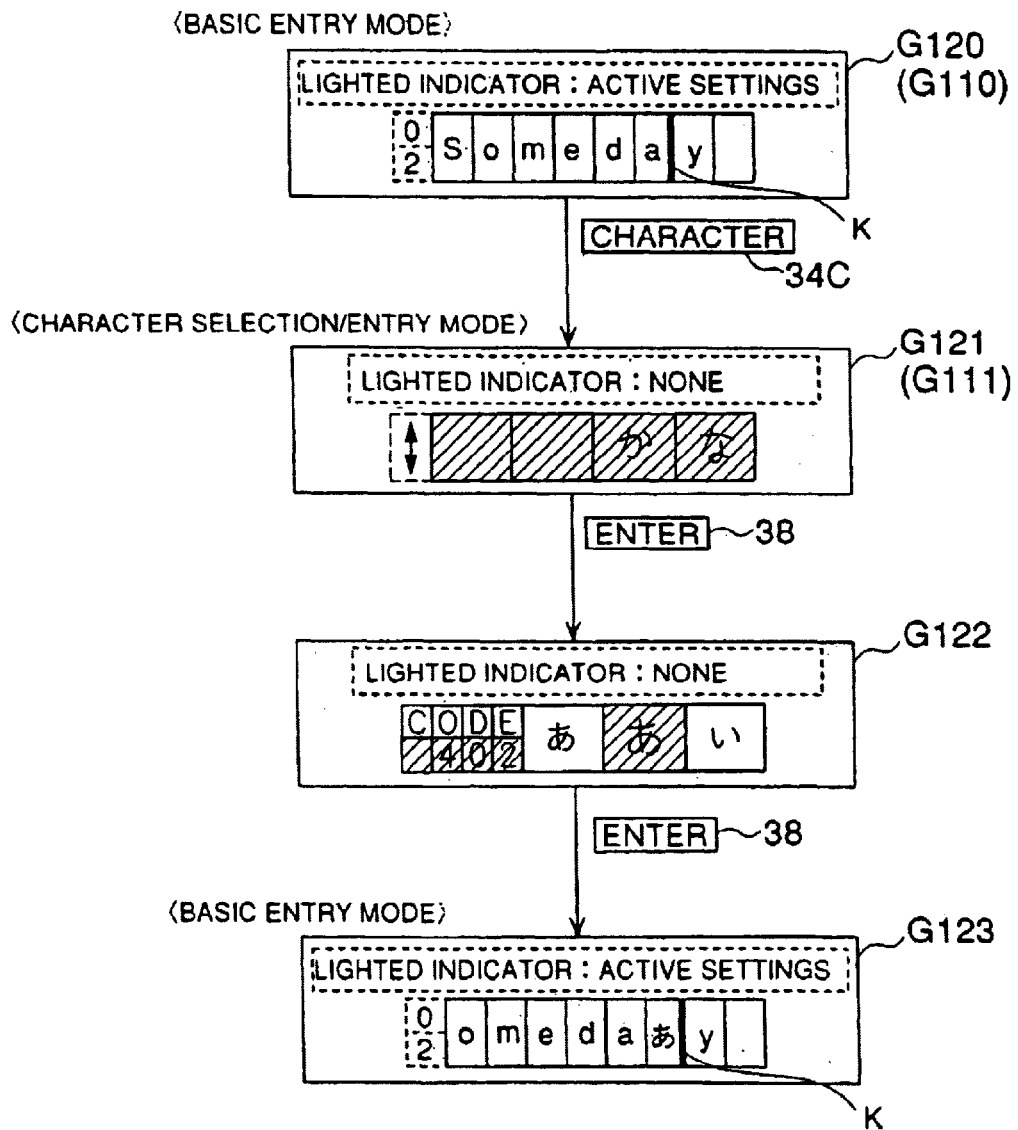

FIG. 13 is a flowchart showing a conceptual representation of an overall control process executed by the FIG. 1 tape printing apparatus;

FIG. 14 is a diagram which illustrates an example of a manner of sending and receiving signals and data between the tape printing apparatus or a remote controller and the MD player during operation of the remote controller;

FIG. 15 is a diagram which illustrates an example of a manner of sending and receiving signals and data between the FIG. 1 tape printing apparatus and the MD player, when the tape printing apparatus combines request signals generated by operating a plurality of request keys on the remote controller and makes successive attribute information requests;

FIG. 16 is a continuation of the FIG. 15 diagram;

FIG. 17 is a continuation of the FIG. 16 diagram;

FIG. 18 is a flowchart for a print data-reading process in which a disc title requesting/storing process corresponding to FIG. 15, a music title-requesting preparation process corresponding to FIG. 16, and a music title requesting/storing process corresponding to FIG. 17 are carried out by respective subroutines which are sequentially activated;

FIG. 19 is a diagram which is useful in explaining changes in the edit mode of the FIG. 1 tape printing apparatus;

FIGS. 20A and 20B are diagrams each of which is useful in explaining a display screen in a text-initialized state;

FIG. 20C is a diagram showing an example of a display screen displaying a disc title;

FIG. 21 is a diagram which is useful in explaining an example of an image of the display screen presented when there is character data (text data) for display, and an example of key operations carried out by the user for deleting whole text data from the FIG. 21A state, thereby returning to an initial state (to the basic entry mode);

FIG. 22 is a diagram which is useful in explaining an example of key operations carried out by the user during the print data-reading process, and screens displayed in accordance with the key operations;

FIG. 23 is a continuation of the FIG. 22 diagram;

FIG. 24 is a diagram which is useful in explaining an example of key operations carried out by the user during the printing process, and a sequence of screens displayed in accordance with the key operations for permitting the user to select the kind of label to be formed;

FIG. 25 is a continuation of the FIG. 24 diagram;

FIG. 26 is a flowchart which is useful in explaining an in-preparation display process and a during-printing display process;

FIGS. 27A and 27B are diagrams which are useful in explaining the difference between print images formed by selecting the case label and the disc label, respectively, as labels to be formed;

FIGS. 28A and 28B are diagrams which are useful in explaining a concept or an idea of an elided image-forming process for forming an elided image by omitting characters or lines;

FIG. 29 is a diagram which is useful in explaining an example of key operations carried out by the user when an automatic new line-starting format is set, and screens displayed in accordance with the key operations;

FIG. 30 shows a table useful in explaining the titles and meanings of overflow-notifying character strings (marks) as display-only characters exclusively provided for display;

FIGS. 31A to 31D are diagrams which are useful in explaining examples of display character strings (edit information character strings) formed by using the FIG. 30 overflow-notifying character strings (marks), and display images (edit information images) formed based on the display character strings (edit information character strings);

FIG. 32A is a diagram showing an example of a display image (edit information image) displayed on the display screen;

FIG. 32B is a diagram which is useful in explaining an example of key operations carried out by the user when the FIG. 32A display image (edit information image) is displayed;

FIG. 33 is a flowchart showing procedures for producing print images (edit images) based on display character strings (edit information character strings);

FIG. 34A is a diagram showing a print image formed of a mixture of full-size and half-size characters;

FIG. 34B is a diagram showing a print image formed of full-size characters alone;

FIGS. 35A to 35I are diagrams which are useful in explaining displacements of the printing position;

FIGS. 36A to 36C are diagrams which are useful in explaining the relationship between a print head and a tape;

FIGS. 37A to 37C are diagrams showing images representative of examples of adjustment of the printing position, in which:

FIG. 37A shows a case where printing is carried out at a reference position;

FIG. 37B shows a case where printing is carried out after adjusting the printing position one dot upward of the reference position;

FIG. 37C shows a case where printing is carried out after adjusting the printing position one dot downward of the reference position;

FIGS. 38A to 38E are diagrams showing images representative of examples of control of data to be sent to each dot element of the print head 7, when the printing position is adjusted in various ways;

FIGS. 39A and 39B are diagrams useful in explaining the range of adjustment of the printing position;

FIG. 40A is a diagram schematically showing a position of print data before carrying out a vertical adjustment of printing positions, when the main label is selected;

FIG. 40B is a diagram schematically showing an adjusted position of the print data after carrying out the vertical adjustment of the printing position, when the main label is selected;

FIG. 41A is a diagram schematically showing a position of print data before carrying out a horizontal adjustment of the printing position, when the main label is selected;

FIG. 41B is a diagram schematically showing an adjusted position of the print data after carrying out the horizontal adjustment of the printing position, when the main label is selected;

FIG. 42A is a diagram schematically showing a position of print data before carrying out a vertical adjustment of the printing position, when the side label is selected;

FIG. 42B is a diagram schematically showing an adjusted position of the print data after carrying out the vertical adjustment of the printing position, when the side label is selected;

FIG. 43A is a diagram schematically showing a position of print data before carrying out a horizontal adjustment of the printing position, when the side label is selected;

FIG. 43B is a diagram schematically showing an adjusted position of the print data after carrying out the horizontal adjustment of printing position, when the side label is selected;

FIG. 44 is a diagram which is useful in explaining an example of key operations carried out by the user at a top level in the hierarchy, when the printing position is adjusted;

FIG. 45 is a continuation of the FIG. 44 diagram, which is useful in explaining an example of key operations carried out by the user at a first level under a selected option for adjustment of the printing position;

FIG. 46 is a continuation of the FIG. 45 diagram, which is useful in explaining an example of key operations carried out by the user at a second level under the option selected for adjustment of the printing position;

FIG. 47 is a flowchart for a side label presence/absence detection & horizontal printing position adjustment process;

FIG. 48A is a diagram showing an appearance of a tape cartridge as viewed from a bottom side, which holds a tape T for use in producing a main label LM;

FIG. 48B is a diagram showing an appearance of a tape cartridge as viewed from a bottom side, which holds a tape T for producing a side label LS;

FIG. 49A is a perspective view of the compartment of the tape printing apparatus in which the FIGS. 48A and 48B tape cartridge is inserted, and component parts in the vicinity thereof;

FIG. 49B is a plan view of the compartment of the tape printing apparatus in which the FIGS. 48A and 48B tape cartridge is inserted, and component parts in the vicinity thereof;

FIG. 50 is a diagram which is useful in explaining a format of a register (internal configuration register) for setting processing formats;

FIGS. 51A to 51C are diagrams which are useful in explaining details of some of the FIG. 50 processing formats;

FIG. 52 is a diagram which is useful in explaining a format of character code data;

FIGS. 53A to 53C are diagrams which are useful in explaining details of the FIG. 52 format;

FIG. 54 is a diagram which is useful in explaining an example of key operations carried out by the user during execution of Kana/Kanji conversion, and a sequence of screens displayed in accordance with the key operations;

FIG. 55 is a diagram which is useful in explaining an example of key operations carried out by the user during execution of Katakana/Hiragana conversion, and a sequence of screens displayed in accordance with the key operations;

FIG. 56 is a flowchart for procedures of operations carried out in the Kana/Kanji conversion mode;

FIG. 57 is a diagram which is useful in explaining an example of key operations carried out by the user during execution of character entry, and screens displayed in accordance with the operations;

FIG. 58 is a diagram which is useful in explaining an example of key operations carried out by the user when the kind of characters is selected during execution of the FIG. 57 character entry, and a sequence of screens displayed in accordance with the operations;

FIG. 59 is a diagram which is useful in schematically explaining an example of key operations carried out by the user from the start of the character entry to the end thereof, and a sequence of screens displayed in accordance with the operations;

FIGS. 60A and 60B are diagrams useful in explaining a selection screen for selecting characters, divided into five display areas for controlling the same.

Figure 64:
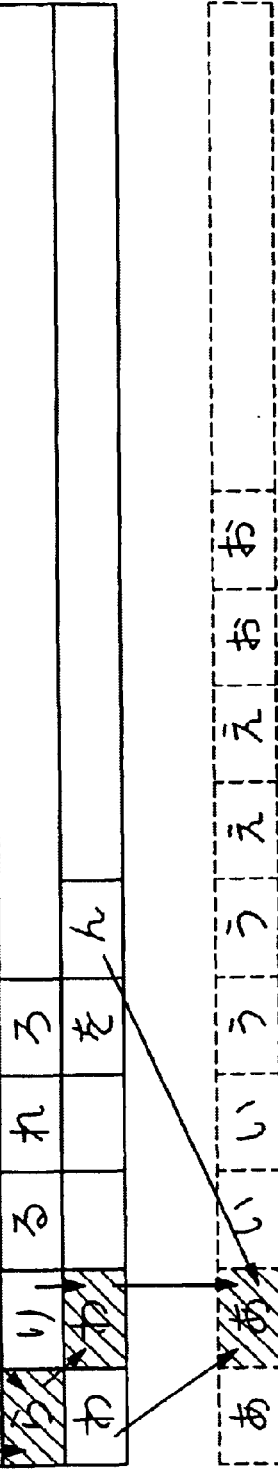
Figure 67:
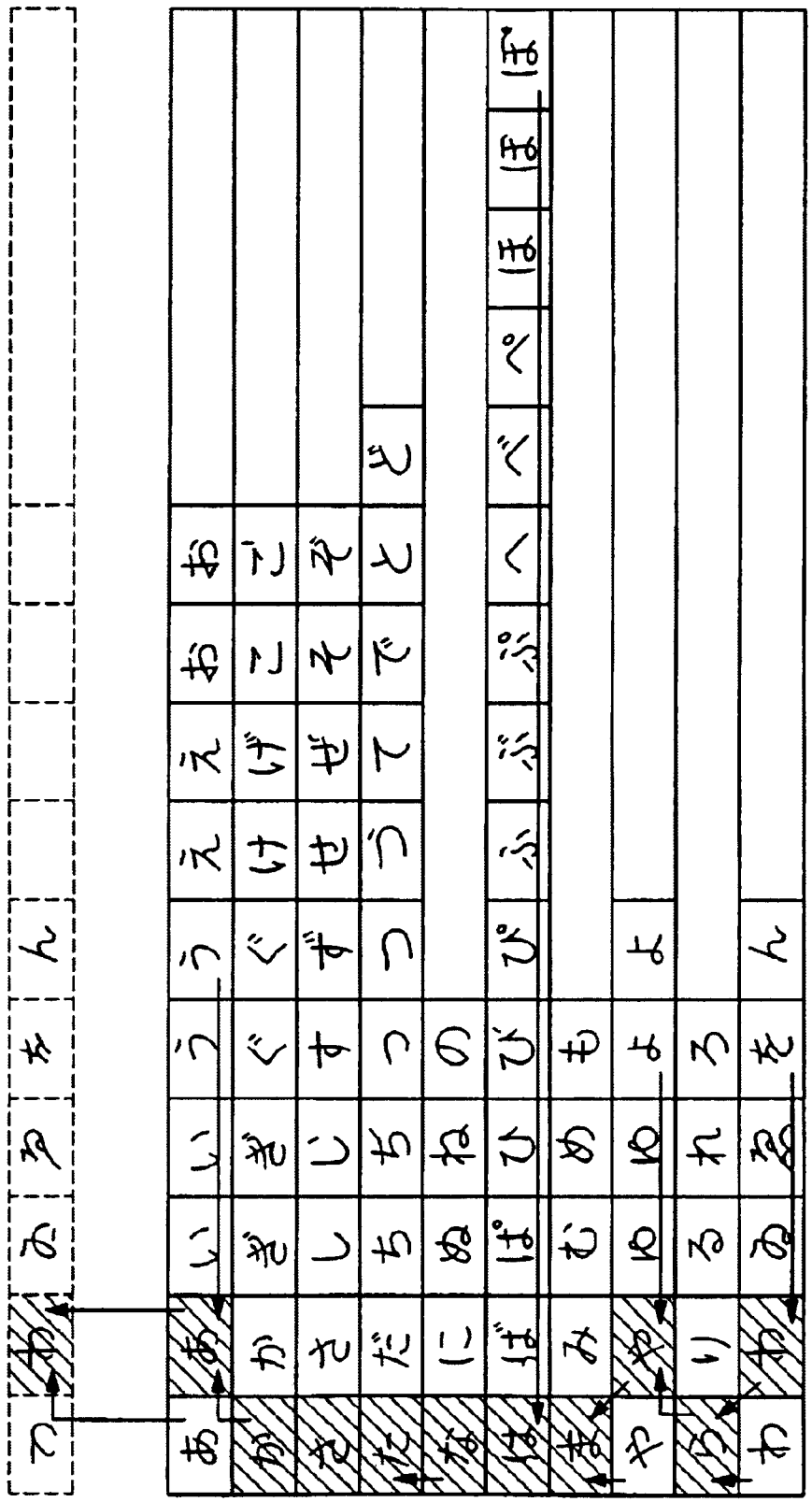

FIG. 60C is a diagram showing display-only characters displayed in one of the FIGS. 60A and 60B display areas;

FIG. 61 shows a Hiragana array table as an example of an array table for arranging a predetermined kind of characters;

FIG. 62 is a diagram which is useful in explaining a scroll rule for changing an entry designation character through a manner of operation of a cursor, based on the FIG. 61 Kana array table;

FIG. 63 is a diagram similar to FIG. 62, which is useful in explaining a scroll rule for changing the entry designation character through another manner of operation of the cursor;

FIG. 64 is a diagram similar to FIG. 62, which is useful in explaining a scroll rule for the changing entry designation characters through still another manner of operating the cursor;

Figure 65:
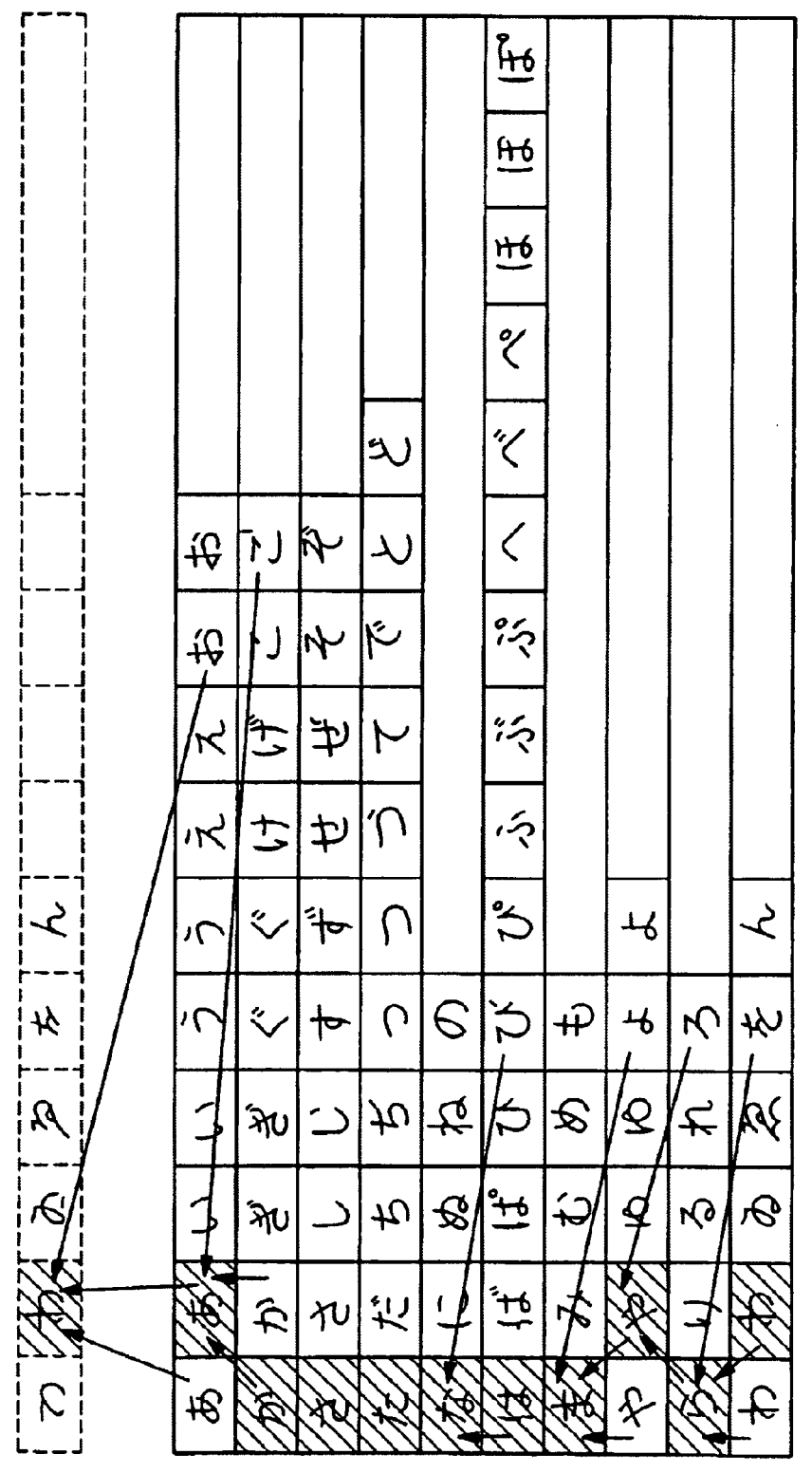

FIG. 65 is a diagram similar to FIG. 62, which is useful in explaining a scroll rule for changing the entry designation character through still another manner of operating the cursor;

Figure 66:
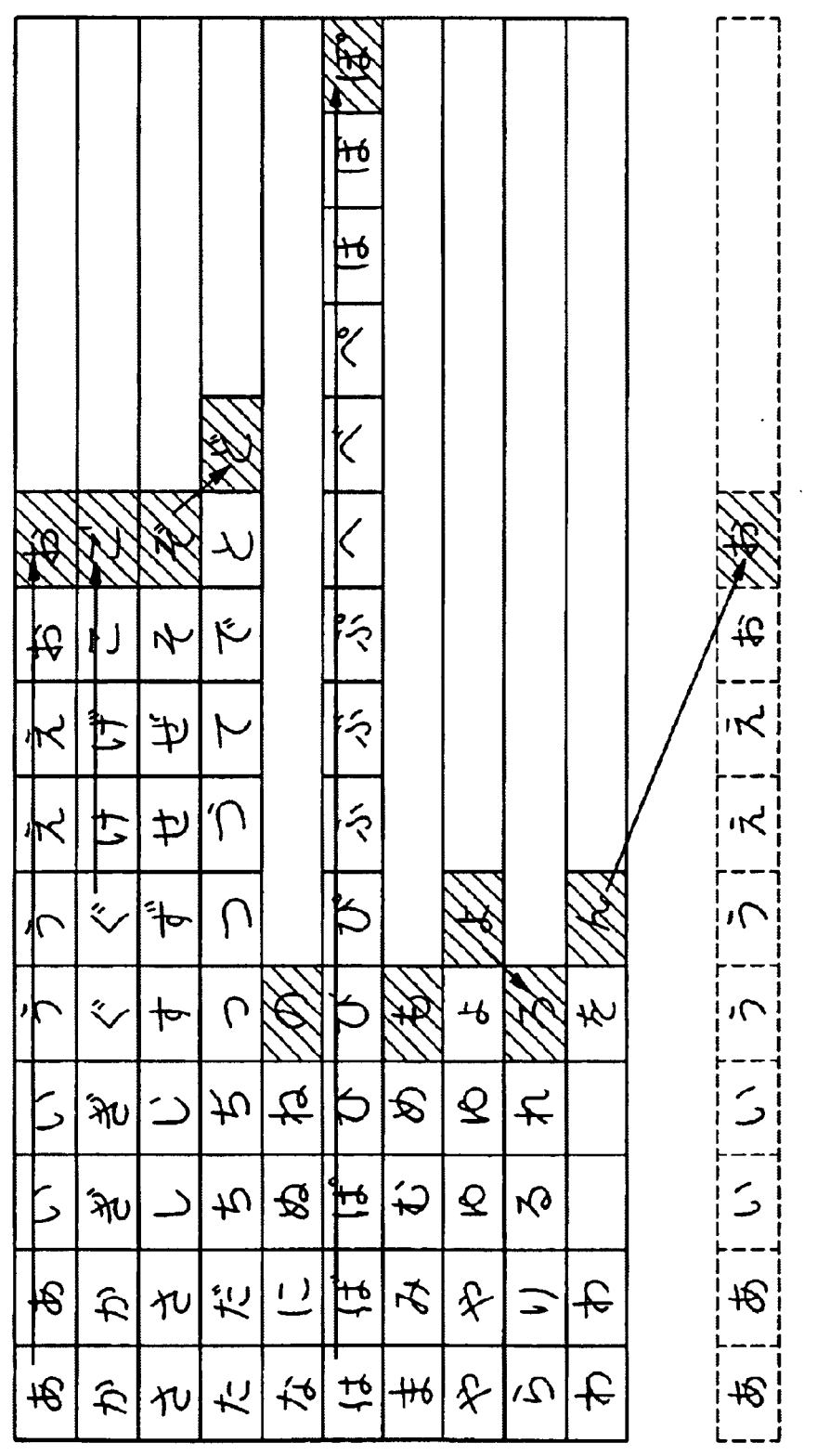

FIG. 66 is a diagram similar to FIG. 62, which is useful in explaining a scroll rule for changing the entry designation character through still another manner of operating the cursor;

FIG. 67 is a diagram similar to FIG. 62, which is useful in explaining a scroll rule for changing the entry designation character through still another manner of operating the cursor;

FIG. 68 shows a Katakana array table as an example of the array table for arranging the predetermined kind of characters;

FIG. 69 shows an array table of alphanumeric characters as an example of the array table;

FIG. 70 shows a numeral array table as an example of the array table;

FIG. 71 shows a Kanji array table as an example of the array table;

FIG. 72 shows a symbol array table as an example of the array table;

FIG. 73 shows a symbol array table as a variation of the FIG. 72 array table;

FIG. 74 shows a symbol array table as another variation of the FIG. 72 array table;

FIG. 75 shows a table classifying symbol groups for use in a symbol selection/entry mode;

FIG. 76 shows a character-code table for showing an example of characters that can be entered when "音楽" (music) is selected as a symbol group in FIG. 75;

FIG. 77 shows a character-code table showing an example of characters that can be entered when "記述" (description) is selected as a symbol group in FIG. 75; and FIG. 78 shows a character-code table showing an example of characters that can be entered when "省略" (omission) is selected as a symbol group in FIG. 75.

DETAILED DESCRIPTION

The invention will now be described in detail with reference to drawings showing an embodiment thereof. In this embodiment, a character printing method and device and an image forming method and device according to the invention are applied to a tape printing apparatus.

FIG. 1 is a perspective view of an appearance of the tape printing apparatus with a lid thereof opened, and FIG. 2 is a block diagram showing the configuration of a control system of the FIG. 1 tape printing apparatus.

Referring to FIG. 1, the tape printing apparatus 1 includes a casing 2 having upper and lower divisional portions. The casing 2 includes a keyboard 3 arranged on the top of the front portion thereof, a display 4 arranged on the front surface at a location upward of the right side of the keyboard 3, a lid 21 arranged on the top of the rear portion thereof, and a lid-opening button 23 provided in front of the lid 21 for opening the same. The keyboard 3 is comprised of various kinds of entry keys.

Referring to FIG. 2, the tape printing apparatus 1 is basically comprised of an operating block 11 having the keyboard 3 and the display 4 for interfacing with the user, a printer block 12 having a print head 7 and a tape feeder block 120 for printing on a tape T contained in a tape cartridge 5 loaded in a compartment 6, a cutter block 13 for cutting off the printed portion of the tape T, a sensor block 14 having various sensors for carrying out various detecting operations, a driving block 270 having drivers for driving respective circuits associated therewith, a power supply block 290, and a control block 200 for controlling operations of components of the tape printing apparatus 1 including the sensors and drivers.

To implement the above construction, the casing 2 accommodates a circuit board, not shown, in addition to the printer block 12, the cutter block 13, the sensor block 14 and so forth. On the circuit board are mounted a power supply block 290 and the circuits of the driving block 270 and the control block 200. The power supply block 290 has a power supply unit EU connected to a connector port 24 for connecting an AC adapter thereto, and batteries E, such as nicad batteries, which can be removably mounted within the casing 2 from outside. The power supply unit EU supplies power to components of the tape printing apparatus 1 including the sensors and drivers.

In the tape printing apparatus 1, after loading the tape cartridge 5 in the compartment 6, the user enters and edits desired characters (letters, numerals, symbols, simple figures, etc.) or the like and inputs instructions via the keyboard 3, while checking or viewing the results of the entry, editing and instructing operations on the display 4. For instance, when the user instructs a printing operation via the keyboard 3, the tape feeder block 120 unwinds a tape T from the tape cartridge 5, while the print head 7 prints on the tape T as desired. The printed portion of the tape T is delivered from the tape exit 22 as the printing proceeds. When the desired printing operation is completed, the tape feeder block 120 sends the tape T to a location corresponding to termination of a predetermined tape length (the predetermined length of a label to be formed), and then stops the feeding of the tape.

It should be noted that in the above and following descriptions, data (items) representative of character information are collectively described as character data (items) or simply as characters, and when it is considered preferable to explicitly show that a character data (item) is text code data (item), the data (item) is described as character code data (item) or simply as a character code, whereas when it is considered preferable to explicitly show that a character data (item) is an image (dot matrix pattern or its synonym, bit map), the data (item) is referred to as a character image data (item) or simply as a character image.

In other words, usually, it is obvious that a character data item input via the keyboard 3, for instance, is a character code, and a character data item displayed as character information based on the character code is a character image data item. Further, when data of a character image is arranged in a display image-forming area of memory to form a display image, for instance, to form a display image by generating pixel dots of each character image by converting a character code based on an outline font or the like and arranging the dots in the display image-forming area (in short, converting a character code to a corresponding image), and to form a display image by arranging character image data based on a dot (bit map) font corresponding to a character code or a registered dot matrix (arranging a character image), can be considered substantially the same things or operations in respect of forming a display image by arranging data (character data) representative of character information, except when the difference matters in description.

Therefore, a character code data item (or a character code) and a character image data item (or a character image) are discriminated from each other only when it is considered particularly preferable to discriminate one from the other. Otherwise, data items representative of character information are indiscriminately described as character data items (or characters).

Referring again to FIGS. 1 and 2, under the lid 21, the printer block 12 has the compartment 6 for loading the tape cartridge 5 therein. The tape cartridge 5 is mounted in or removed from the compartment 6 when the lid 21 is open. Further, the casing 2 has a left side portion thereof formed with a tape exit 22 which communicates between the compartment 6 and the outside of the apparatus. On the tape exit 22 faces a tape cutter 132 for cutting a dispensed portion of the tape T.

Referring to FIG. 3, the tape cartridge 5 has a cartridge casing 51 formed of an upper casing 51a and a lower casing 51b. A tape reel 52 around which the tape T having a predetermined width (approximately 4 to 52 mm: approximately the size of a side label to the size of a case label, both of which are described hereinafter) is wound, a ribbon supply reel 53 around which an ink ribbon R is wound, and a ribbon take-up reel 54 for taking up used part of the ink ribbon R therearound are rotatably arranged within the cartridge casing 51. At a location facing a passageway where the tape T and the ink ribbon R are placed one upon the other, there is formed a hollow chamber 55 without a bottom.

Further, the upper casing 51a has an inflated portion 57 facing the hollow chamber 55, formed such that the print head 7 and a platen 62 does not abut the upper casing 51a from inside. The inflated portion 57 is formed with a platen-fitting hole 58 and a head-fitting hole 59, for fitting an upper end of the shaft of the platen 62 and an upper end of a head-supporting shaft 65 therein, respectively, when the tape cartridge 5 is loaded in the compartment 6.

On the other hand, in the compartment 6, there are arranged a head unit 61 incorporating the print head 7, such as a thermal head, and the platen 62. When the tape cartridge 5 is loaded in the compartment 6, the head unit 61 and the platen 62 are inserted into the hollow chamber 55 in a manner sandwiching the tape T and the ink ribbon R therebetween. Similarly, a guide bar 64 and a take-up reel drive shaft 63 are inserted into a central hole of the tape reel 52 and a central hole of the ribbon take-up reel 54, respectively.

When the platen 62 and the take-up reel drive shaft 63 are driven for rotation by a feed motor 121 as a drive source, the tape T and the ink ribbon R are fed or advanced. More specifically, when the tape T is rolled out from the tape reel 52, the ink ribbon R is also rolled out from the ribbon supply reel 53 and fed or run together with the tape T in a state lying upon the tape T, followed by being taken up by the ribbon take-up reel 54. At the same time, the print head 7 is driven in synchronism with running of the tape T and the ink ribbon R to thereby carry out a printing operation. The printed portion of the tape T is fed from a tape-sending slit 56 formed in the lower casing 51b toward the tape exit 22 of the casing 2. Further, after completion of the printing operation, the tape T continues to be fed until a predetermined cutting position on the tape T reaches the position of the tape cutter 132.

The cutter block 13 includes the tape cutter 132, a cutting button 133 for being manually operated to cause the tape cutter 132 to carry out a manual cutting operation, and a cutter motor 131 for driving the tape cutter 132 for an automatic cutting operation. To selectively carry out one of these two types of cutting operations, the tape printing apparatus 1 is constructed to permit the use to switch the mode between an automatic cutting mode and a manual cutting mode.

More specifically, in the manual cutting mode, when the printing operation is completed, the user pushes the cutting button 133 arranged on the casing 2, whereby the tape cutter 132 is actuated to cut the tape T to a desired length. Further, in the automatic cutting mode, after completion of the printing operation, the tape T is automatically sent for incremental feed by a predetermined length, and then stopped, whereupon the cutter motor 131 is driven to cut off the tape T.

The tape T is a laminate of a base tape having a printing surface as one surface and an adhesive treated surface as the other surface, and a peel-off paper covering the adhesive treated surface of the base tape. There are provided a plurality of types of tape T, and the tape cartridge 5 for holding the tape T includes various types having respective slightly different shapes according to the types of tape T (some types of tape cartridge 5 have a plurality of small holes and recesses formed in the bottom thereof, while others do not have the same).

As shown in FIGS. 4A and 4B, for instance, some types of tape T comprise a base tape having label portions formed by half die cutting (hereinafter, label portions formed as such are referred to as "half-die-cut labels"). The half-die-cut labels are for use in affixation to a disc cartridge (MD cartridge) containing a mini disc (MD) or a disc case (MD case) for storing the MD cartridge. Thus, according to the tape printing apparatus 1, the tape cartridge 5 holding any of the above-mentioned types of tape T is loaded in the apparatus 1 to print on the tape T, and simply by peeling half-die-cut labels printed with characters off the tape T, it is possible to easily form desired labels, which can be easily affixed to predetermined locations on the disc cartridge and the disc case.

As shown in FIG. 6, an MD 92 having a standard size of 64 mm (2.5 inches) in diameter (see FIG. 7) is held in an MD cartridge 91 which is received in an MD case 93 for storage.

To the top surface of the MD cartridge 91, for instance, it is possible to affix a main label LM printed as shown in FIG. 5A. The main label LM is also referred to as a "disc label LMD" when it is discriminated from a "case label LMC" described hereinbelow. To the top surface of the MD case 93, it is possible to affix two main labels LM formed as shown in FIG. 5B. If a unitary label having a size corresponding to a total size of two successive main labels LM is used for these main labels, it is referred to as the case label LMC. Further, even a set of two main labels LM is also referred to as the "case label LMC" when it is discriminated from the above-mentioned disc labels LMD. To a side surface of the MD cartridge 91 or the MD case 93, it is possible to affix a label (side label) LS as shown in FIG. 5C.

The main label LM (disc label LMD) includes various types different in size, including the largest type having a size of approximately 36 mm×52 mm, and the smallest type having a size of approximately 36 mm×18 mm. The side label LS has a size of approximately 4 mm×60 mm. Further, the case label LMC has a size of approximately 52 mm×72 mm. As the case label LMC, the above-mentioned unitary label or the set of two disc labels LMD (main labels) may be affixed.

In printing on portions of "TITLE" appearing in FIGS. 5A and 5B and the side label LS, usually, the disc title (attribute information) of an MD (disc) 92 to which the printed labels are affixed is used. This is because the disc title represents the contents of main information (music) stored in the MD (disc) 92 most accurately. Further, numbers, such as 1, 2, 3 and the like, appearing in the figures represent main information numbers (music numbers). For instance, they correspond to track numbers in the MD 92 and corresponding capital letters, such as "AAAAA", designate main information titles (music titles) stored in the track. Images of labels shown in these figures represent music numbers and corresponding music titles printed such that each music number is followed by a corresponding music title on the same line.

It should be noted that conventionally, the MD records pieces of music or music information as main information. Further, management information formed of text data (text code data) and other text information is recorded as attribute information concerning the main information. The management information includes a music number, the starting and ending addresses of a music piece, and a date of recording of the music piece, which are automatically recorded when the music piece is recorded, and a date of recording a disc title automatically recorded when the disc title is recorded. Further, the above other text information contains disc titles and music titles entered by the user.

Alphanumeric characters and the like are easy to process even in half size (as half-size characters), since they have simpler character constructions (character images) than ideographic characters, such as Chinese letters and Japanese Kanji letters, and hence they are generally processed as half-size characters (half-size display characters) by taking into account display efficiency per unit area, functions of a display, etc. On the other hand, ideographic characters, such as Kanji letters, and symbols are generally processed in full size, i.e. displayed as full-size characters (full-size display characters), since they have complicated character constructions (character images). In the case of a Japanese language-adapted type of the tape printing apparatus 1 of the present embodiment which is capable of processing Japanese language, Kana letters (Hiragana letters and Katakana letters) representative of the Japanese syllabary are processed (displayed or printed) as half-size characters, while Kanji letters are processed (displayed or printed) as full-size characters. It should be noted that as defined by JIS B0191, a "half-size character" is a character having a character area whose size in the direction of reading (in the direction of width) is half the size in the same direction of a character area of a "full-size character" of which height-to-width ratio is approximately 1:1. The height-to-width ratio of the character area of a "half-size character" is, therefore, approximately 1:0.5.

Therefore, in the MD, there are separately provided an area for storing attribute information (hereinafter referred to as "half-size display attribute information") represented by character data (hereinafter referred to as "half-size display attribute data") formed of only half-size display characters, such as alphanumeric characters and the like, and an area for storing attribute information (hereinafter referred to as "full-size display attribute information") represented by character data (hereinafter referred to as "full-size display attribute data") including data of full-size display characters, such as Kanji letters and the like. Normally, only one of the above areas is used. When full-size display characters, such as Kanji letters and the like, are employed, if the displayed characters are reflected i.e. printed on labels as they are, it is possible to create labels which are easy to view or read.

Further, the attribute information sometimes includes the total number of music pieces automatically input by an MD player (or arbitrarily entered by the user), the recording (play) time of each music piece, the names of artists (names of composers or the like) in addition to the above-mentioned kinds of attribute information. Small letters "aaaaa . . . " added after the capital letters "AAAAA" as a music title as shown in FIG. 5B represent the name of an artist (name of a composer or the like). A comment of a phrase "~XX OTHER TITLES~" appearing in FIGS. 5A and 5B expresses information obtained from the total number of music pieces (of course, a phrase "~A TOTAL OF XX TITLES~" may be used in place thereof).

Conventionally, the above-mentioned attribute information (the total number of music pieces, a disc title, music numbers, music titles, play times, recording dates, artist names, etc.) is used as display information displayed on the display of an MD playback system (MD player) or a remote controller.

Referring to FIG. 7, conventionally, an MD cartridge 91 (containing an MD 92) is loaded, e.g. in a portable MD player 90, and keys of a system-operating block 914 of the MD player 90 are operated, whereby it is possible to play back music pieces stored in the MD 92 as well as display the above various kinds of attribute information on a system display 912.

Further, forms of the above-mentioned labels are conventionally provided as accessories of the MD 92, and, for instance, each user manually writes on the labels with reference to character data (display data) of attribute information displayed on the system display 912 when the MD player 90 plays back the MD 92, and then affixes them to respective predetermined portions of the MD cartridge 91 and the MD case 93.

Further, some conventional MD playback systems send and receive data to and from a remote controller by remote control communication means (including wired and wireless ones), and particularly, there is a type for use with a display-equipped remote controller. For instance, the MD player 90 shown in FIG. 7 belongs to this type. The connector (or connection plug) of a remote control connection cable 925 from a remote controller 921 is inserted into the remote control terminal 901 of the MD player 90, and keys of a remote controller-operating block 923 are operated, whereby music pieces recorded in the MD 92 can be played back and at the same time attribute information can be displayed on a remote controller display 922. The user can manually write on the labels with reference to the attribute information thus displayed.

However, this conventional method of making labels for MD's is very troublesome, and it is almost impossible to manually write lots of characters within a label which is small in size. What is more, to make several types of labels has the problem that it demands much patience.

In contrast, as described above with reference to FIGS. 4A and 4B, the tape printing apparatus 1 according to the embodiment of the invention makes it possible to easily form desired labels which can be affixed to predetermined locations, only by loading the tape cartridge 5 holding the tape T formed with half-die-cut labels therein for printing on the tape T, and peeling the half-die-cut labels printed with characters off the tape T.

Although in the examples shown in FIGS. 4A and 4B, the tapes T formed with different labels of a plurality of types, that is, the tape T formed with half-die-cut labels for making main labels LM (disc labels LMD) and the tape T formed with half-die-cut labels for making side labels LS are shown as separate tapes T, one type of tape T may be formed with different half-die-cut labels suitable for making respective types of labels (that is, for making disc labels LMD and side labels LS). Further, it is possible to provide a tape T for making case labels LMC.

To this end, for the tape printing apparatus 1, there are provided several kinds of tape cartridges 5 respectively holding the above tapes T which range in size from a side label-forming tape T having a width of approximately 4 mm to a case label-forming tape having a width of approximately 52 mm, and a tape T without half-die-cut labels thereon.

In the following, description will be mainly made of cases of forming labels. Since minimum two types of tape T, that is, a tape T for forming main labels LM and a tape T for forming side labels LS are required for providing necessary labels for MD's, let it be assumed for clarity of description that there are provided only the two types of tape T shown in FIGS. 4A and 4B. In the FIG. 4A tape T, a main label LM having a width of 36 mm is defined within the range of a tape width Tw of 46 mm, while in the FIG. 4B tape T, two side labels LS each having a width of 4 mm are defined within the range of a tape width Tw of 20 mm.

Further, a print width in the direction of the width of the tape T over which the print head 7 can print characters is set to 36 mm (288 dots when 0.125 mm/dot) in a manner adapted to the widths of the labels LM and LS defined as above on the tapes T (see FIGS. 39A and 39B). When the main label LM is printed, a portion having a print width of 32 mm exclusive of margins in the direction of the width of the tape T is used. Although the print head 7 is required to have a size appropriate for a print width of approximately 56 mm when it is used to form a case label LMC as a unitary label, and only a size appropriate for a print width of 4 mm when it is dedicatedly used to make side labels, the following description will be made assuming that the print head 7 of 288 dots is used in the present embodiment, which can be most generally employed and at the same time designed relatively compact.

On the other hand, as described above, the tape cartridge 5 includes various types constructed to have slightly different shapes in a manner corresponding to respective types of tape T contained therein so as to enable the user to discriminate between the types of tape T which vary with the width, the kind of half-die-cut label defined thereon, and so forth, from a different shape of each type of tape cartridge 5. To this end, a tape-discriminating sensor 141 comprised e.g. of a micro-switch is arranged in the compartment 6, for detecting the different shape of each cartridge to thereby determine the type of tape T contained therein.

Further, similarly to the tapes T shown in FIGS. 4A and 4B, each tape T has reference holes TH formed at predetermined space intervals, and a tape position sensor 143 which is comprised of a photo interrupter or the like is arranged in the vicinity of the tape exit 22 (see FIG. 1), i.e., in the vicinity of the tape cutter 132, for detecting the reference holes TH, thereby enabling detection of the position of the tape T (particularly the printing position thereof).

Furthermore, a mechanism for opening/closing of the lid 21 includes a lid opening/closing sensor 142 which is comprised of a limit switch and the like for detecting the opening or closing of the lid 21, whereby it is possible to detect an abnormality e.g. of the lid 21 being opened during printing.

As shown in FIG. 2, the sensor block 14 has not only the tape-discriminating sensor 141, the lid opening/closing sensor 142 and the tape position sensor 143 but also a voltage sensor 144 connected to the power supply unit EU of the power supply block 290 supplying power to components of the tape printing apparatus 1, for detecting a change in electric potential thereof. It should be noted that sensors other than the above, such as an ambient temperature sensor, a head surface temperature sensor and the like can be added to the apparatus, or some of the above sensors can be omitted therefrom, so as to suit the practical conditions under which the apparatus is used.

The driving block 270 includes a display driver 271, a head driver 272, and a motor driver 273.

The display driver 271 drives the display 4 of the operating block 11 in response to control signals delivered from the control block 200, i.e. in accordance with commands carried by the signals. Similarly, the head driver 272 drives the print head 7 of the printer block 12 in accordance with commands from the control block 200.

Further, the motor driver 273 has a feed motor driver 273d for driving the feed motor 121 of the printer block 12 and a cutter motor driver 273c for driving the cutter motor 131 of the cutter block 13, and similarly, drives each motor in accordance with commands from the control block 200.

The operating block 11 includes the keyboard 3 and the display 4. Referring to FIG. 8, the keyboard 3 has a power key 31, a shift key 32, and four cursor keys 33 (33U. 33D, 33L and 33R) for moving a cursor (actually, for scrolling the display range of a print image on the display screen 41) in respective upward (↑), downward (↓), leftward (←) and rightward (→) directions (hereinafter the cursor keys will be referred to as "the up arrow key 33U", "the down arrow key 33D", "the left arrow key 33L" and "the right arrow key 33R", whereas when collectively called, they are referred to as "the cursor key 33"). The keyboard 3 has eight function keys as well.

More specifically, on the upper side of the top of the keyboard 3, there is arranged a function key group 34 including a character decoration key (hereinafter referred to as "the decoration key) 34F, a character entry key (hereinafter referred to as "the character key") 34C, a figure/symbol entry key (hereinafter referred to as "the symbol key") 34D mainly for use in entry, editing and decoration of each character (letter, numeral, symbol, figure, etc.), as well as a delete/cancel key (hereinafter referred to as "the delete key") 35. On the lower side of the top of the keyboard 3, there are arranged a read key 36, a conversion/space key (hereinafter referred to as "the conversion key") 37, an enter key 38, and a print key 39.

FIG. 8 is a diagram schematically showing the arrangement of keys on the keyboard 3. Although the arrangement of each key is slightly different in relative position from the actual arrangement thereof (see FIG. 1), the keys are shown in an approximately identical arrangement to the actual arrangement thereof. Further, name(s) and functions (some are shown by using callouts) of keys appearing in FIG. 8 are printed on the top surface of the FIG. 1 keyboard 3.

If the decoration key 34F, the character key 34C, symbol key 34D, the delete key 35, the read key 36 or the conversion key 37 are each operated in combination with the shift key 32 (i.e. by depressing the key while depressing the shift key 32), they serve as a format key 34FS (the shift key 32+the decoration key 34F: to reflect the state of the decoration key 34F being used in combination with the shift key 32, hereinafter referred to as "the format key 34FS" by adding an alphabetical letter "S" to the reference numeral, and the same applies to the other keys), a frame key 34CS, an adjustment key 34DS, an all character delete key 35S, a line read key 36S and a conversion mode key 37S.

Further, the above each cursor key 33 is sometimes employed in combination with the shift key 32, and hence, for instance, the state of the up arrow key 334 and the shift key 32 being simultaneously operated is referred to as "the shift/up arrow key 33US", whereas when operation of any of the cursor key 33 in combination with the shift key 32 is collectively referred to as "the shift key 33S".

Although dedicated keys may be exclusively provided for the above key entries, the size of the keyboard 3 dominantly determines the whole size of the tape printing apparatus 1, so that to design the apparatus compact in size, the number of keys having required functions is decreased by using keys in combination with the shift key 32.

Referring to FIG. 9, the display 4 has a display screen 41 which is comprised of an LCD and provides therein an indicator display block 4i which is capable of lighting eighteen indicators, and a character display block 4c formed of a dot matrix of (horizontal) 72×(vertical) 16 dots.

The indicator display block 4i is provided for indicating various printing modes and states of the tape printing apparatus 1 for printing character data (text data: see FIGS. 5A to 5C) of titles and music titles, by state of each indicator being lighted or not lighted. The indicator display block 4i has eight upper indicators 4i00 to 4i07 shown in FIG. 10 indicating information concerning a title (disc title), eight lower indicators 4i10 to 4i17 indicating information concerning music titles, two right-hand side indicators 4iL and 4iR indicating that all music titles cannot be printed on a main label LM (disc label LMD or case label LMC), that is, lines to be printed with the music titles are overflowed (line overflow).

Referring to FIGS. 11A and 11B, the character display block 4c has two basic units of control, i.e. two forms of display to be controlled. One of the two forms of display is a full-size/half-size display shown in FIG. 11A. In this form of display, the character display block 4c is divided into two control blocks; a sub-display block at a left end, indicated by coordinates CE and CF in the figure, for displaying two images each in a 8×8 dot matrix, and a main display block for displaying eight images each in a 8×16 dot matrix. The sub-display block is used for displaying music numbers, referred to hereinafter, or the like, while the main display block is used for displaying general character data other than the music numbers or the like.

The other form of display is a 6×8 display shown in FIG. 11B. In this form of display, the character display block 4c is controlled in units of 6×8 dot matrices as explicitly represented by the name of 6×8 display, that is, by dividing the display block into twelve upper dot-matrix areas indicated by coordinates A0 to Ab and twelve lower dot-matrix areas indicated by coordinates B0 to Bb, i.e. a total of twenty-four dot-matrix areas. This form of display is for use in special display carried out by a code display block (for displaying JIS codes for an MD system), e.g. when characters are input.

During the screen display process of the tape printing apparatus 1, a cursor K for instructing a display range or an editing position (position for inserting character, for instance) is fixed to the right end of the coordinates C5 of the above main display block, as shown in FIGS. 12A to 12E.

Figure 12A:
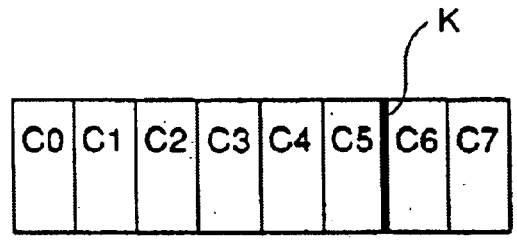
Figure 12B:
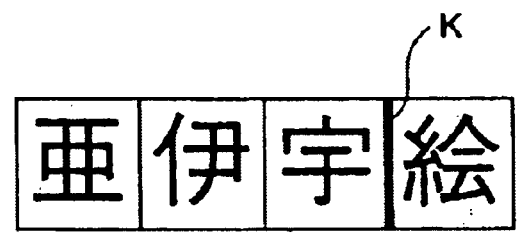
Figure 12C:
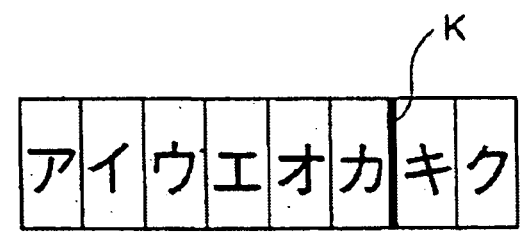
Figure 12D:
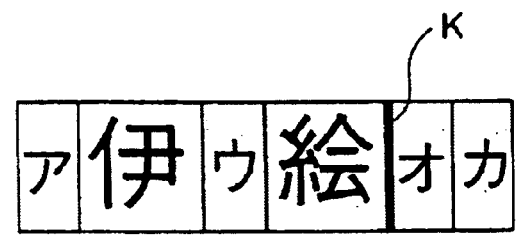
Figure 12E:
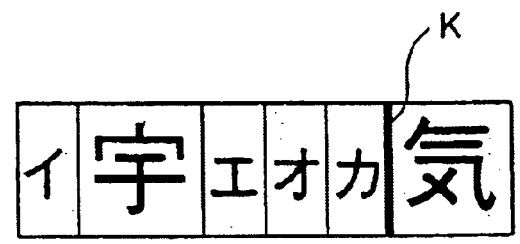

FIG. 12A schematically shows the main display block divided into character display areas indicated by respective schematic representations of coordinate values, while FIGS. 12B to 12E show a case where only full-size display characters are displayed, a case where only half-size display characters are displayed, a case where full-size and half-size display characters are displayed in a mixed manner with the cursor K being positioned on the right side of a full-size display character, and a case where full-size and half-size display characters are displayed in a mixed manner, with the cursor K being positioned on the right side of a half-size display character, respectively. In these cases, the display range is scrolled by operating the cursor key 33. For instance, when the right arrow key 33R is depressed, characters displayed are moved leftward, that is, the display range is shifted rightward.

Referring to FIG. 2, contents (instructions and data items) which the user input via the keyboard 3 while viewing the results of the entry are output to the control block 200.

The control block 200 includes a CPU 210, a ROM 220, a character generator ROM (CG-ROM) 230, a RAM 240, and a peripheral control circuit (P-CON) 250, all of which are connected to each other by an internal bus 260.

The ROM 220 has a control program area 221 for storing control programs executed by the CPU 210, and a control data area 222 for storing control data including e.g. a Kana-Kanji conversion table (dictionary) in the case of the Japanese language-adapted type of the tape printing apparatus 1 which is capable of processing Japanese language, a color conversion table, a letter modification table and the like.

The CG-ROM 230 stores font data, i.e. data defining letters, symbols, figures and the like, provided for the tape printing apparatus 1. When code data indicative of a specific character or the like is input thereto, it outputs the corresponding font data.

The RAM 240 is backed up such that stored data items can be preserved even when the power is turned off by operating the power key 321. The RAM 240 includes areas of a register group 241, a text data area 242, a display image data area 243, a print image data area 244, a half-size display attribute data area 245, a full-size display attribute data area 246, as well as a conversion buffer area 247 including a color conversion buffer. The RAM 240 is used as a work area for carrying out the control process.

The P-CON 250 incorporates logic circuits for complementing the function of the CPU 210 as well as handling interface signals for interfacing with peripheral circuits and the MD player 90. The logic circuits are comprised of gate arrays, custom LSIs, etc. For instance, a timer (TIM) 251 as time-measuring means and a remote control communication control circuit (RC) 252 are also incorporated in the P-CON 250 for realizing other functions thereof.

The P-CON 250 is connected to the sensors of the sensor block 14, and the keyboard 3, for receiving signals generated by the sensor block 14 as well as commands and data entered via the keyboard 3, and inputting these to the internal bus 260 as they are or after processing them. Further, the P-CON 250 cooperates with the CPU 210 for outputting data and control signals input to the internal bus 260 by the CPU 210 or the like to the driving block 270 as they are or after processing them.

Further, the P-CON 250 is connected to the MD player 90 in a remotely controllable manner via the remote control interface terminal (RT) 25 of the tape printing apparatus 1, a remote control connection cable 26 having a connector (or connection plug) connected to the RT 25, and the remote control terminal 901 of the MD player 90, and cooperates with the CPU 210 for carrying out remote control communication, described hereinbelow.

The CPU 210 of the control block 200 receives signals and data from components of the tape printing apparatus 1 and the MD player 90 by using the P-CON 250 according to the control program read from the ROM 220, processes font data from the CG-ROM 230 and various data stored in the RAM 240, and delivers signals and data to the components of the tape printing apparatus 1 and the MD player 90, to thereby carry out position control during printing operations, the display control of the display screen 41, and the remote control communication control, as well as cause the print head 7 to carry out printing on the tape T under predetermined printing conditions. In short, the CPU 210 controls the overall operation of the tape printing apparatus 1.

Next, the overall control process carried out by the tape printing apparatus 1 will be described with reference to FIG. 13. As shown in the figure, when the power key 31 is depressed (to turn on the power of the tape printing apparatus 1) to start the program for carrying out the control process, first, at step S1, initialization of the system including restoration of saved control flags is carried out to restore the tape printing apparatus 1 to the state it was in before the power was turned off the last time. Then, the image that was displayed on the display screen 41 before the power was turned off the last time (screen G0 in FIG. 20B, screen G11 in FIG. 21 or the like) is displayed as the initial screen at step S2.

The following steps in FIG. 13, that is, step S3 for determining whether or not a key entry has been made, and step S4 for carrying out an interrupt handling operation are conceptual representations of actual operations. Actually, when the initial screen has been displayed at step S2, the tape printing apparatus 1 enables an interrupt by key entry (keyboard interrupt), and maintains the key entry wait state (No to S3) until a keyboard interrupt is generated. When the keyboard interrupt is generated (Yes to S3), a corresponding interrupt handling routine is executed at step S4, and after the interrupt handling routine is terminated, the key entry wait state is again enabled and maintained (No to S3).

As described above, in the tape printing apparatus 1, main processing operations executed by the apparatus are carried out by task interrupt handling routines, and hence if print image data required to be printed is available, the user can print the image data at a desired time, by depressing the print key 39 to generate an interrupt handling routine therefor and thereby start a printing process for carrying out a printing operation. In short, operating procedures up to the printing operation can be selectively carried out by the user as he desires.

Now, a manner or procedure of sending and receiving data between a remote controller (for instance, the remote controller 921 described above with reference to FIG. 7) and the MD player 90 (during remote control communication) by operating the remote controller will be described by way of example.

For instance, as shown in FIG. 14, when the user operates a key for requesting desired attribute information (hereinafter, operating the key is provisionally described as depressing the "request key"), a request process (Q10) as an interrupt handling routine is activated and started by the remote controller 921. First, a request signal RQ1 is generated to send the same (Q101).

When the MD player 90 receives the request signal RQ1, a response process responsive to the request is activated and started by the MD player 90 to carry out the response process (P10 and P101), and response data RP1 for answering the request RQ1 is sent out (P102) (although the response is sometimes made by a control signal alone, here, "response data" is used to mean such a control signal as well).

When the response data RP1 is received (Q102), it is determined by the remote controller 921 (Q103) whether or not the received response data RP1 is data requested, i.e. desired response data responsive to the request signal RQ1. In this case, there is provided identification data (of one byte, for instance) at a head of one sending/receiving data unit (e.g. a packet) of the response data, and the received response data RP1 is identified by using the identification data, whereby it is determined whether or not the received response data RP1 is the data requested.

When the response data RP1 is different from the data requested (No to Q103), another response data RP1 is requested (Q101). On the other hand, when the received response data RP1 is the data requested (Yes to Q103), the request process is terminated (Q106), followed by the program proceeding to next processes in which received data is stored in a predetermined area or displayed. Of course, these processes (the storage process and the display process) may be included in the preset process to carry out before terminating the request process.

However, in the above case, in the MD player 90, if there are response data items to be sent successively, the response data RP1 is set to a first response data RP1, for instance, and then a second response data RP2, a third response data RP3, . . . , and a k-th (k represents a number) response data RPk are sequentially sent out (P104 and P105).

In the remote controller 921, when the first response data RP1 is different from the data requested (No to Q103), the first response data RP1 is ignored and another data is requested (Q101), so that the second response data RP2 is also ignored, whereas when the first response data RP1 is the data requested (Yes to Q103), the second response data RP2, the third response data RP3, . . . , and the k-th response data RPk are received, followed by terminating the request process (Q104 to Q106).

As described above, the remote controller 921 is configured such that request signals can be generated in response to the operated request key to send the same, while the MD player 90 is configured such that response data responsive to the request signals can be sent out (in reply). Therefore, if the tape printing apparatus 1 is also provided with the same request, key and means associated therewith as those of the remote controller 921 to carry out the same request key process, the apparatus can perform the same function as that of the remote controller 921.

It should be noted that the MD player 90 contemplated in the present embodiment may be of a type which is different from the MD player described above with reference to FIG. 7, that is, which has only part of various request keys in the system-operating block 914 or which does not have a system display 912, so long as the player is capable of displaying various attribute information on the remote controller display 922 by operating keys of the remote controller 921. Further, although the following description is made of cases wherein wired remote control communication is carried out for convenience of description, this is not limitative, but only by using infrared (optical) or FM carrier wave communication in place of the wired communication, the present invention can be applied to wireless remote control communication.

Now, the MD player 90 described here by way of example is a kind of MD player commercially available, which has, as the above types of request keys, a play key (PLAY key), a rewind key (REWIND key: hereinafter simply referred to as "the REW key"), a stop key (STOP key), a pause key (PAUSE key), a play-mode key (PLAY-MODE key) (hereinafter simply referred to as "the P-MOD key"), and a display key (DISPLAY key) (hereinafter simply referred to as "the DISP key"). In short, the remote controller is provided with the above request keys for causing the MD player to perform its functions.

Further, the MD 92 loaded in this MD player 90 stores information (including both half-size display attribute information and full-size display attribute information) of one music piece per one track with each track number and music number identical in number with each other.

The PLAY key has the function of playing back MD's and further, if it continues to be depressed for a predetermined time period, it can activate the function of a fast forward key (i.e. send a fast forward request signal as a request signal). When playback is requested, the MD player 90 starts a playback process in response thereto, and sends the number and title of a requested music piece to the remote controller during playback, whereas when fast forward is requested, the MD player 90 sequentially outputs a track number (music number) and a corresponding music title whenever fast forward is requested. That is, the user can proceed to playback of a next music piece and display of the number and title thereof by fast forward without waiting for each information to be reproduced as music information.

Although the above music title (attribute information, display information) includes both of a music title (half-size display music title) represented by half-size display attribute data and a music title (full-size display music title) represented by full-size display attribute data, the remote controller according to this embodiment selects and displays a predetermined one of the half-size and full-size display music titles (the conventional one displays only a half-size display music title).

The REW key is a request key for requesting character data (attribute information: character data of the track number (music number) and music title) of a music piece being reproduced, or alternatively character data of a music piece reproduced in immediately preceding playback, depending on the state of the MD player 90 at a time point of depressing the REW key. When the REW key is repeatedly operated, the MD player 90 sequentially outputs track numbers (music numbers) and corresponding music titles similarly to the case of the PLAY key being depressed but in a reverse direction (in a direction of smaller music numbers). The STOP key is a request key for requesting stoppage of playback and the PAUSE key is a request key for requesting pause or temporary stop of playback.

The P-MOD key is a request key for sequentially switching modes (playback modes) during playback to a normal playback mode, a playback mode for repeating all the music pieces, a playback mode for repeating one music piece, and a playback mode for playing back music pieces at random.

Further, the DISP key is a request key for switching display modes of the display block of the remote controller for selection. The display mode is sequentially switched to a music number display mode for displaying a music title (or a music number+a music title: sometimes, additional information, such as an artist's name and the like, is further included. In the following, for simplicity of the description, it is assumed that a music number+a music title are displayed), a disc title display mode for displaying a disc title (or the total number of music pieces+a disc title: hereinafter, it is assumed that the total number of music pieces+a disc title are displayed), a time display mode for displaying a time, a play time display mode for displaying a play time (performance time), and again, the music number display mode, the disc title display mode, and so forth.

Although the above disc title (attribute information, display information) includes both of one represented by half-size display attribute data (half-size display disc title) and one represented by full-size display attribute data (full-size display disc title), the remote controller selects and displays a predetermined one of the half-size and full-size display disc titles (conventionally only a half-size display disc title is displayed).

The MD player 90 is configured such that it can send (in reply) response data in response to each request signal generated by operating each of the above keys, so that if the tape printing apparatus 1 is provided with the same request keys as those of the remote controller for carrying out similar processes, the tape printing apparatus 1 is capable of performing the same function as that of the remote controller.

Further, it is also possible to generate request signals by operating a plurality of request keys on the remote controller and combine the request signals so as to request a continuous set of attribute information of the MD player 90. More specifically, by operating a newly provided key or an existing one for which programs are modified for processing, it is also possible to make a desired combination of requests for attribute information. For instance, it is also possible to request music titles of an arbitrary number of music pieces based on a disc title and a desired music number.

Therefore, the tape printing apparatus 1 is provided with the read key 36 described hereinbefore with reference to FIG. 8 as the request key described above. In the following, a process for successively requesting attribute information will be described.

As shown in FIG. 15, when the user depresses the read key 36, similarly to the case of FIG. 14, a print data-reading process (Q20) as an interrupt handling routine is activated and started in the tape printing apparatus 1, and first, a DISP key signal is generated as a request signal RQ21 to send the same to the MD player (Q201).

When the request signal RQ21 is received, the display mode of the MD player 90 is changed in response to the request (P201), and character data (attribute information, display information) corresponding to the display mode is sent as response data RP21 (P202).

When the response data RP21 as character data is received (Q202), it is determined by the tape printing apparatus 1 whether or not the response data RP21 is desired data, i.e. disc title display data (Q203).

For instance, if the request signal RQ21 was sent (Q201) when the MD player 90 was in the disc title display mode, the display mode is changed (P201) to the time display mode, so that the response data RP21 in this case is character data for displaying a time. Further, if the request signal RQ21 was sent (Q201) when the MD player 90 was in the time display mode, the response data RP21 is character data for displaying a play time. Similarly, if the MD player 90 was in the play time display mode, the response data RP21 is character data for displaying a music title (a music number+a music title).

In the above cases, since each character data is not a desired disc title display data (character data of the total number of music pieces+a disc title) (No to Q203), attribute information is requested again (Q201). Further, as described above, in the these cases as well, the identification data arranged at the head of the response data RP21 is used to determine whether or not the received response data RP1 is data desired.

On the other hand, if the request signal RQ21 was sent (Q201) when the MD player 90 was in the music title display mode, the display mode is changed (P201) to set the MD player 90 to the disc title display mode, so that the response data RP21 in this case is character data (of the total number of music pieces+a disc title) for displaying the disc title.

In this case, the received character data is the desired disc title display data (Yes to Q203), so that in the tape printing apparatus 1, the received character data is stored in a predetermined area as the character data (of the total number of music pieces+a disc title) for displaying the disc title (Q204), followed by the program proceeding to a next process (Q205).

The character data of the disc title (attribute information, display information) in this case also includes character data items of a half-size display disc title and a full-size display disc title, and hence, the character data items of both the display disc titles are successively sent in response to a single request signal. Therefore, in the tape printing apparatus 1, differently from the case of the remote controller, the character data items of the two kinds of display disc titles are stored in respective storage areas in the RAM 240, that is, in respective disc title-storage areas of the half-size display attribute data area 245 and the full-size display attribute data area 246 in the RAM 240 (Q204).

Further, when the above character data items are stored (Q204), there is a case where a lack of one or both of the character data items occurs (where there is empty data), or there is a case where invalid data is contained in the character data items, so that flags or the like for displaying the status of the character data items are provided for storing the status thereof.

For instance, by providing e.g. a half-size display disc title flag and a full-size display disc title flag, the status of the character data of a disc title is stored in the following manner: when character data items for displaying a half-size display disc title and as a full-size display disc title are included in the character data received, a combination of flag statuses [half-size display disc title flag, full-size display disc title flag]=[1, 1] is set, and if only a character data item for displaying one of the display disc titles is included, a combination of flag statuses [half-size display disc title flag, full-size display disc title flag]=[1, 0] or [0, 1] is set, whereas if there is not included any character data item for displaying the display disc titles in the received character data, a combination of flag statuses [half-size display disc title flag, full-size display disc title flag]=[0, 0] is set. Similarly, when invalid data is included, it is possible to provide corresponding flags to store the status of the character data received. In the above manner, the status of character data read in is determined by using flags or the like, thereby enabling a subsequent step to be selected with ease according to the user's selection or to suit a subsequent process (read process).

After completing storage of the disc title (the total number of music pieces+the disc title)(Q204 and Q205), next, as shown in FIG. 16, a DISP key signal is generated as a request signal RQ26 by the tape printing apparatus 1 to send the same to the MD player 90 (Q206). Then, the same sending/receiving operations and the same determination operations as described above with reference to FIG. 15 are carried out (Q206, P206, P207, Q207 and Q208). When desired music title display data is received (Yes to Q208), next, a predetermined music number (track number) (Q209) and a predetermined count of music pieces (Q210) are set.

In this case, as the predetermined music number, there may be set a music number which can be automatically detected and set, such as music number 1, the music number of a music piece played the last time, or the music number of a music piece next thereto. Alternatively, the user may set the predetermined music number as desired by providing some setting means for setting the music number through key operation. Further, as the predetermined count of music pieces, there may be set a value which can be automatically set, such as a value of the total number of music pieces obtained together with a disc title described above with reference to FIG. 15, or a value which the user sets as desired. In the following, a case will be described by way of example, in which the music numbers of all music pieces (e.g. 20 pieces) starting from music number 1 are set, that is, the predetermined music number I=1 and the predetermined count of music pieces J=20 are set.

When the predetermined music number I=1 and the predetermined count of music pieces J=20 are set to the first music number i=1 (=I) and the number or count of remaining music pieces j=20 (=J), respectively (Q209 and Q210), the program in the tape printing apparatus 1 proceeds to a next process (Q211). Then, as shown in FIG. 17, a signal (i.e. fast forward request signal) to be generated in response to a continuous depression of the play key is generated as a request signal RQ2C and sent to the MD player 90 (Q212).

When the request signal RQ2C is received, in the MD player 90, a playback track number (i.e. a music number) is incremented by one as processing responsive to the request (P212), and character data (attribute information, display information) of the track number (music number) is sent as first response data RP2C1 (P213), followed by sending character data of a music title stored in the track as second response data RP2C2 (P215).

When first character data (music number) is received as the first response data RP2C1 (Q213), it is determined by the tape printing apparatus 1 (Q214) whether or not the received music number is a desired music number i (first, i=1). If it is not the desired music number i (No to Q214), another request is made (Q212), whereas when it is the desired music number i (Yes to Q214), next, second character data (music title) is received as the second response data RP2C2 Q215) to store the first character data and the second character data as data of a music title(music number+music title) in a predetermined area (Q216).

The character data of the music title (music number+music title: attribute information, display information) in this case also includes character data items of a half-size display music title and a full-size display music title, and in the tape printing apparatus 1, similarly to the case of the disc title described above, the character data items of two kinds of each display music title are stored in the half-size display attribute data area 245 and the full-size display attribute data area 246 in the RAM 240, respectively (Q216).

Further, the status of data items of all the music pieces including the following music pieces described hereinafter, is stored by using flags similar to those described above with reference to the disc title (for instance, a half-size display music title flag indicative of inclusion of a half-size display music title in the received data items, a full-size display music title flag indicative of inclusion of a full-size display music title in the same, a half-size music title invalid data flag indicative of inclusion of invalid data in the received half-size music titles, a full-size music title invalid data flag indicative of inclusion of invalid data in the received full-size music titles, a half-size music title empty data flag indicative of inclusion of empty data in the received half-size music titles, a full-size music title empty data flag indicative of inclusion of empty data in the received full-size music titles, etc.). This makes it easy to determine the status of character data read in at the following steps (Q216).

When character data of the first music title (music number 1 and a music title corresponding thereto) has been stored (Q216), then, it is determined (Q217) whether or not the predetermined number of music pieces have already been stored. That is, it is determined whether or not the number of remaining music pieces j≦1 holds. At this time point of the present process, only the first music title (of the music number i=1) has been stored (j=20) (No to Q217), so that, then, the music number i is incremented by one to update the desired music number i=2 (=1+1), while the number of remaining music pieces j is decremented by one to update the number or count of remaining music pieces j=19 (=20−1) (Q218).

Thereafter, the same processes as described above (Q212, P212, P213, Q213, Q214, P215, Q215 and Q216) are carried out using the desired music number i=2 and the number or count of remaining music pieces j=19. When character data of a next music title (music number 2 and a music title corresponding thereto) has been stored (Q216), next, it is determined whether or not the predetermined number of music pieces have been stored (whether or not the number of remaining music pieces j≦1 holds). Then, the music number i is incremented by one to update the desired music number i=3 (=2+1), while the number of music pieces j is decremented by one to update the number or count of remaining music pieces j=18 (=19−1) (Q218).

In the following, the same processes as described above are carried out as to each desired music number i=3, 4, . . . (and each number or count of remaining music pieces j=18, 17, . . . ). When character data of the music title (music number 20 and a music title corresponding thereto) of the desired music number i=20 (the number or count of remaining music pieces j=1) has been stored (Q216), then, it is determined whether or not the predetermined number of music pieces have been stored (whether or not the number or count of remaining music pieces j≦1 holds). Now, since the number or count of remaining music pieces j=1 holds (Yes to Q217), the whole reading process is terminated (Q219).

At this time point, reading of desired character data (attribute information, display information) of the disc title (the total number of music pieces+the disc title) and the music titles (the music numbers+corresponding music titles) of all the music pieces (20 pieces) starting from music number 1, and storing of the character data in the predetermined area are completed.

Further, in the above process for obtaining (data of) a desired music number, it is only required that the track number is changed, and hence it is also possible to obtain the data thereof, by using a signal for requesting a continuous depression of the REW key (i.e. the REWIND signal), as shown in FIG. 17 (in an area enclosed by square brackets Q212). Further, if the formula of "i←i+1" (Q218) for setting the music number of a next music piece is changed to the formula of "i←i−1", it is possible to store data of music titles (music numbers+music titles) in reverse order (in descending order in contrast to ascending order in the above example).

Although in the above description, the MD 92 with each track number and a music number in agreement with each other was taken as an example, attribute information may be more finely controlled on sector-by-sector basis or cluster-by-cluster basis in a manner corresponding to a data format of data stored in the MD 92. Further, it is also possible to employ an MD 92, for instance, in which one music number is correlated to a plurality of tracks to thereby store more information including an artist's name and the like as the information of one music piece. Further, such an MD 92 can be applied to a combination of an MD player and a remote controller which are capable of playing back the MD 92 and displaying the above more attribute information, if the MD player is connected to the remote controller in place of the above MD player 90, and a processing program is changed such that each request signal generated by operating a corresponding one of the same request keys as those on the connected remote controller is sent, or a combination of request signals generated by a corresponding combination of request keys are sent.

Further, although in the above example, description was made assuming that half-size display attribute data (or half-size display attribute information) and full-size display attribute data (or full-size display attribute information) are distinguished from each other in dependence on only whether or not full-size characters, such as Kanji letters or the like, are included therein, this is not limitative, but half-size display characters each represented not by a two-byte code, such as a JIS character code, but by a one-byte code (generally employed conventional method) may be adopted to thereby distinguish the half-size display characters from full-size display characters represented by the two-byte codes.

In other words, in the above case, by limiting the number of half-size display characters to be represented by respective character codes, the half-size display characters can be represented based on a one-byte code system, permitting the reduction or saving of capacity of memory for storing half-size display attribute data. In this case, the one-byte code system is used for the convenience of the capacity of memory being reduced. Hence, this method of discrimination is also based on the concept that half-size display attribute data and full-size display attribute data are distinguished from each other in dependence on whether or not a full-size display character (character represented by a code of a particular code set or system), such as Kanji letters or the like, is included in the attribute data, and therefore is included in the category of the above explanation.

Furthermore, as shown in FIG. 18, a program routine may be programmed which includes subroutines (in the form of modules) in a disc title requesting/storing process (S201) corresponding to the FIG. 15 process, a music title-requesting preparation process (S202) corresponding to the FIG. 16 process, and a music title requesting/storing process (S203) corresponding to the FIG. 17 process to sequentially activate the subroutines, to thereby carry out the same processing as described above with reference to FIGS. 15 to 17 as the print data-reading process (S20). Further, although this program routine is an interrupt handling routine activated by depression of the read key 36 (read key interrupt), this is not limitative, but the overall process (S20) may be further programmed as a subroutine such that the process can be activated from a processing routine at the upper level.

As described above, the MD player 90 (disc playback system) is constructed such that it receives request signals generated through key operation of the remote controller, and sends, to the remote controller, character data items selected from character data for display on the display block of the remote controller, so that if the tape printing apparatus 1 generates the same request signals as generated by the remote controller to thereby carry out the same processing as carried out when the signals are generated by the remote controller, the same character data as obtained by the remote controller can be obtained by the apparatus 1.

On the other hand, according to the tape printing apparatus 1, a plurality of request signals are generated simply by depressing the read (request) key 36 (through a single operation of external operating means), and a plurality of successive request signals formed by combining the plurality of request signals are sent to the MD player 90 (disc playback system), so that it is possible to obtain a plurality of character data items responding to the plurality of successive request signals through the single operation of external operating means.

For instance, in the examples described above with reference to FIGS. 15 to 18, character data of the disc title (the total number of music pieces+a disc title) and the music titles (the music numbers+music titles) of all the music pieces (20 music pieces) starting from music number 1 is obtained (received or read in). Although to obtain such an amount of character data (display data) by operating the remote controller, at least 22 key operations (for Q201×1, Q206×1, and Q212×20) are required, according to the tape printing apparatus 1, as described above, it is possible to obtain the amount of character data (display data) by a single operation of the read key.

As a result, part or whole of obtained data can be printed on a label directly or after editing the same, and hence it is possible to form beautiful labels for affixation to an MD (disc) cartridge 91 and an MD (disc) case 93 (see FIGS. 5A to 6) by a simplified operation.

Further, it is preferred that a request signal for requesting all the character data items to be printed on a label is included in a plurality of successive request signals.

In the example described above with reference to FIGS. 15 to 18, for instance, character data of a disc title (the total number or count of music pieces+a disc title) and music titles (music numbers+music titles) of all music pieces (20 music pieces) starting from music number 1 is obtained. This means all the character data items except for additional information, such as artists' names and the like, out of all the character data items to be printed on the main labels LM shown in FIGS. 5A and 5B and the FIG. 5C side label are obtained by a single operation of the read key 36.

It should be noted that when the additional information, such as artists' names and the like, can be received immediately after obtaining the music numbers+music titles in the music number display mode (if the above additional information is regarded as part of the character data of the music titles, an additional information-obtaining (receiving, reading) process is the same process as the print data-reading process, or alternatively the additional information may be processed as a third response data successive to the music titles), all the character data items including the additional information, such as artists' names and the like, can be obtained through a single operation of the read key 36.

That is, in this case, a request signal for requesting all the character data items to be printed e.g. on the FIGS. 5A to 5C labels is included in a plurality of successive request signals generated by a single operation of the read key 36, so that all the character data items required for printing on these labels can be obtained by executing the single operation of the read key 36, which makes it possible to more easily form the labels shown in the FIGS. 5A to 5C, for instance.

Next, changes in edit modes and a typical screen display process of the tape printing apparatus 1 will be described with reference to FIGS. 19 to 21.

Referring to FIG. 19, the tape printing apparatus 1 has a basic entry mode (H1), a character selection/entry mode (H2), a symbol selection/entry mode (H3), and a function-selecting/setting mode (H5), as basic edit mode, and in the case of the Japanese language-adapted type of the tape printing apparatus 1 which is capable of processing Japanese language, additionally, a Kana/Kanji conversion mode (H4) for carrying out conversion between Japanese Kana letters and Kanji letters.

Immediately after the power key 31 is depressed, that is, immediately after the power of the tape printing apparatus 1 is turned on, the apparatus is set to the basic entry mode (H1), and then by operating function keys, the edit mode can be changed between the basic entry mode (H1) and the other edit modes as well as between the character selection/entry mode (H2) and the symbol selection/entry mode (H3).

First, if the character key 34C is depressed in the basic entry mode (H1), the apparatus is set to the character selection/entry mode (H2), whereas if the enter key 38 is depressed after selecting characters, or when the delete key 35 is depressed in order to stop a character-selecting process, the apparatus returns to the basic entry mode (H1).

If the symbol key 34D is depressed instead of the character key 34C in the basic entry mode (H1), the apparatus is set to the symbol selection/entry mode (H3). Further, if the symbol key 34D is depressed in the character selection/entry mode (H2), or the character key 34C is depressed in the symbol selection/entry mode (H3), the character selection/entry mode (H2) and the symbol selection/entry mode (H3) are interchanged.

Further, in the case of the Japanese language-adapted type of the tape printing apparatus 1, when the conversion mode key 37S is depressed in the basic entry mode (H1), the apparatus is set to the Kana/Kanji conversion mode (H4), whereas when the conversion mode key 37S is again depressed in the resulting mode, or when the enter key 38 is depressed after carrying out the Kana/Kanji conversion, or when the delete key 35 is depressed in order to stop the Kana/Kanji conversion process, the apparatus returns to the basic entry mode (H1).

Further, when the apparatus is in the basic entry mode (H1), if the decoration key 34F, the format key 34FS, the frame key 34CS or the adjustment key 34DS is depressed, the apparatus is set to the function-selecting/setting mode (H5), and if the enter key 38 is depressed after a function-setting process is terminated, or if the delete key 35 is depressed in order to stop the function-setting process, the apparatus returns to the basic entry mode (H1).

As described hereinbefore with reference to FIG. 13, when the power key 31 is depressed, the initialization of the system is carried out, and the image that was displayed on the display screen 41 before the power was turned off the last time is shown as the initial screen. However, since the apparatus is set to the basic entry mode (H1) immediately after the power is turned on, as described above, the image that was displayed in the basic entry mode (H1) before the power was turned off the last time is shown as the initial screen (S2).

When the tape printing apparatus 1 is shipped from a factory or before it is used, no character data (text data) is displayed on the display screen 41. The initial screen in such a state displays, as shown in FIGS. 20A and 20B, the cursor K at the right end of the coordinates C5, and a capital letter "D" (representative of "Disc Title", since a disc title is usually used as a title to be printed on labels, as described hereinabove) indicative of a title line at a location of the coordinates CE and CF (G0). Hereinafter, this state is referred to as "the text-initialized state", which is used to mean the state of no text data being available. FIG. 20C shows an example of a title displayed.

On the other hand, for instance, assuming that a character string "Someday" was displayed in half size (i.e. by using half-size characters) as character data representative of the title of music number i=2 before the power was turned off the last time, the initial screen becomes a screen reproducing the screen displayed then, as shown in FIG. 21 (G11). Further, in the indicator display block 4*i* at this time, indicators indicative of active ones out of modes and states set before the power was turned off are lighted. It should be noted that in FIGS. 20B, 20C, and so forth, a portion representative of the indicator display block 4*i* does not represent an actual image, but shows a description of the state of indicator display block 4*i* and hence it is shown in a state enclosed by broken lines.

When the all character delete key 35S is depressed from the above state (G11), a message prompting the user to confirm that all characters displayed are to be deleted is displayed in a flickering (or highlighted) manner (G12). Hereinafter, characters displayed in the flickering or highlighted manner are expressed in a shaded manner as shown in screen G12 in FIG. 21. Although it is possible to switch between the above two manners of display (flickering and highlighting) by configuring internal modes of the apparatus, detailed description thereof is omitted.) When the enter key 38 is depressed, all characters are deleted to initialize the display screen to the same text-initialized state as it was in when the apparatus was shipped from the factory (G13: the same screen as G0).

As described above, the tape printing apparatus 1 is set to the basic entry mode (H1) immediately after the power is turned on, and the initial screen displayed in the state is the screen G0 in the text-initialized state or a screen displaying characters (text) that were displayed before the power was turned off the last time (G13 or the like).

It is considered that a case in which some characters were displayed before the power was turned off the last time occurs more often than special cases where all characters displayed are deleted as described above or where the apparatus has just been shipped from the factory or before it is used. Hence, in the following description, a screen similar to the above screen G11 is shown as an example of an image that was displayed before the power was turned off the last time, and description is made assuming that key operation is started from the state of the screen (G11 or the like).

Therefore, next, the print data-reading process (S20) described above with reference to FIGS. 15 to 18 (e.g. FIG. 18 print data-reading process) will be described from the viewpoint of key operation carried out by the user and screens displayed in response to the key operation.

Referring to FIG. 22, when the user depresses the read key 36 in the state of the same screen as G21 being displayed, the print data-reading process (S20) is activated as an interrupt handling routine. Then, a message "ALL ?" prompting the user to confirm that the reading process for reading all data is to be executed is displayed, and character data or the like displayed is saved (backed up) in case of the reading process being stopped (G22). The above message was omitted in FIG. 15.

Here, when a key other than the enter key 38 and the read key 36 is depressed, the reading process is stopped to restore the stored original character data, i.e. return to the screen (G21) displayed before depressing the read key 36. Further, when the user depresses the enter key 38 or the read key 36 after confirming that the process to be executed is the reading process, a message "READING" is displayed, and at the same time the reading process described above with reference to FIG. 18 and the like is carried out. Then, after the lapse of a certain time period, that is, after all the data items are read in, it is determined at step S24 whether or not both half-size display attribute information and full-size display attribute information has been read in.

In the above example, for instance, in the case of a logical expression "half-size display disc title flag. or. half-size display music title flag=1", character data (half-size display attribute data: hereinafter referred to as "the half-size code data" for purposes of ease of intuitive understanding, Kana character codes being included in the data in the case of Japanese language-adapted type of the apparatus, as described hereinbefore) of the half-size display attribute information (here, half-size display disc title or half-size display music title) is read in. In this case, as described above, the character data (half-size code data) read in is stored in the half-size display attribute data area (second storage area) 245 in the RAM 240.

On the other hand, in the case of a logical expression "full-size display disc title flag. or. full-size display music title flag=1", character data (full-size display attribute data: hereinafter referred to as "the full-size code data" for purposes of ease of intuitive understanding) of the full-size display attribute information (full-size display disc title or full-size display music title) is read in. In this case, as described above, the character data (full-size code data) read in is stored in the full-size display attribute data area (first storage area) 246 in the RAM 240.

When only one of the full-size code data and the half-size code data has been read in (No to S24), the title of a first music piece in the read code data is displayed. For instance, if only the half-size code data has been read in, the title of a first music piece is displayed based on the half-size code data (G25). That is, in this case, character (code) data for display is stored in the text data area 242 in the RAM 240, which serves as a text data-editing area, while corresponding character (image) data is stored as dot matrix data into the display image data area 243 in the same, which serves a display image (display character image)-editing area.

Here, if the user depresses the print key 39, character (image) data corresponding to the character (code) data of the displayed code type of the disc title, music titles and so forth is similarly stored as dot matrix data into the print image data area 244 in the RAM 240, that is, into a print image (print character image)-editing area in the RAM 240, such that the character (image) data is arranged in a predetermined manner. A printing process for printing the character (image) data will be described hereinafter.

On the other hand, when the full-size code data and the half-size code data are both read in (Yes to S24), the program proceeds to a next step (S26), wherein code type selection is carried out by the user. It should be noted that an abnormal case in which neither the full-size code data nor the half-size code data is read in will be described later.

When the program proceeds to the code type selection by the user (S26), as shown in FIG. 23, a message "FULL-C ?" appears which prompts the user to effect a key entry answering the message questioning as to whether or not the full-size code data should be selected (G27). Here, when the user depresses the enter key 38, the full-size code data is selected to display the music title (full-size display music title) based on the full-size code data (G29). In short, in this case, image data corresponding to the character data of the full-size display music title is stored as dot matrix data into the display image data area 243.

Further, in the code selection, it is possible to change the display of the option "FULL-C" to the display of the option "HALF-C" for selection of the half-size code data through operation of the down arrow key 33D" (G28). Furthermore, it is also possible to operate the up arrow key 33U from the state (G28) to thereby return the display screen to the screen G27 displaying the option "FULL-C".

When the user depresses the enter key 38 in the sate of the option "HALF-C" being displayed (G28), the half-size code data is selected to display the music title (half-size display music title) based on the half-size code data (G30). In short, in this case, image data corresponding to the character data of the half-size display music title is stored as dot matrix data into the display image data area 243.

Further, when the user depresses the delete key 35 in one of the above states (G27 or G28), the character data displayed before depressing the print key 39 is restored, i.e. the display screen returns to the screen (G31: the same as G21), similarly to the case of the reading process being interrupted.

Although in the above example, the title of the first music piece is displayed as a typical screen display, this is not limitative, but a title (disc title: half-size display disc title or full-size display disc title) may be displayed in place of the title of the first music piece.

Further, although in the above example, the user depresses the read key 36 in order to read in all the data items (data items of all the music pieces), this is not limitative, but the line read key 36S may be depressed instead of the read key 36, whereby new character data corresponding to only character data on a desired line can be read in to replace the old character data with the new character data.

For instance, when the line read key 36S is depressed in the state of the title of the music number i=2 being displayed (e.g. G21), a message "LINE ?" is displayed instead of the above message "ALL ?", and then if the enter key 38 or the read key 36 (or the line read key 36S) is depressed, new character data of the music number i=2 is read in to replace the old character data with the new character data.

Further, in the state of a title (disc title) being displayed, if the line read key 36S is depressed, new character data of the title is read in similarly to the case of the music title, whereby the old character data is replaced with the new character data of the disc title. In the text-initialized state (G0 or G13) described above with reference to FIGS. 20B and 21, the cursor K is set or placed on a title line, so that when the line read key 36S is depressed, new character data of a title is read in.

It should be noted that when the read key 36 or the line read key 36S is depressed in a mode other than the basic entry mode (H1), an error message is displayed to indicate that the key is depressed in an improper edit mode, and the reading process is not carried out.

Further, if an abnormality other than the above occurs, the following processing is carried out. That is, if the reading process is carried out to eventually read in neither the half-size code data nor the full-size code data, or if there exists invalid data, or if a (remote) control communication error occurs, an error message is displayed notify the user that an error has occurred during the reading process, whereas if the read key 36 is depressed in a state where the tape printing apparatus 1 is not connected to the MD player 90, or if normal connection between the apparatus and the MD player 90 is broken during the reading process, an error message is displayed to notify the user that the apparatus is not connected to the MD player 90. In any of the above cases, the user is notified of the error and then, similarly to the case of the reading process being interrupted, and the original character data is restored to return the display screen to the screen (the same as G21) displayed before starting the present process.

Still further, when the delete key 35 is depressed during the reading process, the user is notified that the reading process is interrupted, and then the display screen returns to the screen displayed before. Further, when the power is turned off (by depressing the power key 31), an error message is displayed to notify the user that the reading process is interrupted, and then all the display and indications are turned off, and thereafter, if the power is turned on again, similarly to the case of the reading process being interrupted, the old character data having been in use is restored to return the display screen to the screen displayed before (the same as G21).

As described above, in the tape printing apparatus 1, an area for storing attribute information (character groups) read in from the MD 92 is determined based on whether or not the attribute information is full-size display attribute information (whether or not the character codes of character groups read out from a disc include a character code of a specific code group), that is, whether the attribute information is full-size code data or half-size code data. For instance, if the attribute information is full-size code data, it is stored in the full-size display attribute data area (first storage area) 246, whereas if it is half-size code data, it is stored in the half-size display attribute data area (second storage area) 245.

Therefore, at the following steps, it is only required that character data is read out from one of the areas 245 and 246, and there is no need to determine whether the read character data is half-size code data or full-size code data.

Further, this makes it possible to program the process such that the process branches according to the result of the above area determination, thereby enhancing processing efficiency, such as average processing speed, and processing capability of the apparatus.

For instance, full-size code data includes character codes of Kanji letters in the case of the Japanese language-adapted type of the tape printing apparatus 1, and hence, it is possible to easily view or recognize a title (disc title), music titles or the like as well as easily display and print the same as a compact image, since Kanji letters are included therein. This makes it easy to print music titles of more music pieces on a main label LM, and add additional information, such as artists' names and the like, to the attribute information. Further, in the JIS code system for use with the MD system, for instance, simple figures, symbols and the like are encoded similarly to general characters. These figures and symbols are basically processed as full-size display characters similarly to Kanji letters. Since the apparatus according to the present embodiments is capable of processing the full-size code data, that is, characters including full-size display characters, such figures and symbols can be included in displayed images and printed images, whereby it is possible to display or print more diversified and attractive images.

On the other hand, in the case of half-size code data, display characters are uniformly half-size display characters, and hence it is possible to omit processes of determining whether characters are of full size or of half size to determine display areas and printing areas therefor. That is, the process may be programmed to branch according to the result of the above storage area determination dependent on the code type, whereby when half-size code data is to be processed, part of steps required for processing full-size code data can be omitted, which results in the increased processing efficiency.

Further, as described above, the MD 92 has the storage area for storing data of half size characters (half-size code data storage area) and the storage area for storing data of full-size characters (full-size code data storage area) defined separately from each other in view of the difference in the above data processing.

Further, since half-size code data and full-size code data are sent in succession in response to a single request signal, it is determined that data of characters sent from the half-size code data storage area is half-size code data and data of characters sent from the full-size code data storage area is full-size code data, whereby it is possible to simplify a code type-determining process. This enables groups of characters sent from the two storage areas in the MD 92 to be easily stored in respective storage areas in the RAM 240, i.e., in the half-size display attribute data area (second storage area) 245 and the full-size display attribute data area (first storage area) 246, respectively, in a discriminating manner thereby enhancing the processing efficiency.

Further, in the tape printing apparatus 1, when character groups have been stored in only one of the full-size display attribute data area (first storage area) 246 and the half-size display attribute data area (second storage area) 245, i.e. when only one of the full-size code data and the half-size code data has been read in, character image data corresponding to the character groups (character data of the music titles, for instance) represented by the code data read in is stored as dot matrix data into the display image data area 243 in the RAM 240, which is the display image (display character image)-editing area, and the stored character (image) data is displayed (processed). On the other hand, when character groups are stored in both of the first storage area 246 and the second storage area 245, that is, when the full-size code data and the half-size code data have been both read in, the program proceeds to the next step, wherein the code type selection by the user is carried out. Then, character image data corresponding to the character groups of the selected code type is stored as dot matrix data into the display image data area 243, and the stored character (image) data is displayed (processed) as data for display (processing).

Further, if the user depresses the print key 39, image data corresponding to characters of the same code type as that of the above character (image) data displayed is stored as dot matrix data into the print image data area 244 as the print image (print character image)-editing area in the RAM 240, such that the image data is arranged in a predetermined manner. Then, the stored character (image) data is printed (processed) as data for printing (processing). Although in the above display process and printing process, characters are stored into the corresponding editing area as image data in dot-matrix form, this is not limitative but, for instance, in a process for transmitting data to another device at a subsequent step, e.g., in a communication process, character codes (text codes) are stored as they are, into an editing area for the communication process (for instance, into the text data area 242 provided for a general editing process).

As described above, according to the tape printing apparatus 1, when only one of the full-size code data and the half-size code data is read in (stored) as well as when the, full-size code data and the half-size code data are both read in (stored), character data stored in an editing area can be processed as data for display, printing or the like, without any problems. This makes it possible to read out attribute information (character groups) stored in the MD (disc) 92 for processing, regardless of whether or not the attribute information is full-size display attribute information (i.e. whether or not a character represented by a character code of a particular code group or system is included in the attribute information).

Further, even when both of the two types of code data are read in (stored), only one of them can be selected for processing, so that the processing efficiency is prevented from being degraded from the prior art. Furthermore, in the above example, the user can select his desired code type, so that the user's intention can be faithfully reflected on the following processes.

Moreover, the tape printing apparatus 1 may be configured such that one of the full-size code data and the half-size code data, for instance, the full-size code data which enables more attractive labels to be formed is selected not arbitrarily by the user but by default. Alternatively, the apparatus may be configured such that it is capable of carrying out both arbitrary selection and default selection, and, only when arbitrary selection is not carried out, a predetermined code or a code arbitrarily selected in the immediately preceding occasion is selected by default.

Now, in general, in a character printing device for printing character groups each including one or more characters, it is checked before printing by using a display device thereof or the like, how many printing areas of a predetermined size are required (for instance, how many pages are required, assuming that one printing area of the predetermined size is equivalent to one page) for printing the character groups (groups of character images corresponding to respective character codes) desired to be printed. Thereafter, printing operation is carried out. Otherwise, if there is not sufficient time before printing, for instance, the check is carried out after printing.

However, there has not been proposed a character printing device, which, when the size of a printable area is fixed due to a predetermined limit set to the number of characters, the number of lines or the number of pages, for printing, directly designates such a limit and extracts part of character groups for printing such that the extracted part is adapted to the printable area of the limited size. Still less proposed is a character printing device which notifies the user of the existence of an unprinted portion of the character groups.

For instance, in a word processor or the like, the number of pages is eventually designated by designating a print starting page and a print ending page. However, the limit of the number of pages is not directly designated, and hence there is no means to tell whether or not the user intended to print all the desired character groups in pages up to the print ending page. Therefore, if all the character groups cannot be printed within the limited number of pages, it is impossible to print a message notifying the user of the fact. To print such a message, the user himself is required to carry out the check via the display screen and enter characters notifying the fact. The same applies to a tape printing apparatus or the like, which does not print on a predetermined size of a printing area, but requires the user to set a size thereof e.g. by setting a fixed length.

As an improvement over the conventional printing apparatus, in the tape printing apparatus 1 according to the invention, it is possible to directly designate a print size equal to an integral multiple of a reference size and extract character groups adapted to the printing area of the print size, for printing. Further, if all of the character groups cannot be printed within the designated print size, characters for notifying the user of the fact can be added for printing. In the following, this novel printing capability will be described in further detail with reference to FIGS. 24 to 27B.

As shown in FIG. 24, when the user depresses the print key 39 in the basic entry mode, e.g., in the state of the same screen as described above (G11, G21, G31) being displayed (G419), the printing process is activated as an interrupt handling routine to display, first of all, a screen of menu options of print sizes, more specifically, a selection screen for selecting a type of label to be printed. By default, an option selected in the immediately preceding occasion (in the illustrated example, "DISC", for instance) is first displayed (G42).

In this state, the user can sequentially display other options by operating the cursor key 33 (33U, 33D, 33L and 33R) (G42 to G44). For instance, when the down arrow key 33D or the right arrow key 33R is repeatedly depressed, the options are sequentially displayed in the order of "DISC"→"CASE"→"SIDE"→"DISC". Similarly, when the up arrow key 33U or the left arrow key 33L is repeatedly depressed, the options are sequentially displayed in the order of "DISC"→"SIDE"→"CASE"→"DISC".

Actually, in addition to the above options, there is provided an option for "normal tape" for designating a printing area on a tape T without half-die-cut labels formed thereon. When the option for "normal tape" is selected, the width of the tape T is determined from the type of tape T detected by the above-mentioned tape-discriminating sensor 141 (see FIG. 2) and a print image adapted to a printing area having a print width equal to the width of the tape T (or printing area formed by eliminating predetermined lateral margins from the tape T) can be produced. However, this option is not related to the invention, so that description thereof is omitted. Hereinafter, only a process for selecting the above-mentioned options for producing labels and subsequent processes will be described.

When the delete key 35 is depressed in a state (G42 to G44) where any of the options of the FIG. 24 print sizes (types of labels, i.e. label sizes) is displayed, the printing process is stopped, followed by returning to the preceding screen in the basic entry mode. (G41). On the other hand, when the user depresses the enter key 38, it is determined at step S45 whether or not print data (print image data for printing) is available.

When the print key 39 is depressed in the text-initialized state (G0) described above with reference to FIG. 20B, or in a state where there is no available character (code) data of a disc title (title) and music titles, and at the same time the option "DISC" or "CASE" has been selected, or in a state where the character (code) data of music titles and the like is available but that of a disc title (title) is not available, and at the same time the option "SIDE" has been selected, the program cannot proceed to a print data-forming process or the like (No to S45), even if the print size selection is completed. Hence, an error message is displayed to notify the user that there is no available data (S46) and then, the display screen returns to the basic entry mode after the lapse of a predetermined time period, that is, to the screen displayed before the print key 39 was depressed.

On the other hand, when character data is available (Yes to S45), next, as shown in FIG. 25, a print-confirming process is carried out to display a confirmation message "PRINT?" (S47: see FIG. 26). When the enter key 38 is depressed in this state, next, an "IN PREP" (in preparation) display process for displaying a message "IN PREP" is carried out (S48). If one of the other keys is depressed, the display screen returns to the basic entry mode (G51: the same as G41).

Next, in the in-preparation display process (S48), a print data-forming process (S481), a label-positioning process (S482), and a process (S483) for determining whether or not detection (that is, a detected tape position or the like) is normal (described hereinafter in detail) are mainly carried out in the state of the message "IN PREP" being displayed (S480: see FIG. 26). In the course of executing these processes, if the power key 31 or the delete key 35 is depressed, or if it is detected (by lid opening/closing sensor 142) that the lid 21 is open, an error message is displayed to notify the user of the fact and then, the printing process is interrupted at step S52, followed by returning to the basic entry mode (G51).

Further, if the tape cartridge 5 is not mounted, if the tape cartridge 5 mounted is different from the selected one (that is, the tape cartridge 5 mounted is not of the type formed with selected labels), or if the reference hole TH detected tells that the tape position is abnormal (No to S483), a "CHANGE LABEL" display process for displaying an error message to advise the user to change labels (i.e. to mount a tape cartridge 5 holding a tape T corresponding to selected label) is carried out, followed by returning to the preceding screen in the basic entry mode (S51).

On the other hand, when the in-preparation display process (S48) is normally terminated, next, a during-printing display process (S50) is executed. In the during-printing display process (S50), printing operation is mainly carried out (S502), in a state of a message being displayed to notify the user that the printing process is being carried out. After that, the display screen returns to the basic entry mode. In this process (S50) as well, during execution of these steps, if the power key 31 or the delete key 35 is depressed, or if it is detected that the lid 21 is open, an error message is displayed to notify the user of the fact and then, the printing process is stopped (S52), followed by returning to the basic entry mode (S51).

By executing the above printing process, it is possible to print a print image adapted to the type of a label (i.e. label size) selected for a print size, in a printing area on a half-die-cut label formed on the tape. T mounted, and thereby form a desired one of various labels described hereinabove with reference to FIGS. 5A to 5C.

Now, the in-preparation display process (S48) and the during-printing display process (S50) will be described in more detail.

Referring to FIG. 26, in the print-confirming process, when the enter key 38 or the print key 39 is depressed in the state of the confirmation message "PRINT ?" being displayed (S47) to start the in-preparation display process (S48), the message "IN PREP" is displayed (S480). In this state, first, the print data-forming process (S481) is carried out.

In the print data-forming process (S481), first, it is determined at S4811 whether or not the option "DISC" or "CASE" is selected. When either of them is selected (Yes to S4811), it is determined based on the result of the detection by the tape-discriminating sensor 141 whether or not a tape cartridge 5 holding a tape T for making main labels LM is mounted(S4812). If it is not mounted (No to S4812), as described above, next, the message "CHANGE LABEL" is displayed (S49).

On the other hand, if neither the option "DISC" nor "CASE" is selected as a label to be produced, that is, when a side label is selected (No to S4811), or when the option "DISC" or "CASE" is selected (Yes to S4811), and at the same time when the tape cartridge 5 holding the tape T for making the same is mounted (Yes to S4812), next, a print image-forming process (S4813) is carried out.

As described above, in the text data area 242 in the RAM 240 is stored character (code) data of characters including ones displayed in the basic entry mode (G41 in FIG. 24, for instance), so that in the print image-forming process (S4813), character (image) data corresponding to character (code) data of a disc title, music titles, etc. stored in the text data area 242 (i.e. corresponding to data for display on the display screen in the basic entry mode) is formed as dot matrix data and stored in the print image data area 244 in the RAM 240 such that the image data is arranged in a predetermined manner. Thus, the character (code) data is formed into a print image (print image data).

After the print image-forming process (S4813) is terminated and accordingly the print data-forming process (S481) is terminated, the label-positioning process (S482) is carried out. In this process (S482), first, a printing position in a vertical direction (in the direction of the width of the tape T) is adjusted (S4821). Then, presence or absence of a side label is detected (it is detected whether or not a tape cartridge 5 holding a tape T for making side labels LS is mounted), and a printing position in a horizontal direction (in the direction of the length of the tape T) is adjusted (S4822).

After terminating the label-positioning process (S482), it is determined at step S483 whether or not the detection (i.e. detected tape position) is normal, to terminate the in-preparation display process (S48). If the detection is normal (Yes to S483), the during-printing display process (S50) is carried out. The vertical printing position adjustment (S4821), the side label presence/absence detection & horizontal printing position adjustment (S4822), and the determination of whether or not the detection (i.e. detected tape position) is normal (S483) will be described hereinafter.

In the during-printing display process (S50), a message is displayed for notifying the user that printing operation is being carried out (S501), and in the state of the message being displayed, next, the printing operation is carried out (S502). After printing, a predetermined post printing tape feed is executed (S503) and then, it is determined at step S504 whether or not a case label is designated (that is, the option "CASE" is selected), at the same time a first label has been printed, and at the same time data of a second label is available. That is, it is determined whether or not the conditions of the case label being designated & printing of the first label being completed & second label data being available are fulfilled. If these conditions are not fulfilled (No to S504), the display screen returns to the basic entry mode.

If the above conditions are fulfilled (Yes to S504), to form (print) the second main label LM, the print image-forming process (S4813) up to the post printing tape feed process (S503) are similarly carried out. Once these processes are carried out, the same conditions are not fulfilled on the following occasion of the determination step, and hence the display screen returns to the basic entry mode.

It should be noted that as to the vertical printing position adjustment (S4821), if the settings of the vertical printing position are changed by a method described hereinbelow, and then once adjusted, there is no need to adjust the same, until they are further changed. At the step S4821, therefore, it is only required to check by using flags or the like if the printing position has already been adjusted. Similarly, as to the side label presence/absence detection (part of S4822) as well, if only detection of the opening and closing of the lid 21 by the lid opening/closing sensor 142 is once carried out, it is only required to check by using flags or the like if the detection has already been executed (when the side label presence/absence detection is described hereinafter, this checking process is included in a subroutine for carrying out the detection process).

Next, the meaning of the above determination as to the conditions of the case label being designated & printing of the first label being completed & second label data being available will be described based on examples. In the FIG. 5A example, the disc label is shown, whereas in the FIG. 5B example, the case label formed by adding artist's names to the FIG. 5A example is shown. However, since it is difficult to directly compare these examples with each other, in the following description, comparison will be made based on other examples.

Let it be assumed that in the configuration of editing (character decoration or the like) at a given time point, and in a state where it is possible to print eleven characters (of each title (title or music title)) exclusive of a music number and a delimiter per line, and it is possible to print twenty lines per label (page), if all the titles, music numbers and music titles are desired to be printed based on character (code) data read out from the MD 92, a print image (print image data) is produced, as shown in FIG. 27A.

More specifically, let it be assumed, for instance, that in the text data area 242, there is stored sufficient character data for forming a print image, which includes a title and the music numbers and music titles of a total of 45 music pieces (that is, up to "45. A45B . . . "), more specifically, in which there are arranged a title (here, provisionally represented by "☆TITLE") formed of one line on a 1st line; a music number "1" with a delimiter "•" and the title (similarly, provisionally represented by "A1B1C1D1E1F1G1") of this music number on 2nd to 3rd lines; a music number with the delimiter "2." and the music title "A2B2C2" of this number on a 4th line; "3. A3B3C3D3E3F3G" on 5th to 6th lines; "4. A4B4C4D4E4F" on a 7th line; . . . , "11. A11B11C11D1" on a 19th line; "12. A12B12C12D12E12F12" on 20th to 21st lines; "13. A13B12C13D13E13" on 22nd to 23rd lines; "14. A14B14C14" on a 24th line; and so forth.

When the print key 39 is depressed in the above state to start the printing process and select, a case label, the print image (data) is laid out to the 20th line for printing on the first main label LM. At this time point, the conditions of the case label being designated & printing of the first label being completed & second label data being available are fulfilled (Yes to S504), and hence, next, the 21st to 39th lines of the print image (data) are laid out on the second main label LM, and at the same time notification characters saying that other music pieces are omitted ("XX OTHER TITLES" in which XX represent a numerical value in the case of the examples illustrated in FIGS. 5A and 5B) are added to the last line (40th line) for printing the same. At this time point, the conditions of the case label being designated & printing of the first label being completed & second label data being available are no longer fulfilled (No to S504), and hence the printing process is terminated, followed by returning to the basic entry mode.

In the above case, sine the title of the 12th music piece is laid out on the 20th to 21st lines, the second line extends beyond the boundary of the page. Although according to the tape printing apparatus 1, in such a case, actually, the 20th line is set to an empty line to print the 12th music piece on the 21st to 22nd lines, the present description is made without taking the processing into account.

Further, the notification characters saying that other music pieces are omitted, which are inserted onto the last line, may be "A TOTAL OF XX TITLES" ("A TOTAL OF 45 TITLES" in the above examples) in place of the notification characters "XX OTHER TITLES" employed in the FIGS. 5A and 5B examples. That is, in the case of "A TOTAL OF XX TITLES", the number or count of music pieces printed (equal to the last music number printed) can be grasped, so that if it is understood from the notification characters that the print image includes e.g. a total of 45 titles, it is possible to comprehend that there are music titles unprinted (the printing of the same was omitted) and grasp or calculate the number of music pieces omitted. In short, the notification characters "A TOTAL OF XX TITLES" is also the notification saying that other music pieces are omitted.

Furthermore, also when the printing of music titles is not omitted, the notifications of "XX OTHER TITLES" and "A TOTAL OF XX TITLES" added can serve as notification characters saying that no music titles are omitted, and hence are useful and convenient. However, when the number or count of the music pieces is a total of 10, for instance, if information of all the music pieces can be printed, a notification "A TITAL OF 10 TITLES" is neater in appearance than a notification "0 OTHER TITLES". Hence, in the following, description will be made by using the notification characters "A TOTAL OF XX TITLES".

If the total number or count of music titles is equal to 10, i.e. if sufficient character data is stored in the text data area 242, for forming a print image up to the 18th line of the illustrated example, that is, a print image including the title and the music numbers and music titles of a total of ten music pieces up to "10. A10B10C10D10E10F1", all the character data items are laid out on the first main label LM, and the second main label LM becomes blank.

Further, when the option "DISC" is selected in the above sate where the sufficient character data for forming the print image comprised of the title, the music numbers and music titles of a total of 45 music pieces, since the disc label LMD has a printing area equal to that of the main label LM, character data up to "11. A11B11C11D1", i.e. the music number and music title on the 19th line is laid out, as shown in FIG. 27B, and a print image having the notification characters "A TOTAL OF 45 TITLES" added on the last 20th line is printed.

As described above, according to the tape printing apparatus 1, by selecting either of the options "DISC" and "CASE" (selecting a print size from a reference size and one or more kinds of enlarged sizes), it is possible to directly designate a print size equal to an integral multiple of the label size (reference size) of the disc label (when the option "DISC" is selected, the print size thereof is one time as large as the size thereof, whereas when the option "CASE" is selected, the print size thereof is two times as large as the size of the disc label).

This makes it possible to allocate predetermined but different part(s) of character groups to a main label when the option "DISC" is selected, and to first and second main labels (one or more divisional printing areas formed by dividing a printing area of a selected print size by the reference size) when the option "CASE" is selected, respectively, to thereby create print images corresponding to the laid-out portion(s) of the character groups for printing the same on a print material. In short, it is possible to directly designate a print size equal to an integral multiple of the reference size to extract character groups adapted to the printing area (each label) having the print size for printing.

Further, in the tape printing apparatus 1, character groups are laid out in the printing area of a selected label size (print size), and when all of the character groups cannot be printed in the printing area, notification characters notifying the user of the fact are added to the character groups. That is, since a print size equal to an integral multiple of a reference size can be directly designated, it is possible to determine whether or not all of the character groups (character images corresponding to respective character codes of characters of the character groups) can be printed within the designated print size. As a result, if it is determined that all of the character groups cannot be printed, it is possible to print part thereof together with notification characters notifying the user of the fact.

It should be noted that in the above embodiment, the notification characters for printing may be added to the character groups as character codes, thereafter collectively converting the same and the character groups into an image (data) in dot matrix form, or alternatively the notification characters may be converted to an image (data) separately from the character groups, thereafter adding the image (image data) to the image (data) of the character groups. Further, when it is determined that the all of the character groups can be printed, whether or not the notification characters for notifying the user of the fact should be added to the character groups can be selected by the user as he desires. Furthermore, it is possible to devise notification characters which can be commonly used for notifying that the all of the character groups cannot be printed, as well as for notifying that the same can be printed, and it is convenient to employ such notification characters for common use.

Further, in the tape printing apparatus 1, basically, a label size (print size) can be arbitrarily selected by the user, while it is possible to detect the type of a tape (print material) T mounted in the apparatus 1, that is, the type of a half-die-cut label formed on the tape T, so that when the type of a label on the tape T does not agree with that of a label selected by the user, an error message notifying the user of the fact is displayed to prompt the user to change the tape having the label. This permits selection of a label size (print size), which is adapted to both the user's intention and the type of the tape (print material) T.

Although the above description is mainly made of a disc label and a case label, that is, two types of labels each having a print size equal to an integral multiple of a reference size (i.e. label size of the disc label; the disc label has a print size one time as large as the reference size, whereas the case label has a print size two times as large as the reference size), this is not limitative, but according to the tape printing apparatus 1, it is possible to select a side label as well.

In other words, in the tape printing apparatus 1, character groups stored in the MD (disc) 92 are read out and at the same time any of label sizes (print sizes) is selected regardless of the integral multiple of the reference size or the like, whereby it is possible to extract part or whole of the character groups adapted to the selected print size and create a print image therefrom for printing. That is, by selecting any of several kinds of print sizes, character groups adapted to the selected print size can be extracted for printing.

Next, description is made of the tape printing apparatus 1 regarded as an image-forming apparatus which converts each character (code) of a character string including one or more characters into a character image based on a predetermined font data, and forms an image having the resulting character images properly arranged therein.

In general, in order to display or print an image of a character string including one or more characters, font data corresponding to text (code) data of each character of the character string is read out from the ROM or the like storing known font data, or dot matrix data registered by nonstandard character registration or image registration is read out from the RAM or the like (hereinafter the known font or the registered dot matrix is simply referred to as "the predetermined fonts"), and based on the predetermined font data, a character image is formed and arranged in a predetermined image-forming area, whereby display image data or print image data representative of the image of the character string is produced.

In a word processor or the like, an edit screen adjusted to a set or determined size of one page is displayed, and registered text data is read into the range of the edit screen, or new characters are input thereto via the keyboard to permit editing of the text data or the characters input thereto. That is, an image of characters (character image) corresponding to the text data of character strings is formed as dot matrix data and arranged in a display image-forming area of a predetermined size, to display a display image thus formed. Further, after the edit process is terminated, by carrying out a key entry to instruct printing operation, a print image which is the same image as displayed on the screen is printed. That is, a character image corresponding to the text data of the character strings is formed as dot matrix data arranged in a print image area of the predetermined size, and the thus formed print image is printed.

In the above cases, for instance, when arbitrary new line-starting codes, which can be inserted into the text (code) data of character strings as desired, are contained, lines of the character strings are determined or defined by these arbitrary new line-starting codes. However, when the length (number of characters or the like) of a character string on a line up to the arbitrary new line-starting code, is larger than the length (horizontal size in horizontal writing, for instance) of each line set as a horizontal size of the image-forming area for the character strings, automatic start of a new line is carried out at the position of a character corresponding to the end of the predetermined horizontal size of the image-forming area. Of course, if there is not included an arbitrary new line-starting code in the text data, the automatic start of a new line is carried out on each line at a character position corresponding to the end of the set horizontal size of the image-forming area.

The same applies to lines. For instance, when arbitrary page break codes, which can be inserted into the text (code) data of character strings as desired, are contained, the number of lines (line count) in each page is determined or defined according to the arbitrary page break codes. However, when the number of lines up to the arbitrary page break code is larger than the number of lines set as the size of the image forming area for the character strings, automatic page break is carried out at the position of a line count corresponding to the end of the predetermined vertical size of the image-forming area. Needless to say, if there is not included an arbitrary page break code in the text data, the automatic page break is carried out for all of the text data at the position of each line count corresponding to the lower end of the set vertical size of the image-forming area.

However, there has not been proposed a device for forming an image which can meet needs for displaying or printing the summary of contents representative of all the character strings, within one predetermined line, a predetermined number of lines, or a predetermined number of pages, even by omitting part of the contents. In other words, there has not been proposed a device, for instance, which is capable of arranging within each line not only a line number or an information number but also at least an essential portion (e.g. a predetermined number of characters from the head) of a character string or character strings corresponding to the line number or the information number, and arranging such lines for display or printing. Furthermore, there has not been proposed a device which is capable of arranging at least an essential portion (e.g. a plurality of lines from the head of character strings) within a predetermined number of lines or pages, and displaying or printing an image representative of all the contents of the character strings within the predetermined number of lines or pages.

In view of these circumstances, the tape printing apparatus 1 according to the embodiment is configured such that, if a line of a character string has characters in excess of a predetermined number of characters, the excessive characters of the character string are omitted, or if a text comprised of a plurality of lines of character strings has lines in excess of a predetermined number of lines, the excessive lines are omitted. When characters or lines are omitted, the apparatus 1 is further capable of producing an elided image by adding an image that notifies the user of the omission to the image of remaining characters or lines. In the following, an elided image-forming process for forming such as elided image will be described in detail with reference to FIGS. 27A to 28B, etc.

First, in the tape printing apparatus 1, it is possible to produce an elided image which is suitable for arranging on each line a corresponding information number (in this embodiment, music number) and essential element (predetermined number of characters from the head) of a character string corresponding to the information number (music number), and arranging such lines for display or printing.

Here, as described above with reference to FIG. 27A, let it be assumed that the text data area 242 stores sufficient character (code) data for forming a print image comprised of a title (which may be regarded as the title of music number 0 (representative of all music pieces)) and the music numbers and music titles of a total of 45 music pieces.

In the tape printing apparatus 1, various functions can be set (see FIG. 19), including a function to set a "automatic new line-starting format". The automatic new line-starting format is initially set or configured to "NL-ON" (automatic new line start-ON format), whereby in this state or setting, if the option "DISC" is selected, for instance, a print image corresponding to the above mentioned character codes, such as the print image described above with reference to FIG. 27B, is produced for printing.

In a state where this initial setting is maintained, for instance, as shown in FIG. 29, a music title (in the example illustrated in the figure, the music title "Someday" of the music number "2") is displayed on the display screen 41 (see FIGS. 2 and 9) in the basic entry mode, and indicators 4i01 and 4i11 (see FIGS. 9 and 10) are lighted (displayed), which indicate the settings of "new line-starting formats" for continuing a title and each music title by starting a new line ("TITLE NL-START" and "MUSIC NL-START") (G61: G41 in FIG. 24 also shows the same state).

In the above state (G61), when the above-mentioned character codes are available, and at the same time when the option "DISC" is selected, a print image, such as the FIG. 27B print image, is produced. If the user depresses the format key 34FS from this state, as shown in FIG. 29, a configuration screen for setting the "automatic new line-starting format" can be displayed in the function-selecting/setting mode.

When the format key 34FS is depressed, the tape printing apparatus 1 first displays the present setting in the function-selecting/setting mode, that is, in the above example, the "NL-ON" (automatic new line start-ON format) (G62).

When the cursor key 33 is operated in this state (G62), the option "NL-ON" for activating the automatic new line-starting format and an option "NL-OFF" for inactivating the automatic new line-starting format are displayed, alternately. When the delete key 35 is depressed in these states (G62 to G63), the display screen returns to the basic entry mode (G61).

After displaying a desired one of the options "NL-ON" and "NL-OFF" (in the illustrated example, "NL-OFF" is displayed) (G63), by depressing the enter key 38, the desired one (here, "NL-OFF" (automatic new line start-OFF format)) can be set. That is, for instance, when the enter key 38 is depressed in the state of the option "NL-OFF" being displayed, the tape printing apparatus 1 sets the "automatic new line-starting format" to the updated state of the "automatic new line-staring format-OFF", followed by returning to the display screen in the basic entry mode (G64).

In this case, the character display block 4c (see FIG. 9) returns to the screen in the basic entry mode (to display the music title "Someday" of the music number "2"), while as to the indicators 4i01 and 4i11 the indicator 4i11 for indicating the setting of the automatic new line-starting format (MUSIC NL-START) for continuing each music title by starting a new (continued) line is turned off, but the indicator 4i01 for indicating the setting of the format (TITLE NL-START) for continuing a title by starting a new (continued) line remains lighted. In short, the setting of the MUSIC NL-START is canceled (G64).

It should be noted that in the basic entry mode, after the user causing the title (disc title) to be displayed (in the state of. "D" being displayed in the sub-display block), by depressing the format key 34FS and operating keys as described above, the user can cancel the setting of the automatic new line-starting format for the title (TITLE NL-START). In this case, the indicator 4i01 is turned off. Of course, by operating keys similarly to the above to display the option "NL-ON" and depressing the enter key 38 (in the state of G62, for instance), the automatic new line-starting formats for the title and music titles can be configured again.

According to the tape printing apparatus 1, in the state of the option "NL-OFF" being displayed (in the illustrated example, the "NL-OFF" for music titles), and at the same time in a state where the sufficient character (code) data for forming a print image comprised of a title (which is regarded as the title of music number 0 (representative of all music pieces)) and the music numbers and music titles of a total of 45 music pieces is available (stored in the text data area 242), if the option "DISC" is selected, a print image (print image data), such as the FIG. 28A print image, is produced, whereas if the option "CASE" is selected in the same state as described above, a print image (print image data), such as the FIG. 28B print image, is formed.

In the following, the print image-forming process carried out e.g. in the above case of the option "DISC" being selected will be described with reference to FIG. 28A. Actually, for purposes of edit and checking, a display image (text data for producing the display image) is first formed (this display image-forming process will be described later) and then, a print image for printing is created by using (the text data for) the formed display image. However, in order to understand the meaning of the display image, description is first made of the print image-forming process, more particularly, of the concept or idea thereof, in disregard for the processing order.

As described hereinbefore with reference to FIGS. 27A and 27B, first, the text data of a character string (basic character string having one or more lines of character strings each including one or more characters) for processing is stored. In the FIG. 27A example, the text data area 242 stores the sufficient character (code) data for forming the print image comprised of the title (music number 0 (representative of all music pieces)) and the music numbers and music titles of a total of 45 music pieces.

Next, it is determined whether or not the number of the characters of each line is larger than a predetermined character count. In the illustrated example, the predetermined character count is assumed to be set to eleven (exclusive of characters for music numbers) as shown in FIGS. 27A and 27B.

It should be noted that generally the size of an image-forming area or the like is calculated by dots (hereinafter referred to as "dot size"), so that what we call herein the predetermined character count is the number of characters arranged on each line of the basic character string, assuming that each character has a size of the present setting. More specifically, it is the count or number of characters each assumed to have a size of the present setting and be arranged such that the sum total of dot numbers is adapted to the horizontal dot size of the edit image area. Therefore, if the dot size of each character is changed according to whether the character is of full-size or of half-size, enlarged or reduced in size or the like, or according to kinds of character decoration (for instance, outline (hollow), italic, etc.), the predetermined character count is also changed.

In the above example, the number of the characters of the title "☆TITLE" (corresponding to the title of music number "0": formed by seven characters including a first space forward of the symbol ☆) on the first line is smaller than the predetermined character count (11), and hence the title is arranged on one line, regardless of whether or not the automatic new line-starting format of the title is set or ON, but, for instance, when the title is "☆TITLEtitle" (formed by 12 characters including the first space), if the TITLE NL-START is set, that is, if the "NL-ON" (automatic new line start-ON format) is set for the title, a print image is formed such that when it is printed, the line is continued by starting a new line after printing the characters "☆TITLEtit1" to print the last character "e" on the second line.

On the other hand, for instance, in the case of the characters "☆TITLEtitle" (formed by 12 characters) being the title, if the TITLE NL-START is not set, that is, if the "NL-OFF" (automatic new line start-OFF format) is set for the title, it is determined that the number of characters of the title exceeds eleven (the predetermined count). Then, the number of characters of a character omission-notifying character string (here, assumed to be formed of one character or symbol "•••" for instance) for notifying the user of omission of one or more characters from the line is subtracted from the above predetermined character count (11), and based on a predetermined post-omission character count (10) calculated by the subtraction, an elided character string "☆TITLEtit" is formed in which characters in excess of the post-omission character count (10) are omitted from the line (here, the line for the title) of the basic character strings.

Then, the character omission-notifying character string "•••" (formed by one character or symbol in this case) is added to the elided character string "☆TITLEtit" to thereby form an elided basic character string "☆TITLEtit•••". In the illustrated example, however, the title is "☆TITLE" (seven characters) as described above, and hence the character string "☆TITLE" as a basic character string is set to the first line of the elided basic character strings (see line number "1" in FIG. 28A).

Next, the music title on the second line of the text data, that is, the music title of information number (music number) "1" is "A1B1C1D1E1F1G1" (14 characters), so that if the MUSIC NL-START is set, that is, if the automatic new line-starting format is set for each music title (automatic new line start-ON format), a print image is formed such that the line is continued by starting a new line after printing the characters "A1B1C1D1E1F" to print the characters "1G1" on the next line (see FIG. 27A or 27B).

However, in the present case, the MUSIC NL-START is not set, that is, the "NL-OFF" is set for music titles, so that it is determined that the number of characters of the music title exceeds eleven, and the number (one) characters of the character omission-notifying character string ("•••") is subtracted from the predetermined character count (11), and based on the predetermined post-omission character count (10), the second line "A1B1C1D1E1" as an elided character string is formed, in which characters in excess of the post-omission character count (10) are omitted from the line (of music number 1) of the basic character strings. Then, the character omission-notifying character string ("•••") is added to the second line "A1B1C1D1E1" as the elided character string to form the second line "A1B1C1D1E1•••" (line number "2" shown in FIG. 28A: see music number "1") of the elided basic character strings.

Next, the next music title on the third line of the text data, that is, the music title of information number (music number) "2" is "A2B2C2" (six characters), so that the music title is formed in one line, regardless of whether or not the MUSIC NL-START is set, that is, whether or not the automatic new line-starting format is set for music titles. Therefore, the character string "A2B2C2" as a basic character string is set to the third line (line number "3" shown in FIG. 28A: see music number "2") of the elided basic character strings.

Next, the music title on the fourth line of the text data, that is, the music title of information number (music number) "3" is "A3B3C3D3E3F3G" (thirteen characters), so that if the MUSIC NL-START is set, a print image is produced such that the line is continued by starting a new line after printing the characters "A3B3C3D3E3F" to print the characters "3G" on the next line (see FIG. 27A or 27B). However, since the "NL-OFF" for music titles is set here, it is determined that the number of characters of the music title exceeds 11 characters, and the number (one) characters of the character omission-notifying character string ("•••") is subtracted from the predetermined character count (11), and based on the predetermined post-omission character count (10), the fourth line "A3B3C3D3E3" an elided character string is formed in which characters in excess of the post-omission character count (10) are omitted from the line for music number 3 of the basic character strings. Then, the character omission-notifying character string ("•••") is added to the fourth line "A3B3C3D3E3" as the elided character string to form the fourth line "A3B3C3D3E3•••" (line number "4" in FIG. 28A: see music number "3") of the elided basic character strings.

Next, the next music title on the fifth line of the text data, that is, the music title of information number (music number) "4" is "A4B4C4D4E4F" (eleven characters), so that the music title is formed in one line, regardless of whether or not the MUSIC NL-START is set, that is, whether or not the automatic new line-starting format is set for music titles. Therefore, the character string "A4B4C4D4E4F" as a basic character string is set to the fifth line (line number "5" in FIG. 28A: see music number "4") of the elided basic character strings.

Similarly, the 19th line "A18B18C18D•••" (line number "19" in FIG. 28A: see music number "18") of the elided basic character strings is formed, and then, the above notification characters saying that lines are omitted, that is, the line omission-notifying character string "A TOTAL OF 45 TITLES" in the predetermined form for notifying the user of omission of lines is added to the last 20th line (see line number "20" in FIG. 28A) of the elided basic character strings, followed by terminating the process of forming the elided basic character strings.

After the elided basic character strings are formed, the tape printing apparatus 1 forms an elided image in which images of the elided basic character strings are formed as dot matrix data based on the predetermined font, and stored in a predetermined image-forming area, in which a character image having a predetermined number of characters (eleven characters per line) can be arranged, that is, in the present embodiment, the predetermined image-forming area secured in the print image data area 244 in a manner adapted to the label size of the disc label LMD.

As described above, in the tape printing apparatus 1, the text data of basic character strings having one or more lines of character strings each including one or more characters is stored, and it is determined whether or not the number of the characters of each line is larger than a predetermined character count (eleven in the above example). If it is determined that the number of characters of a line exceeds the predetermined character count, the number (one) of a character omission-notifying character string ("•••") for notifying the user of omission of one or more characters from each line is subtracted from the above predetermined character count, and based on the predetermined post-omission character count (10), elided basic character strings are formed in which characters in excess of the predetermined post-omission character count are omitted from each line of the basic character strings. Then, an elided image is formed in which images of the elided basic character strings are formed in dot matrix data based on a predetermined font into the predetermined image-forming area in which a character image having a predetermined number of characters (eleven characters) can be arranged.

In the above case, the number of characters of each elided character string, that is, the predetermined post-omission character count (10) is equal to a value obtained by subtracting the number (one) of characters of the character omission-notifying character string ("•••") from the predetermined character count (11). Hence, the number of characters of each elided basic character string, obtained by adding the character omission-notifying character string to the elided character string, is prevented from exceeding the predetermined character count.

As a result, according to the tape printing apparatus 1, in basic character strings formed of text data and each comprised of one or more characters, if each line of the basic character strings has characters exceeding in number a predetermined character count, a new character string image, in which part of each of the basic character strings is omitted and at the same time a character omission-notifying character string for notifying the user of the omission is added, is formed as dot matrix data based on a predetermined font, and the data is stored in a predetermined image-forming area in which a character image having the predetermined number or count of characters can be arranged per line, such that the data is properly arranged in the predetermined image-forming area, thereby forming an elided image.

In short, on each line of character strings, characters in excess of a predetermined character count can be omitted, and if omitted, it is possible to form an elided image having an image for notifying the user of the omission as well as the image of the remaining characters. Therefore, according to the tape printing apparatus 1, an elided image can be created which is suitable for use in arranging on each line a corresponding information number (music number) and the essential position (predetermined number of characters from the head) of a character string corresponding to the information number (music number), and arranging such lines for display or printing (see FIGS. 28A and 28B).

Although in the tape printing apparatus 1, it is possible to select whether or not the title or music title is continued by starting a new line, one of them may be employed in a fixed manner. In such a case, it is not required to provide the settings described above with reference to FIG. 29.

Further, as described hereinabove, notification characters may be added to a basic character string in the form of text data (character code(s)), thereafter converting the same together with the basic character string to image data (dot-matrix data), or alternatively as described hereinafter, the notification characters may be converted to image data separately from the basic character string, and then the image data of the character omission-notifying character string may be added to the image data of the basic character string.

More specifically, in this case, the tape printing apparatus 1 stores the text data of basic character strings which have one or more lines of character strings each including at least one character, and similarly to the above example, based on the predetermined post-omission character count, characters in excess of the predetermined post-omission character count are omitted from each line of the basic character strings, to form the image of each of the remaining characters as dot matrix data based on a predetermined font, and the data is stored in a predetermined image-forming area in which a character image having a predetermined number of characters can be arranged, thereby forming an elided character string image. Further, a character omission-notifying character string is formed as dot matrix data based on the predetermined font and the data is stored in the image-forming area to arrange the same therein, whereby the image of the character omission-notifying character string is added to the elided character string image, thereby forming an elided image.

In this case as well, similarly to the above-mentioned example, the number of the characters on each line of the character image which is formed as dot matrix data and arranged to form the elided image is prevented from exceeding the predetermined character count. Therefore, also in this case, in basic character strings formed of text data and having one or more characters, if each line of the basic character strings has characters exceeding in number a predetermined character count, a new character string image, in which part of each basic character string is omitted and at the same time the character omission-notifying character string for notifying the user of the omission is added, is formed as dot matrix data based on the predetermined font, and the data is stored in the predetermined image-forming in which a character image having a predetermined number or count of characters can be arranged, whereby the elided image can be created. In short, on each line of each character string, characters in excess of the predetermined character count can be omitted, and if omitted, an elided image including an image for notifying the user of the omission of characters can be created as well.

Although in the above example, the symbol "•••" is used as the character omission-notifying character string, this is not limitative, but a symbol, such as "••", "•", "~", "•" or the like, may be employed. Further, for instance, a character string comprised of one or a plurality of characters including one of these symbols may be used as the character omission-notifying character string. In these cases, since the character omission-notifying character string includes one or more characters of "•••", "••", "•", "~" or "•", it is possible to suitably represent omission of an image.

Further, according to the tape printing apparatus 1, it is possible to carry out editing operations, such as character insertion, character deletion, character conversion, settings of character sizes or settings of character decoration. As the result of the editing operations, if the character image of one character is changed in width or the like, resulting in a change in the number of characters arrangeable in the predetermined image-forming area, the resulting number of characters is set to the predetermined character count with reference to which an elided image is formed. This makes it possible to form an image adapted to the basic character strings formed by the editing operations.

That is, as described hereinbefore, what we call herein the predetermined character count is the number of characters arrangeable on each line of the basic character strings, assuming that each character has a size of the present setting. If the dot size of one character is changed according to whether the character is of full size or of half size, enlarged or reduced in size or the like, or according to the kind of character decoration (for instance, hollow, italic, etc.), the predetermined character count is also changed. In the tape printing apparatus 1, the character count changed according to the change in dot size is set to the predetermined character count with reference to which an elided image is formed. This makes it possible to form an image adapted to basic character strings formed by the editing operations.

Further, as described hereinbefore, according to the tape printing apparatus 1, not only characters in excess of a predetermined count (number) of characters are omitted from a line of a character string to form an elided image, but also lines in excess of a predetermined count (number) of lines are omitted from a plurality of lines of character strings. When such lines are omitted, it is possible to form an elided image including an image for notifying the user of the omission in addition to the image of the remaining lines. In other words, an elided image can be produced which is suitable e.g. for arranging an essential portion (a plurality of lines from the head of character strings) within a limit of a predetermined line count or page count to thereby display or print a representation of the whole contents of the character strings in a manner adapted to the limit of the predetermined line count or page count.

In this process, similarly to the above example, first, after storing text data of basic character strings, it is determined whether or not the number of lines of the basic character strings exceeds a predetermined number or count. In the cases of the examples illustrated in FIGS. 27B, 28A, etc. the predetermined line count for a disc label is set to twenty. Further, FIG. 28B shows an example of a case label, in which the predetermined line count is set to forty. In the following, description is made by taking the predetermine line count of twenty (for a disc label) as an example.

More specifically, in the tape printing apparatus 1, when it is determined that the number or count of lines of the basic character strings exceeds the predetermined line count (20), the number of lines (one in this example) of a line omission-notifying character string in a predetermined format (here, "A TOTAL OF XX TITLES", as described above) for notifying the user of the omission of lines is subtracted from the predetermined line count (20), and based on a predetermined post-omission line count (19), lines in excess of the predetermined post-omission line count are omitted from the basic character strings. Then, the line omission-notifying character string (a line of "A TOTAL OF XX TITLES") is added to the remaining lines to form elided basic character strings as new basic character strings. Thereafter, an elided image is formed in which images of the elided basic character strings are formed as dot matrix data based on the predetermined font and stored in the predetermined image-forming area in which a character image having a predetermined line count or number (20) of the lines can be arranged.

In the above case, the post-omission line count (19) is obtained by subtracting the number of lines (one in this example) of the line omission-notifying character string from the predetermined line count (20), so that even if the line omission-notifying character string is added, the number of lines of the elided basic character strings is prevented from exceeding the predetermined line count.

Therefore, in the tape printing apparatus 1, in a case where character strings are each formed of text data of one or more characters, and basic character strings are formed by a plurality of lines of the character strings, if the basic character strings have lines is excess of a predetermined line count, an image of new character strings, in which lines of the basic character strings are omitted and at the same time a line omission-notifying character string for notifying the user of the omission is added, is formed in dot-matrix form based on a predetermined font and stored in a predetermined image-forming area in which a predetermined number of lines can be arranged to form an elided image.

That is, lines in excess of a predetermined line count are omitted from basic character strings comprised of a plurality of lines of character strings and when they are omitted, it is possible to form an elided image constituted by an image of the remaining lines and an image of a character string for notifying the user of the omission. Therefore, according to the tape printing apparatus 1, an elided image can be produced, which is suitable e.g. for arranging an essential portion (a plurality of lines from the head of character strings) within a limit of a predetermined line count or page count to thereby display or print a representation of the whole contents of the character strings in a manner adapted to the limit of a predetermined line count or page count.

It should be noted that when lines are omitted, similarly to the case of the omission of characters from a line, character codes of notification characters (line omission-notifying character string) may be added to character codes of basic character strings, and the whole character codes can be converted to dot matrix data representative of an image including the image of a line omission-notifying character string, or alternatively as described hereinafter, the character codes of notification characters (line omission-notifying character string) may be converted to image data (dot matrix data) representative of the image of the line omission-notifying character string separately from character codes of the basic character strings, and then the image data (dot matrix data) of the line omission-notifying character string may be added to the image data (dot matrix data) of the image of the basic character strings.

In this case, the tape printing apparatus 1 stores basic character strings which have a plurality of lines of character strings each formed of text data of one or more characters, and similarly to the above example, based on the post-omission line count, lines in excess of the post-omission line count are omitted from the basic character strings, and an image (image data) of each character on the remaining lines is formed as dot matrix data based on a predetermined font and stored in the predetermined image-forming area in which data of an image having a predetermined number of lines of characters can be arranged, thereby forming an elided character string image. Further, the predetermined line omission-notifying character string is formed as dot matrix data and stored in the image-forming area based on the predetermined font, whereby the image of the line omission-notifying character string is added to the elided character string image to form an elided image. That is, in this case as well, similarly to the above-mentioned example, the number of lines of a character image formed as dot matrix data and arranged to form an elided image is prevented from exceeding the predetermined line count.

Therefore, in this embodiment as well, in a case where character strings are each formed of text data of one or more characters, and basic character strings are formed by a plurality of lines of the character strings, if the basic character strings have lines in excess of a predetermined line count, an image of new character strings, in which lines of the basic character strings are omitted and at the same time a line omission-notifying character string for notifying the user of the omission is added, is formed in dot matrix form based on a predetermined font and stored in a predetermined image-forming area in which, a predetermined count or number of lines can be arranged, to form an elided image. That is, lines in excess a predetermined line count of are omitted from basic character strings comprised of a plurality of lines of character strings and when they are omitted, it is possible to form an elided image constituted by an image of the remaining lines and an image for notifying the user of the omission.

Further, in the tape printing apparatus 1, when a plurality of lines of basic character strings include music titles of a plurality of music pieces stored in an MD (disc) 92 and some of the plurality of lines which include one or more music titles of the plurality of music pieces are omitted, characters designating the number of a total of all the music pieces stored in the MD (disc) 92 or the number of music pieces omitted are included in a line omission-notifying character string ("A TOTAL OF XX TITLES" or "XX OTHER TITLES", described above). Therefore, if the user views one of the number of all the music pieces and the number of omitted music pieces represented by the line omission-notifying character string, and the number of music pieces whose titles or the like are formed and presented as images, he can know not only the fact that there are some music pieces whose images are omitted but also the other of the number of all the music pieces and the number of omitted music pieces.

Although the tape printing apparatus 1 according to the embodiment is constructed such that a display image displayed on the display screen 41 is formed independently of a print image and the elided image described above is used as the print image for printing, it goes without saying that the above elided image may be used as the display image.

However, when an elided image as described above is formed for display or printing, once the elided image is formed, it is difficult to check modified portions of original character strings. In other words, for instance, when portions of the characters or lines of the original character strings are deleted, the range of characters or lines which can be included in a predetermined line, a predetermined number of lines or a predetermined number of pages is changed. As a result, it is required to modify locations (characters or lines) or the like which should be omitted. In this case, if the elided image alone is displayed or printed, it is impossible to grasp characters or lines omitted in the elided image (which should be restored through modification as a result of the deletion). This makes it difficult to carry out the modification of the original character strings.

On the other hand, when not an elided image but the whole of an image (whole image) is formed without omitting any positions thereof, automatic start of a new line or automatic page break or the like is carried out according to the horizontal size (the number of characters on one line) and vertical size (the number of lines) of a page set for the edit image-forming memory area for editing the whole image, as described above, which makes it difficult to grasp an original image representative of the lines of the character strings. This also makes it difficult to grasp an image representative of each line or page of an elided image to be formed later.

To eliminate such an inconvenience, the tape printing apparatus 1 is capable of forming an edit information image which enables the user to grasp character overflow positions at which characters overflow from each line, such as omission positions or new line start positions in an edit image, while reflecting thereon an original image representative of each line of character strings. The edit information image is produced before forming an edit image, such as an elided image produced by omitting portions of lines of character strings and forming dot matrix data such that the elided image becomes an image of character strings each formed of one line, or a whole image formed without omitting any part of each character string. Alternatively, the edit information image is produced separately or independently of the forming of the edit image. In the following, the edit information image will be described in detail with reference to FIGS. 27A to 32.

First of all, as shown in FIG. 30, in the tape printing apparatus 1 are defined three kinds of display-only characters exclusively used for display. The display-only characters are a line overflow mark 1 (first predetermined line overflow-notifying character string), a line overflow mark 2 (second predetermined line overflow-notifying character string), and a character overflow mark (character overflow-notifying character string), which are marks formed by using letters of "L1", "L2" and "C", respectively, as shown in the figure. Hence, hereinafter, they are also simply referred to as a "mark L1", a "mark L2" and a "mark C".

Now, the meaning and use of these three kinds of display-only characters will be described. The meaning and use of the "mark C" will be described first, and the "mark L1" and the "mark L2" will be described later.

The mark C is, so to speak, a character overflow-notifying character string indicative of an excess of the number of characters of a character string over a predetermined character count. More specifically, in the tape printing apparatus 1, character strings for processing, as described above with reference to FIGS. 27A and 27B, for, instance, are stored, and it is determined whether or not the number of characters on each line of basic character strings exceeds a predetermined character count (eleven in the above-mentioned example). If it is determined that the number of characters on the line of the basic character strings exceeds the predetermined character count (11), the mark C (character overflow-notifying character string) is inserted between a character immediately before the predetermined line count (11) is exceeded and a character immediately after the same is exceeded. Thus a display character string (edit information character string) is formed in the form of a basic character string including the mark C. Then, the display character string (edit information character string) is converted based on a predetermined font to dot matrix data which is stored in the display image data area (edit information image-forming memory area) 243 for arrangement therein, to thereby produce a display image (edit information image).

The meaning and use of the mark C is described in more detail. For instance, assuming that the text data described hereinabove with reference to FIGS. 27A and 27B is set to the basic character strings, the 11th line on the text data corresponding to the 17th and 18th lines in FIG. 27A is formed by character codes representative of the music title "A10B10C10D10E10F1" of the information number (music title) "10".

In this case, in the tape printing apparatus 1, as shown in FIG. 31A, the mark C is inserted between an 11th character "1" (central character "1" of a character string "D10") and a 12th character "0" (last character "0" of the character string "D10"), and the character string is displayed on the display screen in a manner such that the insertion of the mark C is reflected as it is. That is, FIGS. 31A to 31D represent the display character strings of the text data (character codes), and at the same time represent display images formed based on the character codes.

On the other hand, as described above, a print image formed from the original basic character strings is shown in FIG. 27A or 27B. For instance, if the print image representative of the music title "A10B10C10D10E10F1" of the information number (music title) "10" on the 17th to 18th lines is compared with the display image (representative of the display character strings) of a FIG. 31A music title "A10B10C10D1 [C] 0E10F1" with the mark C inserted therein (the inserted mark is shown by characters [C] for convenience of description), it is clear that the position of the mark C corresponds to a position from which a new line is automatically started.

That is, in the tape printing apparatus 1, if the number of characters adjusted to the horizontal size (for instance, in the direction of the length of each line in horizontal writing) of the print image data area (edit image-forming memory area) 244 for producing a print image (edit image), such as an elided image or a whole image, is set to a predetermined line count (eleven in the above example), the mark C (character overflow-notifying character string) is inserted into a display character string (edit information character string) between a character immediately before the predetermined line count (11) is exceeded and a character immediately after the same is exceeded, that is, at a position where automatic start of a new line is carried out, so that the character image of the mark C is positioned at a location corresponding to the automatic start of the new line in a display image (edit information image) represented by dot matrix data formed by converting the character codes of the display character string including the mark C to respective dot matrix data item and arranging the data items.

Therefore, if the display image (edit information image) thus formed is displayed, the user can grasp new line start positions (character overflow positions) in the print image (edit image) from the display image (edit information image). Further, although in the above example, the character overflow-notifying character string is inserted when it is determined that the number of characters on a line of basic character strings exceeds the predetermined character count, this is not limitative, but if the apparatus is configured such that the character overflow-notifying character string can be arbitrarily inserted, similarly to the case of general arbitrary new line start capability, freedom of edit can be increased to thereby enhance operability of the apparatus.

Further, as described above, in the tape printing apparatus 1, it is possible to select whether or not a title or a music title should be continued by starting a new line. If the "NL-OFF" (automatic new line start-OFF format) is set, the number (one) of characters in the above predetermined character omission-notifying character string (the symbol "•••" in the above example) is subtracted from the predetermined character count (11), and based on the predetermined post-omission character count (10) resulting from the subtraction, the mark C (character overflow-notifying character string) is inserted.

The sum of the predetermined post-omission character count (10) and the number (one) of characters of the predetermined character omission-notifying character string ("•••") is equal to the predetermined character count (11). In other words, when the number of characters adapted to the horizontal size of the disc label (which corresponds to the edit image-forming memory area), for instance, is set to the predetermined character count (11), the inserting position at which the mark C (character overflow-notifying character string) is inserted becomes an omission position applied when an elided image is formed in which portions of lines of the basic character strings are omitted and at the same time the predetermined character omission-notifying character string ("•••") for notifying the user of the omission is added to the respective lines.

The meaning and use of the mark C is described in further detail. Let it be assumed that the text data described above with reference to FIGS. 27A and 27B is set to the basic character strings, and the "NL-OFF" is set for music titles (MUSIC NL-START is OFF). As shown in FIG. 31B, for instance, the mark C is inserted between the 10th character "D" (the first character "D" of the character string "D10") and the 11th character "1" (the central character "1" of the character string "D10") in the character codes of the above music title "A10B10C10D10E10F1" of the information number (music title) "10". The music title is displayed on the display screen as it is, that is, with the image of the mark C inserted therein.

On the other hand, when the "NL-OFF" is set for music titles, the print image formed from the original basic character strings is shown in FIG. 28A or 28B, as described hereinbefore. When comparison is made between the print image of the music title "A10B10C10D•••" of the information number (music number) "10" on the 11th line in FIG. 28A and the display image (the image of a display character string) of a FIG. 31B music title "A10B10C10D [C] 10E10F1" with the mark C inserted therein, it is clear that the position of the mark C corresponds to the omission position after which excessive characters are omitted.

As will be understood from the above, if a display image (edit information image) formed is displayed, when the automatic new line-starting format is set (to carry out automatic start of a new line), the user can grasp new line start positions (character overflow positions) in a print image (edit image) from the display image (edit information image), whereas when the automatic new line-starting format is inactive, the user can grasp omission positions (character overflow positions).

Actually, as described above, in the tape printing apparatus, for purposes of edit and checking, a display image (or text data for producing the display image) is first formed and then, a print image is created by using the formed display image (or text data thereof).

The use of the mark C is described more specifically. In the tape printing apparatus 1, the mark C (character overflow-notifying character string) and the following characters on each corresponding line of the above display character strings (edit information character strings) are omitted to form an elided character string, and the character omission-notifying character string ("•••") is added to each line subjected to the omission to thereby produce elided basic character strings. Then, image data (dot matrix data) representative of the image of the elided basic character strings is formed based on a predetermined font and stored in a predetermined print image data area (edit image-forming memory area) 244 in which a character image having a predetermined number of characters (for instance, eleven characters in the above example) can be arranged, to thereby form a print image (elided image).

That is, when the automatic new line-starting format is set (to carry out automatic start of a new line), each mark C (character overflow-notifying character string) inserted into the display character strings (edit information character strings) represents new line start positions (character overflow positions) in a print image (edit image), whereas when the automatic new line-starting format is not set, each mark C represents an omission position (character overflow position), so that when the automatic new line-starting format is set, lines are continued by starting new lines at the position of the mark C, or when the automatic new line-starting format is not set, the mark C and the following characters on each line are omitted to add a character omission-notifying character string ("•••") to each line, whereby it is possible to form a print image (edit image) from the display character string (or to produce character strings for use in forming the print image).

Therefore, according to the tape printing apparatus 1, not only a display image (edit information image) but also a print image (elided image), in which portions of lines of the basic character strings are omitted and at the same time a character omission-notifying character string for notifying the user of the omission is added to a corresponding line, can be easily produced based on the above display character strings (edit information character strings).

Of course, even when a display image (edit information image) or a print image (elided image) is formed based on the display character strings (edit information character strings), as the result of editing operations, if the character image of one character is changed in width or the like to change the number of characters arrangeable in the predetermined image-forming area, the resulting number of characters is set to the predetermined character count to form the display image (edit information image) or the print image (elided image), so that it is possible to form an image adapted to basic character strings modified by the editing operations.

Although it is also possible to form an image equivalent to the above display image as a print image for printing, if such an image is produced as a display image, the following merits can be particularly exploited. Assuming, for instance, that there are provided display character strings as in FIG. 32A, by displaying the display character strings as a display image, the user can check portions thereof through operating the cursor key 33 (G65 to G68: portions surrounded by broken lines are undisplayed portions). Further, it is possible to prevent predetermined undesirable edit operations (for instance, an operation to delete display-only characters, such as the mark L1 and the like), and display an error message (G69), which makes the display image suitable for edit operations.

Similarly, it is also possible to edit or check, for instance, the display character strings described above with reference to FIGS. 31A to 31D. Especially when an edit image, such as an elided image described above or a whole image, is to be formed into a print image, character overflow positions in the print image (edit image) where characters overflow from each line, corresponding e.g. to omission positions or new line start positions, can be checked before printing by displaying a corresponding display image (edit information image). As a result, if it is determined that edit operations, such as modification and the like (e.g. restoration of omitted characters), are required, edit operations can be carried out with ease, since each character of the overall basic character strings including characters omitted (especially a character to be restored as a result of the modification) can be viewed.

Further, as clearly shown in FIGS. 31A to 32B, in the tape printing apparatus 1, the display image (edit information image) is formed by converting character codes of the basic character strings to dot matrix data and arranging the data such that each line of display character strings (edit information character strings) corresponds to each line of the basic character strings, and is displayed as an image of a line of a character string. Hence, it is possible to form a display image (edit information image) which reflects thereon original images of lines of the basic character strings.

Further, it is preferred that the character overflow-notifying character string includes a mark, such as a special mark specially registered as a nonstandard character, which can be easily distinguished from other characters, that is, which can be clearly discriminated from other characters when the user checks each edit information image, and enables him to easily grasp character overflow positions. By taking these advantageous effects into account, the tape printing apparatus 1 according to the present embodiment uses a mark shaped after the character "C", that is, the mark C, so as to permit the user to associate it with character overflow.

Further, it is preferred that an edit information image is formed by converting only a required range of text data (character codes) of edit information character strings to dot matrix data and arranging the data, for display or printing. More specifically, only a display range of the edit information image to be displayed on the display screen, for instance, is formed, and as characters displayed disappear in accordance with the scroll of the display range, dot matrix data representative of an image of new characters is formed and arranged for display, whereby it is possible to shorten a time period from a time point of the start of an edit information image-forming process to a time point of checking the resulting edit information image. Further, it is only required to allocate a memory area for displaying the display screen as the edit information image-forming memory area, so that the capacity of the memory device can be saved. Also when such an edit information image is used for making a print image, it is only required to sequentially form ranges of dot matrix data necessitated by respective printing operations, and hence the same advantageous effects as described above can be obtained.

Similarly to forming an edit information image, which enables the user to easily grasp a whole of an elided image formed by omitting portions from lines of character strings, it is preferable to form an edit information image which enables the user to grasp a whole of an elided image formed by omitting several of a plurality of lines of character strings. Hence, the tape printing apparatus 1 is designed to have an inventive feature that provides this capability.

More specifically, the tape printing apparatus 1 is capable of forming an edit information image which enables the user to grasp line overflow positions which designate omission positions for use in setting the number of lines of the edit image to a predetermined line count equal to a positive integral multiple of a reference line count, while reflecting thereon an original image representative of each line of character strings. The edit information image is produced before forming an edit image, such as an elided image which is produced by omitting some of a plurality of lines of character string, adding an omission notifying character string to the character strings in place of the omitted lines, and forming the dot matrix data of the resulting character strings such that the whole image is comprised of a predetermined number of lines equal in number to a positive integral multiple of the reference line count. Alternatively, the edit information image is produced separately or independently of the forming of the edit image. In the following, the process for forming the edit information image will be described in detail with reference to FIGS. 27A to 33.

As described above with reference to FIG. 30, in the tape printing apparatus 1 are defined as display-only characters the mark L1 (line overflow mark 1: first predetermined line overflow-notifying character string) and the mark L2 (line overflow mark 2: second predetermined line overflow-notifying character string) as well as the mark C (character overflow mark: character overflow-notifying character string).

The mark L1 and the mark L2 are, so to speak, line overflow-notifying character strings each designating an excess of lines over a predetermined line count. The mark L1 is the first predetermined line overflow-notifying character string designating an excess of a line count (the number of lines) over a first predetermined line count (the number of lines for the disc label, in an example described hereinbelow), while the mark L2 is the second predetermined line overflow-notifying character string designating an excess of a line count (the number of lines) over a second predetermined line count (the number of lines for the case label, in an example described hereinbelow).

That is, in the tape printing apparatus 1, there are defined a reference line count and one or more n-th predetermined line counts each corresponding to a number n (n represents a natural number) times as large as the reference line count. These line counts are used, for forming dot matrix data of a predetermined portion or all of the lines of character strings (the above basic character strings) for processing, as described above with reference to FIGS. 27A and 27B, for instance, based on a predetermined font and storing the data in an edit image-forming memory area (similarly to the above example, an edit image is used as a print image, and an area for forming the image is allocated in the print image data area 244).

To be more specific, description will be made of a case where two predetermined reference line counts (n=1, 2) are defined. In this case, one of the predetermined reference counts (i.e. the first predetermined line count) used for making a disc label is set to twenty, while the second predetermined line count used for making a case label to forty.

When dot matrix data of each character of the basic character strings is formed for storage in the edit image-forming memory area, if the number of lines of the basic character strings is determined to exceed one of the n-th predetermined line counts, the n-th predetermined line overflow-notifying character string which designates the excess of one of the n-th predetermined line count is inserted between the end of a line immediately before a n-th post-omission line count is exceeded and the head of the following line, i.e. a line positioned immediately after the n-th post-omission line count is exceeded. Then, the resulting character strings are edit information character strings dot matrix data of which is formed based on the predetermined font and arranged in the edit information image-forming memory area, to thereby produce an edit information image.

It should be noted that the term "n-th post-omission line count" is used to mean the line count obtained by subtracting the number of lines of the n-th predetermined line omission-notifying character string for notifying the user of the omission of lines from the n-th predetermined number.

More specifically, in the case of the above example, the n-th predetermined line omission-notifying character string is "XX OTHER TITLES" or "A TOTAL OF XX TITLES". In the case of the former, a first (n=1) predetermined line omission-notifying character string and a second (n=2) predetermined line omission-notifying character string are necessarily different from each other (in the portion of "XX", that is, in the number of remaining music pieces), whereas in the case of the latter, the first and second predetermined line-notifying character strings are identical to each other. Both of the two notifying character strings are each formed of one line. Further, as described above, according to the present embodiment, the latter predetermined line omission-notifying character string "A TOTAL OF XX TITLES" is preferentially used.

In the case of the latter notifying character string being used, the first post-omission line count=the first predetermined line count (20)–the number (one) of lines of the first predetermined line omission-notifying character string ("A TOTAL OF XX TITLES")=19, while the second post-omission line count=the second predetermined line count (40)–the number (one) of lines of the second predetermined line omission-notifying character string ("A TOTAL OF XX TITLES")=39 (see FIGS. 28A and 28B).

More specifically, when dot matrix data of each character of the basic character strings is formed and arranged in the print image data area (edit image-forming memory area) 244, if the number of lines of the basic character strings is determined to exceed the first predetermined line count (20) or the second predetermined line count (40), the mark L1 (first predetermined line overflow-notifying character string) or the mark L2 (second predetermined line overflow-notifying character string) designating the excess of the number of lines (line count) over the first predetermined line count (20) or the second predetermined line count (40) is inserted between the end of a line immediately before the first post-omission line count (19) or the second post-omission line count (39) is exceeded, and the head of the following line, i.e. a line positioned immediately after the first post-omission line count (19) or the second post-omission line count (39) is exceeded. The resulting character strings are edit information character strings (used as display character strings for display, similarly to the above example), and dot matrix data of the display character strings (edit information character strings) is formed based on the predetermined font and arranged in the display image data area (edit information image-forming memory area), to thereby produce a display image (edit information image) for display.

In this case, needless to say, the sum of the first post-omission line count (19) and the number (one) of the lines of the corresponding first predetermined line omission-notifying character string is equal to the first predetermined line count (20). Similarly, the sum of the second post-omission line count (39) and the number (one) of lines of the corresponding second predetermined line omission-notifying character string is equal to the second predetermined line count (40).

In other words, as shown in FIG. 27A and corresponding FIG. 31A, and FIG. 28A and corresponding FIGS. 31B to 31C, the inserting position of the mark L1 (first predetermined line overflow-notifying character string) in this case is provided at an omission position which is used in forming an elided image by omitting some of the lines (20th line et. seq.) of the basic character strings and adding the image of the first predetermined line omission-notifying character string ("A TOTAL OF XX TITLES") for notifying the user of the omission, such that the whole image is formed of lines corresponding in number to the first predetermined line count (20).

Further, as shown in FIG. 28B and corresponding FIGS. 31B to 31D, the inserting position of the mark L2 (second predetermined line overflow-notifying character string) in this case is provided at an omission position which is used in forming an elided image by omitting some of the lines (40th line et. seq.) of the basic character strings and adding the image of the second predetermined line omission-notifying character string ("A TOTAL: OF XX TITLES") for notifying the user of the omission, such that the whole image is formed of lines corresponding in number to the second predetermined line count (40).

Accordingly, by displaying a display image (edit information image) thus formed, the user can grasp each omission position with reference to which an elided image (edit image) is formed such that the number of lines thereof is equal to the first predetermined line count or the second predetermined line count (each predetermined line count corresponding to a number n (n represents a natural number) times as large as the reference line count). Although in the present embodiment, display character strings are used for producing a display image, it goes without saying that the same can be employed for creating a print image for printing the same contents as displayed.

In general, in the above case, the sum of each n-th post-omission line count and the number of lines of a corresponding n-th predetermined line omission-notifying character string is equal to the n-th predetermined line count. That is, the inserting position of the n-th predetermined line overflow-notifying character string in this case is provided at an omission position which is used in forming an elided image by omitting some of the lines of the basic character strings and adding the image of the n-th predetermined line omission-notifying character string for notifying the omission in place of the omitted lines. The resulting elided image represented by a dot matrix data is formed such that the whole image is formed of lines corresponding in number to the n-th predetermined line count.

As a result, by displaying or printing the edit information image thus formed, the user is capable of grasping each omission position (line overflow position) with reference to which an elided image (edit image) is formed such that the elided image is formed of lines correspond in number to the n-th predetermined line count (predetermined line count equal to a positive integral multiple of a predetermined reference line count).

Further, a plurality of types of predetermined line count are defined as the n-th predetermined line count which varies with different values of the natural number n. Although it is also possible to, set the number of lines of the n-th predetermined line omission-notifying character string to different values from each other depending on the value of the natural number n, in the tape printing apparatus 1, the n-th predetermined line omission-notifying character string are set to the same number of lines irrespective of the value of each natural number n. This enables an identical value to be used as the number of lines of the n-th predetermined line omission-notifying character string, which makes it possible to simplify a process for inserting each n-th predetermined line overflow-notifying character string, that is, creation of an edit information character string.

Further, in the tape printing apparatus 1, it is possible to form not only a display image (edit information image) but also a print image (edit image: elided image) by using display character strings (edit information character strings).

More specifically, as described above with reference to FIGS. 24 to 26, any of the disc label, the case label and the side label can be selected to form a print image of a print size adapted to the size of the label selected, so that if the disc label is selected, the first predetermined line count (20) can be set as a predetermined line count, whereas if the case label is selected, the second predetermined line count (4) can be set as a predetermined line count.

Therefore, in the tape printing apparatus 1, when the disc label is selected (i.e. the first predetermined line count is set), lines of display character strings (edit information character strings) arranged after the mark L1 (first predetermined line overflow-notifying character string) are omitted to form elided character strings. Then, to the elided character strings formed is added the character string "A TOTAL OF XX TITLES" (first predetermined line omission-notifying character string) to produce elided basic character strings. Thereafter, dot matrix data representative of the image of the elided basic character strings is formed based on a predetermined font, and arranged in the print image data area (edit image-forming memory area) 244, thereby forming an elided image.

On the other hand, when the case label is selected (i.e. the second predetermined line count is set), lines of display character strings (edit information character strings) arranged after the mark L2 (second predetermined line overflow-notifying character string) are omitted to form elided character strings. Then, to the elided character strings formed is added the character string "A TOTAL OF XX TITLES" (second predetermined line omission-notifying character string) to produce elided basic character strings. Thereafter, dot matrix data representative of the image of the elided basic character strings is formed based on a predetermined font, and arranged in the print image data area (edit image-forming memory area) 244, thereby forming an elided image.

That is, by using display character strings (edit information character strings), it is possible to form not only a display image (edit information image) but also a print image (edit image: elided image), in which some of the lines of the basic character strings thereof are omitted but at the same time a character string for notifying the user of the omission is added, and the resulting character strings are converted to dot matrix data arranged such that the image represented by the dot matrix data is comprised of images of lines corresponding in number to a predetermined line count which is a number n times as large as a reference line count (wherein, n represents a natural number).

More specifically, as shown in FIG. 33, it is determined at step S71 which of the disc label, the case label, and the side label is selected or designated. If it is determined at step S71 that the side label is selected, a print image of a title (disc title) is formed for printing at step S72.

Further, if it is determined at step S73 that the disc label is selected, it is determined at step at step S74 whether or not the display character strings include a mark L1. If the mark L1 is included or exists (Yes to S74), a print image is formed for a first main label LM such that the first main label LM is fully printed up to the 20th line with the notification character string "A TOTAL OF XX TITLES" (first predetermined line omission-notifying character string) added as 20th line of the main label LM at step S75.

On the other hand, when no mark L1 is included or exists (No to S74), even if a print image corresponding to all of display character strings is produced, the first main label LM is not fully printed up to the 20th line, so that a print image is created without omitting any lines of the basic character strings for printing at step S76. Moreover, as described hereinabove, in the case of the notification image "A TOTAL OF XX TITLES" being added, even if the print image is printed without omitting any lines, the resulting printed image is not degraded in appearance. Hence, the tape printing apparatus 1 may be configured such that the notification image is printed (i.e. a print image is formed as much) when no lines are to be omitted, provided that there is no printing data for the 20th line.

Further, when the case label is selected at step S77, first, it is determined at step S78 whether or not a first main label LM is to be printed. If the first main label LM is determined to be printed (Yes to S78), next, it is determined at step S79 whether or not a mark L1 is included or exists (this determination step may be omitted, since the step is not necessary for processing character strings for the first main label). If the mark L1 is included (Yes to S79), a print image is formed for the first main label LM such that the first main label is fully printed up to the 20th line. In this case, the case label is selected, and there is another main label (second one) to be printed, so that a print image without the notification image "A TOTAL OF XX TITLES" is produced for printing at step S80.

On the other hand, when the display character strings do not include a mark L1 (No to S79), even if a print image corresponding to all of display character strings is produced, the first main label LM is not fully printed up to the 20th line, so that the print image is created without omitting any lines of the basic character strings, for printing at step S76.

Further, it is determined at step S78 whether or not the first main label LM is to be printed. When the first main label LM is not to be printed, that is, when the second main label is to be printed (No to S78), next, it is determined at step S81 whether or not a mark L1 is included or exists. If no mark L1 is included (No to S81), the printing operation has already been completed when printing on the first main label is finished, so that there is no print image produced, and no printing operation is carried out on the second main label.

On the other hand, when the second main label is to be printed (No to S78), and when the a mark L1 is included (Yes to S81), next, it is determined at step S83 whether or not a mark L2 is included. When no mark L2 is included (No to S83), even if a print image corresponding to all of display character strings is produced, the second main label LM is not fully printed up to the 40th line (20th line of the second piece), so that the print image is created without omitting any lines of the basic character strings for printing at step S84.

When the second main label is determined to be printed (No to S78), and when the mark L1 is included (Yes to S81), as well as when there is the mark L2 is included (Yes to S83), a print image is formed for the second main label LM such that the second main label is fully printed up to the 20th line, with the notification character string "A TOTAL OF XX TITLES" (second predetermined line omission-notifying character string) being added as the 20th line at step S85.

As described above, in the tape printing apparatus 1, by using display character strings (edit information character strings), it is possible to form not only a display image (edit information image) but also a print image (edit image: elided image), in which some of the lines of the basic character strings thereof are omitted, but at the same time a character string for notifying the user of the omission is added, and the resulting character strings are converted to dot matrix data arranged such that the image represented by the dot matrix data is comprised of images of lines corresponding in number to a predetermined line count which is a number n (n=1, 2) times as large as a reference line count (20).

Further, in the above example, all the n-th predetermined line omission-notifying character strings for use in producing an elided image are the same character string ("A TOTAL OF XX TITLES"), so that only one type of character string is required to be available as the n-th predetermined line omission-notifying character string.

Furthermore, in the tape printing apparatus 1, there are defined predetermined information numbers (music titles) corresponding to respective lines of basic character strings. The information numbers (music titles) are only required to correspond to respective lines of the basic character strings. They are not required to correspond to respective lines in a print image (edit image) formed by forming dot matrix data of the basic character strings and arranging the dot matrix data in the print image data area (edit image-forming memory area) 244.

In other words, regardless whether an arbitrary one line of the basic character strings is formed into one line of character string, or into a plurality of lines of character string e.g. by automatic start of a new line, a character string notifying the total number of pieces of information (total number of music pieces) is formed as the n-th predetermined line omission-notifying character string. Therefore, by displaying or printing an elided image, the user is capable of grasping the number of pieces of information recorded in unomitted lines (number of unomitted music pieces) and the number of all pieces of information (number of all music pieces), from which he can further know the fact of omission of lines, and the number of pieces of information recorded in the omitted lines (number of omitted music pieces).

Although in the above example, the n-th predetermined line omission-notifying character strings for use in producing elided images are all set to the same character string ("A TOTAL OF XX TITLES"), they can be set to different character strings ("XX OTHER TITLES", for instance) such that a suitable character string is applied to each n-th predetermined line omission-notifying character string.

Further, when a predetermined information number (music number) corresponding to each line of the basic character strings is determined, by setting the character string ("XX OTHER TITLES", for instance) for notifying the number of pieces of information (number of music pieces) recorded in omitted lines to the n-th predetermined line omission-notifying character string, the user is capable of knowing the fact of omission of lines, the total number of pieces of information (total number of music pieces) and so forth from the number of pieces of information (number of music pieces) recorded in unomitted lines and the number of pieces of information (number of music pieces) recorded in omitted lines.

Although the same image as the above display image (edit information image) can be formed as a print image for printing, the forming of such an image as the display image permits the advantageous effects thereof to be particularly exploited. Especially when an edit image, such as the above elided image and the like, is formed as a print image, an omission position (line overflow position) in the print image (edit image) can be checked before printing by displaying the display image (edit information image). As a result, if it is determined that edit operations, such as modification and the like (e.g. restoration of omitted characters), are required, edit operations can be carried, out with ease since the overall basic character strings including each line and each character omitted (especially a line to be restored, as a result of the modification) can be viewed.

Further, as clearly shown in FIGS. 31A to 32B, in the tape printing apparatus 1, a display image (edit information image) is produced by forming and arranging images of the basic character strings such that each line of display character strings (edit information character strings) corresponds to each line of the basic character strings, and such that each line of display character strings (edit information character strings) is formed as a line of a character string image. Hence, the display image (edit information image) reflects thereon original images of respective lines of the display character strings.

Further, it is preferred that the n-th predetermined line overflow-notifying character string includes a mark, such as a special mark specially registered by nonstandard character registration, which can be easily distinguished from other characters. If such a mark is included, when the edit information character string is displayed (this is also the case when it is used in printing), the user can clearly discriminate the mark from other characters during checking an edit information image, and easily grasp a line overflow position. In this embodiment, the mark L shaped after the character "L" is employed such that the user can associate it with line overflow. It should be noted that a mark shaped after a character "P" may be used to cause the user to associate it with page overflow.

Further, in the tape printing apparatus 1, the mark L1 (1st (n=1) predetermined line overflow-notifying character string) includes a character (number) teaching that n=1, which shows that the predetermined line count is as large as the predetermined reference line count. Further, the mark L2 (2nd (n=2) predetermined line overflow-notifying character string) includes a character (number) teaching that n=2, which shows that the predetermined line count is twice as large as the predetermined reference lines. That is, the n-th predetermined line count corresponds to a number n times as large as the predetermined reference line count, and hence if only the user views the n-th predetermined line overflow-notifying character string including a character teaching the natural number n, he can understand that the omission position is a position for use in setting the number of lines of an elided image (edit image) to the predetermined line count n times as large as the predetermined reference line count.

Further, if the print images (edit images, elided images) described above with reference to FIGS. 27A to 28B are compared with the corresponding display images (edit information images) described above with reference to FIGS. 31A to 32B, it is clear that in the tape printing apparatus 1, print images and corresponding display images are different from each other in some points other than the above insertion of various notification character strings described above. In short, the tape printing apparatus 1 as an image forming device is configured such that it realizes various kinds of ideas other than those described hereinabove.

The word processors or the like, referred to hereinbefore, have a large display screen, so that they are capable of displaying an image representative of a print image to be printed, as it is, on a display screen without any inconveniences. On the other hand, among small-sized and inexpensive electronic apparatuses, such as a tape printing apparatus, a stamp making apparatus, and the like, there are some which have so small display screens that they can display only a small number of lines (one line, for instance) or only part of the line(s). The same applies to the tape printing apparatus 1 according to the present embodiment (see FIGS. 9 to 12E, etc.). In these apparatuses, in order to display a maximum range of display image data on a small-sized display screen, half-size characters are usually used for display.

For instance, characters, such as alphanumeric characters, Japanese Kana letters (Hiragana letters and Katakana letters) and the like, are relatively simple in construction, so that if they are displayed in half size, they can be properly recognized as respective characters on the display screen. That is, characters, such as alphanumeric ones and the like, having relatively simple constructions, can be displayed in half size (half-size display characters), and by using half-size display characters, a relatively wide range of information can be displayed even on a small-sized display screen.

On the other hand, to display characters having complicated constructions, such as Kanji letters, symbols, figures and the like, in a half size-adapted display area of a small-sized screen, it is required to use a display screen which is capable of displaying characters having a high density (high resolution: high dot number), resulting in increased cost. This makes it impossible to fulfill the requirement of reduction of the manufacturing costs of the apparatuses. Therefore, in the small-sized and inexpensive electronic apparatuses of the above-mentioned kind, a small-sized display screen having a low resolution is employed. This holds true with the tape printing apparatus 1 according to the present embodiment, which provides a resolution of 16×16 dots for each full-size character and a resolution of 8 (width)×16 (length) dots for each half-size character (see FIGS. 11A to 12E).

This makes it impossible to display characters having complicated constructions, such as Kanji letters, symbols, figures and the like, in half size, or even if it is possible to display the same, they are difficult to recognize. That is, characters complicated in construction, such as Kanji letters and the like, can be displayed only in full size (full-size display characters). Therefore, it is impossible to display character strings including full-size display characters only in half size.

To eliminate this inconvenience, the tape printing apparatus 1 is configured such that it is capable of forming a display image (image data thereof) permitting efficient display of character strings including full-size display characters, such as Kanji letters, and a print image (image data thereof) permitting such character strings to be printed with a neat appearance. In the following, a display image/print image-forming process will be described in detail with reference to FIGS. 32A and 32B and FIGS. 34A and 34B.

First, characters represented by character codes for conversion to dot matrix data of half-size character images and arranged as such during the display image-forming process to a display image for display on the display screen are defined as "half-size display characters", while characters represented by character codes for conversion to dot matrix data of full-size character images and arranged as such during the same process are defined as "full-size display characters". Each of all the characters which can be converted to dot matrix data based on a predetermined font is determined to be a half-size display character or a full-size display character.

More specifically, characters complicated in construction, such as Kanji letters, symbols, figures and the like, are determined as full-size display characters, and the other characters are defined as half-size display characters. Although the above marks L1, L2 and C are also full-size display characters, they are not used in forming a print image, since they are display-only characters and are not included in original character strings.

In the tape printing apparatus 1, the text data of the basic character strings described above with reference to FIGS. 27A and 27B, for instance, are stored and then, it is determined as to each character of the basic character strings whether the character is a half-size display character or a full-size display character. If the character is determined to be half-size display character, a display image is produced by converting a character code for the character to dot matrix data, and arranging the data in a display image data area (predetermined display image-forming area) 243, as a half-size character image, whereas if it is determined to be a full-size display character, a display image is produced by converting a character code for the character to dot matrix data, and arranging the data in the display image data area, as a full-size character image.

In short, full-size display characters that can be displayed only in full size are displayed in full size, whereby it is possible to display character strings including full-size display characters, such as Kanji letters, while half-size display characters that can be displayed in half size are displayed in half size. This enables a display image to be displayed as efficiently as possible even on a small-sized display screen.

In this case, if a print image corresponding to a display image is formed just as it is displayed on the display screen and printed (that is, a print image having full-size display characters and half-size display characters mixed with each other, similarly to the display image, is formed and printed), for instance, if a FIG. 34A print image is formed according to the FIG. 32A display image and printed), a string or sequence of characters look irregular between lines (i.e. the left-side ends and right-side ends of characters corresponding in position between lines are not aligned), resulting in the degraded appearance of a printed image.

Therefore, in the tape printing apparatus 1, as shown in FIG. 34B, a print image is formed by forming and arranging each character in the basic character strings as a full-size character image regardless of whether the character is a half-size display character or a full-size display character. This makes it possible to produce a display image suitable for efficiently displaying character strings including full-size display characters, such as Kanji letters, on a small-sized display screen, and a print image suitable for printing the character strings with attractive appearance.

Further, in the above case, the display image is formed by converting character codes of only characters within a range of the basic character strings required for display to dot matrix data for arrangement. More specifically, for instance, only a display image within a display range on the display screen is produced such that as a portion of the display image disappear in accordance with the scroll of the display image range, images of new characters are additionally formed, i.e. only required part of the display image is formed, whereby it is possible to shorten a time period from the start of the display image-forming process to the checking of the display image formed and the like. Further, it is only required to secure a display image-forming area for displaying the part of the display image for display on the display screen, so that the capacity of the memory device can be saved or reduced.

Similarly, the print image is formed by converting character codes of only part of the basic character strings required for printing to dot matrix data, and arranging the data. That is, in this case, it is only required that portions of the print image required for printing are sequentially created in accordance with the printing process, so that similarly to the case of the display image being produced, it is possible to shorten a time period from the start of the print image-forming process to the printing of the print image. Further, it is only required to secure a print image-forming area for use in printing only the part of the print image required to be printed, which enables the capacity of the memory device to be saved or reduced.

Further, in the tape printing apparatus 1, the font data defining a predetermined font includes data for forming an image of each character of the half-size display characters as a full-size character image, and data for forming an image of each character of the half-size display characters as a half-size character image. Therefore, as to each of characters of the basic character strings for which a character image is to be formed, if the character is a half-size display character, a full-size character code for the character is converted to a half-size character code and then, by using the converted half-size character code, an image of the character can be formed based on the predetermined font as a half-size character image.

On the other hand, if the character whose image is to be formed is a full-size display character, by using a full-size character code therefor, an image of the character can be formed based on the predetermined font as a full-size character image. Through the processes described above, it is possible to produce a display image suitable for efficiently displaying character strings including full-size display characters, such as Kanji letters and the like, on a small-sized display screen.

Although in the above embodiment, a full-size character code for use with a half-size display character is converted to a half-size character code to form an image of the half-size display character by using the converted half-size character code, this is not limitative, but in the case where a half-size display character is to be formed, it is possible to form an image of such a character by another method, for instance, by carrying out a half-size character image-forming process for directly forming an image of the character as a half-size character image. In this case, a half-size display character can be directly formed as a half-size character image, while a full-size display character can be directly formed as a full-size character image, whereby it is possible to produce a display image suitable for efficiently displaying character strings including full-size display characters, such as Kanji letters and the like, on a small-sized display screen.

Generally, outline font is defined by the coordinates and attributes of contour lines or the like of each character image. Hence, the dot matrix of a character image having a desired size can be obtained by simply carrying out conversion from the character codes, regardless of the character size thereof. That is, reference font data is expanded or reduced in size by calculation to form a character image. Therefore, a neat enlarged or reduced image can be formed by converting the character code again to a desired size of an image of the character.

Hence, in the above half-size character image-forming process, for instance, when a half-size display character whose image is to be formed is a character which can be formed based on the outline font, by adapting a horizontal dot size to which an image of the character is to be formed to a half size, and simply forming an image of the character to this size, it is possible to form a half-size character image corresponding to the half-size display character whose image is to be formed.

Further, in the half-size character image-forming process, for instance, when a half-size display character whose image is to be formed is a character which can be formed based on a dot font or a predetermined and registered dot matrix, by reducing the horizontal dot size of a character image of the character to a half size, it is possible to form a half-size character image corresponding to the half-size display character whose image is to be formed based on the dot font or the dot matrix.

As described above, the tape printing apparatus 1 is designed to have inventive features for producing a display image for display and a print image for printing, and further, it has other inventive features for displaying characters as well as converting and inputting the same. These features will be described hereinafter in further detail. Now, in the following, a problem concerning the actual printing process and a method of solving the problem will be summarized. That is, the tape printing apparatus 1 as an image printing device for printing a desired image by using a print head in a predetermined printing area of a print material will be described hereinafter.

Generally, in an image printing device for printing a desired print image having character images arranged therein as image elements, predetermined margins are set above and below or on the left-hand side and the right-hand side of a printing area (for one page, for instance) having a predetermined size. The character images are image of characters of character strings each including one or more characters, such as letters, numerals, symbols, simple figures and the like.

For instance, in a word processor or the like, predetermined vertical and horizontal margins are set on a print material (paper of a fixed size (A4 or the like)) and then, a portion exclusive of the margins is set to a predetermined printing area for each page for printing (a print image) thereon. Further, if desired margins cannot be obtained due to variations in a position at which paper (print material) is set (mounted), and feed of the paper by a paper feed mechanism, the user carries out adjustment of the printing area by viewing results of printing and configuring the margins again.

Further, in the word processor or the like, normally, the direction of reciprocation (movement) of the print head and the direction of feeding of paper are orthogonal to each other, so that the left-side margin and the right-side margin are adjusted according to a print start position and a print end position in the direction of reciprocation of the print head (for instance, direction of a sequence of characters or along a line in horizontal writing) respectively, while a top margin and a bottom margin are adjusted according to a print start position and a print end position in the direction of feeding of the paper, respectively. In short, by adjusting the print start/end position by the feed control of the print head and the printing paper (print material), respectively, desired margins can be obtained.

However, in a particular kind of printing apparatus, such as a tape printing apparatus, there is a type having a fixed print head. In such a printing apparatus, only the print start/end positions along the direction of feeding of the printing object (e.g. tape) can be adjusted by the feeding control, and hence only the front margin and the rear margin (corresponding to the top and bottom margins in the case of the word processors or the like) can be adjusted but lateral margins along the width of the tape (corresponding to the left and right margins in the case of the word processors or the like) cannot be adjusted.

To eliminate this inconvenience, the tape printing apparatus 1 according to the embodiment is capable of printing the print material by relatively moving a print head having a plurality of dot elements arranged in a predetermined one of vertical and horizontal directions for printing, and a print material, in a direction orthogonal to the predetermined direction, as well as adjusting a printing position in the predetermined direction. In the following, the printing and adjustment processes will be described in detail with reference to FIGS. 35A to 46.

Figures 35A, 35B, 35C:
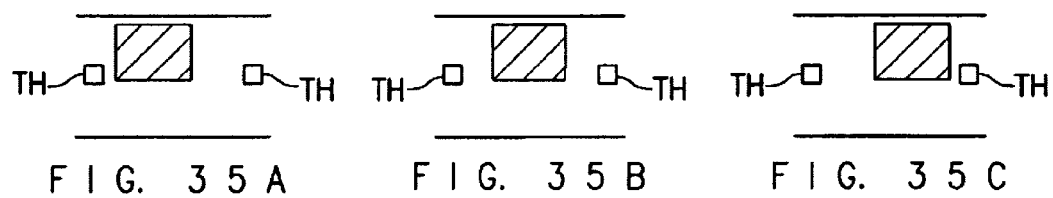

Similarly to the case of FIGS. 4A and 4B, assuming that the tape T is fed from right to left (see FIGS. 36A to 36C), and that for instance, a hatched area, shown in FIG. 35E, which is located between the two reference holes TH, described above with reference to FIG. 4A, formed at predetermined space intervals in the tape T for making a main label, is a reference range (hereinafter, the position of this range is referred to as "the reference position"). Then, if the printing position is displaced upward, the print image is printed as shown in FIG. 35B, whereas if the printing position is displaced downward, the print image is printed as shown in FIG. 35H.

Figures 35D, 35E, 35F:
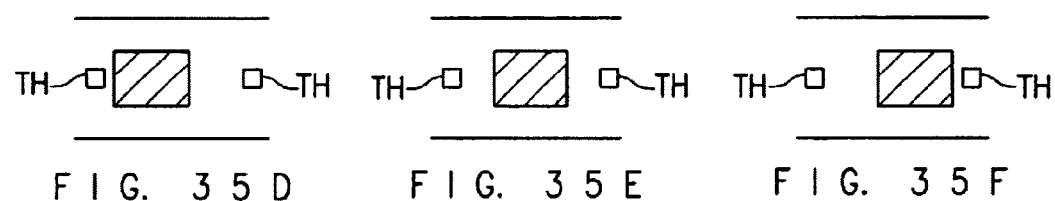
Figures 35G, 35H, 35I:
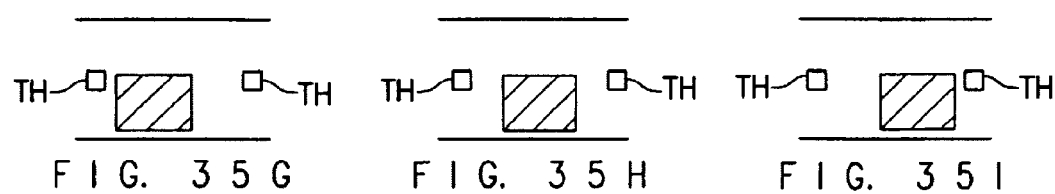

Similarly, FIG. 35D shows a case where the printing position is displaced forward (leftward) from the reference position, and FIG. 35F shows a case where the printing position is displaced rearward (rightward) from the reference position. The other figures, i.e. FIGS. 35A, 35C, 35G and 35I show combined displacements of the printing position in the upward/downward and forward/rearward (leftward/rightward) directions. Among the above displacements, the displacement in the forward/rearward (leftward/rightward) direction corresponds to the print start/end position in the direction of feeding of the tape T, which can be adjusted by the feed control (described hereinafter with reference to FIGS. 26, 47, etc.). Accordingly, in the following, the adjustment of displacement in the upward and downward directions as viewed in FIGS. 35A to 35I (in the direction of the width of the tape T: hereinafter, this direction is referred to as "the predetermined direction") will be mainly described.

As shown in FIGS. 36A to 36C, in the tape printing apparatus 1, the direction of arrangement of the print head 7 (direction of a line of dots, i.e. direction of a sequence of dot elements for printing pixel dots) and the direction of feeding of the tape T are orthogonal to each other. Further, the head width Hw of the print head 7 in the predetermined direction is large enough to arrange 288 dot elements thereon, which enables maximum 288 dots (width of 36 mm) to be printed. The main label LM, which is formed in the tape T having a width Tw=46 mm by half die cutting, has a width of 36 mm (288 dots) in the predetermined direction, and out of the width of 36 mm, a width of 32 mm (256 dots) is defined as an actual printing range in the predetermined direction (see FIG. 39B).

Accordingly, in the tape printing apparatus 1, by using the 256 dot elements (some of a plurality of (288) dot elements) of the print head (print head formed by arranging the plurality of (288) dot elements in a predetermined direction (in a predetermined direction of the vertical and horizontal directions: vertical direction in this embodiment)) 7, a print image having e.g. 256 dots (the number of dots in the predetermined direction, smaller than the maximum printable number of dots, 288, in the predetermined direction) is printed on a tape (print material) T, while moving the tape T relative to the print head 7 (or moving at least one of the print head and the tape (print material) T relative to the other in a direction orthogonal to the predetermined direction).

In the tape printing apparatus 1, to print a print image in the area of a half-die-cut label on the tape (print material) T for making e.g. a main label LM, the range of use of 255 (a plurality of) dot elements is shifted in a predetermined direction (predetermined one of the vertical and horizontal directions), whereby a printing position of the print image is adjusted in units of one or more dots.

Images representative of examples of adjustment of a printing position in this embodiment are shown in FIGS. 37A to 37C. As shown in the figures, if the maximum dot number in the predetermined direction printable by the print head 7 is eleven, and if, at the reference position, the print image is printed by using seven dots at the central portion of a line of dots exclusive of two dots on the upper side thereof and two dots on the lower side thereof, as shown in FIG. 37A, by shifting the printing position upward by one dot for adjustment, as shown in FIG. 37B, printing is carried out by using seven dots exclusive of one dot on the upper side of the dot line and three dots on the lower side thereof. If the printing position is adjusted downward by one dot, as shown in FIG. 37C, printing is carried out by using seven dots exclusive of three dots on the upper side of the dot line and one dot on the lower side thereof.

Therefore, for instance, when an actual printing position is displaced upward as shown in FIG. 36A, the range of use of dots, that is, the printing position is adjusted downward, whereas when the actual printing position is displaced downward as shown in FIG. 36C, the printing position is adjusted upward, whereby the print image can be printed at the reference position, as shown in FIG. 36B.

Next, a change to be made to printing control of data for being sent to each dot element of the print head 7 when the printing position is adjusted, that is, a data control process for controlling the data for being sent to each dot element of the print head 7 when a printing position adjustment is made by a method described hereinafter will be described.

Figures 38A, 38B, 38C, 38D, 38E:
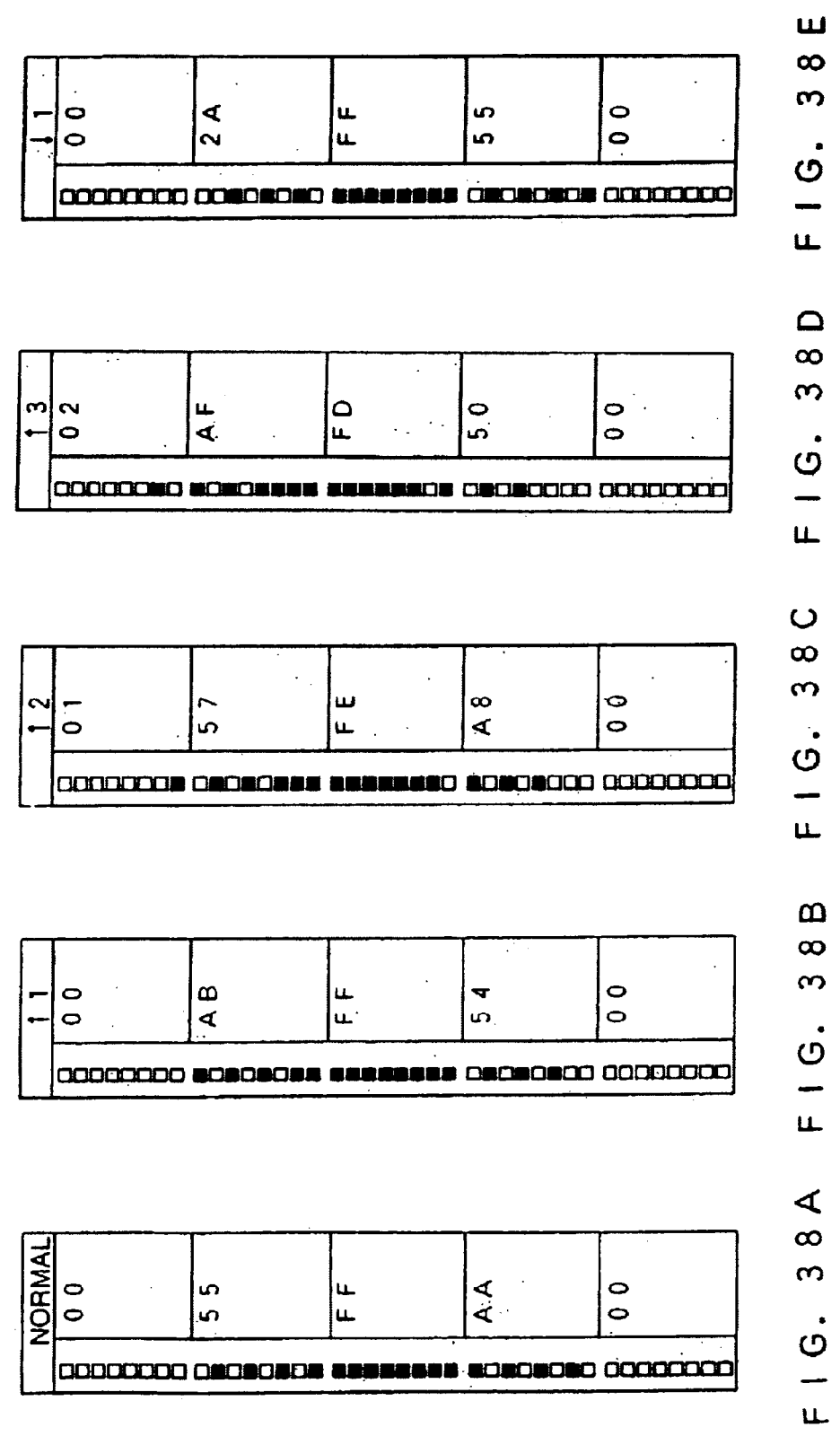

Referring to FIGS. 38A to 38E, assuming that the maximum dot number in the predetermined direction printable by the print head 7 is 40, and that as shown in FIG. 38A, at the reference position, printing is carried out by using 24 dots at the central portion of a line of dots without using eight dots on the upper side thereof and eight dots on the lower side thereof, an example will be considered which a data item [0055FFAA00] HEX (hereinafter, hexadecimal is referred to as [~] HEX) is sent to all the 40 dots (in hexadecimal).

In this process, to adjust the printing position upward by one dot, it is only required that a data item [00ABFF5400] HEX (see FIG. 38B) is sent to the print head 7, and to adjust the printing position upward by two dots, it is only required that a data item [0157FEA800] HEX (see FIG. 38C) is sent to the print head 7. Further to adjust the printing position upward by three dots, it is only required that a data item [02AFFD5000] HEX (see FIG. 38D) is sent to the print head 7. Inversely, to adjust the printing position downward by one dot, it is only required that a data item [002AFF5500] HEX (see FIG. 38E) is sent to the print head 7.

Next, a manner of setting adjustment values for adjusting the printing position by the tape printing apparatus 1 will be described. As shown in FIGS. 39A and 39B, the tape printing apparatus 1 employs the print head 7, which is capable of printing 288 dots in the predetermined direction.

Out of the 288 dots (of a dot line) in the print head 7, 276 dots (dot elements) arranged at the central portion of the dot line are employed for printing and position adjustment. The other 12 dots of the 288 dots, i.e. six dots from the upper end of the dot line and six dots from the lower end thereof are not used here (see FIG. 39B). Through the adjustment of the printing position, the printing position can be adjusted or shifted to any of 21 positions in units of one or more dots (by an adjustment amount of one or more dots) in a range between a position of 256 dots (corresponding to 32 mm: −10 dots) exclusive of 20 dots from the upper end of the dot line, and a position of 256 dots (corresponding to 32 mm: +10 dots) exclusive of 20 dots from the lower end of the dot line, with a central position of 256 dots (corresponding to 32 mm: reference position of ±0 dot) exclusive of 20 dots, i.e. 10 dots from the upper end of the dot line and 10 dots from the lower end.

FIGS. 40A and 40B show examples of the vertical adjustment of the printing position ("MAIN V": main vertical) executed when the main label is selected. FIG. 40A shows an image representative of print data (mark ■ shown in the figure) in the reference position of ±0, and FIG. 40B shows an image representative of the print data in the adjustment position of +10 (dots). Similarly, FIGS. 41A and 41B show examples of the horizontal adjustment of the printing position ("MAIN H": main horizontal) executed when the main label is selected. Through the horizontal adjustment, the printing position can be adjusted or shifted to any of 31 positions in a range of −15 to +15.

The same adjustment of the printing position can be carried out on the side label. FIGS. 42A and 42B show examples of the vertical adjustment of the printing position ("SIDE:V": side vertical) executed when the side label is selected. Through the vertical adjustment, the printing position can be adjusted or shifted in units of one or more dots to any of 21 positions in a range of −10 to +10. Similarly, FIGS. 43A and 43B show examples of the horizontal adjustment of the printing position ("SIDE:H": side horizontal) executed when the side label is selected. Through the horizontal adjustment, the printing position can be adjusted or shifted in units of one or more dots to any of 31 positions in a range of −15 to +15.

Referring to FIG. 44, to set the above adjustment values, the user depresses the adjustment key 34DS in the basic entry mode, whereby it is possible to display the screen of "DENSITY" for setting the density of display in the function-selecting/setting mode (see FIG. 19) (G72). When the up arrow key 33U or the left arrow key 33L is depressed in this state (G72), the indicator display block is flickered for caution at step S71, followed by returning to the screen of "DENSITY" (for setting the density of display: G72) after the lapse of a predetermined time period. When the enter key 38 is depressed, the screen is changed to a menu screen under the option "DENSITY" for selecting one from options of adjusting the density of display (S72). However, these options are not directly related to the present embodiment, and hence description thereof is omitted. When the delete key 35 is depressed in the state of the above menu screen at the lower level in hierarchy being displayed, the screen returns to the immediately preceding screen (G72).

On the other hand, when the down arrow key 33D or the right arrow key 33R is depressed in the state of the screen of "DENSITY" being displayed (G72), the screen of "POSITION" for setting a printing position (G73) is displayed. When the up arrow key 33U or the left arrow key 33L is depressed in this state (G73), the display screen returns to the state of the immediately preceding screen of "DENSITY" (G72). Further, when the down arrow key 33D or the right arrow key 33R is depressed in the state of the option "POSITION" being displayed (G73), the indicator display block is flickered for caution (S71), followed by returning to the screen of "POSITION" (settings of density of display: G73) after the lapse of the predetermined time period.

Further, when the enter key 38 is depressed in the above sate (G73), the screen is changed to a first level (highest level in hierarchy) of a menu for selecting options of adjusting the printing position (S73). When the delete key 35 is depressed at the first level, the screen returns to the immediately preceding state (G73).

Referring to FIG. 45, when the enter key 38 is depressed in the state of the option "POSITION" being displayed (G73), the screen is changed to the first level of the printing position-adjusting menu. Initially, a candidate or menu option selected and finally determined on an immediately preceding occasion of this process for setting the printing position (here, it is assumed that an option "MAIN V" was selected) is displayed (G75).

Thereafter, whenever the down arrow key 33D or the right arrow key 33R is depressed, the screen is switched to display options in the order of "MAIN V"→"MAIN H"→"SIDE:V"→"SIDE:H" (G75 to G78). When the down arrow key 33D or the right arrow key 33R is further depressed in the state of the option "SIDE:H" being displayed (G78), the indicator display block is flickered for caution at step S80, followed by returning to the immediately preceding state after the lapse of the predetermined time period (G78).

Further, whenever the up arrow key 33U or the left arrow key 33L is depressed from the state of the option "SIDE:H" being displayed (G78), the options are displayed in the order of "SIDE:H"→"SIDE:V"→"MAIN H"→MAIN V" (G75 to G78). When the up arrow key 33U or the left arrow key 33L is further depressed in the state of the option "MAIN V" being displayed (G75), the indicator display block is flickered for caution at step S79, followed by returning to the immediately preceding state after the lapse of the predetermined time period (G75).

Further, when the enter key 38 is depressed in the state of any of the options "MAIN V", "MAIN H", "SIDE:V" and "SIDE:H" being displayed (G75 to G78), the screen is changed to a second level (second highest level) under the option selected at one of the steps S75 to S78. When the delete key 35 is depressed at the second level, the screen returns to the immediately preceding state (G75 to G78). In the following, description is made of an example in which the enter key 38 is depressed in the state of the option "SIDE:V" displayed (G77), thereby displaying the second level menu under this option at step S77.

Referring to FIG. 46, when the enter key 38 is depressed in the state of the option "SIDE:V" being displayed (G77), first, the present state of settings or configuration is displayed. Here, it is assumed by way of example that a configuration screen "SIDE:±00" which is an initial state of the configuration is displayed at step S83.

Whenever the up arrow key 33U is depressed from the above state, (S83), the screen is switched to display options in the order of "SIDE: ↑01", "SIDE: ↑02", "SIDE: ↑03", . . ., "SIDE: ↑10" (G82 to G81). When the up arrow key 33U is further depressed in the state of the option "SIDE: ↑10" being displayed, the indicator display block is flickered for caution at step S81, followed by returning to the immediately preceding state after the lapse of the predetermined time period (G81).

Further, whenever the down arrow key 33D is depressed from the state of the option "SIDE: ↑10" being displayed, the screen is switched to display options in the order of "SIDE: ↑09", "SIDE: ↑08", "SIDE: ↑02", "SIDE: ↑01", "SIDE:±00", "SIDE: ↓01", "SIDE: ↓02", . . ., "SIDE: ↓10" (G81 to G83 to G85). When the down arrow key 33D is further depressed in the state of the option "SIDE: ↓10" being displayed, the indicator display block is flickered for caution at step S81, followed by returning to the immediately preceding state after the lapse of the predetermined time period (G81).

Further, when the enter key 38 is depressed in the state of any of the options ranging from "SIDE: ↑10" via "SIDE:±00" to "SIDE: ↓10" (G81 to G83 to G85), the printing position is set to a value corresponding to the displayed one in the screen, followed by returning to the screen in the basic entry mode (G86: the same as G71 in FIG. 44).

For instance, when the enter key 38 is depressed in the sate of the option "SIDE: ↑10" being selected, the printing position is adjusted to "+10" (shifted upward by 10 dots) by the vertical adjustment of the printing position in the sate of the side label being selected. Further, when the option "SIDE:±00" is selected, the printing position is set to an initial position without shifting the same, whereas when the option "SIDE: ↓10" is selected, the printing position is adjusted to "−10" (shifted downward by 10 dots).

In short, the user selects one of the above options by operating the up arrow key 33U or the down arrow key 33D, and depresses the enter key 38, whereby he (she) can adjust or shift the printing position in units of one or more dots to any of 21 positions in a range of −10 to +10 in the vertical directions.

If an option other than the option "SIDE V" is selected in the state of the first level being displayed, described above with reference to FIG. 45, another kind of adjustment of the printing position can be carried out similarly. For instance, when the enter key 38 is depressed in the state of the option "SIDE:H" (G78) being displayed, the screen is changed to the second level under the option "SIDE:H" so that at the second level corresponding to FIG. 46, the user can selectively display the screens of "SIDE:←15" (the printing position is shifted forward (leftward) by 15 dots) via "SIDE:±00" to "SIDE:→15" (the printing position is shifted rearward (rightward) by 15 dots) by operating the left arrow key 33L or the right arrow key 33R. Then, by depressing the enter key 38, he (she) can adjust or shift the printing position in units of one or more dots to any of 31 positions in a range of −15 to +15 in the horizontal direction (left-right direction).

Similarly, the user can select the option "MAIN V" (G75 in FIG. 45), to thereby adjust or shift the printing position for the main label in unit of one or more dots to any of 21 positions in a range between "MAIN:↑10" (+10) and "MAIN:↓10" (−10) in the vertical direction. Further, the user can select the option "MAIN H" (G76), thereby adjusting or shifting the printing position for the main label in units of one or more dots to any of 31 positions in a range between "MAIN:←15" (+15) and "MAIN:→15" (−15) in the horizontal direction.

A value set in the above adjustment process, if it is the vertical position adjustment, is used for adjusting data to be sent to the print head 7 (in the same manner as described above with reference to FIGS. 38A to 38E) in the vertical printing position adjustment process (S4821), described above with reference to FIG. 26, whereas if it is for the horizontal position adjustment, it is used for adjusting pre-print tape feed, which will be described hereinafter with reference to FIG. 47, in the side label presence/absence detection & horizontal printing position adjustment (S4822) to be carried out thereafter.

As described hereinbelow, in the tape printing apparatus 1, by using some (256 dots) of the plurality of dot elements (276 of 288 dot elements) of the print head 7 arranged in a predetermined direction (vertical direction in this embodiment), a print image having a dot number (256 dots) smaller than the maximum printable dot number (276 dots) in the predetermined direction, is printed on a print material (tape T), while moving the print head and the print material relative to each other (i.e. moving the tape T relative to the print head 7) in a direction orthogonal to the predetermined direction.

In this process, the range (256 dots) of use of the plurality of dot elements is shifted in the predetermined direction, whereby a printing position for printing the print image is adjusted or shifted in units of one or more dots by the minimum adjustment amount of one dot. Hence, the print image can be printed in a predetermined printing area on the print material. Further, it is possible to adjust the printing position in the direction orthogonal to the predetermined direction, that is, in the direction of the relative movement, by using a method of controlling the relative movement to adjust a print start/end position.

Further, in the above example, the predetermined printing area is the area of a half-die-cut label (main label or side label) formed in the print material (tape T) formed by half die cutting, so that if only the print image is printed on the half-die-cut label as the predetermined printing area and the half-die-cut label is peeled off, a label printed with a desired print image can be formed. Positions of half-die-cut labels can also vary (due to manufacturing errors or the like), resulting in displacement of the areas of the half-die-cut labels as the predetermined printing areas. Even in such a case, printing positions can be adjusted in a manner adapted to the displaced areas. Further, there are provided a plurality of types of half-die-cut labels, and the printing position is adjusted according to each of the plurality of types of labels. Hence, the printing position can be adjusted in a manner adapted to the type of a half-die-cut label.

Further, in this embodiment, the printing position or the range of actual use of dot elements is designated in units of one or more dots by using a dot count with a plus or minus sign which represents an adjustment amount of the printing position with respect to a predetermined reference position. Although in the above example, an initially set position is set to the predetermined reference position, this is not limitative, but not such a predetermined fixed position but the present printing position may be set to a reference position to designate other printing positions with respect to the reference position by using a dot count with a plus or minus sign.

Although in the example described above with reference to FIG. 26, the vertical adjustment of the printing position is carried out before executing the side label presence/absence detection & horizontal printing position adjustment (S4822), there is no need to carry out the vertical adjustment prior to the execution of this step, but the vertical adjustment may be carried on any time before execution of printing at step S502 (for instance, by transmitting an adjustment amount to the head driver 272).

Further, in the above example, the results of adjustment of the printing position are used for adjustment or control of data to be sent to the print head 7. In addition, it is possible to adjust the position of an effective image range in a print image as well as adjust the range of use of the plurality of dot elements (256 dots) of the print head 7. That is, it is possible to form a print image having a dot width of 276 dots as the maximum printable dot number, and adjust the position of an effective (meaningful) part of the image having a width of 256 dots out of the 276 dots, while leaving the other part of the image as a blank image. Further, if this method is not suitable for saving the capacity of the memory device, only a portion of the print image to be printed immediately after forming the same may be sequentially formed, thereby saving the capacity of the memory device.

Next, a type-detecting method of detecting the type of an access object used in the tape printing apparatus regarded as an electronic apparatus will be described hereinafter. First, the principles of the method are mainly described.

Conventionally, the type-detecting method of detecting the type of an access object of the this kind and a device therefor are applied to a stamp making apparatus as an electronic apparatus, for instance. In such a stamp-making apparatus, a stamp body (access object) as a stamp-making material is formed with a plurality of recesses corresponding to a predetermined pattern for discriminating the type of the stamp body. When the stamp body is mounted in the compartment of the stamp making apparatus, the pattern of the stamp body is discriminated according to the plurality of recesses formed in the stamp body by a detecting device of a contact type, comprised e.g. of limit switches, arranged on the bottom of the compartment, and based on the detected pattern, the type of the stamp body mounted is determined.

Further, for instance, in a tape printing apparatus as an electronic apparatus, a tape (access object) as a print material, which is contained in a tape cartridge corresponding to the type of the tape, is mounted in the compartment of the tape printing apparatus. The tape cartridge is formed with a plurality of recesses similar to those formed in the stamp body, which form a predetermined determination pattern for detecting the type of the tape loaded or mounted. When the tape cartridge is loaded in the compartment of the tape printing apparatus, the type of the tape cartridge, that is, the type of the tape held in the tape cartridge can be detected by the same method described above.

However, in the conventional type-detecting method and device for detecting the type of an access object, in the stamp making apparatus, for instance, when one of various stamp bodies (access objects) having respective different shapes is mounted, it is sometimes impossible to normally detect the type of the mounted stamp body, depending on the type thereof. This is because when a stamp body is mounted to be brought into contact with the above mechanical detecting device comprised e.g. of limit switches, for detection, the stamp body can be so light as to be lifted up from the compartment, or it can be so small that it cannot properly face the detecting device.

Further, when a compact and light stamp body is mounted as the stamp-making material, since a stamping face thereof to be formed with a stamp is also small in size, it is required to carry out a stamp making process with higher accuracy than when the process is carried out on other stamp bodies larger in size. In other words, when a stamp body (access object) whose stamp has to be made with the highest accuracy is mounted, the type of the stamp body cannot be detected, or even if it can be detected, the stamp body can be displaced from a predetermined mounting position thereof due to the contact made for detection, resulting in an increased frequency of occurrence of the mounting error.

The tape printing apparatus also suffers from the problems described above. That is, if a tape having a small width and requiring the most accurate printing operations is loaded in the compartment in a state held in a tape cartridge adapted to the width of the tape, the tape cartridge itself is required to be small in size. Therefore, such a tape cartridge can be so light as to be easily lifted up from the compartment, or so small that it cannot properly face the detecting device, which hinders normal detection of the type of the tape held therein, or causes the mounting error to exceed an allowable tolerance. However, if a tape having a small width is held in a large-sized tape cartridge, errors such as holding errors and feeding errors in feeding the tape, become conspicuous.

To eliminate the above inconveniences, the tape printing apparatus 1 regarded as an electronic apparatus which has one of a plurality of types of access objects mounted therein and accesses the mounted access object in a manner dependent on the type thereof employs a type-detecting method which is capable of detecting the type of a mounted one of access objects which are classified into a plurality of types, and minimizing mounting errors in mounting a predetermined type of access object in the compartment thereof.

Before describing this method, a conventional method will be described hereafter in the first place. If an access object, such as the stamp body, or an object cartridge, such as the tape cartridge holding a tape as the access object, is provided with maximum k (k represents a natural number) recesses or the like for discriminating the type of a stamp body or tape, it is possible to configure k-bit patterns according to the presence or absence of each recess. The patterns are discriminated by the mechanical detecting device, comprised e.g. of limit switches, whereby generally, m (m=$k^2$) types of discrimination can be effected. However, usually, one of the patterns is assigned to a state in which no access object is mounted (this state will be referred to hereinafter as "the state of no mounted access object"), so that K-bit patterns are used to effect (m−1) types of discrimination of mounted access objects and one type of discrimination of the state of no mounted access object, that is, a total of m types of discrimination.

In this case, if there are provided k (=3) recesses for detection, out of k (=3)-bit patterns, that is, out of m=8 (=$2^3$) types of patterns [0, 0, 0], [0, 0, 1], [0, 1, 0], [0, 1, 1], [1, 0, 0], [1, 0, 1], [1, 1, 0] and [1, 1, 1], one type of a pattern is assigned to the state of no mounted access object, and the other (m−1=7) types of patterns are assigned to seven types of access objects.

The same can be applied to other sets of patterns using another number of bits. For instance, if there are provided 3 (=m) types of access objects, out of 2 (=k)-bits patterns [0, 0], [0, 1], [1, 0] and [1, 1], e.g. [0, 0] is assigned to the state of no mounted access object, and the other patterns [0; 1], [1, 0] and [1, 1] are assigned to 3 (=m) types of access objects, respectively.

By carrying this idea forward, for instance, in the above case of 3-bit patterns, if the state of no mounted access object is regarded as a particular access object and the pattern [0, 0, 0] is assigned to the same, the patterns [0, 0, 1] to [1, 1, 1] can be assigned to the other seven types of access objects. Further, if only 4 (=m) types of access objects are provided, out of the seven types of patterns [0, 0, 1] to [1, 1, 1] except for the pattern [0, 0, 0] assigned to the state of no mounted access object, any four patterns are assigned to the four types of access objects.

In the above cases, to determine the presence or absence of any access object from a detected pattern, that is, to determine therefrom only whether any access object is mounted or not, it is only required e.g. to determine whether or not the pattern is comprised of all 0's. The determination can be made easily based on a logic circuit or a program of a logical OR operation by determining whether the logical sum of three bits of the detected pattern is 1 or 0.

Further, if there are provided four or less types of access objects, to determine the presence or absence of access objects more easily, a predetermined one of the three bits may be assigned such that the same indicates the presence or absence of any access object. For instance, if the case of the first one (predetermined) bit being 1 is assumed to designate that any access object is mounted, and the patterns [1, 0, 0], [1, 0, 1], [1, 1, 0] and [1, 1, 1] are assigned to respective patterns for discriminating four types of access objects, the presence or absence of any access object can be determined simply by detecting whether the first one (predetermined) bit is 1 or 0.

In this case, however, whether or not any access object is mounted is determined by the first one (predetermined) bit, so that it is determined not only by the pattern [0, 0, 0] but also by the patterns [0, 0, 1], [0, 1, 0], and [0, 1, 1] that no access object is not mounted. In the following, such a pattern is represented by a pattern [0, -, -], wherein the symbol "-" designates a "don't care bit".

That is, in the above case, four types of patterns [1, 0, 0], [1, 0, 1], [1, 1, 0], and [1, 1, 1] are assigned as patterns for discriminating four types of access objects, in addition to the pattern [0, -, -] for indicating that no access object is mounted.

Further, for instance, when 2 (=m) types of access objects are provided, out of 2 (=k)-bit patterns, a pattern [0, -] is assigned to one for indicating that there is no access object mounted, and patterns [1, 0] and [1, 1] are assigned to ones for discriminating two types of access objects, respectively, such that a predetermined bit indicates the presence or absence of any access object respectively.

Actually, when a method of assigning determination patterns to m (=$2^k$) types of access objects is contemplated, if the state of no mounted access object as well as the m (=$2^k$) types of access objects are desired to be detected, it is conceptually natural that 4 (=$2^2$) types of access objects and the state of no mounted access object, for instance, the pattern [0, -, -] is assigned to the state of no mounted access object, and the patterns [1, 0, 0], [1, 0, 1], [1, 1, 0] and [1, 1, 1] are assigned to the four (=$2^2$) types, whereas to detect two (=$2^1$) types of access objects and the state of no mounted access object, the pattern [0, -] is allocated to the state of no mounted access object, and the patterns [1, 0] and [1, 1] are assigned to the two types. That is, this pattern assignment method conforms to a naturally or spontaneously conceived idea that it is first determined whether or not only access object is mounted, and if mounted, the type thereof is discriminated.

In the above cases, if bit patterns for determination of whether or not any access object is mounted and discrimination of a type of the mounted access object are described by using a combination of separately expressed respective parenthesis bit-pattern forms, in the case of the four ($=2^2$) types of access objects and the state of no mounted access object being detected, a patterns for detecting the state of no mounted access object can be expressed as [0] [-, -], and patterns for discriminating the four types can be expressed as [1] [0, 0], [1] [0, 1], [1] [1, 0] and [1] [1, 1]. That is, it is determined by a predetermined one bit whether or not only access object is mounted, and if mounted, it becomes effective to discriminate the type of the mounted access object by the other two bits. Similarly to the above case of two ($=2^1$) types of access objects and the state of no mounted access object being detected, a pattern for detecting the state of no mounted access object corresponds to [0] [-], and patterns for discriminating the two types can be expressed as [1] [0] and [1] [1]. That is, it is determined by a predetermined one bit whether or not only access object is mounted, and if mounted, it becomes effective to discriminate the types of the mounted access object by the other one bit.

Differently from the conventional method, in the type-detecting method used by the tape printing apparatus 1 for detecting the types of access objects, in the above case of the four ($=2^2$) types of access objects and the state of no mounted access object being detected, the pattern [0, 0, 0] is assigned to the state of no mounted access object, and the patterns [1, 0, 0], [-, 0, 1], [-, 1, 0] and [-, 1, 1] are assigned to the four ($=2^2$) types. Similarly, when bit patterns for determination of whether or not any access object is mounted and discrimination of a type of the mounted access object are expressed by using a combination of separately expressed respective parenthesis, a pattern for detecting the state of no mounted access object can be expressed as [0] [0, 0], and patterns for discriminating the four types can be expressed as [1] [0, 0], [-] [0, 1], [-] [1, 0] and [-] [1, 1].

That is, it is not necessarily determined first whether or not any access object is mounted, but it is determined whether or not a mounted access object belongs to three of the four types, [-] [0, 1], [-] [1, 0] and [-] [1, 1] (i.e. whether or not any of the three types of access objects is mounted). In this case, a predetermined bit becomes effective for determining whether the remaining only one type of access object left undetermined is mounted or no access object is mounted at all. In this discrimination of four types of the access objects, the type of the access object left undetermined is set to the predetermined type of an access object.

Further, the same can be applied to the above case of two ($=2^1$) types of access objects and the state of no mounted access object being detected. In this case, a pattern [0] [0] is assigned (caused to correspond) to the state of no mounted access object, and patterns [1] [0], [-] [1] to the two types, and hence it is determined whether or not a mounted access object belongs to one of the two types, [-] [1] (i.e. whether or not the one type is mounted). A predetermined one bit is effective for determining whether the remaining only one type of an access object left undetermined is mounted or no access object is mounted at all. In this discrimination of two types of access objects, the type of the access object left undetermined is set to be predetermined type of an access object.

Furthermore, two bits for discrimination of four types of access objects and one bit for discrimination of two types of access objects are detected by a mechanical contact-type detecting device comprised e.g. of limit switches, similarly to the conventional apparatus, while the predetermined one bit for determination as to whether or not any access object is mounted, is detected by a non-contact-type detecting device.

The above-mentioned points are summarized as follows. According to the type-detecting method used by the tape printing apparatus 1, the mounting of any of (m−1) types of access objects except for a predetermined type out of m ($2^k \geq m > 2^k - 1$, wherein k represents a natural number) types of access objects, and at the same time the type of the mounted access object, are detected by a contact-type detecting device, while whether or not any access object is mounted is detected by a non-contact-type detecting device. If it is not detected that any of the (m−1) types of access objects is mounted, when it is detected by the non-contact-type detecting device that an access object is mounted, it is determined that the predetermined type of access objects is mounted.

In other words, when the tape printing apparatus 1 is regarded as an electronic apparatus which has one of m (a plurality of) types of access objects mounted therein and accesses the mounted access object in a manner dependent on the type thereof, the type-detecting method of detecting the type of an access object employed by the tape printing apparatus 1 according to the present embodiment defines a predetermined one of the m (plurality of) types of access objects, and detects the type of a mounted one of the access objects while minimizing mounting errors in mounting the predetermined type of access object by carrying out non-contact detection of this predetermined type.

Further, by providing a contact-type detecting device for detecting the mounting of any of the (m−1) types of access objects and discriminating the type of the mounted access object, it is possible to detect the mounting of the m types of access objects and discriminate the type of the mounted access object, which enables the contact-type detecting device to be designed compact in size.

In other words, to detect the mounting of any of the m ($=2^k$) types of access objects and discriminate the type of the mounted access objects, it is conventionally required to provide a contact type detecting device which is capable of detecting (k+1)-bit patterns to make (m+1) ($=2^k+1$) kinds of determination as the sum of one kind of determination of the state of no mounted access object and m kinds of determination for determining the types of m types of access objects. However, according to the type-detecting method applied to the tape printing apparatus 1, to make the above-mentioned m ($=2^k$) kinds of determination, it is only required that a contact-type detecting device which is capable of detecting k-bit patterns is provided. This enables the contact-type detecting device to be designed compact in size. On the other hand, the non-contact-type detecting device is only required to be capable of detecting whether or not an access object is mounted at all as the minimum requirement, whereby it is possible to employ a non-contact-type detecting device having a simple configuration.

This point will be further described in the following. To adopt the type-detecting method of this kind, each access object mounted in an electronic apparatus employing the method is formed with maximum k recesses, holes or equivalent cut-away portions corresponding to k bits for forming predetermined k-bit patterns to be detected by a contact-type detecting device. Recesses, holes or equivalent cut-away portions of an access object of a predetermined type are shaped such that the same predetermined pattern as one detected when no access object is mounted is detected by the contact-type detecting device.

The type-detecting method and device are suitable for use with e.g. an apparatus whose access object is easily formed with the recesses, holes or equivalent cut-away portions of a stamp body or the like, that is, for use with an electronic apparatus, such as a stamp making apparatus or the like.

Further, a pattern detected by the contact-type detecting device when an access object of the predetermined type is mounted and a pattern detected by the same when no access object is mounted are identical. Therefore, the access object of the predetermined kind is formed with recesses, holes or equivalent cut-away portions corresponding to the pattern detected when no access object is mounted, that is, the pattern detected when the contact-type detecting device makes no contact with any object. This makes it possible to minimize mounting errors, such as an error that the access object is lifted up from the compartment due to contact for detection.

Further, in the above case, it is preferred that the above predetermined pattern has a k-bit pattern comprised of all 0's. That is, if the predetermined pattern has a k-bit pattern comprised of all 0's, it is most suitable for an image representative of the state of no mounted access object, which is most frequently detected and at the same time provides the easiest pattern to process in mathematical operations, whereby it is possible to enhance efficiency of detection processing carried out by the apparatus.

Furthermore, in the above cases, the contact-type detecting device, for instance, has k mechanical switches activated by abutment against portions where maximum k recesses, holes, or equivalent cut-away portions are formed or left unformed. A state where a switch is prevented from abutting the above portions by forming a corresponding recess, hole or equivalent cut-away portion is caused to correspond to [0] of a corresponding bit of the pattern, whereas a state where the switch abuts a corresponding portion is caused to correspond to [1].

In this case, the contact-type detecting device implemented by the k switches can detect k bit patterns to make a total of m kinds of determination as the sum of one kind of determination of the state of no mounted access object and (m−1) kinds of determination of the (m−1) types of access objects, so that it is possible to detect the mounting of any of the (m−1) types of access objects and discriminate the type thereof. Further, in this case, the recesses, holes, or equivalent cut-away portions of the predetermined type of access object are formed into shapes which prevent all the k switches from abutting the access object, that is, which prevent all the switches from being brought into contact with the access object, whereby it is possible to use the same pattern as used in the case of no access object being mounted, for detecting the predetermined type of access object.

On the other hand, as described above, in the tape printing apparatus as the electronic apparatus, a tape (access object) as a print material is generally held in a tape cartridge corresponding to the type of the tape and mounted in the compartment of the tape printing apparatus 1 in the state held in the tape cartridge.

Therefore, to apply the above type-detecting method of detecting the type of an access object to the electronic apparatus of this kind, that is, the electronic apparatus, each access object is mounted in a compartment in the state held in an access object-holding cartridge corresponding to the access object. The cartridge is formed with maximum k recesses, holes or equivalent cut-away portions corresponding to k bits of predetermined patterns for detection by a contact-type detecting device. The recesses, holes or equivalent cut-away portions of the cartridge holding an access object of a predetermined type are formed such that when the same predetermined pattern as one detected when no access object mounted is detected by the contact-type detecting device.

The type-detecting method and device of this particular kind is suitable for use with an apparatus whose access object, such as a tape or the like, is difficult to be formed with recesses, holes or equivalent cut-away portions, that is, for use with a stamp making apparatus or like electronic apparatuses.

In the tape printing apparatus 1, actually, as described above, there are provided several kinds of tape cartridges 5 each holding a corresponding one of the above-mentioned tapes T, that is, tapes T ranging from a side label(LS)-forming tape T having a width of approximately four mm to a case label(LMC)-forming tape having a width of approximately 52 mm, as well as tapes T without half-die-cut labels formed therein, respectively. For convenience of description and clarity thereof, it is assumed that there are provided only two kinds of tapes (a main label-forming tape T and a side label-forming tape T) as shown in FIGS. 4A and 4B, and hence, this case corresponds to the above case where the two ($=2^1$) types of access objects and the state of no mounted access object are detected.

That is, since the pattern [0][0] is assigned to the state of no mounted access object, and the patterns [1][0], [-][1] to the two types of access objects, it is determined whether or not the mounted access object belong to one of the two types, i.e. [-][1] (whether or not the one type is mounted). In this case, a predetermined one bit becomes effective for determining whether only the one type of access object left undetermined is mounted or no access object is mounted at all. In discrimination of the two types of access objects, the type of the access object left undetermined is set to a predetermined type of an access object.

More specifically, the side label-forming tape T for use in forming the side label LS is set to the predetermined one type. This is because the side label-forming tape T has a width smaller than that of the main label-forming tape T (see FIGS. 4A and 4B) for forming the main label LM, so that a holding error is liable to occur when it is held in the tape cartridge 5, and because the tape cartridge 5 is so thin that a mounting error in mounting the same in the compartment 6 liable to occur and moreover, accuracy in printing position is required due to the small printing area (area of a half-die-cut label) of the tape.

In the tape printing apparatus 1, as described above with reference to FIG. 1 and the like or as shown in FIGS. 49A and 49B, the compartment 6 includes a tape-discriminating sensor 141 comprised e.g. of a micro-switch or limit switch. Further, the tape position sensor 143 comprised of a photo interrupter or the like, for detecting the position of the tape T through optical sensing (in this embodiment, by using reflected light) is arranged in the vicinity of the tape exit 22.

Referring to FIGS. 48A and 48B, as viewed from below or the bottom side of the type cartridge 5 (as viewed from below or the bottom side such that the tape-sending slit 56 is positioned on the right-hand side), the FIG. 48A tape cartridge 5 holding the main label-forming tape T is shaped such that when mounted in the compartment 6, the same abuts on the mechanical switch (the above micro-switch, limit switch or the like) of the tape-discriminating sensor 141. On the other hand, the FIG. 48B tape cartridge 5 holding the side label-forming tape T is formed with a recess 71 for avoiding contact with the mechanical switch such that the tape cartridge is kept from contact with the tape-discriminating sensor 141.

As a result, when the FIG. 48A tape cartridge 5 holding the main label-forming tape T is mounted in the compartment 6, the tape-discriminating sensor 141 detects the mounting of the FIG. 48A tape cartridge 5 in the compartment 6, whereas when the FIG. 48B tape cartridge 5 holding the side label-forming tape T is mounted, the tape-discriminating sensor 141 detects the same state as that of the tape cartridge being not mounted.

Let it be assumed that, a flag bit (hereinafter referred to as "the side label detection flags) indicative of a result of optical (non-contact) sensing carried out by the tape position sensor 143 (non-contact-type detecting device), and a flag bit (hereinafter referred to as "the main label detection flag") indicative of a result of detection carried out by the tape-discriminating sensor 141 (contact-type detecting device) using the mechanical (contact-type) limit switch or the like are represented in side-by-side notation of [side label detection flag] [main label detection flag]. Then, as described above, the pattern [0] [0] is assigned to the state of no mounted access object, the pattern [1] [0] is assigned to one (side label-forming tape T) of the two types of tape T, and the pattern [-] [1] to the other (main label-forming tape T) of the two types of tape T.

Therefore, when the tape cartridge 5 holding one (main label-forming tape T) of the two types of tape T, that is, one holding the tape T for use in forming the main label LM is mounted in the compartment 6, the mounting of the tape cartridge is detected, so that the type of tape T is determined based on only a result of detection carried out by the tape-discriminating sensor 141 (contact-type detecting device). If it is not determined, that is, if the result of the detection is the same as that of the state of the tape cartridge being not mounted, it is determined based on a result of detection carried out by the tape position sensor 143 (non-contact-type detecting device) whether there is no tape cartridge mounted or the tape cartridge 5 holding the tape T for use in forming the side label LS is mounted.

As described above with reference to FIG. 26, in the print data-forming process (S481), first, it is determined at step S4811 whether or not the disc label or the case label is selected. Here, for instance, when the power of the tape printing apparatus 1 is turned on in advance by operating the power key 31, or when the opening or closing of the lid 21 is detected by the lid opening/closing sensor 142 (i.e. when there is a possibility of replacing the tape cartridge 5), it is detected by the tape-discriminating sensor 141 whether or not the tape cartridge 5 for holding a main label-forming tape T is mounted. If the tape cartridge 5 is mounted, the main label detection flag is ON (=1) (that is, the type of tape T is already determined).

Therefore, when it is determined next at step S4812 whether or not the tape cartridge 5 for holding a main label-forming tape T is mounted, it is only required to check whether the main label detection flag is ON or OFF (1 or 0).

Further, thereafter, when the print image-forming process (S4813) is terminated, followed by terminating the print data-forming process at step S481, next, the label-positioning process (S482) is carried out. In this label-positioning process (S482), first, the vertical printing position adjustment process (S4821) is carried out according to the settings of the printing position, described above with reference to FIG. 46. etc. and then, the side label presence/absence detection & horizontal printing position adjustment (S4822) is started.

In the side label presence/absence detection & horizontal printing position adjustment (S4822), as shown in FIG. 47, first, a side label presence/absence detection process (S48221) is carried out and thereafter, a horizontal printing position adjustment process (S48222) is executed.

In the side label presence/absence detection process (S48221), first, it is determined at step S482211 whether or not the main label cartridge is mounted, that is, whether or not the main label detection flag is ON. If the main label detection flag is ON (Yes to S482211), the side label presence/absence detection process (S48221) is terminated in this state, and the flow proceeds to the horizontal printing position adjustment process (S48222).

On the other hand, when the main label detection flag is OFF (No to S482211), next, it is determined at step S482212 whether or not (the tape cartridge for holding) a side label-forming tape T is already detected, that is, whether or not the side label detection flag is ON. If the side label detection flag is ON (Yes to S482212), similarly, the side label presence/absence detection process (S48221) is terminated in this state, and the flow proceeds to the horizontal printing position adjustment process (S48222).

Further, if the side label detection flag is OFF (No to S482212), next, it is detected and determined at step S482213 whether or not the tape T is mounted, that is, it is detected by the tape position sensor 143 (optical sensor: by emitting light to a portion of the tape exit 22, where the tape T should exist and receiving reflected light from the tape T, by using the photo interrupter or the like) and determined based on a result of the detection whether or not the tape T exists.

If it is detected that the tape T exists (Yes to S482213), it is determined that the tape cartridge 5 holding a side label-forming tape T is mounted. Then, after the side label detection flag is set or turned ON at step S482216, the side label presence/absence detection process (S48221) is terminated, and the flow proceeds to the horizontal printing position adjustment process (S48222).

On the other hand, if the existence or presence of the tape T is not detected (No to S482213), it is detected, while feeding the tape T maximum 13 mm at step S482214, by the tape position sensor 143 whether or not the tape T exists. If it is detected in the course of the feeding of the tape T that the tape T is mounted or exists (Yes to S482215), it is determined that the tape cartridge 5 holding a side label-forming tape T is mounted, and after setting the side label detection flag at step S482216, the side label presence/absence detection process (S48221) is terminated, and the flow proceeds to the horizontal printing position adjustment process (S48222).

The tape T is fed maximum 13 mm, since 13 mm corresponds to a distance over which the tape T is fed from the tape-sending slit 56 to a position where the tape T can be detected by the tape position sensor 143, that is, a distance over which the tape T is required to be sent from the tape-sending slit 56 to the tape exit 22, when the tape T is mounted in the compartment 6 with only a small portion of the tip thereof is outward of the tape-sending slit 56 (see FIGS. 1, 48A, 48B, 49A and 49B).

Therefore, although the tape is fed maximum 13 mm, if the existence of the tape T cannot yet be detected (No to S482215), it is determined that the tape cartridge 5 is not loaded, and a no-tape cartridge detection flag is set or turned ON at step S482217. In the following horizontal printing position adjustment process (S48222) an error flag is simply set at step S482224, followed by terminating the process at step S48223.

On the other hand, when the flow proceeds to the horizontal printing position adjustment process (S48222) in the state of the main label detection flag or the side label detection flag being set, first, detection of the reference hole TH, described above with reference to FIGS. 4A, 4B and the like, for detecting the position of the tape T is carried out by using the tape position sensor 143, that is, the tape T is fed until the reference hole TH is detected by the tape position sensor 143 at step S482221.

After the reference hole TH is detected (S482221), it is determined at step S482222 whether or not the reference hole TH has a predetermined length. If the reference hole TH do not have the predetermined length (No to S482222), the error flag is set at step S482224, followed by terminating the process at step S48223.

On the other hand, when the reference hole TH has the predetermined length (Yes to S482222), next, the pre-print tape feed is carried out at step S482223. In this process, if the option "MAIN H" (G76) or the option "SIDE H" (G78) has been selected to set the same, the pre-print tape feed (S482223) is carried out according to the set value, whereas when neither of the options is set, the pre-print tape feed (S482223) is carried out to feed the tape T to the reference position, followed by terminating the process (S48223). This pre-print tape feed (S482223) and the post-print tape feed (S503) in the during-printing display process (S50), described hereinabove with reference to FIG. 26, which is executed after the present process is terminated, are carried out, for horizontal adjustment of the printing position.

As described above with reference to FIG. 26, after terminating the label-positioning process at step S482, it is determined at step S483 whether or not results of the detections carried out by the process are normal. Here, when the error flag is set at step S482224 in FIG. 47 to indicate some error (No to S483), that is, when no cartridge is mounted or when the detected position of the reference hole TH is not normal (No to S483), similarly to the above case in which the tape cartridge 5 mounted is different from the one selected (No to S4812), the label replacement display process (S49) for displaying an error message or the like to prompt the user to replace the label is carried out, followed by returning to the screen in the basic entry mode at step S51.

On the other hand, as described hereinbefore with reference to FIG. 25 and the like, when the in-preparation display process (S48) is normally terminated, next, the during-printing display process (S50) is executed, and then the printing process is terminated, followed by returning to the screen in the basic entry mode at step S51.

Although in the above example, in order to detect the mounting of (the tape cartridge 5 holding) a tape T (for use in forming a main label LM) of one (=m−1) of two types (m=2=$2^1$, i.e. k=1) of tapes T as an access object by using the tape-discriminating sensor 141, the presence or absence of one (=k) recess (k=1-bit pattern) is detected, this is not limitative, but when there are provided a lot of types of tapes T (and corresponding tape cartridges 5), it is also possible to form more and maximum k recesses according to the types of tape T, to thereby detect a k-bit of pattern.

In the above case, it is possible to detect the mounting of any of tapes T of maximum $2^k$ types including a predetermined type of (side label-forming) tape T discriminated from the state of no tape T (no cartridge) being mounted by using the tape position sensor 143, and the type of the mounted type. Further, the tape cartridge 5 may be formed with any suitably shaped portions, such as holes, cut-away portions, or concave portions, which are equivalent to recesses.

Further, also in a tape printing apparatus for mounting (or inserting therein) tapes without any cartridges containing the same, each tape can be formed with holes for detection which have a different pattern according to the type of the tape. In such a variation as well, it is possible to set a tape requiring the highest printing accuracy to a tape of a predetermined type, thereby minimizing mounting errors in mounting the tape of the predetermined type.

As described above, in the type-detecting method of detecting the type of an access object employed in the tape printing apparatus 1, each access object (tape T) is mounted in the compartment 6 in the state of the access object (tape T) being held in an access object-holding cartridge (tape cartridge 5) corresponding to the same. The access object-holding cartridge is formed with maximum k recesses, holes or equivalent cut-away portions corresponding to predetermined k-bit patterns to be detected by a detecting device of a contact type (the tape-discriminating sensor 141).

In this embodiment, similarly to the variation in which the access object itself is formed with recesses, holes or equivalent cut-away portions corresponding to the k-bit patterns for detection of the type of the access object, the recesses, holes or equivalent cut-away portions of an access object-holding cartridge holding an access object of a predetermined type are formed such that the same predetermined pattern as one detected when no access object is mounted is detected by the contact-type detecting device.

Therefore, the access object of the predetermined type is formed with recesses, holes or equivalent cut-away portions corresponding to the pattern detected when no access object is mounted, that is, the predetermined pattern detected when no access object is mounted, and hence the contact-type detecting device is kept from contact, which makes it possible to minimize mounting errors, such as an error that the access object is lifted up from the compartment due to contact for detection.

Further, in the type-detecting method of detecting the type of an access object applied to the tape printing apparatus 1, when an access object (tape T) is mounted in the apparatus in the state of the same being held in a corresponding access object-holding cartridge (tape cartridge), the access object (tape T) is sent out from the access object-holding cartridge (i.e. from the tape-sending slit 56 of the tape cartridge 5) and then, it is detected (by the tape position sensor 143) whether or not the access object (tape T) exists at a position (near the tape exit 22) where the access object sent out should exist.

That is, since the access object sent out is detected, it is possible to determine the presence or absence of the access object without providing an access object-holding cartridge with a particular configuration only for detection. Further, an electronic apparatus, which accesses an access object mounted therein in a state received in a cartridge, generally has a device for sending out the access object (this holds true with the tape printing apparatus 1), and hence the device can be utilized for sending the access object for detection.

Further, in the above example, as described above, the predetermined pattern has a k-bit pattern formed of all 0's, so that the pattern is the most suitable for an image representative of the state of no mounted access object, which is most frequently detected, and at the same time provides the easiest pattern to process in mathematical operation, whereby it is possible to enhance the efficiency of the detection processing carried out by the apparatus.

Furthermore, in the above example, as described above, the contact-type detecting device (tape discriminating sensor 141) has k (k=1 in the above example) mechanical switches activated in dependence on results of the switches being brought into contact with portions formed (or not formed) with maximum k recesses, holes, or equivalent cut-away portions. A state where each switch is not in contact with a corresponding one of the above portions by the presence of a corresponding recess, hole or equivalent cut-away portion is caused to correspond to [0] of a bit of the pattern, whereas a state where the switch is in contact with the corresponding portion is caused to correspond to [1].

In this case, the contact-type detecting device using the k switches can detect k bits of patterns for making a total of m kinds of determination as the sum of one kind of determination of the state of no mounted access object and (m−1) kinds of determination for determining the types of the access objects of (m−1) types, whereby it is possible to detect the mounting of the (m−1) types of access objects and discriminate the types thereof. Further, in this case, the recesses, holes, or equivalent cut-away portions of the predetermined type of access object are formed into shapes which prevent all the k switches from abutting the access object, that is, which prevent all the switches from being brought into contact with the access object. This makes it possible to use the same pattern as used in the case of no access object being mounted for detecting the predetermined type of access object.

Particularly in the present embodiment, the type-detecting method and device are applied to the tape printing apparatus 1. When a tape having the smallest width is mounted in a printing apparatus of a conventional tape, if a small-sized (thin) tape cartridge is used for holding the tape, and the presence or absence of the tape as well as the type thereof are to be detected by a contact-type detecting device, the tape cartridge is so light that it can be lifted up from a compartment or so small that it cannot properly face the detecting device, which is liable to cause an increased frequency of mounting errors. On the other hand, if a large-sized tape cartridge is used, holding errors in holding the tape in the tape cartridge and feeding errors in feeding the tape are likely to be increased in frequency. Further, when a half-die-cut label defined by half die cutting is formed in a tape to print a print image-thereon, if the formed half-die-cut label is small in size, it is required to set a printing position with higher accuracy than when the print image is printed on a large-sized half-die-cut label.

To overcome these problems, according to the tape printing apparatus 1, a tape of a type which is desired to be printed with minimized possibility of errors related to mounting operation of the tape, such as mounting errors, holding errors, printing errors and the like, is set to a predetermined type of tape, and detected by a different method from that of detecting other types of tapes which are detected by a contact-type detecting device. That is, the predetermined type of tape is detected by a non-contact-type detecting device. Further, also in a tape printing apparatus for use in combination with a tape mounted without any cartridge containing the tape, the tape can be formed with holes having a different pattern according to the type of the tape. In such a variation as well, it is possible to set a tape requiring the highest printing accuracy to a tape of a predetermined type, thereby minimizing mounting errors in mounting the tape of the predetermined type.

Further, in the tape printing apparatus 1, a tape position detecting device (tape position sensor 143), which detects the position of a tape T by using a non-contact type detecting device during the tape feed control, can be used for detecting the presence or absence of the tape T as an access object. It should be noted that the tape position detecting device of the above-mentioned kind is provided not only in the tape printing apparatus 1 but also in tape printing apparatuses of the general type, so that the same can be realized without adding a new particular detecting device to the apparatuses.

Further, in the tape printing apparatus 1, the tape T is formed with reference holes TH with reference to which the position of the tape T is detected at predetermined space intervals. Since the non-contact-type detecting device (tape position sensor 143) is provided for detecting the reference holes TH, and hence after detecting whether or not the tape T is mounted, if the presence of the tape T is detected, the reference hole TH can be detected to thereby detect the position of the tape T. Further, the non-contact-type detecting device is provided with an optical sensor which detects by optical means whether or not an access objet is mounted, so that it is possible to carry out non-contact detection without any problems.

Furthermore, according to the present embodiment, the tape printing apparatus 1 as an electronic apparatus 1 forms labels to be affixed to a disc cartridge (MD cartridge 91) holding a disc (MD 92). A tape T as an access object of a predetermined type (for use in forming side labels LS) is formed with side labels as half-die-cut labels each for being affixed to a side surface of the disc cartridge.

Generally, the disc cartridge 5 has a side surface having a small width, and hence the side label LS is necessarily required to be small in size. To print a print image formed e.g. of a desired character string in the printing area of the side label LS, it is required to minimize errors of various kinds. In the type-detecting method used in the tape printing apparatus 1 for detecting the type of an access object, out of the various tapes T as access objects, the tape T formed with side labels LS by half die cutting is set to the predetermined type of tape T, thereby minimizing errors related to the mounting operation of the tape T, which makes it possible to minimize printing errors (as the sum of several kinds of errors) in printing the side labels LS.

Next, display (notification, guide)-related methods of the tape printing apparatus 1 will be described hereinafter. First of all, a method of notifying the user of processing formats, used in the tape printing apparatus 1 regarded as a data processing device (particularly, character processing device), will be described.

For instance, a data processing device for processing data of characters (including letters, symbols, simple figures, etc.), that is, a character processing device is taken as an example. In a character processing device having a large-sized display screen, such as a word processor or the like, it is possible to select and set one of the processing formats for each character string (data group) having one or more characters (data items), and check on the display screen which processing-format is set to a character string the user is paying attention to.

More specifically, let it be assumed that there are provided a plurality of kinds of processing formats which can be set to a character string the user is paying attention to, such as enlargement/reduction (extension, shortening, enlargement, reduction, and so forth), character decoration (underline, delete line, enclosed character, shaded character, half tone dot meshing, highlight, italic, outline (hollow), shading, reversal, rotation, etc.), edit configurations (frame decoration, automatic new line start, automatic page break insertion, automatic paragraph break insertion, line number display, information number display, etc.), and a type face font settings. Even if the user selects a plurality of processing formats from the above formats to set the same to a character string he (she) is paying attention to, the user can directly check the processed character string owing to the large-sized display screen.

On the other hand, in a relatively small-sized character processing device, such as a tape printing apparatus, a stamp making apparatus or the like, which is a data processing apparatus of the above-mentioned kind but has a small-sized display screen, it is difficult to directly view a processing format set to each character or each character string on the display screen thereof. Therefore, the data processing apparatus (character processing apparatus) of this kind without a large-sized display screen is provided e.g. with indicators corresponding to respective processing formats, and when the user designates a character to which he pays attention by operating the cursor, an indicator corresponding to a processing format set to the character is lighted, thereby enabling the user to directly check a processing format set to each character or each character string.

In the above data processing apparatus without a large-sized display screen, however, there is a case where the user desires to simultaneously view all the processing formats set to characters or character strings at a glance. On the other hand, there is also provided a data processing apparatus which is capable of classifying a plurality of data groups to be processed into a plurality of to-be-processed groups, and collectively setting a desired processing format to each data group included in each to-be-processed group on a group-by-group basis.

The tape printing apparatus 1 corresponds to the data processing apparatus which is capable of classifying a plurality of data groups to be processed into a plurality of to-be-processed groups, and collectively setting a desired processing format to each data group included in each to-be-processed group on a group-by-group basis. To this end, the tape printing apparatus 1 is configured such that processing formats set on a group-by-group basis can be viewed at a glance.

First, as described hereinbefore with reference to FIG. 9, the display 4 has the indicator display block 4i which is capable of lighting eighteen indicators, and the character display block 4c formed of a dot matrix of 72 (width)×16 (length) dots in the display screen 41 comprised of LCD or the like.

The indicator display block 4i indicated printing modes for printing character data of titles and music titles as well as printing states of the tape printing apparatus 1, by the ON-OFF state of each indicator. The indicator display block 4i has the eight upper indicators 4i00 to 4i07 shown in FIG. 10 for indicating information concerning a title (corresponding to a disc title), and the eight lower indicators 4i10 to 4i17 for indicating information concerning music titles. That is, the upper horizontal sequence of indicators indicates processing formats related to a title (disc title), while the lower horizontal sequence of indicators indicates processing formats related to music titles.

On the other hand, for instance, in the example described above with reference to FIG. 29, description is made that the "automatic new line-starting format" is set in the state of a music title being displayed in the basic entry mode (G61), whereby it is possible to set the "NL-ON" (automatic new line start-ON format) and the "NL-OFF" (automatic new line start-OFF format) for a music title. In this embodiment, in the state of the "NL-ON" for a music title being set in the basic entry mode (G61), out of the indicators 4i10 to 4i17 in a horizontal row indicated by "MUSIC" in FIG. 10, i.e. the lower line of indicators, the indicator 4i11 at an intersection of this horizontal row and a column under "NL-START" (automatic new line start) is lighted, whereby it is indicated that the format "MUSIC NL-START" is set or turned ON, whereas when the option "NL-OFF" for a music title is set (G64), the indicator 4i11 is turned off.

Further, it is also described that if the same operation as described above is carried out in the state of a title being displayed in the basic entry mode, it is possible to set the "NL-ON" (automatic new line start-ON format) or the "NL-OFF" (automatic new line start-OFF format) for the title. That is, according to the tape printing apparatus 1, an automatic new line-starting format (processing format) for music titles and an automatic new line-starting format (processing format) for a title (disc title) can be set separately from each other.

Further, not only the automatic new line-starting formats but also processing formats juxtaposed for display on the FIG. 10 indicator display block 4i, that is, processing formats FRAME, NL-START, SHORTEN, EXTEND, OUTLINE, ITALIC, MINCHO, and GOTHIC can be separately set for a title and music titles. Although the format "NL-START", described above with reference to FIG. 29, is set by operating the format key 34FS out of the function keys for changing the basic entry mode to the function-selecting/setting mode shown in FIG. 19, the format "FRAME" can be set by operating the frame key 34CS and thereafter designating a frame number at a menu screen immediately under the processing format "FRAME", while the other processing formats of the character decoration can be set by operating the decoration key 34 and then designating each format at a menu screen under the character decoration.

The details of the settings of the processing formats are stored in a processing format (internal configuration) register of the register group 241 in the RAM 240 in formats shown in FIGS. 50 and 51C.

More specifically, as shown in the figures, bit numbers b31 to b30 record cartridge information shown in FIG. 51A. Bit numbers b29 to b28 for automatic new line-starting information store automatic new line-starting information of a title line and that of a music title line shown in FIG. 51B, respectively. Bit numbers b27 to b26 stores information of the print sheet number shown in FIG. 51C. Bit numbers b23 to b16 for frame information represents values from 0 to 255, wherein numeral 0 designates the state of a main label being decorated with no frame, and values 1 to 255 designate frame numbers.

Bit numbers b12 to b08 and bit numbers b04 to boo designate character decoration information ("TYPEFACE", "EXTEND", "REDUCE", "OUTLINE" and "ITALIC") of the title line and the music title line, respectively, wherein in the "TYPEFACE", value 0 designates Mincho and value 1 Gothic, in the Japanese language-adapted type apparatus of the present embodiment, and in the other character decoration information items, value 1 represents that each information is designated.

As described above, the tape printing apparatus 1 corresponds to a data processing apparatus which is capable of classifying a plurality of data groups (character strings) to be processed into a plurality of to-be-processed groups (title-related and music title-related groups), and collectively setting a desired processing format to each data group included in each to-be-processed group on a group-by-group basis.

In a processing format-notifying method used by the tape printing apparatus 1, according to the present embodiment, a plurality of indicators (indicator display block 4*j*) arranged in the form of a matrix formed by a plurality of rows upper and lower rows in the indicator display block 4*i* shown in FIGS. 9 and 10 indicative of respective to-be-process groups (title-related and music title-related character strings) and a plurality of columns-indicative of respective plurality of processing formats (FRAME, NL-START, etc.) or setting. Each indicator (e.g. indicator 4*i*11) located at an intersection of a row (e.g. lower one) corresponding to a desired one of the to-be-processed groups (e.g. music title-related character strings) and a column (e.g. second vertical column from the left-hand end) corresponding to a desired one of the processing formats (e.g. automatic new line-starting format) indicates whether or not the desired one of the processing formats is set to the desired one of the to-be-processed groups (whether or not the "NL-ON" for a music title is set).

As a result, from the plurality of indicators (indicator display block 4*i*) arranged in the form of a matrix, the user can ascertain each processing format set to each to-be-processed group at a glance.

Although in the above example, "OUTLINE (hollow)", "ITALIC" and the like are indicated by way of examples of character decoration, this is not limitative, but it is possible to adopt other character decoration forms of general types, such as underline, delete line, enclosed character, shading, highlight, reversal, and rotation. If these character decoration forms are included in the processing formats indicated by the indicators, the user can view a plurality of indicators arranged in the form of matrix, thereby checking a character decoration configuration set to each to-be-processed group at a glance.

Further, although in the above example, "EXTEND (extension)", "SHORTEN (shortening)" and the like are indicated by way of examples of enlargement/reduction of characters, this is not limitative, but it is also possible to include normal expansion or reduction. If these character enlargement/reduction forms are included in the processing formats indicated by the indicators, the user can view a plurality of indicators arranged in the form of matrix, thereby checking a character enlargement/reduction configuration set to each to-be-processed group at a glance.

Furthermore, although in the above example, "FRAME (frame decoration)", and "NL-START (automatic new line start)" are indicated by way of examples of character edit configuration, this is not limitative, but it is also possible to adopt other edit capabilities of general types for configuration or setting, such as automatic page break insertion, automatic paragraph break insertion, line number display, information number display, and the like. If these edit function-setting forms are included in the processing formats notified by the indicators, the user can view a plurality of indicators arranged in the form of matrix, thereby checking an edit function configuration set to each to-be-processed group at a glance.

Still further, although in the above example, Mincho and Gothic for the Japanese language are indicated by way of examples of the typeface therefor, this is not limitative, by including other typeface processing formats in the processing formats notified by the indicators, the user can view such a plurality of indicators arranged in the form of matrix, thereby checking an edit function configuration set to each to-be-processed group at a glance.

Next, a character information display method as one of the display (notification, guide)-related methods of the tape printing apparatus 1 will be described.

In general, an editing device for editing character information, a printer for printing the edited character information, and the like, are provided with a character information display device having a display screen for entering and editing character information and checking the resulting character information. The character information is input and edited in text code data (character code) corresponding to the character information, which is converted to data of a display image based on a predetermined font. Then, the display image is displayed on the display screen. As devices of this kind, there are a personal computer having word processing software installed therein, and a device dedicatedly provided for word processing (so-called word processor).

A personal computer can have software (so-called editor) exclusively provided for editing text code data including program codes and the like. The editor has a capability of displaying the text code data after adding line numbers thereto for purposes of convenience of edit. Further, there are sometimes provided editors or word processors which have a capability of adding a number (character string number) to a sequence of characters when the user consciously adds (inputs) a delimiter (code) (by carrying out arbitrary new line start, for instance), regardless of whether character strings are displayed in a line or a plurality of lines (due to automatic new line start), and updating the character string numbers whenever the user enters another delimiter (code).

In the above cases, information numbers, such as line numbers or character string numbers, each added to a line or a sequence of characters (a piece of character information) are usually displayed on an edit screen as numerals "1", "2", . . . entered or arranged forward of each character information, so that the user can input and edit character information, while viewing the information numbers.

However, in a relatively small-sized character processing apparatus, such as a tape printing apparatus, a stamp making apparatus, and the like, although it is a data processing device of the same kind as the above editor and word processor, there is provided a small-sized display screen, which prevents sufficient space from being provided between an information number and character information corresponding thereto, resulting in difficulty of viewing displayed information. This inconvenience becomes more noticeable, particularly when character information contains numerals. For instance, in a case where character information of information number "1" is a character string "1A2B3C . . . ", the information is displayed as "11A2B3C . . . ", which makes it difficult to discriminate between the information number and the character information.

However, if sufficient space intervals are forcibly provided, or if a delimiter, such as a period ".", is added to display the information e.g. as "1.", the information is not made much easier to view or recognize, and moreover, an area for arranging character information is reduced (display efficiency is degraded), thereby causing inconvenience in edit operations and the like. This inconvenience becomes more noticeable, particularly when the number of digits is increased. For instance, in the case of a 2-digit information number being used, a character information-arranging area is reduced in space for one character in comparison with the case of a 1-digit information number being used.

To cope with the above inconvenience of degraded display efficiency, if a full-size 2-digit information number "10." is converted to a half-size 2-digit information number "10." to display the information number as "10." 1A2B3C . . . " instead of "10. 1A2B3C . . . ", the information is not made much easier to view. Further, if character information can be displayed in half size, for instance, if a character string "10A2B3C . . . " is displayed in a manner arranged immediately after the information, number "10.", the information is displayed as "10. 10A2B3C . . . ". Therefore, conversion of a full-size information number to a half-size one does not contribute to solution of the above problem of difficulty in discriminating the information number from the character information.

To solve the above problem, the tape printing apparatus 1 employs the character information display method which enables the user to easily discriminate between an information number and corresponding character information displayed in a small-sized display screen, while enhancing display efficiency. In the following, this method will be described in detail.

First of all, character code data (text data) items to be processed in the tape printing apparatus 1 are each is constructed according to a data format shown in FIG. 52.

More specifically, as shown in the figure, when a line of a character string or a sequence of a plurality of lines of character strings is set as one character information item, the one character information item basically has line head data defining an information number (music number, in this example) and character code data of each character following the line head data and forming a line of or a sequence of a plurality of character strings.

One character (code) is formed of two bytes. The line head data and end-of-data-indicating data (hereinafter referred to as "EOD") are also each comprised of two bytes, and processed as one character. An area for maximum 1800 characters is allocated to an area for arranging the character code data. The data "EOD" indicates the end of the whole text data, and a character string "NULL" shown in the figure represents a portion without data items.

Referring to FIG. 53A, four bits at the head of each two-byte character (code) indicate a code for discrimination of a kind of data. [7] HEX in hexadecimal for b15 to b12, that is, [0111] in binary notation designates that the data is edit information, and codes other than [0111] designate that the data are character data.

Referring to FIG. 53B, the line head data arranged at the head of a character information item has a first byte indicating that the same is the line head data of edit information, and a second byte thereof indicating a music number as an information number. As shown in the figure, the music number (information number) is a numerical value within a range of (number) 0 to 255 represented by eight bits from bit numbers b07 to b00. The number "0" designates a title line, whereas when a number is between "1" and "255", the number designates a music number (i.e. information number). It should be noted that end-indicating data "EOD" may be a simple fixed value (data) (see FIG. 53C).

On the other hand, as described above with reference to FIG. 9, the display 4 displaying the character information items includes the indicator display block 41 and the character display block 4c. As described above with reference to FIGS. 11A and 11B, the character display block 4c has two basic units of control, i.e. two forms of display to be controlled. One of the two forms of display is a full-size/half-size display shown in FIG. 11A. In this case, the character display block 4c is controlled by being divided into a sub-display block at a left end, indicated by coordinates CE and CF, for displaying data of two images in a 8×8 dot matrix., and a main display block for displaying data of eight images each in a 8×16 dot matrix.

As described hereinbefore with reference to FIG. 21 and the like, each music number (information number) out of the above character information items is displayed on the sub-display block, while general character data, such as a title, a music title or the like, is displayed on the main display block (G11, for instance). In this case, each music number (information number) is displayed on the sub-display block, in a manner such that digits thereof are displayed in respective two 8×8 dot matrices (hereinafter referred to as "the digit display portions") each designated by coordinates CE and CF. That is, the music number (information number) is displayed on the sub-display block in a vertical arrangement as shown in FIG. 21, in other words, the displayed digits are arranged one above another in a direction orthogonal to the direction of a sequence of the music number.

As described above, in the character information display method used in the tape printing apparatus 1, at least part of desired character information (music title) and an information number (music number) corresponding thereto are simultaneously displayed on the display screen 41 having a character information display block (main display block) which is capable of displaying at least part of desired character information (music title, for instance) and information number display block (sub-display block) which is capable of displaying a desired information number (music number).

When the direction of a sequence of characters forming a character string of character information (music title) displayed on the character information display block (main display block) is defined as a first direction (horizontal direction in the illustrated example), the information number display block (sub-display block) has a plurality of digit display portions arranged in a second direction (vertical direction in the figure) orthogonal to the first direction, and displays information number (music number) in digits corresponding in number to the number of digit display portions, such that the number of each digit of the information number (music number) is displayed on a corresponding digit display portion.

That is, the direction (first direction) of a sequence of characters forming a character string of character information (music title) displayed on the character information display block (main display block) and the direction (second direction) of a sequence of digits of information number displayed on the information number display block (sub-display block) are orthogonal to each other, so that even if the display screen is small in size, further even if an information number and corresponding character information are displayed in a manner adjacent to each other, it is possible to easily discriminate a displayed information number (music number) from corresponding character information (music title). It should be noted that in this case, an information number may be arranged either in horizontal writing or in vertical writing in the second direction (direction orthogonal to a direction of a character string or sequence of characters of the character information).

Further, as clearly shown in FIGS. 11A and 11B, the size of the information number display block (sub-display block) in the second direction (vertical direction in the figure) coincides with the size of the character information display block (main display block) in the second direction, and the size of the information number display block (sub-display block) in the first direction (horizontal direction in the figure) is equal to a size or one half of the size (one half of the size, in the above example) required for displaying a full-size character in the first direction in the character information display block (main display block). That is, the size of the area of the information number display block is equal to or half the size of an area which is required for arranging a full-size character or full-size characters in a line in the vertical direction as required when a line or lines of full-size character(s) is(are) arranged in the character information display block. If the character information display block displays a line of characters, the area of the information number display block becomes equal to an area for a full-size character or a half of the area.

In this case, in the information number display block are displayed digits or numerals, and hence if they are reduced in size and a plurality thereof are arranged in the second direction for display, they are easy to recognize. For instance, if a plurality of digits of number arranged in the second direction are displayed in an area for arranging a full-size or half-size character, a display area can be reduced in size, thereby enhancing display efficiency. Further, the information number display block is small in size, so that if the display screen having the same area is used, the character information display block can be accordingly increased in size.

Further, the size of the information number display block in the second direction is equal to that of the character information display block in the second direction. Hence, an information number and a corresponding character information are easily displayed in a manner adjacent to each other. That is, the area of the whole display screen can be reduced, which makes it possible to apply the character information display method to a character processing device having a small-size display screen. Therefore, according to the character information display method applied to the tape printing apparatus 1, even if the method is applied to a character processing device having only a small-sized display screen, information number (music number) and a corresponding character information (music title) can be easily distinguished from each other, and at the same time the display efficiency of the character processing device can be improved.

Further, the information number display block (sub-display block) and the character information display block (main display block) are arranged in a manner adjacent to each other, whereby an information number (music number) and character information (music title) can be correlated with each other to easily view or recognize the same. Further, by arranging the information number display block (sub-display block) and the character information display block (main display block) adjacent to each other, whereby the whole display screen having the blocks can be reduced in size, which makes it easy to apply the character information display method to a character processing device having only a small-sized display screen.

Further, in the above example, the size (18 dots) of the digit display portion (indicated by coordinates CE or CF shown in FIG. 11A) in the second direction (vertical direction in the figure) is equal to one half of the size (16 dots) required for displaying a full-size character in the second direction in the character information display block (main display block). Therefore, if the character information display block (main display block) displays one line of characters (corresponding to the examples in FIGS. 11A and 11B, FIGS. 12A to 12E), 2-digit information number can be displayed, and if the character information display block (main display block) displays two lines of characters, 4-digit information number can be displayed. That is, 2-digit information number can be displayed in the second direction for every line of the character information display block (main display block), and an information number having twice the density of display can be displayed, which enhances display efficiency. Moreover, the information number is displayed in a manner arranged in the second direction orthogonal to the first direction. Therefore, the information number and the corresponding character information can be easily distinguished from each other.

Further, when character information (title) not corresponding to an information number is contained in character information to be displayed on the character information display block (main display block), and the character information is displayed as an arbitrary character information, a predetermined symbol or figure (e.g. mark D described with reference to FIGS. 20A to 20C) for notifying the user of the fact is displayed on the information number display block (sub-display block) in place of the information number (see FIG. 20C), so that from the symbol or figure, the user can recognize the fact (i.e. that the character information is a disc title) with ease. In this case, it is preferred that a D-shaped symbol or the like, which the user can associate with the disc title, for instance, is used as the above symbol.

Next, an operation guide method as one of the display (notification, guide)-related methods of the tape printing apparatus 1 as a character processing device will be described.

As described above, generally, an editing device for editing character information, a printer for printing the edited character information, and the like, are provided with a character information: display device having a display screen for entering and editing character information, and checking the resulting character information.

In a word processor or the like, when the user sets or configures various functions (for editing and printing) and modes, he depresses a function key, such as an escape key or the like to cause a selection screen to be displayed on the display screen for selectively setting functions and modes. On the selection screen are displayed a plurality of options which can be selected, and the user designates a function he desires to set by operating the cursor to select the same and depressing the return (line feed, selection or determining) key, or designates the same by clicking a mouse for selection. Further, icons representative of functions may be provided at a periphery or peripheral portions in the display screen to permit the use to click the same (for instance, a plurality of options are displayed by clicking on a right-hand button of the mouse, and determines the selection by clicking on a left-hand button of the same), for more direct selection of a function or edit character information.

Further, even when the user forgets how to edit during editing of character information, the user can make use of a help function (by activating the same through depressing a help key), by displaying an edit operation-explaining (guide) screen which explains edit functions and edit operations, thereby grasping and ascertaining details of operations. Further, there is also provided a word processor which is capable of displaying a search entry screen as a screen similar to the operation guide screen. The search entry screen permits the user to input what he (she) desires to know, as key words.

As described above, the character processing apparatus having a large-sized display screen, such as the word processor, is capable of displaying, in a large-sized display screen thereof, an operation guide screen, such as a selection screen (selection operation guide screen) for displaying a plurality of options to provide a guide for various selection operations, and an edit operation explanation screen (edit operation guide screen; icons may be regarded as similar screens for indicating details of operations by showing figures and the like) for explaining (providing a guide for)

details of edit functions and edit operations. This enables the user to clearly grasp details of operations on the display screen. That is, it is possible to carry out selection operations and edit operations with reference to images displayed on the operation guide screen.

However, in a relatively small-sized character processing apparatus, such as a tape printing apparatus, a stamp making apparatus and the like, although it is a data processing device of the same kind, a display screen thereof is small in size, so that it is difficult to display an operation guide screen of the above-mentioned kind, which is capable of showing details of selection operations and edit operations.

On the other hand, there is also provided a character processing device of the above-mentioned kind, which has a small-sized display screen but has an information number display block in the display screen for displaying line numbers of character information and information number, such as character string numbers or the like. This information number display block, however, is used only for displaying character information corresponding to an information number.

Therefore, the tape printing apparatus 1 employs a character processing device including a character information display block for displaying character information in the display screen and information number display block for displaying an information number corresponding to the character information, while adopting an operation guide method for permitting the user to know details of selection operations and edit operations. In the following, the operation guide method will be described in detail.

First, the tape printing apparatus 1 is a character processing device having a character information display block (main display block) for displaying character information (music title) in a display screen (display screen 41 of the display 4) and an information number display block (sub-display block) for displaying information number (music number) corresponding to the character information.

Further, in the tape printing apparatus 1, to prompt (guide) the user to operate the cursor for selecting an option, operation guide characters for providing a guide for the cursor operations, that is, up and down arrow marks indicative of operating directions corresponding to operations of the up arrow key 33U and the down arrow key 33D are displayed in the sub-display block. These arrow keys are displayed e.g. in the screens (G27 to G28) displaying options for selecting the full-size code data or the half-size code data in the read process described above with reference to FIGS. 22 and 23, the screens (G42 to G44) displaying options for selecting the kind of a label to be printed and formed in the printing process described above with reference to FIG. 24, the screens (G72 and G73) displaying options for selecting an adjustment item in the function selecting/setting mode described above with reference to FIG. 44, the screens (G75 to G78) for selecting a printing position-adjusting function at the first level described above with reference to FIG. 45, and further the screens (G81 to G85) for selecting an adjustment value for adjusting the printing position at the second level.

That is, according to the operation guide method applied to the tape printing apparatus 1, when providing a guide for a next operation (selection operation, for instance), character information to be manipulated is displayed in the character information display block (main display block) and at the same time an operation guide character (cursor operation guide character indicating the operation of the cursor in a predetermine direction) indicative of at least one of candidates for a next operation is displayed in the information number display block (sub-display block).

As a result, the user can grasp details of operations on the display screen, and carry out next selection and edit operations with reference to operation guide characters displayed in the information number display block. Therefore, according to the tape printing apparatus 1, it is possible to notify the user of details of operations, such as selection operations and the like, by adopting the operation guide method.

Although in the above example, the operation guide for providing a guide for selection operation is described, in the tape printing apparatus 1, the above operation guide method is adopted in edit operations, such as character conversions, as well.

Referring to FIG. 54, when the user depresses the conversion mode key 37S in the basic entry mode in a state (G96) where the cursor K is placed on a right side of a first "い" (on a left side of "こ") of a character string "新しいこうかい", the screen is changed to the Kana/Kanji conversion mode to designate a Hiragana letter "こ" as a first letter to be converted (G97), so that the user can designate the range of characters to be converted (or the position of a last character to be converted) by operating the right arrow key 33R from this state (G97). The right arrow mark ("→") shown in the sub-display block provides a guide for the cursor operation therefor.

When the user depresses the right arrow key 33R according to the guide, the designated range is expanded to Hiragana letters "こう". When the user depresses the right arrow key 33R twice more, the designated range is expanded to Hiragana letters "こうかい". That is, by operating the cursor (the right arrow key 33R×3), the user designates the range of Hiragana letters "こうかい" (phonogramic letters pronounced as "koukai") as a character-converting range. (G98).

In this state (G98), the user can operate the right arrow key 33R to expand the character-converting range. Therefore, the operation guide character (cursor operation guide character:right arrow mark "→") for guiding the cursor operation is displayed in the sub-display block. However, the left arrow key 33L can be also depressed from this state (G98) to reduce the designated range. Therefore, the apparatus 1 may be configured such that both the right and left arrow marks are displayed as operation guide characters. Further, when an original character string includes a Kanji letter(s), if the right arrow key 33R is operated to cover Kanji letter, it is possible to delete the arrow mark of the operation guide character and display another mark (indicating an error, for instance).

On the other hand, by depressing the conversion key 37 in this state, the user can determine the character-converting range to permit the process to proceed to an operation for converting characters. That is, when the conversion key 37 is depressed, next, Kanji letters "後悔" (ideographic characters pronounced as "koukai") are displayed as a first candidate character for conversion (G99).

The user operates the conversion key 37 or the right arrow key 33R from the above state (G99), to thereby sequentially display different candidate characters (Kanji letters as candidates for conversion). The right arrow mark ("→") shown in the sub-display block provides a guide for the cursor operation.

When the user depresses the right arrow key 33R according to the guide, Kanji letters "公開" (ideographic characters pronounced as "koukai") are displayed as a second candidate (G100), so that if the Kanji letters are to be selected, it is possible to finally determine or set the converted characters to the Kanji letters "公開" by depressing the enter key 38. When the converted characters are determined, the screen returns to the basic entry mode, while the state (G96) of the first character string "新しいこうかい" being displayed is changed into the state (G101) of a converted character string "新しい公開" being displayed.

Further, similarly to the case of the character-converting range being changed (G98), etc., the user can further depress the right arrow key 33R, in the state of the Kanji letters "公開" being displayed without depressing the enter key 38, to sequentially display Kanji letters from a third candidate in the order of "更改"→"航海"→"公海"→"降灰"→"狡獪" (all these two-character phrases are pronounced as "koukai" which can be written as "こうかい" in phonogramic representation using Hiragana letters). Inversely, it is also possible to display candidates in reverse order by depressing the left arrow key 33L. In this case as well, the apparatus 1 may be configured such that both the right and left arrow marks are displayed as operation guide characters.

As described above, the operation guide method is applied to the tape printing apparatus 1 regarded as a character processing device which has a character information display block (main display block) capable of displaying character information (music title) in a display screen 41 and an information number display block (sub-display block) capable of displaying an information number (music number) corresponding to the character information, and to provide a guide for next cursor operation, displays a character information to be manipulated in the character information display block and an operation guide character indicative of at least one of next candidates of operation.

As a result, the user can grasp details of operations on the display screen and carry out next selection operations and edit operations with reference to operation guide characters displayed on the information number display block. That is, according to the operation guide method, it is possible to provide a guide for details of operations, such as selection operations and edit operations.

More specifically, as described above, the operation guide characters include a cursor operation guide character(s) indicative of a cursor operation(s) in one or more predetermined directions of upward, downward, leftward and rightward directions, and hence the user can grasp cursor operations for carrying out next selection/edit operations on the display screen and carry out next selection/edit operations with reference to cursor operation guide characters displayed in the information number display block. That is, in this case, it is possible to provide a guide for cursor operations for carrying out next selection/edit operations.

Further, the above cursor operation guide character(s) is/are an arrow-shaped mark(s) indicative of a cursor operation(s) in at least one predetermined direction, so that the user can easily grasp directions of operations to be carried out by cursor operation by viewing the arrow marks. That is, in this case, it is possible to provide a guide for the cursor operations by displaying arrow marks of the information number display block.

Further, as described above, when providing a guide for a selection operation as a next operation to be carried out, character information corresponding to any of a plurality of options selected in the selection operation is displayed as the character information to be manipulated. When the operation indicated by the operation guide character is effected, character information corresponding to a next one of the options is displayed as a next character information to be manipulated.

Therefore, the user is capable of carrying out the operation indicated by the operation guide character as a next operation in the state of character information corresponding to any of a plurality of options being displayed, to thereby cause character information corresponding to a next one of the plurality of options to be displayed. That is, when providing a guide for a selection operation as a next operation to be carried out, it is possible to provide a guide for an operation for displaying character information corresponding to a next one of the plurality of options by using the operation guide character(s), in the state of character information corresponding to any of a plurality of options being displayed.

Further, by way of an example of another operation, when providing a guide for an edit operation as a next operation to be carried out, as described above, character information to be edited is displayed as the character information to be manipulated, and when this operation indicated by the operation guide character as the next operation is carried out, a position or a range to be edited in the character information is changed. That is, by providing a guide for an edit operation as a next operation, in the state of character information to be edited being displayed, it is possible to provided a guide for the operation for changing a position or a range to be edited in the character information, by using the operation guide character(s).

Now, the edit operation described above is an operation for carrying out character conversions, so that when providing a guide for a character conversion operation (edit operation): as a next operation to be carried out, in the state of the character information to be converted being displayed, it is possible to provide a guide for an operation for changing a position or a range to be converted in the character information, by using the operation guide character(s).

Further, as described hereinbefore with reference to FIGS. 9, 11A, 11B, 21 and the like, in the tape printing apparatus 1, the information number display block (sub-display block) is arranged in a manner adjacent to the character information display block (main display block), so that an information number (music number, for instance) and character information (music title) can be correlated with each other to permit them to be easily viewed or recognized. Further, by arranging these blocks adjacent to each other, operation guide character(s) displayed in the information number display block (sub-display block) and the character information displayed in the character information display block (main display block) for manipulation as well can be correlated with each other to permit them to be easily viewed or recognized. Further, by arranging these blocks adjacent to each other, the whole display screen having the two blocks can be reduced in size, and hence the operation guide method can be employed without any problems by the tape printing apparatus 1 (character processing device) having only a small-sized display screen.

Although in the above example, for instance, character information for conversion, that is, character information to be manipulated is a music title, this is not limitative, but since a title (disc title) is also to be converted, it is possible to provide a similar guide for an operation for the title. In this case, in the normal state, a D mark, which designates that the same is a title (disc title), is displayed in the information number display block (sub-display block) in place of an information number (music number). However, this can be regarded as a similar case where the music title of music number "0" is used as a title, so that the present method can be applied to this case without any problems. This is, character information showing a title (disc title) can be set to an object to be displayed, and by using the character information as the character information to be manipulated, a guide for various operations can be provided.

Next, character processing (input, conversion and the like)-related methods of the tape printing apparatus 1 will be described. First of all, a character conversion method applied to the tape printing apparatus 1, more particularly, a character conversion method of converting Hiragana letters will be described. It should be noted that now the term "character conversion" is used to mean a character conversion for converting a character string having one or more characters to another character string indicative of the same meaning, e.g. phonogramic character(s) to ideographic character(s).

As devices capable of carrying out character conversion of this kind, there are a personal computer having word processing software installed therein and a device dedicatedly provided for word processing (so-called word processor). In the word processor and the like, both in Romaji (alphabetic) entry mode and Kana entry mode, characters are basically entered in Hiragana letters. When Kana/Kanji conversion (predetermined character conversion) is designated, the Kana/Kanji conversion is carried out with reference to a Kana/Kanji conversion table (dictionary) for converting Hiragana letters to Kanji letters.

On the other hand, there is a character entry device, such as the MD player 90 connected to the tape printing apparatus 1, which has the function of entering characters not as a main function but simply as an accessory function. Since a character entry device of this kind does not have a large-sized display screen, half-size characters, such as alphanumeric characters and Hiragana letters, are usually used therein. Further, Katakana letters congenial with a small-sized display screen comprised of LCD are used more frequently than Hiragana letters having delicate curved portions. Therefore, character strings input by a character entry device of this kind are mainly Katakana letters, so that a Kana/Kanji conversion table of the general type for converting Hiragana letters to Kanji letters is useless in the device.

Further, even if a Katakana/Kanji conversion table (dictionary) for converting Katakana letters to Kanji letters is provided, and Katakana letters can be converted to Kanji letters, Katakana letters and Kanji letters are not congenial with each other, so that it is difficult to regard a character string comprised of a mixture of Katakana letters and Kanji letters as a natural one. For instance, if a character string comprised of Katakana letters "ウツクシイ" is converted to a character string comprised of a mixture of Katakana letters and a Kanji letter "新シイ", declensional Kana ending added in Katakana after a Kanji letter is felt unnatural or causes the user to feel a sense of disorder.

To eliminate these inconveniences, the tape printing apparatus 1 employs a character conversion method which is capable of converting Hiragana letters to Kanji letters, while being capable of converting even a character string mainly comprised of Katakana letters to one comprised of a mixture of Hiragana letters and Kanji letters through simple operations, even if predetermined character conversion-designating means, such as a function key or the like, is not additionally provided in the apparatus or the Katakana/Kanji conversion table (dictionary) is not provided. In the following, the character conversion method will be described in detail.

As described above with reference to FIG. 19, by depressing the conversion mode key 37S in the basic entry mode (H1), the screen can be changed to the Kana/Kanji conversion mode (H4). Referring to FIG. 56, immediately after the conversion mode key 37S is depressed in the basic entry mode to change the screen to the Kana/Kanji conversion mode (H4), first, the kind of a letter next to the cursor K is determined at step S91.

For instance, from the state (G96) of the screen being in the basic entry mode, described above with reference to FIG. 54, by effecting the above determination (S91), it is determined that a letter "こ" in the character string "新しいこうかい", next to the cursor K, is a Hiragana letter. Then, as shown in FIG. 56, the flow proceeds to the Hiragana/Kanji conversion process (S92), and the Kana/Kanji conversion is carried out through the operations described above with reference to FIG. 54 (G97 to G100), followed by returning to the screen in the basic entry mode at step S90 (G101).

On the other hand, as shown in, FIG. 55, when in the basic entry mode (G90), from the state (G91) of a character sting comprised of Katakana letters "アタラシイコウカイ" being displayed, if part of the character string "アタラシイ" is directly converted, "新シイ" is obtained, which is an unnatural character string.

Therefore, in the tape printing apparatus 1, in the state (G91) of the Katakana letters "アタラシイコウカイ" being displayed in the basic entry mode, as shown in FIG. 56, when the conversion mode key 37S is depressed for changing the screen display, and, after it is determined at step S91 that the letter next to the cursor K (for instance, "ウ" in FIG. 55) is a Katakana letter, the Katakana/Hiragana conversion is carried out at step S93.

In this case, however, differently from the case of Kana/Kanji conversion being carried out, the whole area of the sequence of characters is defined as a range to be converted. For instance, if a character string displayed in the basic entry mode is a character string of a title, the whole area of the character string (title) is set to the range to be converted, or if the character string displayed is that of a music title, the whole area of the music title of a music number is set to the range to be converted.

In the FIG. 55 example, the whole area of the Katakana letters "アタラシイコウカイ" is set to the range to be converted, and first, a corresponding character string of Hiragana letters "あたらしいこうかい" is displayed before determining the entries (G92). Then, when the user checks the display and depresses the enter key 38, the new character string, that is, the entry of Hiragana letters "あたらしいこうかい" is determined, followed by returning to the screen in the basic entry mode at step S90 (G90).

This state of the screen in the basic entry mode is the same as that of a character string of Hiragana letters originally entered being displayed. For instance, the user operates the left arrow key 33L such that the character next to (character on the right side of) the cursor K becomes a Hiragana letter "あ" (G94), and thereafter, depresses the conversion mode key 37S. Next, the user designates the Hiragana letters "あたらしい" as a range to be converted and depresses the enter key 38, whereby he (she) can convert the character string to a character string "新しいこうかい". Then, by carrying out the operation described above with reference to FIG. 54, the user can obtain the desired character string of a mixture of Hiragana letters and Kanji letters, "新しい公開" (G101 in FIG. 54).

As described above, according to the character conversion method applied to the tape printing apparatus 1, when the Hiragana/Kanji conversion (Kana/Kanji conversion) is instructed (the conversion mode key 37S is depressed), character conversion is carried out assuming that Katakana/Hiragana conversion (カナ/かな replacement) is instructed for convention of a desired portion or predetermined portion or all (in the above example, predetermined whole area) of Katakana letters included in a displayed character string to Hiragana letters if a character (character next to the cursor K) designated by to-be-converted character-designating means at a time point of instruction of the Hiragana/Kanji conversion is a Katakana letter. Accordingly, it is possible to instruct the Katakana/Hiragana conversion (カナ/かな replacement) by using character conversion-instructing means (conversion mode key 37S) instructing the Hiragana/Kanji conversion (Kana/Kanji conversion), without providing character conversion-instructing means for instructing the Katakana/Hiragana conversion (カナ/かな replacement).

Further, in the above case, characters converted assuming that the Katakana/Hiragana conversion is instructed are converted to Hiragana letters, and then, if the Hiragana/Kanji conversion is instructed by the same predetermined character conversion-instructing means, the Hiragana letters can be converted to Kanji letters. Therefore, it is possible to convert even a character string mainly comprised of Katakana letters to one comprised of a mixture of Hiragana letters and Kanji letters through simple operations, even if predetermined character conversion-designating means, such as a function key or the like, is not additionally provided in the apparatus or the Katakana/Kanji conversion table (dictionary) is not provided.

Further, in the above case, to-be-converted character-designating means is cursor operation means (cursor key 33) for operating the cursor K for designating a position or area to be converted in the display screen 41, and hence it is possible to designate a position or area of characters (Hiragana letters) to be subjected to the Hiragana/Kanji conversion through a simple cursor operation of the general type.

Although in the above example, an area to be converted is not designated in the Katakana/Hiragana conversion process but the whole area of a sequence of characters is set to the area to be converted, this is not limitative, but a position or area to be converted may be designated in the Katakana/Hiragana conversion as well, similarly to the case of the Hiragana/Kanji conversion. In this case, it is possible to designate the position or area of characters (Katakana) to be subjected to the Katakana/Hiragana conversion through a simple cursor operation.

Further, in the character conversion method applied to the tape printing apparatus 1, as shown in FIG. 56, when the Hiragana/Kanji conversion is instructed (conversion mode key 37S is depressed), if a character (character next to the cursor K) designated by to-be-converted character-designating means at a time point of instruction of the Hiragana/Kanji conversion is not a Hiragana letter or a Katakana letter, the screen is changed to a screen displaying an error message to notify the user of occurrence of an error at step S94, followed by returning to the screen in the basic entry mode after the lapse of a predetermined time period. That is, it is possible to cause the user to recognize wrong operations by notifying him (her) occurrence of an error to thereby prompt the user to carry out a correct operation again.

Further, a character string input by a device permitting entry of only Katakana letters and alphanumeric characters is mainly formed of Katakana letters, and in this case, the user sometimes desires to collectively convert a predetermined range of Katakana letters to Hiragana letters, instead of designating the position or area to be converted finely.

In such a case, as shown in the above example, when character conversion is carried out assuming that the Katakana/Hiragana conversion is instructed, if it is possible to collectively convert all the Katakana letters in the predetermined area of a character string, character conversion can be effected through a simple operation. It should be noted that in this case, the predetermined area collectively convertible to Hiragana letters may be a predetermined range by default or may be a predetermined area arrangeable as desired. Further, it is more convenient if a predetermined range set by default is used before it is particularly designated.

Further, in the above case, the predetermined area collectively convertible to Hiragana letters is set to the range of one line including a displayed character string defined by automatic or arbitrary new line start, whereby all the Katakana letters within the range of the one line can be collectively converted, which enables the Katakana/Hiragana conversion to be effected through simple operations.

Of course, as described above, by setting the predetermined area for collective conversion to a range of one line or a sequence of a plurality of lines including a displayed character string defined in a predetermined manner (for instance, in the above example, the whole of a music title corresponding to a music number: corresponding to a range of one line in the case of a short music title represented in one line), it is possible to collectively convert all the Katakana letters within the range of the sequence of lines. This enables the Katakana/Hiragana conversion to be effected through simple operations.

Next, a character entry method as one of the character processing (input, conversion and the like)-related methods of the tape printing apparatus 1 will be described.

As a character entry device for inputting character strings each comprised of one or more characters (used to mean characters including Kanji letters, Hiragana letters Katakana letters, numerals, alphanumeric characters and symbols (including simple figures)), there are provide a so-called word processor and the like. The word processor and the like have the function of switching between Romaji entry mode and Kana entry mode or between capital letters and small letters, while having a keyboard (key entry device) capable of separately inputting a number of characters larger in number than that of all Kana letters or that of all alphabetical letters.

On the other hand, there is contemplated a character entry device of a type which is capable of selectively displaying one of a predetermined number of characters, in a predetermine order in a manner switching from one character to another, for selection of a desired one of the characters, to thereby permit entry of a desired character by using a small number of keys (Japanese Laid-Open Patent Publication (Kokai) No. 58-76930).

In the above-mentioned character entry method, however, it is relatively easy to find out a desired character from a character group or set comprised of a small number of characters, such as alphabetical letters, but it is difficult to find out a desired character from a character group or set comprised of a large number of characters, such as Kana (i.e. Hiragana and Katakana) letters and further Kanji letters). In other words, in the case of e.g. Kana letters and further Kanji letters, there is no inevitability in the arrangement or sequence of characters displayed as a candidate, so that to find out an undisplayed character, it is required to move a cursor in one direction or another to switch displayed characters, that is, look for an undisplayed character by trial and error.

Originally, when inputting a character group or set comprised of a small number of characters, such as alphabetical letters, the character entry method as described above cannot provide an advantageous effect over the provision of all keys for entering the characters of the group or set. It is only when characters of a character group or set comprised of a large number of characters are input that the above method of entering characters by using a small number of keys provides the advantageous effect. However, if a large number of characters are to be input, such a character entry method is useless due to its degraded operability.

Further, in order to eliminate any of the above inconveniences at all, to provide a large-sized display screen which is capable of displaying a larger number of candidate characters to be entered for enhancing operability thereof results in increased size and manufacturing cost of a key entry device, so that the same can not be applied to a devise which is desired to have a reduced number of keys for reduction in size and manufacturing costs thereof. This hinders the above character entry method and device from being put into practical use.

Therefore, the tape printing apparatus 1 employs a character entry method which enables characters to be entered by using a small number of keys and a small-sized display screen without spoiling operability thereof. In the following, the character entry method will be described in detail. It should be noted that the following description is made assuming that the Japanese language-adapted type of the tape printing apparatus 1 is operated to characters including Hiragana ("かな") letters, Katakana ("カナ") letters, and Kanji ("漢字") letters.

As described with reference to FIG. 19, to input characters (or symbols), the character key 34C is depressed (when symbols are input, the symbol key 34D is depressed) from the state of the edit mode being the basic entry mode, whereby the basic entry mode is changed to a character (or symbol) selection entry mode (H2 or H3).

For instance, as shown in FIG. 57, when the character key 34C is depressed in the state of the basic entry mode (G110), the basic entry mode is changed to the character selection/entry mode, and at a first level, an option "かな" is displayed (G111). When the delete key 35 is depressed from this state (G111), the edit mode returns to the basic entry mode (G110). Further, when the symbol key 34D is depressed, the edit mode is changed to a symbol selection/entry mode. Furthermore, when the enter key 38 is depressed, the display screen is changed to a second level.

Further, as shown in FIG. 58, whenever the character key 34C or the right arrow key 33R or the down arrow key 33D is depressed from this state (G111), options are sequentially displayed in a circular manner, such as "かな" (Hiragana)→"カナ" (Katakana)→"英字" (alphabet)→"数字" (numeral)="漢字" (Kanji)→"かな" (Hiragana) (G111~G115~G116 (identical to G111)), whereas whenever the left arrow key 33L or the up arrow key 33U is depressed, the options are sequentially displayed in a reverse direction in a circular manner, such that "かな"→"漢字"→"数字"→"英字"→"カナ"→"かな" (G116~G112~G111).

In the following, the character entry method will be described in detail by taking the Hiragana entry mode as an example. Referring to FIG. 59, when the character key 34C is depressed in the basic entry mode (G120: the same as G110 in FIG. 57), as described above, the screen is changed to the first level of the character selection/entry mode to display "かな" (Hiragana) (G121: the same as G111). When the enter key 38 is depressed in this state (G121), the screen is changed to the screen displaying the second level, that is, the screen for selecting and inputting characters. In this state (G112), candidate characters for entry are displayed in a form shown in FIGS. 60A to 60C.

As shown in FIGS. 60A and 60B, a selection screen (G122) for selecting characters is divided into five display areas (five blocks) for controlling. An area at a left end of 24 dots (in the horizontal direction) displays images each in a 6×8 dot matrix, as described above with reference to FIG. 11B. Assuming that an upper display area having coordinates A0 to A3 is defined as a first block, whereas when a lower display block having coordinates B0 to B3 as a second block (see FIGS. 60B and 11B), characters "CODE" are always displayed in the first block, to notify the user that the lower second block designates a character code.

The other three display areas are controlled by full-size/half-size display, described above with reference to FIG. 11A. Assuming that a display block indicated by coordinates C2 to C3 is a third block, a display block indicated by coordinates C4 to C5 a fourth block, and a display block indicated by coordinates C6 to C7 a fifth block, a candidate character for entry is displayed in each of the third to the fifth blocks, and the character displayed particularly in the fourth block is set to an entry designation character at the time point of display.

Further, in the second block, the value of the character code of the character displayed in the fourth block, that is, the entry designation character is displayed. Referring to FIG. 59, when the enter key 38 is depressed in the state of the option "かな" at the first level of the character selection entry mode being displayed (G121) to change the screen to a selection/entry screen for selecting/entering characters at the second level, first, a character selected and determined on the immediately preceding occasion is displayed. Now, for clarity of description, let it be assumed that a Hiragana letter "あ" is displayed as a first entry designation character (displayed at the time point of initialization) under the option "かな" (G122).

For instance, when the Hiragana letter "あ" is displayed as the entry designation character, in the third block, a small Hiragana letter "あ" is displayed adjacent to a front side (left side) of the Hiragana letter "あ", and in the fifth block, a small Hiragana letter "い" is displayed adjacent to a rear side (right side) of the Hiragana letter "あ". That is, in the third to fifth blocks are displayed a plurality of (three) candidate characters adjacent to each other.

Further, in the second block, a character code corresponding to the entry designation character. i.e. the character displayed in the fourth block out of the displayed candidate characters is displayed. In the present embodiment, Japanese graphic character code of JIS is adopted as a predetermined character code (more accurately, Japanese graphic character code of JIS for use with the MD system is adopted, however, the same code is used for the Hiragana letters "かな"), so that [0402] DEC (hereinafter each decimal is represented by "[ ] DEC") is shown in the second block as the character code of the Hiragana letter "あ" displayed in the fourth block (G122).

Although the value of each character code is represented as a number (corresponding to the code number) having digits thereof displayed as respective 6×8 image in 6×8 dot matrix images in the lower four areas of the second block, the display of a thousandth digit in a value equal to or less than [999] DEC (that is, a number of three figures) is omitted. Further, as for [10000] DEC to [10999] DEC, [11000] DEC to [11999] DEC, [12000] DEC to [12999] DEC., the vale of each character code is a number having five digits, and hence a corresponding one of character images dedicatedly provided for display, as shown in FIG. 60C, is used to represent the upper two digits of each of these values of character codes to thereby display the whole code number in the display area.

First, in tape printing apparatus 1 (in the character entry method applied thereto), a predetermined kind-of-character array table is defined, in which a plurality of characters classified into at least one of predetermined kinds of characters, such as Kanji letters, Hiragana letters, Katakana letters, numerals, alphabetic characters and symbols, are caused to correspond to the character codes thereof, and the characters and their codes are arranged into a plurality of lines and a plurality of columns according to a predetermined rule, to thereby form a two-dimensional arrangement.

Assuming that a character located at a j-th column and an i-th row (i and j represent natural numbers) is defined as a character at coordinates [i, j] in the array table (hereinafter simply referred to as "character at [i, j]"), if Hiragana letters ("かな") are taken as an example of a predetermined kind of characters above, an array table as shown in FIG. 61 is defined, in which a plurality of characters classified into the predetermined kind of character (Hiragana letters) are caused to correspond to the character codes thereof (Japanese graphic character code of JIS for use with the MD system), and the characters and their codes are arranged into a plurality of (10 (i=1 to 10)) rows and a plurality of (15 (j=1 to 15)) columns according to a predetermined rule to thereby form a two-dimensional arrangement.

Further, as to other kinds of characters, there are defined array tables provided for the cases of the characters being each set to the predetermined kind of characters (Katakana letters (カナ), see FIG. 68; alphabetic characters, see FIG. 69; numerals, see FIG. 70; and Kanji letters, see FIG. 71).

Although the apparatus 1 according to the present embodiment is configured such that symbols can be selected in a symbol selection entry mode (see FIG. 19) in a manner correlated to the uses of symbols rather than according to the order of character codes (see FIGS. 75 to 78), it is possible to provide an array table according to the character codes to handle symbols similarly to the other kinds of characters (see FIG. 72).

Here, differences in properties or characteristics between Kana letters, i.e. Hiragana and Katakana letters, and the other alphabetic characters, numerals and Kanji letters will be described by referring to symbols which have intermediate properties or characteristics between these two groups of characters.

In an array table shown in FIG. 72, symbols are simply arranged according to values indicated by the character codes of "symbols" to form 12 rows and 10 columns (i=1 to 12, j=1 to 10), such that a character at an intersection of an i-th row and a j-th column is a character at [i, j].

When memorability for the user is taken into account, someone may be of opinion that the user can understand and retain or memorize e.g. a FIG. 73 array table more easily which is a modification of the FIG. 12 array table formed by shifting, a character "☆" ([0189] DEC) at [9, 9] to a character "◎" [0193] DEC at [10, 3] to a 10-th row, [0194] DEC at [10, 4] to [0207] DEC at [11, 7] to an 11-th row, and [0208] DEC to [0214] DEC to a 12-th row.

Further, someone may be of opinion that the user can understand and retain e.g. a FIG. 74 array table more easily which is a modification of the FIG. 73 array table formed by increasing the number of columns to 11 (j=1 to 11) shifting """ ([0141] DEC) at [5, 1] to the end of the fourth row as """ ([0141] DEC) at [4, 11], and setting [0142] DEC to [0149] DEC to the fifth row, [0150] DEC to [0159] DEC to the sixth row, and [0160] DEC to [0170] DEC to e.g. the seventh row.

Whether or not the FIG. 72 array table is easy to for the user to use or retain, or whether or not FIG. 74 is better, or further whether or not there is something wrong in each array table can not be determined with ease since it depends on the sense of each individual to some extent. So long as it is clear that each array table is formed according to predetermined rules, these is little substantial difference between arrays, and hence it may be defined as desired.

On the other hand, in the FIG. 69 array table of alphabetic characters, since the total number of characters is small, the array can be easily retained by the user. Therefore, a simple array table of 4 rows and 13 columns (i=1 to 4, j=1 to 13) will do. A FIG. 70 array table (numeral array table) may be formed of 4 rows and 10 columns (i=1 to 4, j=1 to 13) for the same reason.

Further, in the case of a FIG. 71 array table (Kanji array table), the number of letters is so large that there is little merit in designing the user's original array table, and moreover, if designed, such an array table will be too complicated for the user to retain. Therefore, in the case of Kanji letters or the like, a simple array table having letters arranged according to the order of numeric values of character codes is assumed to be convenient for use.

Next, in the case of Hiragana and Katakana letters, although the total number of characters is so large that it is rather difficult for the user to retain the same, the number is not extremely large, so that there is room for improvement in arrangement or array of character codes. However, since the number is not extremely small, it is required that the user can retain and use the array with ease.

Hiragana and Katakana letters have an array of their own easier to understand than numerical values and known to Japanese language-using people, that is, the array of the systematic table of the Japanese syllabary. Therefore, in the character entry method applied to the tape printing apparatus 1, there are provided array tables for Hiragana and Katakana letters, arranged based on the systematic table of the Japanese syllabary (see FIGS. 61 and 68).

Next, a basic character entry method and a designation-changing method of changing the designation of entry designation characters will be described.

For instance, on the selection/entry screen for selecting and inputting characters ("かな" (Hiragana letters), as described above with reference to FIGS. 59 to 60C, are displayed a plurality of (three) candidate characters including "あ" corresponding to the entry designation character and "あ" and "い" arranged immediately forward of and immediately afterward of "あ" in the predetermined kind-of-character array table (see FIG. 61) Hiragana array table, and at the same time [0402] DEC as a character code corresponding to the entry designation character "あ" (G122).

When the enter key 38 is depressed in this state, as shown in FIG. 59, the entry designation character "あ" is determined as an entry character, and the entry character "あ" is inserted on the left side of the cursor K, followed by returning to the screen in the basic entry mode (G123).

On the other hand, when the right arrow key 33R is depressed in the above state (G122), the designation of the entry designation character is shifted from "あ" to "い" on the right side of "あ". Then, three characters "あ" "い" "い" are displayed as candidate characters for entry and [0403] DEC is displayed as a character code corresponding to the entry designation character "い".

Therefore, when the enter key 38 is depressed in this state, the entry designation character "い" is determined as an entry character, similarly to the case of "あ", and the entry character "い" is inserted on the left side of the cursor K, followed by returning to the screen in the basic entry mode.

Similarly, when the right arrow key 33R is depressed in the state of "い" being designated as the above entry designation character, the designation of the entry designation character is shifted from "い" to "い" on the right side of "い". Then, three characters "い" "い" "う" are displayed as candidate characters for entry and [0404] DEC is displayed as a character code corresponding to the entry designation character "い". If the enter key 38 is depressed in this state, "い" is input.

That is, it is possible to change the designation of the entry designation character through cursor operations including other cursor operations described hereinafter. When the designation is changed, a new entry designation character corresponding to the change and candidate characters for entry adjacent thereto are displayed, and at the same time a character code corresponding to the entry designation character at the time point is displayed.

Hereinafter, the rules for changing entry designation characters through this kind of operation of the cursor (operation of the cursor key 33) are referred to as "the scroll rules". If only the entry designation character can be changed, the following character entry procedure is carried out by the same key operations as described above. Hence, the scroll rules for changing entry designation characters through operation of various cursor keys will be mainly described in the following. Further, description of candidate characters (arranged adjacent to, i.e. immediately forward and immediately afterward of) the entry designation character displayed therewith will be omitted unless otherwise required, since their positions are clearly grasped if a corresponding entry designation character is designated.

Referring to FIG. 62, whenever the right arrow key 33R is depressed, the position of an entry designation character is sifted rightward in the Kana array table by one box (the character on the right side of the present entry designation character is designated as a new entry designation character). In short, the position of an entry designation character is moved from the position of the above "あ" in the order of "あ"→"い"→"い"→"う"→"う"→"え"→ . . . →"お".

Further, according to the scroll rules of the character entry method applied to the tape printing apparatus 1, the code of a character at the end of a desired one of a plurality of rows in an array table and the code of a character at the head of the next row in the array table are processed as character codes adjacent to each other. This scroll rule is commonly applied irrespective of the kinds of characters to be entered. (that is, regardless of which array table including those shown in FIGS. 68 to 74 is used in designating an entry designation character).

For instance, when the above letter "お" is an entry designation character, letters "お", "お" and "か" are displayed as candidate characters. If the designation is changed in a manner "お"→"か", then letters "お", "か" and "が" are displayed as candidate characters. That is, character codes in a plurality of rows are handled as a sequence of character codes, and hence a character at the end of an immediately preceding row and a character at the head of a next row are handled as candidate characters adjacent to each other.

Further, the character code at the end of the last row of a plurality of rows in the array table and the character code at the head of the first row are handled as character codes adjacent to each other. For instance, when a Hiragana letter "ん" is an entry designation character, characters "を", "ん" and "あ" are displayed as candidate characters, whereas if designation is changed in a manner "ん"→"あ", then letters "ん", "あ" and "あ" are displayed as candidate characters. That is, since the rows of the table form a circular sequence of character codes, a character at the end of a last row and a character at the head of a first row can be displayed as candidate characters.

Next, as shown in FIG. 63, whenever the left arrow key 33L is depressed, the position of an entry designation character is shifted leftward on the Kana array table by one box (the character on the left side of the present entry designation character is designated as a new entry description character). In short, the position of an entry designation character (designation position) is moved from the position of the above "あ" in a manner "あ"→"あ"→" "→"を"→ . . . →"わ"→"ろ"→ . . . →"ら"→"よ"→ . . . $\overset{ん}{\rightarrow}$"や"→"も"→ . . . →"ま"→"ぽ"→ . . . →.

Although the above scroll rules are commonly applied irrespective of the kinds of characters, a scroll rule applied to cursor operations using the down arrow key 33D varies with the kinds of characters.

When a change in the character entry designation is carried out based on the alphabetic character array table shown in FIG. 69, if "T" ([0352] DEC) at [2, 7] is designated as an entry designation character and the down arrow key 33D is depressed, the designation is changed to "g" at [3, 7] ([0371] DEC). This scroll rule conforms to the principles or arrangement of the table. This is true when the designation is changed according to the FIG. 70 numeral array table, the FIG. 71 Kanji array table, and the FIG. 74 symbol array table.

That is, the scroll rule in changing the character entry designation through operation of the down arrow key 33D is defined in a manner conforming to principles, i.e. arrangement of each table such that the designation is changed from a character at [i, j] to a character at [i+l, j], except for Kana's ("かな" (Hiragana letters) and "カナ" (Katakana letters)).

On the other hand, when the entry designation character is changed based on the array table of Kana, by depressing the down arrow key 33D, a character at the head of a next row is designated as the entry designation character. For instance, as illustrated in FIG. 64, while a hiragana letter "け" ([0417] DEC) at [2, 7] (see FIG. 61) is designated as the entry designation character, if the down arrow key 33D is depressed, a hiragana letter "さ" ([0421] DEC) at [3, 1] is designated as the entry designation character. That is, according to the array table of the Hiragana letters, it is defined that a first letter in a next (i+1) row is designated.

This is because according to the systematic table of the Japanese syllabary, characters in each of "あ(a)-headed row" to "わ(wa)-headed row" are customarily thought of from the first character in each row. For instance, assuming that to find a desired character the search is shifted from the fourth character "け(ke)" in "か(ka)-headed row" a to the next row i.e. "さ(sa)-headed row", it is easier to start check from the first character "さ(sa)" in the "さ(sa)-headed row" than to start to check from the fourth character "せ(se)" in the same row, so that it is easier to find out the desired character (the apparatus 1 has a higher operability).

Similarly, a scroll rule for changing entry designation characters by operating the up arrow key 33U is defined in a manner conforming to the principles or arrangement of each table (except for Hiragana letters and Katakana letters) such that when the up arrow key 33U is depressed, the entry designation character is changed from a letter at [i, j] to a letter at [i−1, j], while in the cases of Hiragana letters and Katakana letters, as shown in FIG. 65, for instance, it is defined that the entry designation character is changed to a first letter in the immediately preceding (i−1) row.

Therefore, according to the scroll rule for changing entry designation characters of Hiragana and Katakana through operation of the down arrow key 33D or the up arrow key 33U, it is defined that if the entry designation character is changed from one row to an adjacent one, then, a first character on the adjacent row in the Japanese syllabary is designated as a new entry designation character. Therefore, the entry designation character is changed in a manner conforming to the principles or arrangement of each table from a letter at [i, j] to a letter at [i+1, j] or to a letter at [i−1, j], only when the letter as the entry designation character prior to a change corresponds to a first letter in each row of the systematic table of the Japanese syllabary.

As described above, according to the character entry method applied to the tape printing apparatus 1, while a character in an i-th row (i represents a natural number) of a plurality of rows in the array table is designated as an entry designation character, when the entry designation character is changed, a character in a k-th row (k=i−1, or k=i+1) as a preceding row or a next one is designated as a new entry designation character in accordance with the change.

That is, the array table is comprised of a plurality of rows and a plurality of columns formed into a two-dimensional arrangement. The entry designation character can be changed not only in the direction of a sequence of characters in each of the plurality of rows (in the direction of the length of row) but also in the direction of the length of columns, so that it is possible to quickly designate, as the entry designation character, a character at a location remote from the present entry designation character in the array table, thereby enhancing the operability of the device.

Further, there is sometimes a case where a k-th row to which the search is shifted does not have a character in a j-th column corresponding in position to the preceding entry designation character, so that the scroll rules are defined in a more generalized manner to cope with such a case. According to the scroll rule of the character entry method, assuming that a desired j-th character in a desired i-th row is defined as a character at [i, j], to change the entry designation character to a character in the k-th row when the character at [i,] is being designated as the entry designation character, a character at [k, h] (when the number of characters in the k-th row is smaller than the number j, h represents the number of the characters in the k-th row, whereas when the number of characters in the k-th row is equal to or larger than the number j, h=j) is designated as a new entry designation character in accordance with the change.

In this case, the entry designation character can be changed from the character in the j-th column in the i-th row in the array table to the character in the j-th column in k (i−1 or i+1)-th row. Further, when there is not a letter in the k-th row, corresponding to the character in the j-th column, a letter at the end of the k-th row can be designated as a new entry designation character, so that it is easy to expect a character to be displayed as the entry designation character immediately after the position of an entry designation character is shifted to the k-th row. This makes it easy to know in advance characters as new candidate characters for entry, thereby further enhancing the operability of the device.

Further, according to the scroll rules of the character entry method applied to the tape printing apparatus 1, the first one of a plurality of rows in the array table is handled as the row following the last row. This scroll rule is commonly applied irrespective of the kinds of characters to be entered (that is, regardless of which array table including those shown in FIGS. 68 to 74 is used in designating an entry designation character).

For instance, as shown in FIGS. 64 and 65, it is defined that the row following the "わ(wa)-headed row" as the last row (row corresponding to i=10) (in the systematic table of the Japanese syllabary) is defined to be the "あ(a)-headed row" as the first row (initial row: row corresponding to i=10), and that the immediately preceding row of the "あ(a)-headed row" as the first row (row corresponding to i=10) is the "わ(wa)-headed row" as the last row (row corresponding to i=10). This scroll rule is commonly applied irrespective of the kinds of characters. That is, since the rows of the table can be handled as rows in a circular sequence, it becomes easier to change an entry designation character in the direction of the length of columns (scroll between rows), whereby the operability of the device can be further enhanced. Exceptions thereof will be described hereinafter.

Next, a scroll rule for changing entry designation characters by operating the shift/cursor key 33S will be described hereinafter. This scroll rule is commonly applied irrespective of the kinds of characters to be entered (that is, regardless of which array table including those in FIGS. 68 to 74 is used in designating an entry designation character) with the exception for changing entry designation characters of small Hiragana and Katakana letters.

Referring to FIG. 66, assuming that a letter in an i-th row is designated as the entry designation character, if the shift/right arrow key 33RS is depressed, a character at the end of the i-th row is designated. However, when the present entry designation character is a letter at the end of the i-th row, a letter at the end of a next (i+1)-th row is designated as the new entry designation character.

Further, as shown in FIG. 67, assuming that a letter in an i-th row is designated as the entry designation character, if the shift/left arrow key 33LS is depressed, a character at the head of the i-th row is designated. However, when the present entry designation character is a letter at the head of the i-th row, a letter at the head of the immediately preceding (i−1)-th row is designated as the new entry designation character. Exceptions thereof ill be described hereinafter.

It should be noted that the apparatus 1 may be configured such that by operating the shift/up arrow key 33US, a character at the head of the immediately preceding (i−1)-th row is designated, or by shifting the shift/down arrow key 33DS, a character at the head of the next (i+1)-th line is designated. Further, a configuration can be contemplated in which by operating the shift/down arrow key 33DS, a character at the end of the next (i+1)-th line is designated or selected.

Characters at the head and end of each of a plurality of rows in the array tables have the minimum and maximum values of the character codes of the row and tend to indicate features of the row. Therefore, by viewing a character at the head or end of each row, it is possible to easily grasp the characteristics (range or features) of (the values of codes) of the characters in the row.

As described above, according to the character entry method applied to the tape printing apparatus 1, assuming that character in an i-th row (i represents a natural number) of a plurality of rows in an array table is designated as an entry designation character, the entry designation character can be changed to a character in a k-th (k=i−1, or k=i+1) row (preceding row or next row). Further, the entry designation character can be changed to a character as the head or end of the k-th or i-th row, so that the user can readily know about a row where the position of the entry designation character is located immediately before or immediately after a change in the entry designation character. This enables the user to quickly change the entry designation character, which enhances the operability of the apparatus 1.

Further, if the Hiragana letters or Katakana letters are the predetermined kind of characters, the predetermined kind-of-character array table has a plurality of rows of characters arranged based on the systematic table of the Japanese syllabary. That is, since the plurality of rows are arranged based on the systematic table of the Japanese syllabary, it is easier to find out a desired letter, which enhances the operability of the apparatus 1.

Further, in the above case, small letters are included in the predetermined kind of characters (Hiragana letters or Katakana letters), and assuming that a character at an i-th line is designated as the entry designation character, and the entry designation character is to be changed to a small letter as a general rule, the entry designation character can be changed to a large letter corresponding to the small letter as an exception to such cases.

More specifically, as described hereinabove with reference to FIGS. 64, 65 and 67, when a newly designated entry designation character after a change is positioned at the head of a row, if a character at the head of each row is a small character, a large or normal-size character corresponding to the small character is designated as the entry designation character instead of the small letter. That is, in place of the small Hiragana letters "ぁ" ([0401] DEC) of the "ぁ(a)-headed row", "ゃ" ([0467] DEC) of the "ゃ(ya)-headed row", and "ゎ" ([0478] DEC) of the "ゎ(wa)-headed row", the large or normal-sized letters "あ" ([0402] DEC), "や" ([0468] DEC) and "わ" ([0479] DEC) are designated as entry designation characters, respectively.

In general, differently from alphabetic characters, in the case of Hiragana or Katakana letters, large or normal-size letters are by far frequently used than small letters, and hence even when a small letter is designated as the entry designation character, the probability of a designated letter being a letter desired by the user is increased if a large or normal-size letter is exceptionally designated as the entry designation character before designating the small letter. Therefore, when Hiragana or Katakana letters are input, large or normal-size letters are handled by giving priority thereto, whereby it is possible to quickly find and designate a letter desired by the user, thereby enhancing the operability of the device.

As described above, according to the character entry method applied to the tape printing apparatus 1, a plurality of candidate characters for entry are displayed on the display screen, and one of the candidate characters is designated as an entry designation character. Then, after changing the position of the entry designation character, if a character desired by the user is designated as the entry designation character, the character can be finally determined as the character to be entered, whereby the character desired by the user can be entered. That is, the character entry method is basically of a type which displays candidate characters and one of the same is designated as a character for entry, requiring only a small number of keys.

Further, a predetermined kind-of-character array table is defined, in which a plurality of characters classified into a predetermined kind are caused to correspond in position to the character codes thereof and the characters and their codes are arranged into a plurality of rows and a plurality of columns according to a predetermined rule, to thereby form a two-dimensional arrangement. In short, a predetermined kind-of-character array table is defined, in which characters to be input are caused to correspond to the codes thereof. This array table is similar to a so-called character code table generally attached to a character entry device, and if attached to an actual device similarly to the character code table, the user can refer to the array table.

On the other hand, according to the character entry method, a plurality of characters corresponding to a plurality of character codes arranged adjacent to each other in the array table are displayed on the display screen as candidate characters for entry. Since displayed characters corresponding to the character codes arranged adjacent to each other in the array table are displayed as the candidate characters, the user can easily understand with reference to the array table to which direction he is required to change the position of an entry designation character so as to display a desired character.

Further, the code of the entry designation character is displayed on the display screen together with a plurality of candidate characters including the entry designation character, so that the user can easily and quickly find out where the entry designation character designated at the present time point is positioned in the array table with reference to the displayed character code. That is, it is possible to find out, in the array table, both the entry designation character designated at the present time point and a desired character, and hence the user can grasp with ease to which direction he is required to change the position of an entry designation character so as to display a desired character.

Further, after changing the entry designation character, a newly designated character and new candidate characters arranged adjacent to the newly designated character are displayed, and a character code corresponding to the newly designated character is displayed, so that if the direction of change in designation is correct, the result can be ascertained in the array table, whereas if the direction of change in designation is wrong, the result can be checked for correction of the changing error.

In the above cases, it is only required to display at the minimum the present entry designation character as a candidate character, and accordingly, it is sufficient if a character for entry (entry designation character) and characters adjacent to the character for entry can be displayed at the maximum (i.e. two characters in the case of displaying one of characters immediately before and immediately after the character for entry in addition to the entry designation character, or three characters in the case of displaying both the characters immediately before and immediately after the character for entry in addition to the same). In short, the operability of the device cannot be spoiled, even if the display screen is small in size. Therefore, according to the above character entry method, it is possible to input characters by operating a small number of keys without spoiling the operability of the device, even if the display screen is small in size.

It should be noted that predetermined kind-of-character array tables used in the tape printing apparatus 1 are defined, as described above with reference to FIG. 61 and FIGS. 68 to 74, such that the maximum value of values indicated by the codes of characters on any one of a plurality of rows is smaller than the minimum value of values indicated by the codes of characters on a next row. As a result, ranges of values indicated by the codes of characters on respective rows in each array table are prevented from being duplicated. Further, the character codes are sequentially arranged in ascending order, which makes it easy to find out a desired number from the array table, and change the entry designation character to thereby display a desired character therefor.

That is, the user can easily and quickly grasp with reference to the array table to which direction he is required to change the position of an entry designation character to thereby display a desired character for the entry designation character. Moreover, if the direction of changing the designation is wrong, it is easy to view and correct the error, and hence a desired character can be displayed quickly with ease. Therefore, it is possible to input characters by operating a small number of keys without spoiling the operability of the device, even if the display screen is small in size.

It should be noted that in this embodiment, the array table may be defined such that the minimum value of values indicated by the codes of characters in any one of a plurality of rows exceeds the maximum value of values indicated by the codes of characters in a next row. In this case as well, ranges of values indicated by the codes of characters on respective rows in each array table are prevented from being duplicated. Further, the character codes are sequentially arranged in descending order, which makes it easy to find out a desired number from the array table, and change the entry designation character to display a desired character therefor.

That is, similarly to the case of the character codes being arranged in ascending order, the user can easily and quickly grasp with reference to the array table to which direction he is required to change the position of an entry designation character to thereby display a desired character. Moreover, if the direction of changing the designation (i.e. the position of an entry designation character) is wrong, the error can be corrected with ease, and a desired character for the entry designation character can be displayed quickly with ease. Therefore, it is possible to input characters by operating a small number of keys without spoiling the operability of the device, even if the display screen is small in size.

Further, in the above example, an entry designation character is designated by operating the cursor designating the position thereof, and hence it is possible to designate the entry designation character through simple operations by using cursor keys of the general type. Further, the entry of a character is determined by operating the enter key, so that it is possible to determine the entry through a simple operation by using the enter key of the general type.

According to the character entry method applied to the tape printing apparatus 1, one of a plurality of kinds of enterable characters including a predetermined kind of characters is selected as a kind of characters to be entered. When the selected kind of characters is the predetermined kind of characters, characters of the predetermined kind are determined as candidate characters for entry. In this case, even if a kind of characters except for the predetermined kind are included as one of the plurality of kinds of enterable characters, the predetermined kind can be selected as a kind of characters to be entered. Therefore, this method can be applied to a character entry method and device which are capable of entering various kinds of characters.

Further, in the tape printing apparatus 1, a character for entry is for editing a character string read out from a disc storing character strings. Therefore, the character entry method can be used for editing such a character string read out from a disc, e.g. by inserting characters into the character string read out. Furthermore, in the above example, the disc is a mini disc, and hence the character entry method can be applied as a character entry method for editing a character string read out from a mini disc e.g. by inserting characters therein.

Character stings of the above-mentioned kind include a character string indicating the titles of music pieces and a title stored in a disc or a disc title, so that the character entry method can be used as a method for editing a character string read out from a disc e.g. by inserting characters therein, more particularly, for adding artist's names after music titles, changing character strings into ones which make it easy for the user to grasp the contents of the music pieces, or adding desired characters to character strings. For instance, when all the music pieces stored in a disc are composed by the same artist or there is a representative artist among the artists recorded in the disc, the character entry method can be used to add the artist's name or change the title after the name of the artist. Further, it is possible to form a desired label simply by printing a desired print image on a desired label to thereafter peel off a half-die-cut portion defined by half die cutting.

Although in the above embodiment, a remotely controllable MD player is used, this is not limitative, but an MD playback function block similar to the MD player may be incorporated in the tape printing apparatus. Further, the invention can also be applied to other disc playback systems for use with other types of discs, such as a magneto-optical (MO) disc for mainly storing and reproducing music/voice signals as the main information, a rewritable CD (CD-R, etc.), and a DVD for mainly recording and reproducing movie data as the main information, so long as they are capable of reading out main information and attribute information corresponding thereto.

Further, it is also possible to apply the invention to printing apparatuses other than a tape printing apparatus, so long as by using them, the user desires to print the all of the character groups within a predetermined print size, even if the character groups are not read out from the disc.

It is further understood by those skilled in the art that the foregoing are preferred embodiments of the invention, and that various changes and modifications may be made without departing from the spirit and scope thereof.

What is claimed is:

1. An image forming device comprising:

predetermined line count-defining means for defining a reference line count and one or more n-th predetermined line counts each corresponding to a number which is n times as large as said reference line count (n represents a natural, number), with reference to which text data of part or all of basic character strings forming a plurality of lines each including at least one character is converted based on a predetermined font to image data of said part or all of said basic character strings and said image data is arranged in an edit image-forming memory area;

storage means for storing text data of said basic character strings;

determining means for determining whether or not the number of lines of said basic character strings to be formed when said text data of said basic character strings is converted to image data thereof and said image data of said basic character strings is arranged in said edit image-forming memory area exceeds in number any of said one or more n-th predetermined line counts;

edit information character string-forming means for forming edit information character strings, with reference to an n-th post-omission line count calculated by subtracting the number of lines of an n-th predetermined line omission-notifying character string for notifying omission of lines from each n-th predetermined line count which the number of lines of said basic character strings is determined to exceed, by inserting an n-th predetermined line overflow-notifying character string indicative of an excess in line count over said each n-th predetermined line count between an end of a line of said basic character strings immediately before the count of lines of said basic character strings exceeds said n-th post-omission line count and a head of the following line; and edit information image data-forming means for forming data of an edit information image by converting text data of said edit information character strings to image data thereof and arranging said image data of said edit information character strings in an edit information image-forming memory area.

2. An image forming device according to claim 1, wherein said one or more n-th predetermined line counts comprise, a plurality of line counts defined by different values of said n, and wherein the number of lines of said n-th predetermined line omission-notifying character string is identical for all of said plurality of line counts of said one or more n-th predetermined line counts.

3. An image forming device according to claim 1, including:

predetermined line count-setting means for setting one of said one or more n-th predetermined line counts to a predetermined line count with reference to which text data of said basic character strings is converted to image data thereof for arrangement in said edit image-forming memory area;

elided character string-forming means for forming elided character strings by omitting lines of said edit, information character strings after said n-th predetermined line overflow-notifying character string for the set one of said one or more n-th predetermined line counts;

elided basic character string-forming means for forming elided basic character strings in which said n-th predetermined line overflow-notifying character string for the set one of said one or more n-th predetermined line counts is added to said elided character strings; and elided image data-forming means for forming data of an elided image by converting text data of said elided basic character strings to image data thereof and arranging said image data of said elided basic character strings in said edit image-forming memory area.

4. An image forming device according to claim 3, wherein said elided image is a print image for printing on a printing object.

5. An image forming device according to claim 4, wherein said printing object is a tape.

6. An image forming device according to claim 3, wherein said n-th predetermined line omission-notifying character string is formed by an identical character string for all of said one or more n-th predetermined line counts.

7. An image forming device according to claim 6, wherein a predetermined serial number is defined to indicate information of each of said basic character strings, and said n-th predetermined line omission-notifying character string indicates the number of all pieces of information of said basic character strings.

8. An image forming device according to claim 1, wherein said n-th predetermined line omission-notifying character string for said one or more n-th predetermined line counts is formed by a different character string for a different-value of said n.

9. An image forming device according to claim 8, wherein a predetermined serial number is defined to indicate information of each of said basic character strings, and said n-th predetermined line omission-notifying character string indicates the number of omitted pieces of information of said basic character strings.

10. An image forming device according to claim 1, wherein said edit information image is a display image for displaying on a display screen.

11. An image forming device according to claim 1, wherein said edit information character strings correspond respectively to said basic character strings, and wherein said edit information image-forming means converts text data of each of said edit information character strings to image data thereof and arranges said image data of said each of said edit information character strings in said edit information image-forming memory area such that an image of said each of said edit information character strings forms an image of one line of a character string.

12. An image forming device according to claim 1, wherein said n-th predetermined line overflow-notifying character string includes a symbol easily discriminated from other characters.

13. An image forming device according to claim 1, herein said n-th predetermined line overflow-notifying character string includes at least, one character indicative of a number represented by said n.

14. An image forming device according to claim 1, wherein said data of said edit information image is formed by converting text data of only a required range of said edit information character strings to image data thereof and arranging said image data of said required range of said edit information character strings in said edit information image-forming memory area.

15. An image forming device according to claim 1, wherein said text data of said basic image character strings is stored in a disc, the image forming device includes reading means for reading said text data of said basic character strings from said disc.

16. An image forming device according to claim 15, wherein said disc is a mini disc.

17. An image forming device according to claim 15, wherein said reading means includes disc playback means for reading said text data of said basic character strings from said disc.

* * * * *